US009866794B2

(12) United States Patent
Dunn et al.

(10) Patent No.: US 9,866,794 B2
(45) Date of Patent: *Jan. 9, 2018

(54) PORTABLE PRESENTATION SYSTEM AND METHODS FOR USE THEREWITH

(71) Applicant: STEELCASE INC., Grand Rapids, MI (US)

(72) Inventors: Michael H Dunn, Dunwoody, GA (US); Ian G Hutchinson, Atlanta, GA (US); Peter W Hildebrandt, Duluth, GA (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,317

(22) Filed: Jan. 27, 2017

(65) Prior Publication Data

US 2017/0142370 A1 May 18, 2017

Related U.S. Application Data

(63) Continuation of application No. 15/078,494, filed on Mar. 23, 2016, which is a continuation of application
(Continued)

(51) Int. Cl.
*H04N 7/15* (2006.01)
*G06F 3/0481* (2013.01)
(Continued)

(52) U.S. Cl.
CPC ............ *H04N 7/15* (2013.01); *G06F 3/0486* (2013.01); *G06F 3/0488* (2013.01);
(Continued)

(58) Field of Classification Search
CPC .... G06F 3/0412; G06F 3/1423; G06F 3/1431; G06F 3/1438; G06F 3/1454;
(Continued)

(56) References Cited

U.S. PATENT DOCUMENTS 3,911,218 A 10/1975 Suzuki et al.
4,430,526 A 2/1984 Brown et al.
(Continued)

FOREIGN PATENT DOCUMENTS

EP 0279558 A1 8/1998
JP 61288655 A 12/1986
(Continued)

OTHER PUBLICATIONS

Wilkhahn+Hahne GmbH+Co., InterWall. ConsulTable. ConAction range, 12 page brochure, no date.
(Continued)

*Primary Examiner* — Tom Sheng
(74) *Attorney, Agent, or Firm* — Quarles & Brady LLP

(57) ABSTRACT

A method and assembly for sharing information in a conference space, the assembly comprising a display configuration including presentation surface area juxtaposed within the conference space for viewing by an audience, the surface area including at least first and second adjacent presentation sub-spaces, a processor programmed to perform the steps of presenting an interface on the surface area useable to generate session images within at least one of the sub-spaces, the interface including a panel section in which a separate panel icon for each of the session images created during a session is presented, the interface further including a separate space on the surface area associated with each of the sub-spaces, the interface facilitating selection and dragging of panel icons to locations associated with the sub-spaces to control the images presented in each of the sub-spaces, wherein, when a panel icon is dragged to a space, an image currently associated with the sub-space is replaced at the sub-space.

43 Claims, 73 Drawing Sheets

Related U.S. Application Data

No. 13/968,931, filed on Aug. 16, 2013, now Pat. No. 9,471,269, which is a continuation of application No. 13/087,085, filed on Apr. 14, 2011, now Pat. No. 8,610,641, which is a continuation of application No. 11/585,752, filed on Oct. 24, 2006, now Pat. No. 7,948,448, which is a continuation-in-part of application No. 11/446,019, filed on Jun. 2, 2006, now abandoned, which is a continuation-in-part of application No. 11/096,969, filed on Apr. 1, 2005, now abandoned.

(60) Provisional application No. 60/771,908, filed on Feb. 9, 2006, provisional application No. 60/687,389, filed on Jun. 2, 2005, provisional application No. 60/771,908, filed on Feb. 9, 2006.

(51) Int. Cl.
  *G06F 3/0488* (2013.01)
  *G06F 3/0486* (2013.01)
  *G09B 5/06* (2006.01)
  *G09B 5/08* (2006.01)

(52) U.S. Cl.
  CPC ......... *G06F 3/04817* (2013.01); *G09B 5/067* (2013.01); *G09B 5/08* (2013.01)

(58) Field of Classification Search
  CPC ............... G06F 3/0481; G06F 3/04845; G06F 3/04817; G06F 3/0482; G06F 3/0486; G06F 3/0488; G09B 5/067; G09B 5/08; G09G 3/002; G09G 2370/04; H04L 12/1813; H04N 7/15; H04N 9/3102; H04N 9/3147; H04N 9/3197
  See application file for complete search history.

(56) References Cited

U.S. PATENT DOCUMENTS

| | | |
|---|---|---|
| 4,451,895 A | 5/1984 | Sliwkowski |
| 4,495,490 A | 1/1985 | Hopper et al. |
| 4,503,429 A | 3/1985 | Schreiber |
| 4,521,770 A | 6/1985 | Rhyne |
| 4,538,993 A | 9/1985 | Krumholz |
| 4,587,568 A | 5/1986 | Takayama et al. |
| 4,616,336 A | 10/1986 | Robertson et al. |
| 4,659,876 A | 4/1987 | Sullivan et al. |
| 4,667,254 A | 5/1987 | Araki et al. |
| 4,683,468 A | 7/1987 | Himelstein et al. |
| 4,686,522 A | 8/1987 | Hernandez et al. |
| 4,715,818 A | 12/1987 | Shapiro et al. |
| 4,725,829 A | 2/1988 | Murphy |
| 4,736,407 A | 4/1988 | Dumas |
| 4,752,773 A | 6/1988 | Togawa et al. |
| 4,752,893 A | 6/1988 | Guttag et al. |
| 4,763,356 A | 8/1988 | Day, Jr. et al. |
| 4,780,821 A | 10/1988 | Crossley |
| 4,797,106 A | 1/1989 | Umehara et al. |
| 4,815,029 A | 3/1989 | Barker et al. |
| 4,893,116 A | 1/1990 | Henderson et al. |
| 4,897,801 A | 1/1990 | Kazama et al. |
| 4,939,509 A | 7/1990 | Bartholomew et al. |
| 4,953,159 A | 8/1990 | Hayden et al. |
| 4,954,970 A | 9/1990 | Walker et al. |
| 5,002,491 A | 3/1991 | Abrahamson et al. |
| 5,008,853 A | 4/1991 | Bly et al. |
| 5,014,267 A | 5/1991 | Tompkins et al. |
| 5,018,083 A | 5/1991 | Watanabe et al. |
| 5,025,314 A | 6/1991 | Tang et al. |
| 5,027,198 A | 6/1991 | Yoshioka |
| 5,038,158 A | 8/1991 | Ayers et al. |
| 5,050,105 A | 9/1991 | Peters |
| 5,063,600 A | 11/1991 | Norwood |
| 5,073,926 A | 12/1991 | Suzuki et al. |
| 5,101,197 A | 3/1992 | Hix et al. |
| 5,107,443 A | 4/1992 | Smith et al. |
| 5,119,319 A | 6/1992 | Tanenbaum |
| 5,146,552 A | 9/1992 | Cassorla et al. |
| 5,176,520 A | 1/1993 | Hamilton |
| 5,201,011 A | 4/1993 | Bloomberg et al. |
| 5,202,828 A | 4/1993 | Vertelney et al. |
| 5,206,934 A | 4/1993 | Naef, III |
| 5,208,912 A | 5/1993 | Nakayama et al. |
| 5,216,755 A | 6/1993 | Walker et al. |
| 5,239,466 A | 8/1993 | Morgan et al. |
| 5,271,097 A | 12/1993 | Barker et al. |
| 5,280,583 A | 1/1994 | Nakayama et al. |
| 5,293,619 A | 3/1994 | Dean |
| 5,299,033 A | 3/1994 | Watanabe et al. |
| 5,299,307 A | 3/1994 | Young |
| 5,309,555 A | 5/1994 | Akins et al. |
| 5,339,389 A | 8/1994 | Bates et al. |
| 5,347,295 A | 9/1994 | Agulnick et al. |
| 5,375,200 A | 12/1994 | Dugan et al. |
| 5,392,400 A | 2/1995 | Berkowitz et al. |
| 5,412,775 A | 5/1995 | Maeda et al. |
| 5,442,749 A | 8/1995 | Northcutt et al. |
| 5,448,263 A | 9/1995 | Martin |
| 5,463,728 A | 10/1995 | Blahut et al. |
| 5,465,370 A | 11/1995 | Ito et al. |
| 5,473,737 A | 12/1995 | Harper |
| 5,502,727 A | 3/1996 | Catanzaro et al. |
| 5,508,713 A | 4/1996 | Okouchi |
| 5,530,795 A | 6/1996 | Wan |
| 5,530,880 A | 6/1996 | Katsurabayashi |
| 5,537,548 A | 7/1996 | Fin et al. |
| 5,548,705 A | 8/1996 | Moran et al. |
| 5,579,481 A | 11/1996 | Drerup |
| 5,589,873 A | 12/1996 | Natori et al. |
| 5,596,721 A | 1/1997 | Masse et al. |
| 5,608,426 A | 3/1997 | Hester |
| 5,608,872 A | 3/1997 | Schwartz et al. |
| 5,625,833 A | 4/1997 | Levine et al. |
| 5,634,018 A | 5/1997 | Tanikoshi et al. |
| 5,649,104 A | 7/1997 | Carleton et al. |
| 5,651,107 A | 7/1997 | Frank et al. |
| 5,657,049 A | 8/1997 | Ludolph et al. |
| 5,671,380 A | 9/1997 | Hidaka |
| 5,680,636 A | 10/1997 | Levine et al. |
| 5,704,042 A | 12/1997 | Hester et al. |
| 5,717,856 A | 2/1998 | Carleton et al. |
| 5,717,939 A | 2/1998 | Bricklin et al. |
| 5,748,894 A | 5/1998 | Ishizaki et al. |
| 5,754,186 A | 5/1998 | Tam et al. |
| 5,761,419 A | 6/1998 | Schwartz et al. |
| 5,781,727 A | 7/1998 | Carleton et al. |
| 5,790,114 A | 8/1998 | Geaghan et al. |
| 5,790,818 A | 8/1998 | Martin |
| 5,799,320 A | 8/1998 | Klug |
| 5,805,118 A | 9/1998 | Mishra et al. |
| 5,819,038 A | 10/1998 | Carleton et al. |
| 5,822,525 A | 10/1998 | Tafoya et al. |
| 5,831,622 A | 11/1998 | Ayala |
| 5,835,713 A | 11/1998 | FitzPatrick et al. |
| 5,838,914 A | 11/1998 | Carleton et al. |
| 5,870,547 A | 2/1999 | Pommier et al. |
| 5,872,923 A | 2/1999 | Schwartz et al. |
| 5,889,946 A | 3/1999 | FitzPatrick et al. |
| 5,892,509 A | 4/1999 | Jakobs et al. |
| 5,903,252 A | 5/1999 | Ogata |
| 5,920,694 A | 7/1999 | Carleton et al. |
| 5,923,844 A | 7/1999 | Pommier et al. |
| 5,938,724 A | 8/1999 | Pommier et al. |
| 5,940,082 A | 8/1999 | Brinegar et al. |
| 5,944,785 A | 8/1999 | Pommier et al. |
| 5,948,022 A | 9/1999 | Carleton et al. |
| 5,949,432 A | 9/1999 | Gough et al. |
| 5,987,376 A | 11/1999 | Olson et al. |
| 5,995,096 A | 11/1999 | Kitahara et al. |
| 6,008,804 A | 12/1999 | Pommier et al. |
| 6,020,863 A | 2/2000 | Taylor |

(56) References Cited

U.S. PATENT DOCUMENTS

| | | | |
|---|---|---|---|
| 6,046,709 A * | 4/2000 | Shelton | G06F 3/1446 345/1.1 |
| 6,047,314 A | 4/2000 | Pommier et al. | |
| 6,061,717 A | 5/2000 | Carleton et al. | |
| 6,084,638 A | 7/2000 | Hare et al. | |
| 6,091,408 A | 7/2000 | Treibitz et al. | |
| 6,115,022 A | 9/2000 | Mayer, III et al. | |
| 6,219,099 B1 | 4/2001 | Johnson et al. | |
| 6,223,212 B1 | 4/2001 | Batty et al. | |
| 6,237,025 B1 | 5/2001 | Ludwig et al. | |
| 6,262,724 B1 | 7/2001 | Crow et al. | |
| 6,266,691 B1 | 7/2001 | Watanabe et al. | |
| 6,275,223 B1 | 8/2001 | Hughes | |
| 6,335,739 B1 | 1/2002 | Matsukura et al. | |
| 6,340,976 B1 | 1/2002 | Oguchi et al. | |
| 6,342,906 B1 | 1/2002 | Kumar et al. | |
| 6,343,313 B1 | 1/2002 | Salesky et al. | |
| 6,388,654 B1 | 5/2002 | Platzker et al. | |
| 6,411,988 B1 | 6/2002 | Tafoya et al. | |
| 6,473,704 B1 | 10/2002 | Ito et al. | |
| 6,560,637 B1 | 5/2003 | Dunlap et al. | |
| 6,567,813 B1 | 5/2003 | Zhu et al. | |
| 6,587,587 B2 | 7/2003 | Altman et al. | |
| 6,594,390 B2 | 7/2003 | Frink et al. | |
| 6,601,087 B1 | 7/2003 | Zhu et al. | |
| 6,608,636 B1 | 8/2003 | Roseman | |
| 6,614,451 B1 | 9/2003 | Hudson et al. | |
| 6,654,032 B1 | 11/2003 | Zhu et al. | |
| 6,662,210 B1 | 12/2003 | Carleton et al. | |
| 6,693,661 B1 | 2/2004 | Vanderwilt et al. | |
| 6,714,172 B2 | 3/2004 | Matsuzaki et al. | |
| 6,724,373 B1 | 4/2004 | O'Neill, Jr. et al. | |
| 6,735,616 B1 | 5/2004 | Thompson et al. | |
| 6,759,997 B2 | 7/2004 | Someya et al. | |
| 6,783,252 B1 | 8/2004 | Cambron | |
| 6,784,925 B1 | 8/2004 | Tomat et al. | |
| 6,788,319 B2 | 9/2004 | Matsumoto et al. | |
| 6,836,870 B2 | 12/2004 | Abrams | |
| 6,901,448 B2 | 5/2005 | Zhu et al. | |
| 6,925,645 B2 | 8/2005 | Zhu et al. | |
| 6,989,801 B2 | 1/2006 | Bruning | |
| 7,006,055 B2 | 2/2006 | Sukthankar et al. | |
| 7,016,935 B2 | 3/2006 | Lee et al. | |
| 7,018,043 B2 | 3/2006 | Castaldi et al. | |
| 7,027,035 B2 | 4/2006 | Youden | |
| 7,046,213 B2 | 5/2006 | Campbell et al. | |
| 7,069,298 B2 | 6/2006 | Zhu et al. | |
| 7,130,883 B2 | 10/2006 | Zhu et al. | |
| 7,134,079 B2 | 11/2006 | Brown et al. | |
| 7,143,134 B2 | 11/2006 | Petrie et al. | |
| 7,170,531 B2 | 1/2007 | Itoh et al. | |
| 7,180,475 B2 * | 2/2007 | Slobodin | G06F 3/1415 345/2.3 |
| 7,188,317 B1 | 3/2007 | Hazel | |
| 7,200,692 B2 | 4/2007 | Singla et al. | |
| 7,203,755 B2 | 4/2007 | Zhu et al. | |
| 7,238,231 B1 | 7/2007 | Craig et al. | |
| 7,248,231 B2 | 7/2007 | Hurley et al. | |
| 7,373,605 B2 * | 5/2008 | Schaper | G06F 3/1431 345/1.1 |
| 7,451,181 B2 | 11/2008 | Sasaki et al. | |
| 7,454,708 B2 | 11/2008 | O'Neal et al. | |
| 7,486,254 B2 | 2/2009 | Suzuki et al. | |
| 7,532,196 B2 | 5/2009 | Hinckley | |
| 7,542,052 B2 | 6/2009 | Solomon et al. | |
| 7,561,116 B2 * | 7/2009 | Westerinen | G06F 1/1601 345/1.1 |
| 7,640,506 B2 | 12/2009 | Pratley et al. | |
| 7,716,600 B2 | 5/2010 | Sawano | |
| 7,733,366 B2 | 6/2010 | Beavers et al. | |
| 7,834,819 B2 * | 11/2010 | Dunn | G09B 5/02 345/1.1 |
| 7,856,473 B2 | 12/2010 | Horikiri et al. | |
| 7,948,448 B2 * | 5/2011 | Hutchinson | G09B 5/067 345/1.1 |
| 8,103,968 B2 | 1/2012 | Cheng | |
| 8,495,520 B2 | 7/2013 | Islam et al. | |
| 8,610,641 B2 | 12/2013 | Hutchinson et al. | |
| 8,732,373 B2 | 5/2014 | Sirpal et al. | |
| 9,116,656 B2 | 8/2015 | Hutchinson et al. | |
| 9,430,181 B2 | 8/2016 | Dunn et al. | |
| 9,448,759 B2 | 9/2016 | Dunn et al. | |
| 9,465,573 B2 | 10/2016 | Dunn et al. | |
| 9,471,269 B2 | 10/2016 | Dunn et al. | |
| 2002/0067318 A1 * | 6/2002 | Matsuzaki | G06F 3/1423 345/1.1 |
| 2002/0140675 A1 | 10/2002 | Ali et al. | |
| 2003/0085923 A1 | 5/2003 | Chen et al. | |
| 2003/0122863 A1 | 7/2003 | Dieberger et al. | |
| 2003/0197659 A1 | 10/2003 | Arai | |
| 2004/0002049 A1 * | 1/2004 | Beavers | G09B 5/00 434/350 |
| 2004/0125044 A1 | 7/2004 | Suzuki | |
| 2004/0252074 A1 * | 12/2004 | Schaper | G06F 3/1431 345/1.1 |
| 2004/0252185 A1 | 12/2004 | Vernon et al. | |
| 2005/0091610 A1 | 4/2005 | Frei et al. | |
| 2005/0193060 A1 | 9/2005 | Barton | |
| 2005/0195221 A1 | 9/2005 | Berger et al. | |
| 2005/0198141 A1 | 9/2005 | Zhu et al. | |
| 2005/0219223 A1 * | 10/2005 | Kotzin | G06F 1/1626 345/173 |
| 2005/0235215 A1 | 10/2005 | Dunn et al. | |
| 2006/0010392 A1 | 1/2006 | Noel et al. | |
| 2006/0048058 A1 * | 3/2006 | O'Neal | G06F 17/241 715/730 |
| 2007/0044028 A1 | 2/2007 | Dunn et al. | |
| 2007/0065096 A1 | 3/2007 | Ando et al. | |
| 2008/0148152 A1 | 6/2008 | Blinnikka et al. | |
| 2009/0063542 A1 | 3/2009 | Bull et al. | |
| 2009/0153434 A1 | 6/2009 | Cheng et al. | |
| 2009/0327893 A1 | 12/2009 | Terry et al. | |
| 2010/0192072 A1 | 7/2010 | Spataro et al. | |
| 2010/0293598 A1 | 11/2010 | Collart et al. | |
| 2011/0047459 A1 | 2/2011 | Van Der Westhuizen | |
| 2011/0050975 A1 | 3/2011 | Chung | |
| 2011/0175830 A1 | 7/2011 | Miyazawa et al. | |
| 2011/0181603 A1 | 7/2011 | Liang et al. | |
| 2011/0310034 A1 | 12/2011 | Ouchi et al. | |
| 2012/0110509 A1 | 5/2012 | Isozu et al. | |
| 2013/0024821 A1 | 1/2013 | Lee | |
| 2013/0185665 A1 | 7/2013 | Furukawa et al. | |
| 2013/0321340 A1 | 12/2013 | Seo et al. | |
| 2013/0339861 A1 | 12/2013 | Hutchinson et al. | |
| 2013/0339880 A1 | 12/2013 | Hutchinson et al. | |
| 2013/0339888 A1 | 12/2013 | Hutchinson et al. | |
| 2014/0006976 A1 | 1/2014 | Hutchinson et al. | |
| 2014/0068483 A1 | 3/2014 | Platzer et al. | |
| 2014/0359435 A1 | 12/2014 | Zheng et al. | |
| 2015/0227166 A1 | 8/2015 | Lee et al. | |
| 2015/0356943 A1 | 12/2015 | Dunn et al. | |
| 2016/0162250 A1 | 6/2016 | Dunn et al. | |

FOREIGN PATENT DOCUMENTS

| | | |
|---|---|---|
| JP | 62179268 A | 8/1987 |
| JP | 2001217977 A | 8/2001 |
| JP | 2002049453 A | 2/2002 |
| JP | 2003031079 A | 1/2003 |
| WO | 0131397 A1 | 5/2001 |
| WO | 2005099263 A1 | 10/2005 |
| WO | 2006130750 A1 | 12/2006 |

OTHER PUBLICATIONS

PCT International Search Report and Written Opinion, Application No. PCT/US2005/011366, dated Aug. 4, 2005.

PCT International Preliminary Report on Patentability, Application No. PCT/US2005/011366, dated Oct. 12, 2006.

(56) References Cited

OTHER PUBLICATIONS

PCT International Search Report, Application No. PCT/US2006/021233, dated Oct. 6, 2006.
PCT International Preliminary Report on Patentability, Application No. PCT/US2006/021233, dated Dec. 6, 2007.
PCT International Search Report and Written Opinion, Application No. PCT/US2007/082202, dated Jun. 5, 2008.
PCT International Search Report, Application No. PCT/US2007/012671, dated Jan. 3, 2008.
PCT International Preliminary Report on Patentability, Application No. PCT/US2007/0012671, dated Dec. 3, 2008.

* cited by examiner

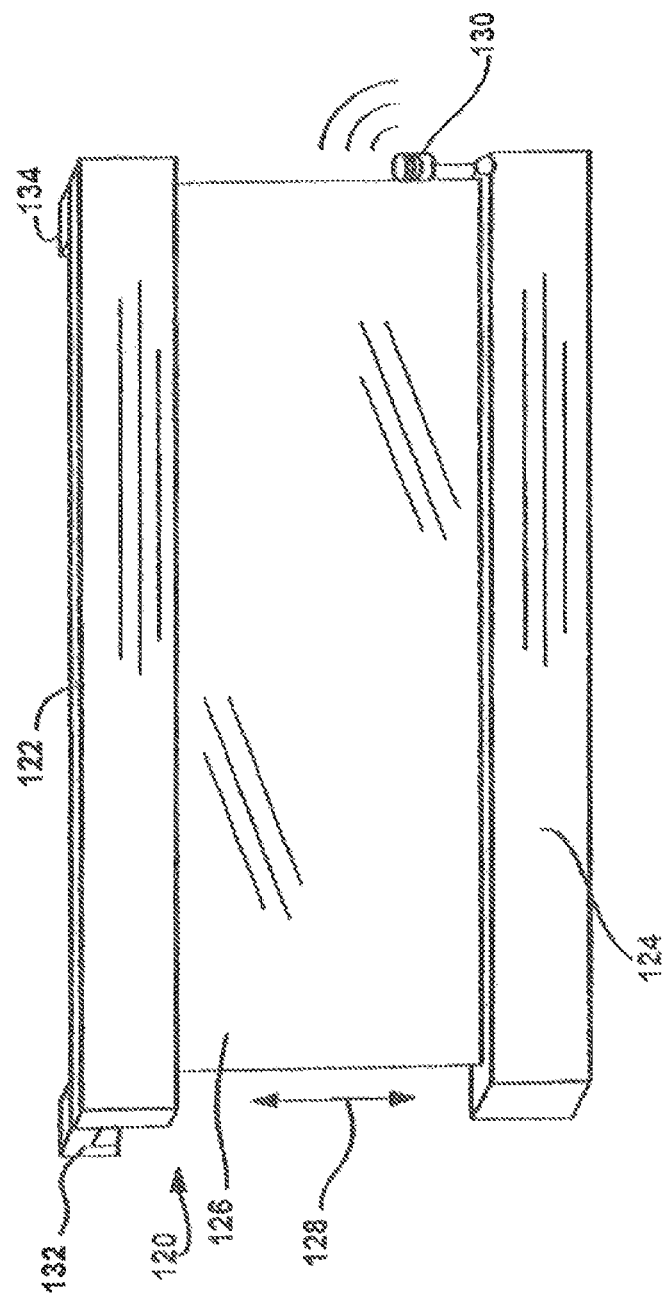

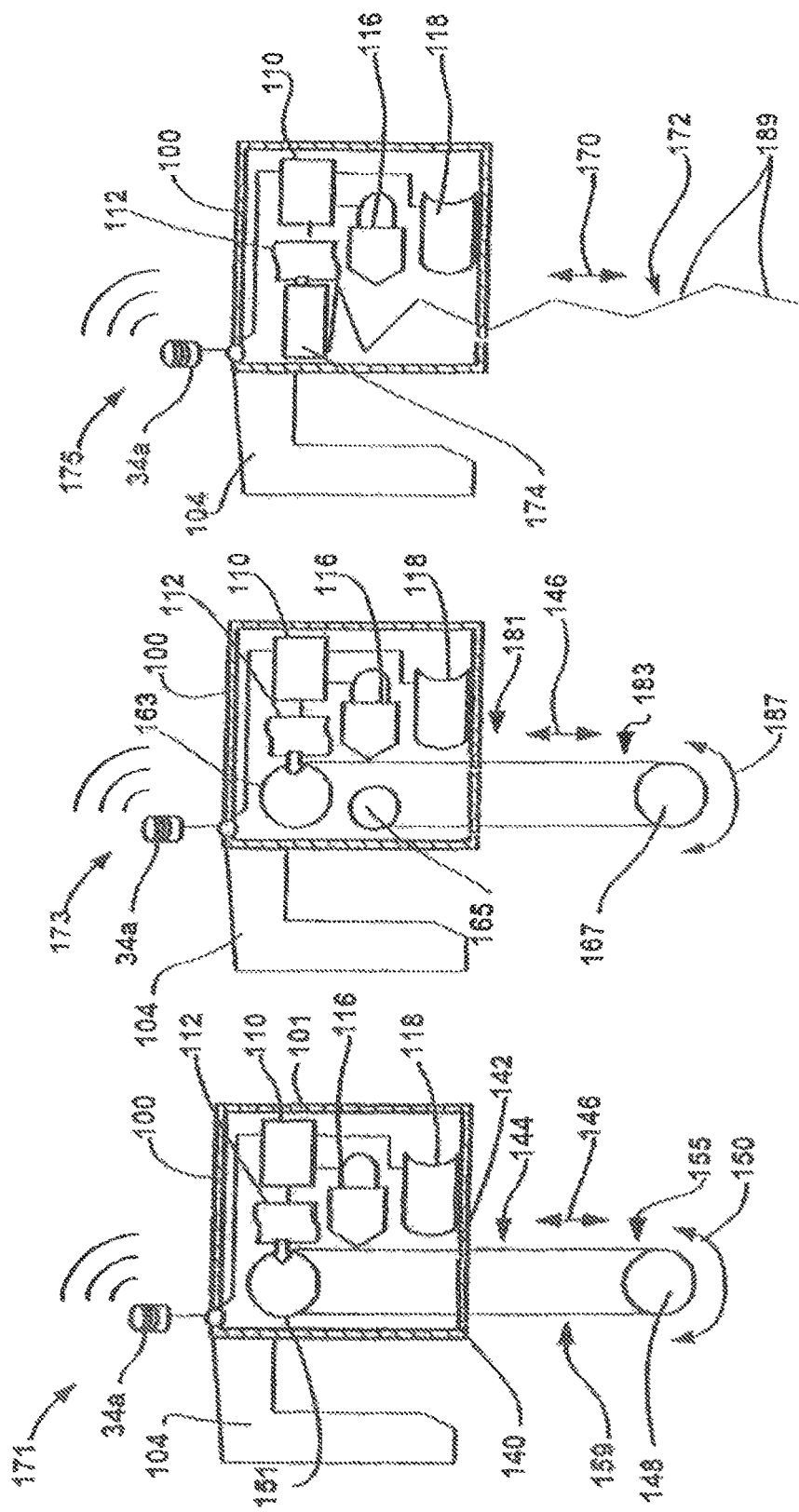

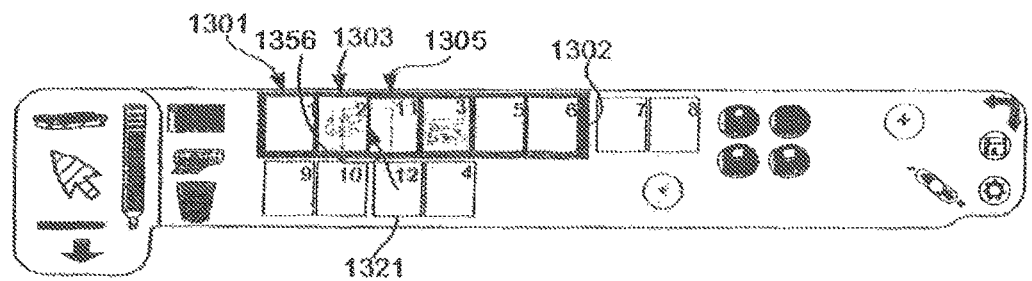
Fig. 48
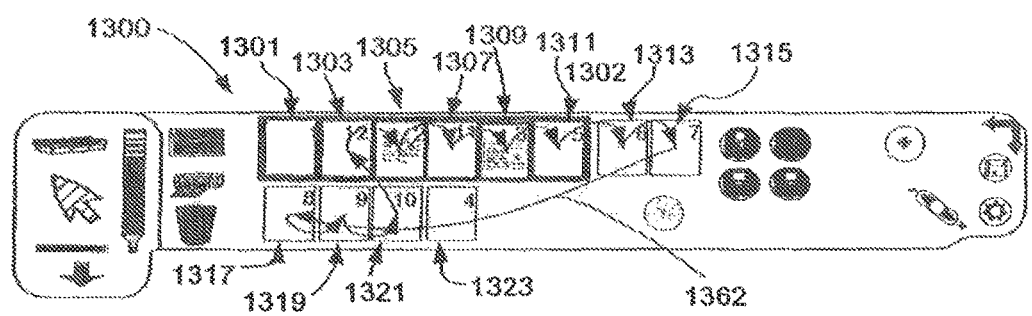
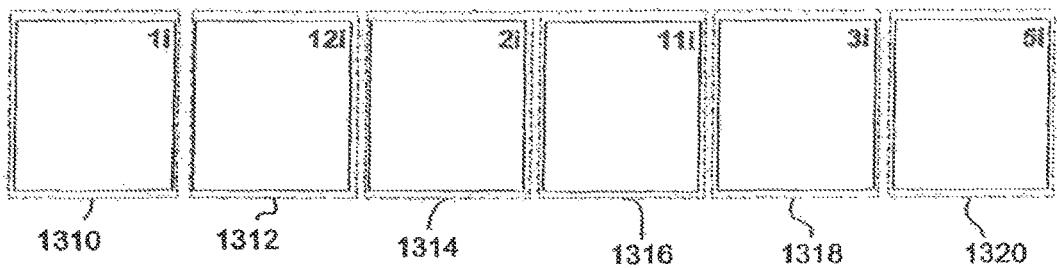
Fig. 49

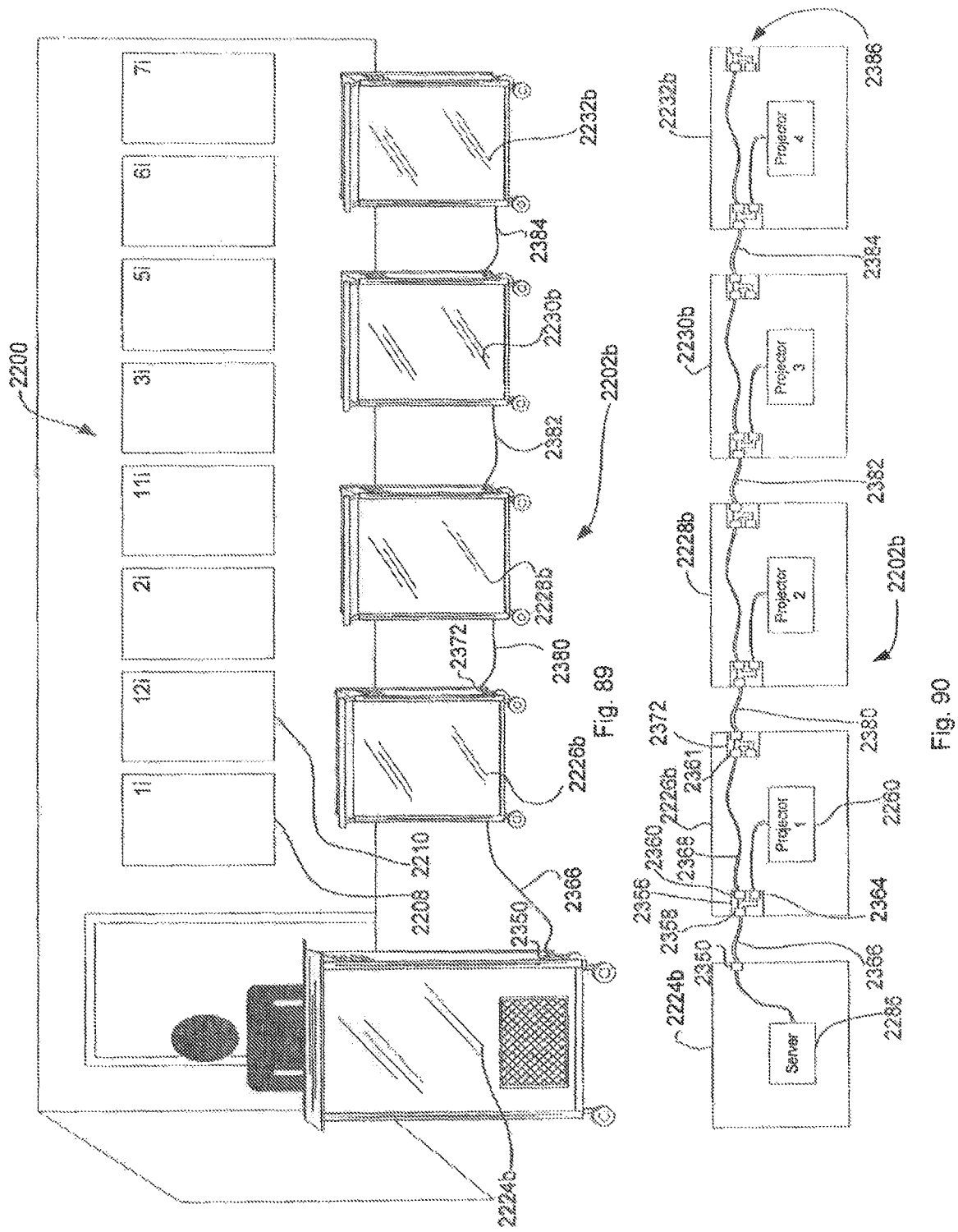

PORTABLE PRESENTATION SYSTEM AND METHODS FOR USE THEREWITH

CROSS-REFERENCE TO RELATED APPLICATIONS

This application is a continuation of U.S. patent application Ser. No. 15/078,494 which is titled "Portable Presentation System And Method For Use Therewith" which was filed on Mar. 23, 2016 which is a continuation of U.S. patent application Ser. No. 13/968,931 which was filed on Aug. 16, 2013 and which is titled "Portable Presentation System And Methods For Use Therewith" which is a continuation of U.S. patent application Ser. No. 13/087,085, which was filed on Apr. 14, 2011, which issued as U.S. Pat. No. 8,610,641 and which is entitled "Portable Presentation System And Method For Use Therewith," which was a continuation of U.S. patent application Ser. No. 11/585,752, now U.S. Pat. No. 7,948,448, which was filed on Oct. 24, 2006, and entitled "Portable Presentation System And Methods For Use Therewith," which claims the benefit of U.S. provisional patent No. 60/771,908, which was filed on Feb. 9, 2006, and entitled "Virtual Flip Chart Method And Apparatus." U.S. patent application Ser. No. 11/585,752, now U.S. Pat. No. 7,948,448, is also a continuation in part of U.S. patent application Ser. No. 11/446,019, which was filed on Jun. 2, 2006, and entitled "Virtual Flip Chart Method And Apparatus," which claims the benefit of U.S. provisional patent No. 60/687,389, which was filed on Jun. 2, 2005, and entitled "Virtual Flip Chart Method And Apparatus," and U.S. provisional patent application No. 60/771,908, which was filed on Feb. 9, 2006, and entitled "Virtual Flip Chart Method And Apparatus." U.S. patent application Ser. No. 11/446,019 is also a continuation in part of U.S. patent application Ser. No. 11/096,969, which was filed on Apr. 1, 2005, and entitled "Virtual Flip Chart Method And Apparatus", and claims priority to each of the above applications and patents, each of which is incorporated herein in its entirety by reference.

STATEMENT REGARDING FEDERALLY SPONSORED RESEARCH OR DEVELOPMENT

Not applicable.

BACKGROUND OF THE INVENTION

The present invention is related to interfaces for large scale presentation systems and more specifically to interface features that enable conference attendees to readily and intuitively share information within a conference space and/or remotely.

The parent applications to this application that are referenced above and that are incorporated herein by reference teach a plurality of conferencing systems, at least some of which include a master presentation unit and one or more slave presentation units that can be set up within a conference space (i.e., a conference room) for sharing information.

In at least some of the embodiments, the master unit includes a large scale flat panel display, a sensor system and a display processor. The processor presents information via the display such as interfaces for software applications, pictures, video, electronic whiteboard images, etc. The processor is linked to the sensor system for receiving information indicative of user activity adjacent/on the display screen and for performing functions associated with the received information and the nature of the activity. For example, where a system operator (i.e., a conference presenter) uses a mechanical stylus as a pen device to draw on the screen, the processor may be programmed to provide virtual ink markings that follow movements of the stylus tip. Similarly, where an application interface is provided on the screen that includes selectable button icons, the processor may be programmed to sense when the stylus is used to contact the screen at a location corresponding to the button icon and may then cause an activity associated with selection of the icon to be performed.

The slave presentation units are also large scale units that include some type of presentation surface that is typically as large or larger than the master unit display screen. The slave units are meant to be positioned adjacent the master unit for viewing by persons within the conferencing space. In at least some inventive embodiments a master unit operator can use the master unit to indicate that information presented via the master unit should be presented via one of the slave units. When an operator indicates that master unit information should be displayed via one of the slave units, the master unit information is so displayed. Thus, the master-slave system is, in at least some respects, akin to a conventional paper based flip chart where the master unit is useable to create and modify images and the slave units are usable to display images of interest after the images are created.

In at least some embodiments the slave units include one or more projectors, each projector projecting one or more slave images on a slave presentation surface. In at least some embodiments two or more master/slave sub-systems can be linked via a network so that conference attendees in remote locations can all simultaneously view the same images.

BRIEF SUMMARY OF THE INVENTION

At least some embodiments include a method for configuring electronic presentation units for cooperative activities, the method comprising the steps of providing a plurality of presentation units in a conferencing space including a master unit and other units, electronically identifying the other units present in the conferencing space, enabling a configuration interface for identifying a sub-set of the other units as slave units, receiving input via the configuration interface identifying the slave unit sub-set and enabling a control interface for transferring images from the master unit to each of the slave units in the selected sub-set.

In some cases the step of providing a plurality of presentation units including a master unit and other units includes providing a plurality of units, enabling at least one initial interface for identifying the master unit and receiving a designation via the initial interface identifying the master unit from among the plurality. In some cases each of the presentation units includes a display screen and the step of enabling the initial interface includes providing a selectable icon via at least one of the unit screens that is selectable to indicate that the unit is the master unit.

In some cases the step of providing presentation units includes providing electronic presentation units that each include a wireless transmitter, the step of identifying the other presentation units in the conferencing space including causing the other units in the space to transmit unique identifiers to the master unit. In some cases the step of causing the other units to transmit includes transmitting a polling signal from the master unit to the other units that causes the other units to transmit the unique identifiers to the master unit. In some cases at least the master unit includes a display screen, the step of enabling a configuration interface for identifying a sub-set of the other units as slave units including presenting a separate selectable icon for each of the other units via the master unit display screen and monitoring for the selected subset.

In some cases the step of enabling a control interface includes enabling at least one transfer tool for each of the selected slave units wherein, when a transfer tool associated with one of the slave units is selected, the image displayed via the master unit is transmitted to the associated slave unit and is displayed. In some cases the master unit includes a display screen and wherein each of the initial interface, the configuration interface and the control interface are provided via the master unit.

In some cases the step of identifying the other units includes transmitting a polling signal from the master unit that causes the other units to transmit identifying information back to the master unit, the step of providing a configuration interface including uniquely identifying each of the other units via the master display screen. In some cases each of the units includes a display screen, the step of enabling a configuration interface including displaying a unique identifier associated with each of the other units, the method further including causing each of the other units to display the associated unique identifier via the other units display screen.

In some cases each of the units includes a display screen, the step of enabling a control interface including displaying a unique identifier associated with each of the selected units, the method further including causing each of the selected units to display the associated unique identifier via the selected units display screen. In some cases the master unit includes the control interface and wherein the unique identifiers are presented via the master unit display screen and are selectable for transferring images from the master display to the slave displays associated with the unique identifiers. In some cases the step of enabling a configuration interface for identifying a sub-set of the other units as slave units includes enabling the interface on the master unit.

Other embodiments include a method for configuring electronic presentation units for cooperative activities, the method comprising the steps of providing a plurality of presentation units in a conferencing space including a master unit and other units wherein each of the presentation units includes a display screen, electronically identifying the other units present in the conferencing space, enabling a configuration interface for identifying a sub-set of the other units as slave units, receiving input via the configuration interface identifying the slave unit sub-set and enabling a control interface for transferring images from the master unit to each of the slave units in the selected sub-set.

In some cases each of the display screens includes a large flat panel display screen. In some cases each of at least a subset of the presentation units is portable and wherein the step of providing a plurality of presentation units includes moving at least a subset of the presentation units into the conferencing space.

Yet other embodiments include a system for facilitating cooperative activities, the system comprising a plurality of presentation units in a conferencing space including a master unit and other units wherein each of the presentation units includes a display screen, a processor programmed to perform the steps of identifying the other units present in the conferencing space, enabling a configuration interface for identifying a sub-set of the other units as slave units, receiving input via the configuration interface identifying the slave unit sub-set and enabling a control interface for transferring images from the master unit to each of the slave units in the selected sub-set.

BRIEF DESCRIPTION OF THE SEVERAL VIEWS OF THE DRAWINGS

FIG. 6 is a perspective view of a second embodiment of a slave unit that may be used with the master unit of FIG. 1;

FIG. 7 is a view similar to the view of FIG. 5, albeit illustrating another exemplary slave presentation unit design;

FIG. 8 is a similar to FIG. 7 albeit illustrating one additional slave presentation unit;

FIG. 9 is similar to FIG. 7 albeit illustrating yet one more slave presentation unit embodiment;

FIG. 10b is a schematic view of components that make up one embodiment of the interface unit of FIG. 10a;

FIG. 48 is similar to FIG. 46, albeit illustrating the tool area in another state.

FIG. 49 is similar to FIG. 44, albeit illustrating a tool area and slave presentation spaces in yet another state;

FIG. 89 is a schematic showing yet another kit system similar to the kit system of FIG. 78;

FIG. 90 is a schematic view showing how the components of the system in FIG. 89 are connected;

DETAILED DESCRIPTION OF THE INVENTION

Figure 1:
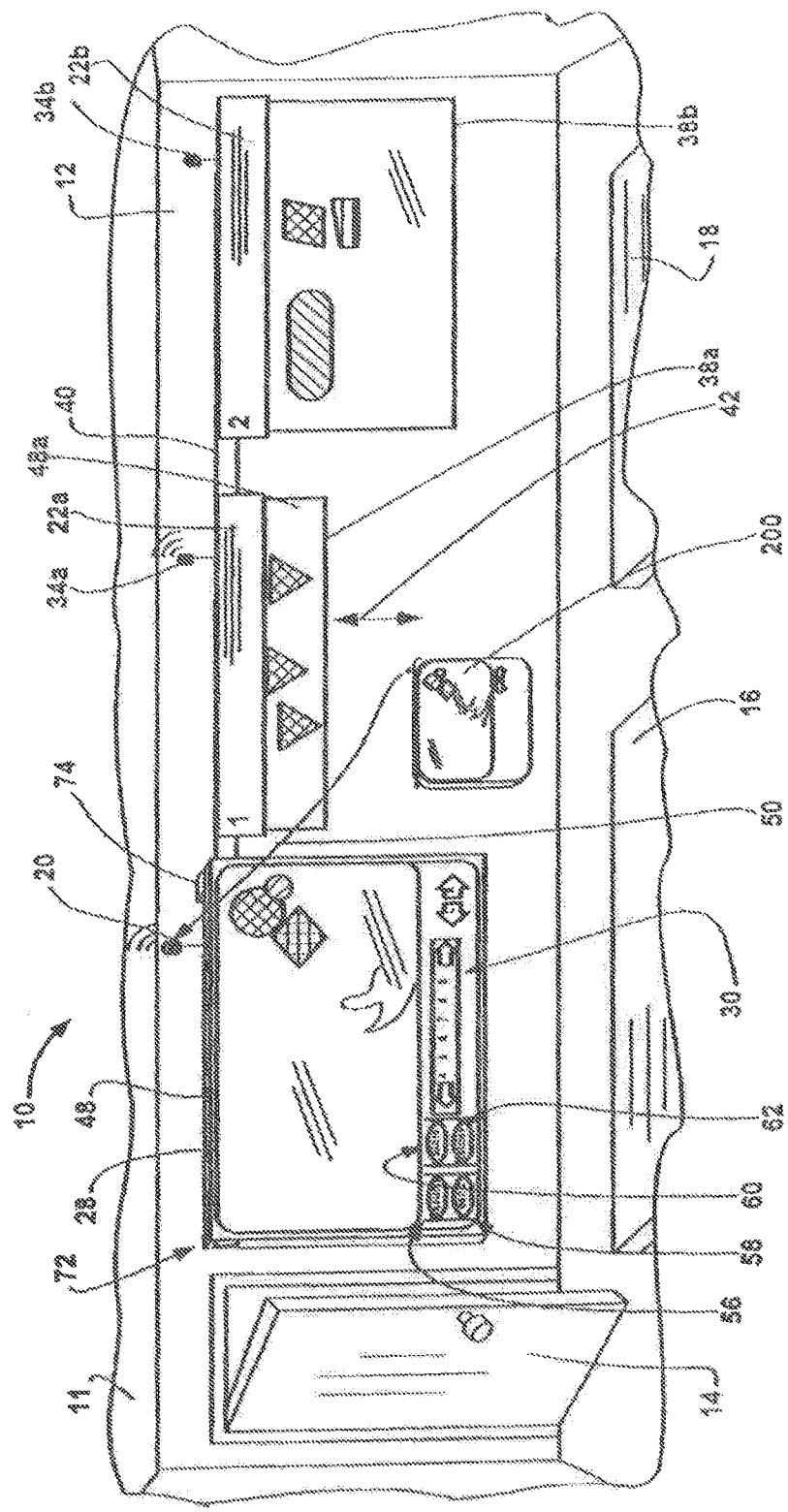
FIG. 1 is a perspective view of an exemplary flipchart mimicking system according to one embodiment of the present invention including a master presentation unit and first and second slave presentation units.

While the present invention may be embodied in any of several different forms, the present invention is described here with the understanding that the present disclosure is to be considered as setting forth exemplary embodiments of the present invention which are not intended to limit the invention to the specific embodiment(s) illustrated.

Referring now to the drawings wherein like reference characters represent similar elements throughout the several views and, more specifically, referring to FIG. 1, while the system components to be described may be used in any space to present information to an audience and/or to facilitate collaborative activity between a system operator and an audience, in order to simplify this explanation, the systems and components will be described in the context of an exemplary conference room 11 including a presentation wall 12 generally located at a front end of the conference room 11, a door 14 for entering and exiting the conference room 11 and a plurality of conference tables or desks, two of which are identified by numerals 16 and 18, respectively. The tables 16 and 18 are arranged as are seats (not illustrated) within room 11 so as to orient audience members within room 11 to easily observe information presented to the audience at the front of room 11 adjacent wall 12.

Figure 3:
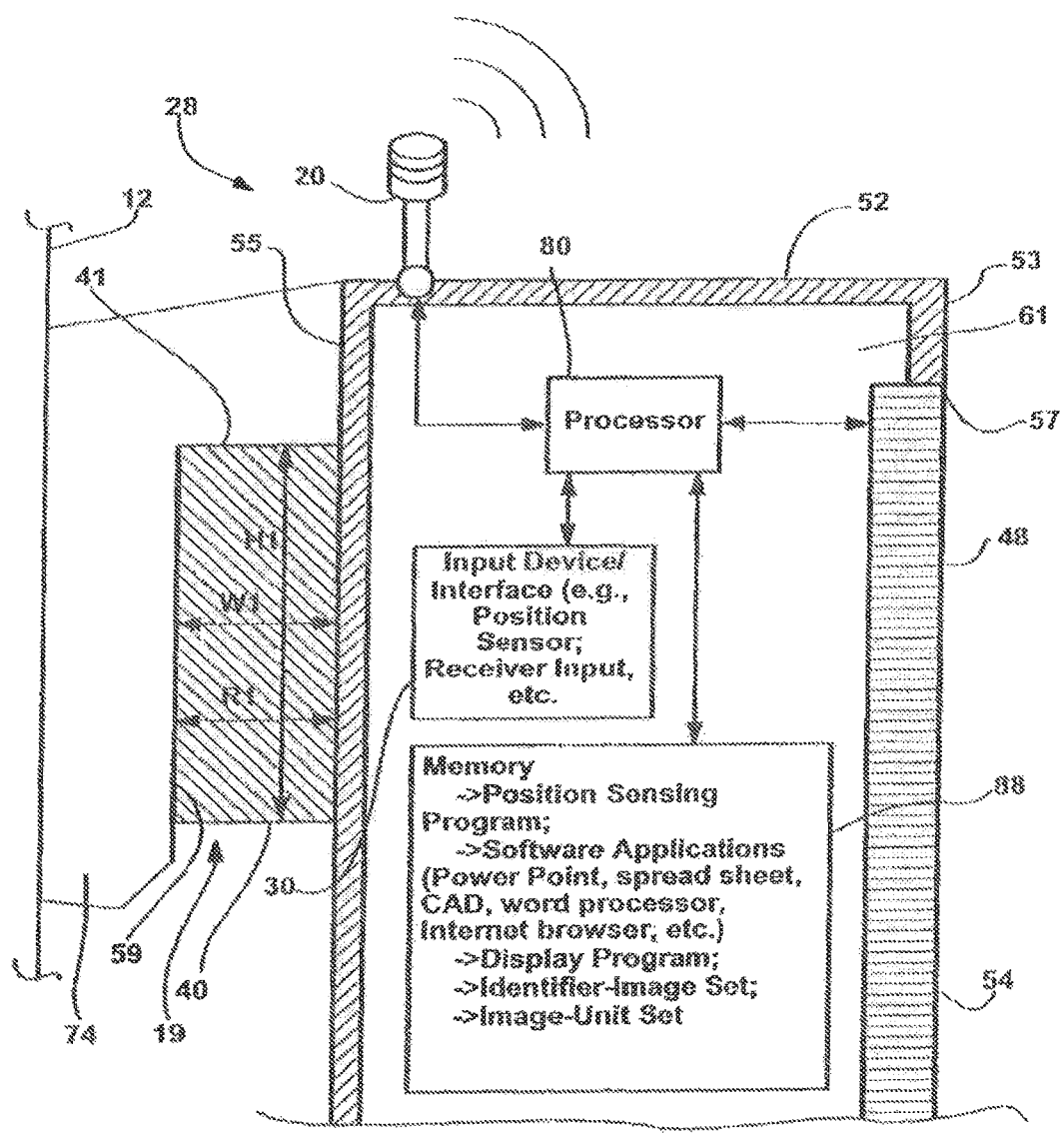
FIG. 3 is a schematic partial cross sectional view of the master unit of FIG. 2.

In at least some embodiments of the present invention, an elongated horizontal rail 40 is mounted to wall 12 at approximately 6 to 7 feet above the floor within room 11 for either temporarily or permanently supporting master and slave presentation units adjacent wall 12. Referring also to FIG. 3, rail 40 has a height dimension H1 and a width W1 that are perpendicular to the length of rail 40 and forms a horizontal top surface 41. Rail 40 may be mounted to wall 12 in any secure manner including bolts or the like and is held off the surface of wall 12 such that distal ends (e.g., 74 in FIG. 3) of presentation unit mounting members to be described in greater detail below fit between the wall and a rear surface of rail 40.

Figure 2:
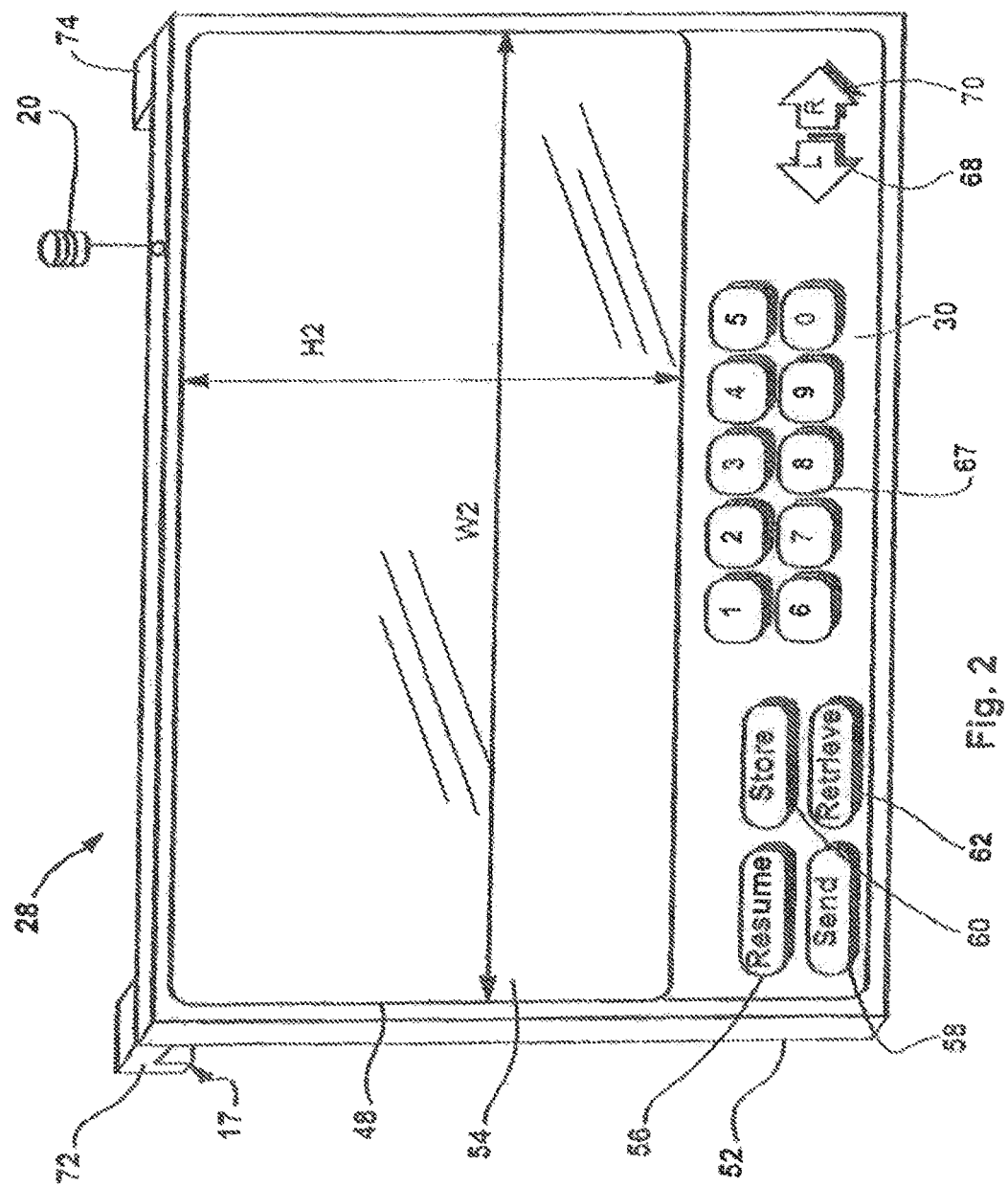
FIG. 2 is an enlarged perspective view of the master presentation unit of FIG. 1.

Referring still to FIG. 1, an exemplary first system 10 includes a master presentation unit 28 and first and second slave presentation units 22a and 22b, respectively. As illustrated in FIG. 1, each of the presentation units 28, 22a, 22b, etc., are mounted to and hang from rail 40 adjacent wall 12 so that front presentation surfaces (generally identified by numeral 48 or numeral 48 followed by a lower case letter) are easily observable by an audience within room 11. Referring also to FIGS. 2 and 3, master presentation unit 28 is an electronic image-forming device which, in the illustrated embodiment, includes a flat plasma or liquid crystal type display screen 48 mounted within a rigid generally rectilinear and relatively thin plastic or metal housing assembly 52, a transceiver 20 and first and second mounting hooks or members 72, 74, respectively.

Referring also to FIG. 3, housing 52 includes oppositely facing front and rear surfaces 53 and 55, respectively. Front surface 53 forms an opening 57 in which screen 48 is mounted so that a front surface 54 thereof having a width dimension W2 and a height dimension H2 is observable. Mounting members 72 and 74 extend from opposite lateral upper corners of rear surface 55 and extend downwardly at distal ends thereof so as to form channels 17 and 19 between rear surface 55 and facing surfaces of the distal ends (one of the facing surfaces identified by numeral 59 in FIG. 3). Each channel 17, 19, has a recess dimension R1 which is substantially similar to width dimension W1 of rail 40 (see FIG. 3).

To mount master unit 28 to rail 40, as best illustrated in FIGS. 1 and 3, unit 28 is lifted and positioned with respect to rail 40 such that the channels formed by members 72 and 74 are above rail 40. Thereafter, unit 28 is lowered until sections of rail 40 are received within the channels formed by members 72 and 74 and so that members 72 and 74 are generally supported on the top rail surface 41 (see FIG. 3). Although not illustrated, one or more additional extension member may be provided that extends from rear surface 55 proximate the bottom end thereof to contact the wall 12 surface and stabilize unit 28 in a substantially vertical orientation.

Referring again to FIG. 3, in addition to the components described above, exemplary master presentation unit 28 includes a processor 80, a keyboard or other type of control interface 30 (i.e., the keyboard is not necessary where interactivity is provided via other means such as selectable on-screen icons, etc.) and a digital memory 88. Processor 80 and memory 88 are mounted within cavity 61 formed by housing 52 while keyboard 30 includes keys supported by the housing structure. Processor 80 is linked to each of transceiver 20, display screen 48, keyboard 30 and memory 88 via a plurality of data busses (not labeled). Generally, transceiver 20 is capable of transmitting and receiving information via any of several different wireless technologies (e.g., RF, infrared, etc.) and via any of several different wireless communication protocols (e.g., 802.11b, Bluetooth, etc.) within the vicinity of transceiver 20 (e.g., within the space defined by a conference room 11).

Memory 88 is a digital memory device and includes a plurality of different types of information usable by processor 80 to perform various methods. Generally, the information stored in memory 88 takes two forms including programs run by processor 80 and data such as images presented via display screen 48. Programs run by processor 80 include, in at least some cases, position sensing programs for sensing the position of virtual ink pens and virtual ink type eraser devices used to add information to and delete information from screen 48 as well as display driver programs for presenting information via display 48.

In addition, memory 88 includes programs used to manage images present via display 48. For instance, in at least some embodiments of the present invention, a program in memory 88 may assign unique identifier numbers or the like to each image flipped from unit 28 to one of the slave presentation units and may store each flipped image and corresponding identifier number within memory 88 for subsequent access. As another instance, when an image is flipped to a specific one of the slave presentation units, the master unit processor 80 may be programmed to correlate and store the flipped image with a unit identifier that uniquely identifies the slave unit to which the image is being flipped. After an identifier and an image is stored in memory 88, the image may be accessed via reference to the unique identifier.

Moreover, in at least some embodiments of the present invention, copies of conventional software applications such as PowerPoint, various spread sheet applications, CAD applications, word processor applications, internet browser applications, etc., may be stored within memory 88 for access and running by processor 80. Here, it should be appreciated that, in at least some embodiments of the invention, conventional software applications may not be useable with system 10 and in that case, copies of the conventional software applications would not be stored in memory 88. Moreover, it should be appreciated that, in at least some embodiments of the invention, software applications such as PowerPoint, spreadsheets and the like may be stored in or accessed via a palm or laptop type computer useable with master presentation unit 28 so that, while processor 80 is used to display images corresponding to conventional software applications, processor 80 itself does not run the software applications. Here, the computer would run the programs and provide information to processor 80 to drive the display 48.

Referring still to FIG. 3, control interface 30 may include various types of input devices. For instance, in at least some embodiments of the invention, it is contemplated that mechanical hardware type buttons like the keys illustrated in FIG. 2 may be provided within the front surface 53 of housing 52 for providing commands to processor 80 such as flip commands (i.e., commands that indicate that an image currently on display 48 should be transmitted to slave presentation units and then removed from display 48) and other data access and program control commands. In the alternative, or in addition to hardware type buttons, in at least some embodiments of the invention, it is contemplated that touch selectable icons may be provided on display screen 48 for selection by a system operator which, when selected, provide command signals to processor 80 to perform processes. In some cases the input device 30 may include image augmentation capabilities (i.e., be in part an augment interface) so that marks can be added to an image on screen 48 or deleted. To this end, see U.S. patent application Ser. No. 10/452,178 which was filed on Jun. 2, 2003 that is entitled "Electronic Whiteboard" and which is incorporated herein in its entirety by reference. In the alternative, in at least some embodiments of the invention, input to master unit 28 may always be via a palm or laptop type computing device (e.g., a portable control interface) where commands to processor 80 are received via transceiver 20.

Hereinafter, unless indicated otherwise, in order to simplify this explanation, it will be assumed that the master unit 28 includes a mechanical type keyboard 30. In addition, unless indicated otherwise, palm and laptop computers and control devices will be referred to generally as hand held devices (HHDs). Moreover, while unit and device communication may be wired, it will be assumed here that all unit and device communication is via a wireless protocol and transceivers (e.g., 20 in FIG. 2).

Referring once again to FIGS. 1 and 2, exemplary master unit keyboard keys include a resume key 56, a send or Flip key 58, a store key 60, a retrieve key 62, a left send key 68, a right send key 70, and a number pad 67. The selectable keys described and illustrated herein are only exemplary and, in many cases, additional selectable keys or a subset of the keys described herein may be provided via display 48, the selectable key set being dependent upon the functions supported by the system 10 and, in at least some cases, the relative juxtaposition of system components. In addition, where conventional software programs are run by processor 80 or where display 48 is used as a large display for an HHD running conventional software programs, mouse or touch selectable icons required to support the software applications may appear on display 48.

Referring still to FIGS. 1 and 2, in at least some cases, it is contemplated that master presentation unit 28 may be positioned to one side of the slave presentation units 22a, 22b, etc. relative to an audience viewing the units within room 11. In this case, to flip an image from display 48 to one of the slave presentation units 22a, 22b, etc., there must be some way to specifically identify the slave unit to receive the flipped image. In the exemplary embodiment described herein, unique slave unit identifiers "1" and "2" are provided on each one of the slave units 22a, 22b, etc., which are easily viewable by a system operator when the operator is in a position to facilitate collaborative activity by interacting with master unit 28. In FIG. 1, the unit identifiers "1" and "2" are permanently printed at one end of each of the unit housing assemblies.

In the present example, processor 80 is programmed to monitor keyboard 30 for an indication that the image on display 48 is to be flipped to one of units 22a or 22b. In this case, it is contemplated that, to flip an image to one of units 22a or 22b, a system operator uses number 67 to select the unit identifier number corresponding to the unit to which the image is to be flipped and subsequently selects send key 58. For example, to flip an image from display 48 to unit 22a, the operator uses pad 67 to select number "1" and then selects key 58. Similarly, to flip an image to unit 22b, the operator selects number "2" from pad 67 and subsequently selects send key 58.

Here, it is assumed that each separately addressable slave units and also, in some embodiments, master unit 28, has a unique network address that can be used to send data thereto. For instance, in FIG. 1, slave units 22a and 22b may be assigned unique wireless addresses "XP45519784" and "QZ1433217", respectively, while master unit 28 is assigned address "AM7966142". The addresses of slave screens are correlated with the unique salve unit identifiers (e.g., "1" and "2" in the present example) and the correlated addresses and identifiers are stored in master unit memory 88. In addition, processors in each of the slave units 22a, 22b, etc., are programmed to monitor for and receive wireless signals sent to their respective network addresses. When a slave unit is selected as a target for a flipped image, processor 80 identifies the network address associated with the target slave unit, generates an image data packet including the image and the address of the target slave unit, transmits the data packet to the selected slave unit and then, in at best some embodiments, erases the image from display 48 (i.e., blanks display 48) or otherwise renders the image unobservable via display 48 to provide a clean and clear surface 48 in a manner that mimics a conventional paper pad type flip chart. In other embodiments a second affirmative step may be required to render the master image un-observable.

In at least some embodiments of the present invention, master presentation unit 28 is also useable to retrieve images presented via the slave presentation units 22a, 22b, etc., so that those images can be edited and then re-presented via the slave units in the edited form. To this end, referring still to FIGS. 1 through 3, when an image is flipped from master unit 28 to one of the slave units 22a, 22b, etc., in at least some inventive embodiments, the image data received by the slave unit is temporarily stored in a slave unit memory (see 119 in FIG. 5).

After an image is presented via a slave unit, if a system operator wants to edit that image, in a manner similar to the manner described above for flipping an image to unit 22b, the system operator uses number pad 67 to select the identifier number corresponding to the slave unit and then selects retrieve key 62. When retrieve key 62 is selected, master processor 80 forms a retrieve data packet including an image retrieve request and the address of the slave unit from which to retrieve the image and wirelessly transmits the retrieve data packet to the slave unit. In response, the slave unit generates an image data packet including the slave image and the network address of the master unit and transmits the image data packet back to the master unit 28. When unit 28 receives the image data packet, master unit 28 re-presents the image via display 48 for further collaborative viewing/editing.

Instead of accessing slave images from slave unit memories as described above, in at least some inventive embodiments, when master unit 28 flips an image to a slave unit, the image may be correlated with and stored with the unique slave unit identifier in master unit memory 88. Thereafter, when an operator wants to re-present a slave image via master unit 28 for editing or the like, the operator can select the appropriate slave unit identifier (i.e., the identifier number associated with the slave unit presenting the image to be re-accessed) via number pad 67 followed by retrieve key 62 causing processor 80 to access the previously stored image in memory 88 and present the image via display 48.

Referring yet again to FIGS. 1 through 3, according to at least one aspect of the present invention, during a presentation or collaborative activity, after images are presented via one or more of the presentation units 28, 22a, 22b, etc., if an operator wishes to cease a presentation with the intention of continuing the presentation at a later time, a function is provided whereby the operator can quickly store all of the images currently presented via the presentation units such that, upon resuming the presentation or collaborative activity, all of the currently presented images can be quickly and immediately re-presented via the presentation units in the same relative juxtapositions. To this end, processor 80 may be programmed to monitor store key 60 and, when icon 60 is selected, may correlate each of the unique presentation unit identifiers (e.g., "1", "2", etc., an identifier uniquely associated with master unit 28, etc.) with the image currently displayed by the corresponding presentation unit as an image-unit set and then to store the image-unit set in memory 88. Thereafter, to re-present the images via the master and slave units at a subsequent time, the operator may select resume key 56 after which processor 80 accesses the image-unit set and re-presents those images via the master and slave units.

Here, when an image-unit set is stored or is re-accessed, processor 80 may be programmed to enable the operator to uniquely identify the image-unit set by providing a name therefore useable to recognize the specific image-unit set. In this case, more than one image-unit set may be stored in memory 88 and subsequently unambiguously retrieved to resume presentations.

While images may be stored with unit identifiers, it should also be appreciated that similar results can be achieved by storing images along with network addresses when store key 60 is selected. Here, when a session is resumed, processor 80 simply accesses the stored images and addresses and flips the images to the correlated addresses without having to perform the intermediate step of correlating the unit identifiers and addresses.

In at least some embodiments it is contemplated that the number of slave units used with a master unit will not change and that keys dedicated to specific slave units and functions may be provided on keyboard 30. For instance, where a system 10 only includes one master unit 28 and two slave units 22a and 22b, separate send and retrieve keys for each of the slave units 22a and 22b may be provided so that single key selection can cause image flipping/retrieving. Similarly, referring once again to FIG. 1, in at least some cases, it is contemplated that a master unit 28 may be positioned between two slave units (i.e., master unit 28 and slave unit 22a would be swapped so that unit 28 is between slave units 22a and 22b). In this case, simple left and right send icons 68 and 70, respectively, may be used to flip images from master unit 28 to the slave units to the left and right of the master unit, respectively. Although not illustrated, simple left and right retrieve arrow icons similar to icons 68 and 70 may also be provided for retrieving images from the slave units to be re-presented via screen 48.

Figure 4:
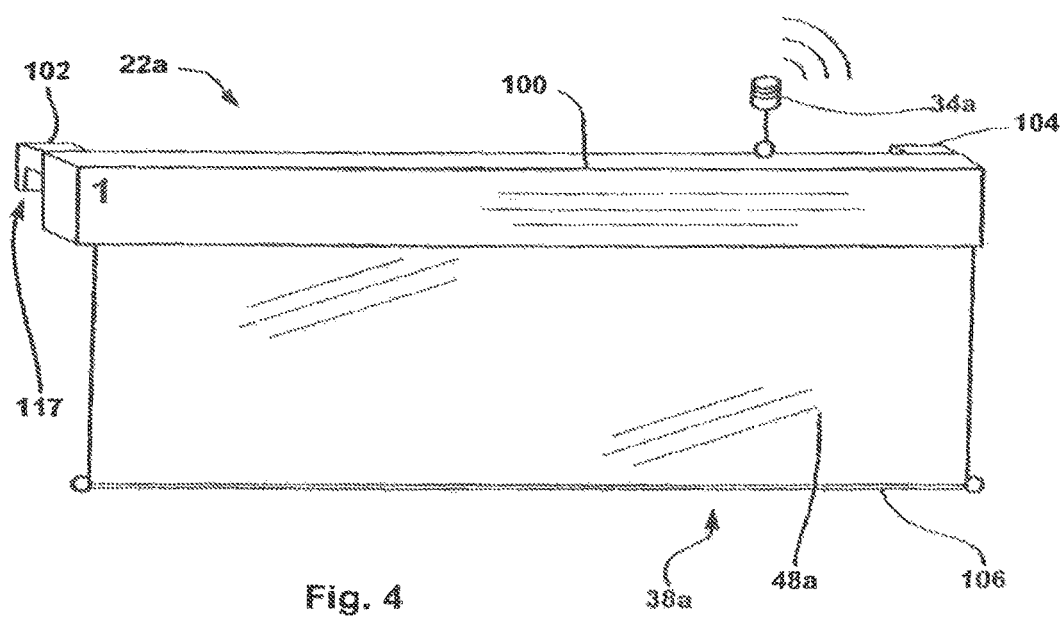
FIG. 4 is a perspective view of one of the slave units of FIG. 1.
Figure 5:
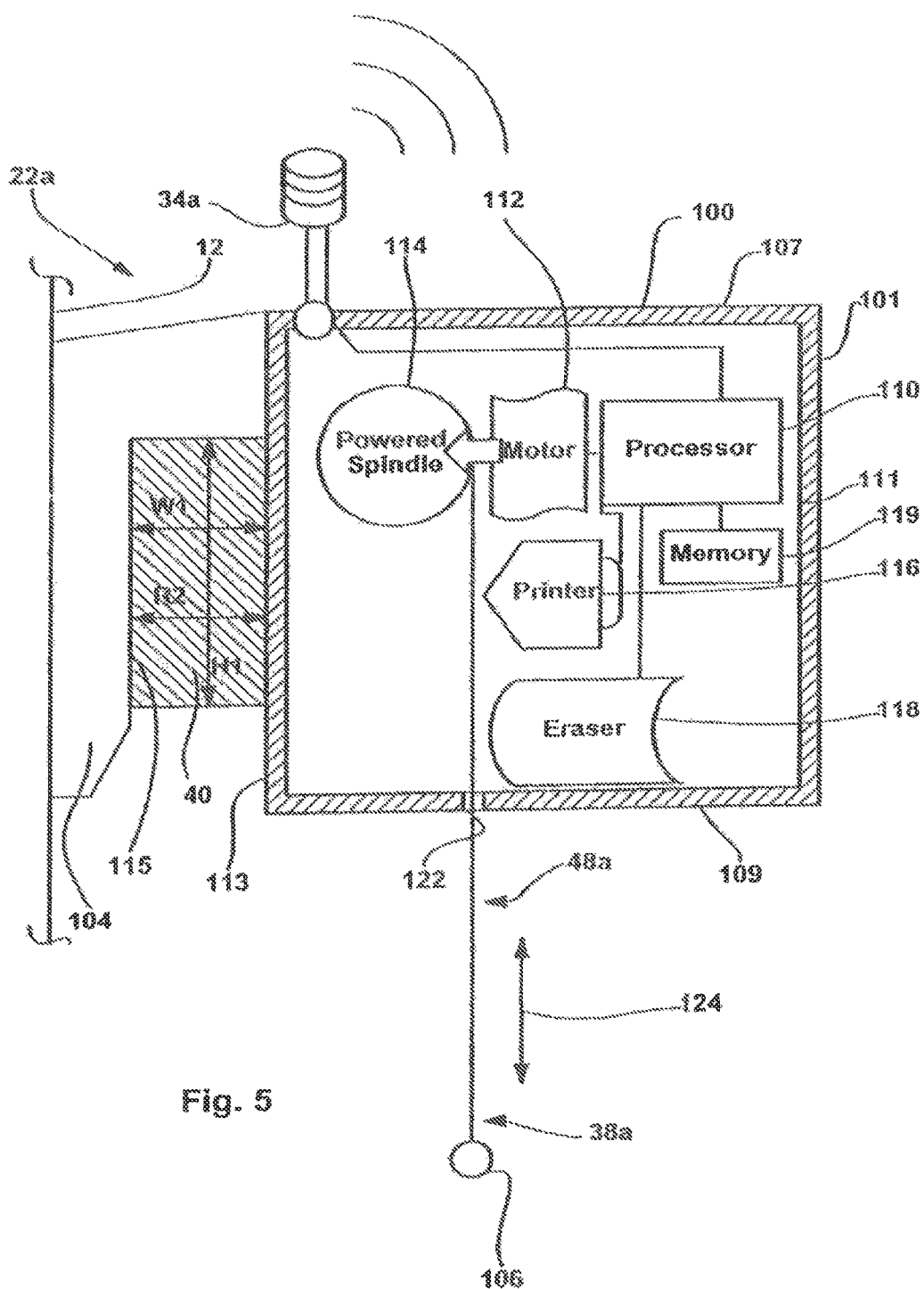
FIG. 5 is a schematic partial cross sectional view of the slave presentation unit of FIG. 4.

Referring once again to FIG. 1, in at least some embodiments of the present invention, each of the slave presentation units 22a and 22b will have a similar construction and similar operation and therefore, in the interest of simplifying the present explanation, only unit 22a will be described here in detail. Referring also to FIGS. 4 and 5, slave presentation unit 22a is a pull-out, roller window shade style unit and includes a housing assembly 100 (hereinafter housing 100), a transceiver 34a, a rollable and unrollable presentation screen 38a, first and second mounting members or hooks 102 and 104, respectively, a processor 110, a motor 112, a powered screen spindle 114, a slave presenter/print applicator that takes the form of a printer 116 in the present example, an eraser 118 and a memory 119. Housing 100 is generally a rigid box shaped assembly that forms a cavity 105 between top and bottom walls 107 and 109, respectively, and front and rear walls 111 and 113, respectively. The front wall 111 and rear wall 113 form opposite facing front and rear surfaces 101 and 103, respectively. Bottom wall 109 forms a slit or opening 122 generally along the length of housing 100 through which a lower end of screen 38a extends. Each of mounting members 102 and 104, like mounting members 72 and 74 that are secured to master unit housing 52, are secured to an extend rearwardly from the rear surface 113 of housing 100 and extend from opposite ends of housing 100. The distal ends of each of members 102 and 104 extend downwardly such that member 102 forms a channel 117 and member 104 forms a channel 115 having a channel dimension R2 which is similar to the width dimension W1 of rail 40. Thus, as in the case of main unit 28, slave unit 22a is mountable to rail 40 by placing members 102 and 104 over rail 40 so that rail 40 is received within channels 115 and 117.

Transceiver 34a is mounted to top wall 107 and extends upwardly therefrom. Screen 38a, in at least some embodiments of the present invention, is a flexible and rollable generally rectilinear member that, when unrolled, extends through opening 122 and there below to provide a presentation surface 48a that faces in the same direction as front surface 101 of housing 100. In at least some embodiments, presentation surface 48a is a writable/erasable surface such as Mylar (trademarked name of a polyester material developed and sold by DuPont) or the like on which erasable ink can be printed or plotted and can subsequently be erased. In some cases, a weighted bar 106 may be mounted to a distal lower end of screen 38a that helps to maintain screen 38a substantially flat when screen 38a is unrolled and extends below housing 100.

In the illustrated embodiment each of processor 110, motor 112, spindle 114, printer 116 and eraser 118 is mounted within housing cavity 105. Processor 110 is linked to each of motor 112, printer 116 and eraser 118 for controlling each of those components. Processor 110 is also linked to memory 119 for accessing information therein and is linked to transceiver 34a to send and receive data packets. Motor 112 is linked to spindle 114 for rolling and unrolling slave screen 38a which is attached at a top end to spindle 114.

Processor 110 controls printer 116 to, when an image is flipped to slave unit 22a from master unit 28, print the image on presentation surface 48a either as screen 38a is being unrolled or, in the alternative, by moving one or more printer heads adjacent to the surface 48a while moving screen 38a up and down via spindle. In any event, processor 110 controls printer 116 to provide a rendition of the image flipped to unit 22a from master unit 28. In some cases the rendition will be in color while in other cases it may be in black and white. In still other cases the user may have the option to print in color or in black and white.

Eraser 118 is controlled by processor 110 to erase ink applied by printer 116 to presentation surface 48a. To this end, eraser 118 may simply move back and forth along the length of housing 100 while holding an eraser pad on surface 48a as screen spindle 114 rolls up screen 38a. In the alternative, processor 110 may be able to control eraser 118 to erase certain information from surface 48a while leaving other information on surface 48a. Here, for instance, where a system operator re-accesses an image from slave unit 22a to be edited via master unit 28, if the edit simply entails erasing a distinct part of the image via unit 28 and then re-flipping the modified image back to unit 22a, the modified image may be presented via unit 22a by erasing the appropriate information from surface 48a and unrolling screen 38a so that the modified image is viewable via surface 48a.

Thus, in the embodiment illustrated in FIGS. 1 through 5, when an operator indicates that an image on master screen display 48 is to be flipped to unit 22a, the image data packet is transmitted via transceiver 22 to processor 110 via transceiver 34a after which processor 110 controls motor 112 and printer 116 to simultaneously unroll screen 38a and apply ink to surface 48a thereby forming the flipped image on surface 48a. After an image has been formed on surface 48a, if the system operator flips another image to unit 22a, processor 110 first controls motor 112 and eraser 118 to roll up screen 38a while simultaneously erasing the ink printed thereon. After surface 48a has been cleaned, processor 110 next controls motor 112 and printer 116 to again apply ink to surface 48a thereby providing the newly flipped image on surface 48a for the audience to view.

While it may take some time (e.g., thirty or more seconds) for one of the slave units 22a or 22b to erase an existing image and to apply ink forming a new image on surface 48a, after an image is flipped from master unit 28, display 48 can be cleared immediately and used to continue the collaborative process. Thus, the delay in generating an image in the manner described above will not delay the collaborative effort.

Referring to FIG. 1, it should be appreciated that the dimensions of the master display screen 48 and the portion of the slave screen 38a that is unrolled and used to present an image are similar such that an image flipped to and presented via screen 38a has a scale substantially similar to the scale of the image that was originally presented via display 48.

Referring still to FIGS. 1 through 5, it should be appreciated that where the master and slave units 28 and 22a, 22b, etc., are removable from rail 40, the entire system described above can be easily transported from one conference room 11 to another and can easily be set up by placing the mounting members that extend from the rear surfaces of the units over a rail in the other conference room similar to rail 40. During transport, the screens (e.g., 38a) of the slave units can be completely rolled up for protection and to provide a compact configuration.

Referring now to FIG. 6, a second embodiment of a slave presentation unit 120 is illustrated including a top header 122, a housing 124, a transceiver 130, a screen 126 and first and second mounting members 132 and 134, respectively. Mounting members 132 and 134 are similar in construction and operation to mounting members 102 and 104 described above and therefore will not be described here in detail. Here, it should suffice to say that members 132 and 134 extend from a rear surface of header 122 for mounting unit 120 to a rail like rail 40 described above.

In this second embodiment, screen 126 is rigidly secured to a lower surface of header 122 and lower housing 124 forms an opening (not illustrated) through which a distal lower end of screen 126 extends and in which a screen spindle similar to spindle 114 described above with respect to FIG. 5 is mounted. In addition, in this embodiment, the processor 110, motor 112, printer 116, memory 119 and eraser 118 described above with respect to FIG. 5 are also mounted within housing 124 and transceiver 130 extends upwardly from housing 124. Here, when an image is flipped from master unit 28 to slave unit 120, the image data packet transmitted is received via transceiver 130 and the processor in housing 124 simultaneously controls the motor and printer therein to unroll screen 126 and apply ink to surface 126 forming the flipped image thereon as housing 124 descends (see arrow 128) below header 122. An advantage here is that the image can be printed from top to bottom. Similarly, when the image on surface 126 is to be erased, the processor inside housing 124 simultaneously controls the motor and eraser in housing 124 to roll screen 126 up and erase ink from surface 126.

Referring now to FIGS. 7, 8 and 9, three additional embodiments 171, 173 and 175 of slave units that are similar to the slave unit of in FIG. 5 are illustrated. In FIGS. 7 through 9, each of the slave units includes a processor 110, a motor or motivator of some type 112, a printer 118, an eraser 116, a memory (not illustrated), mounting members (e.g., 104) and a transceiver 34a similar to those described above with respect to FIG. 5 and therefore, in the interest of simplifying this explanation, those components are not separately described again here. The primary difference between the embodiments of FIGS. 7, 8 and 9 and the embodiment of FIG. 5 is in how the presentation screens are extended and retracted.

The embodiment of FIG. 7 is generally a pull-out endless loop style unit and includes both a powered spindle 151 and a freewheeling spindle 148. Powered spindle 151 is driven by motor 112 under the control of processor 110. In FIG. 7, screen 144 is a continuous belt or loop type screen that wraps around powered spindle 151 within housing 100 and extends downward and wraps around freewheeling spindle 148 below housing 100 such that a front screen segment forms a front presentation surface 155 and a rear screen segment forms a rear surface 159 facing in a direction opposite the direction of surface 155. In at least some embodiments, housing 100 forms two slit like openings 140 and 142 that extend generally along the entire length of housing 100 to allow screen 145 to pass therethrough.

In at least some embodiments, spindle 151 may be powered in either clockwise or counterclockwise direction so that screen 144 can move in either direction up or down as indicated by arrow 146 and so that freewheeling spindle 148 can rotate in either clockwise or counterclockwise directions as indicated by arrow 150. Here, in at least some embodiments of the present invention, when an image is flipped to unit 171, processor 110 controls the motor 112 and printer 116 simultaneously to apply ink and form the image on screen 144 as spindle 151 rotates in the clockwise direction. After an image is formed, the image is viewable on front surface 155 between housing 100 and freewheeling spindle 148. In this case, to erase the image, spindle 151 may be rotated in the counterclockwise direction while eraser 118 removes the ink from screen 144. In the alternative, to erase an image from front surface 155, spindle 151 may be rotated in the clockwise direction so that the image rotates about freewheeling spindle 148, back up toward and around powered spindle 151 and again down past eraser 118 while eraser 118 erases the ink on the screen. In yet one other embodiment that is not illustrated in FIG. 7, eraser 118 may be positioned on the opposite side of screen 144 within housing 100 and may be used to erase images presented thereto on screen 144 as section 155 is moved up through opening 140.

Referring to FIG. 8, exemplary slave presentation unit 173 is a pull-out drop loop style unit and includes a first powered spindle 163 and a second powered spindle 165, both mounted within housing 100, as well as a freewheeling spindle 167 wherein first and second ends of a presentation screen 181 are mounted to and rolled around spindles 163 and 165, respectively, and a central portion of screen 181 wraps around freewheeling spindle 167 that hangs below housing 100. In this case, the powered spindles 163 and 165 may be used to move a presentation surface 183 of screen 181 either upward or downward as indicated by arrow 146 and about spindle 167 in either direction as indicated by arrow 187. As in the above slave unit embodiments, a printer 116 and an eraser 118 may be controlled to apply ink to the presentation surface or to remove ink therefrom to reflect image flipping activity caused by interaction with master unit 28.

Referring now to FIG. 9, unit 175 is a pull-out accordion style unit similar to the units described above with respect to FIGS. 5, 7 and 8 except that the spindles are replaced by a take up and let down assembly 174 and the screen, instead of being a rollable screen member, is a segmented accordion type screen 172 including elongated horizontal screen members, two of which are collectively identified by number 189, that are linked along horizontal elongated edges. Here, motivator 112 is controlled by processor 110 to let out the screen 172 adjacent printer 116 and to take up the screen 172 adjacent eraser 118 as indicated by arrow 170.

Figure 10A:
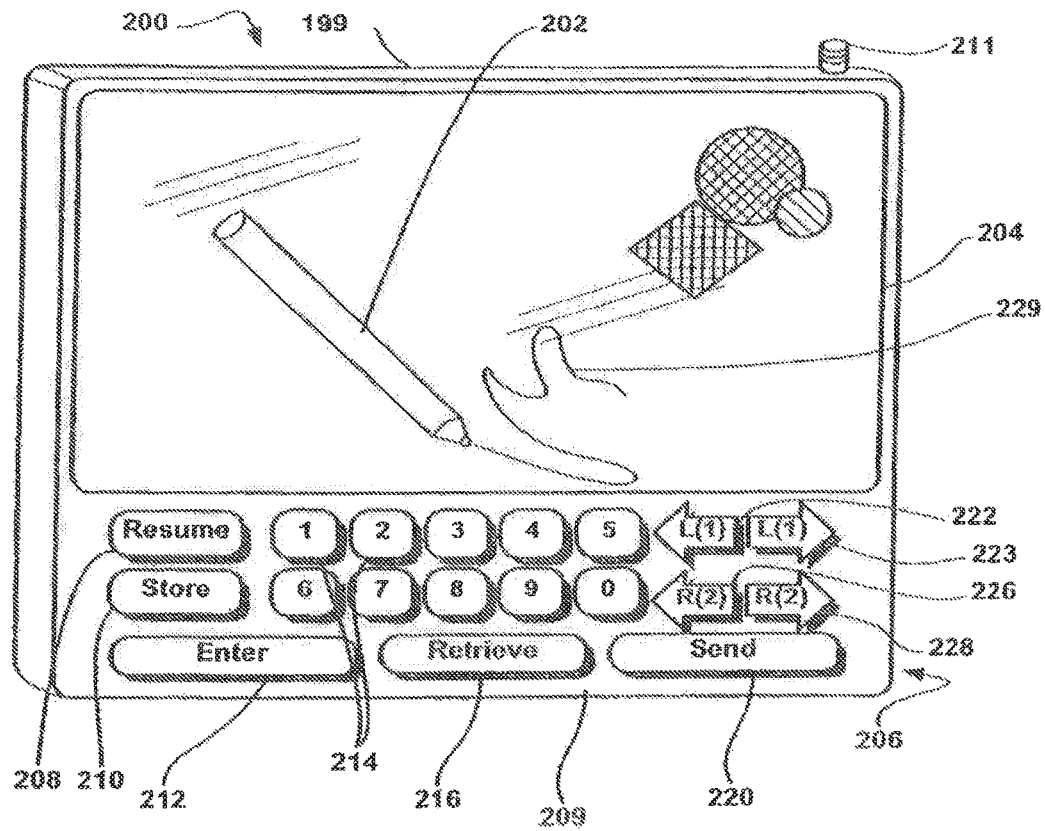
FIG. 10a is a perspective view of a handheld interface unit shown in FIG. 1.
Figure 10B:
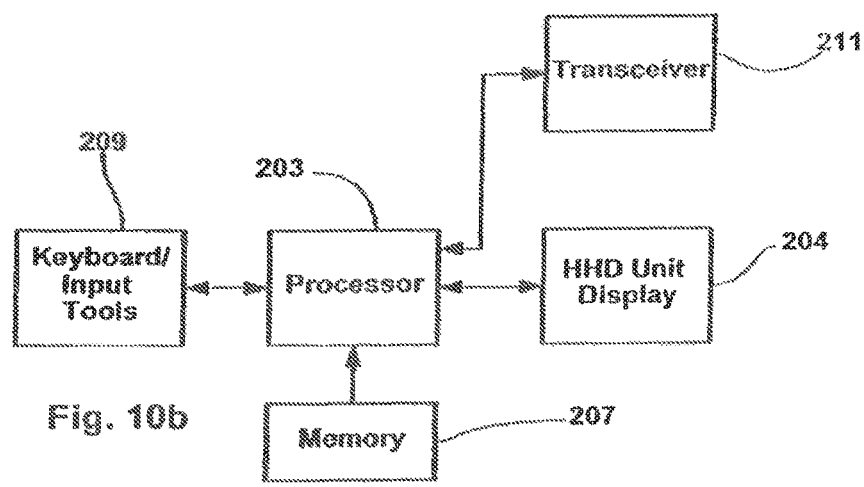

Referring now to FIGS. 1, 10a and 10b, an exemplary HHD interface unit 200 includes a generally rectilinear and rigid plastic or metallic housing 199 that protects and supports other unit components including a processor 203, a display 204, a keyboard 209 and a transceiver 211. Processor 203 is linked to each of transceiver 211, screen 204, memory 207 and keyboard 209 to receive information therefrom or provide information thereto, where appropriate. Processor 203 runs various programs stored in memory 207. In addition, in at least some embodiments of the present invention, processor 203 may be able to access a conventional computer network (e.g., a local area network, a wide area network, the Internet, etc.) via wireless communication with access points mounted within or proximate conference room 11. Communication between wireless devices like unit 200 and a network server via access points is well known in the wireless communication arts and therefore, in the interest of simplifying this explanation, will not be described here in detail.

Keyboard 209 includes hardware keys that are akin to the keyboard keys described above with respect to FIG. 2. Specifically, mechanical keys 208, 210, 216 and 220 are akin to keys 56, 60, 62 and 58 described above and can be used to resume a presentation, store images associated with a presentation, retrieve images presented by slave units so they can be re-presented by the master unit 28 and to send images from the master unit 28 to any one of the slave units, respectively. Number pad 214 is used in a manner similar to the number pad 67 described above with respect to FIG. 2. For instance, to indicate a slave unit associated with identifier number "2" to which an image should be flipped, an operator selects the "2" key from keyboard 209 followed by the send key 220.

Left arrow key 222 is a send left key indicating, as its label implies, that an image currently presented via master unit 28 should be sent to a slave unit to the left of master unit 28. Similarly, right arrow key 228 is a send right key indicating that an image currently displayed by the master unit 28 should be sent to the slave unit to the right of the master unit 28. Right directed arrow key 223 is a left retrieve key indicating that the image currently presented on a slave unit to the left of master unit 28 should be retrieved to the master unit and displayed thereby. Similarly, left directed arrow key 226 is a right retrieve key indicating that an image currently presented by a slave unit to the right of master unit 28 should be retrieved and displayed via master unit 28.

In addition to the keys described above, an enter key 212 is provided via unit 200 which can be used to indicate that information entered via other keyboard keys should be acted upon. For example, in cases where a presentation is to be resumed and a specific seven digit number code must be entered to access a specific previously stored image-unit set, after resume button 208 is selected, processor 203 may present a session identification number field via display 204 in which a specific sequence of seven numbers has to be entered in order to access the images corresponding to an image-unit set and present the images via the presentation units. In at least some embodiments of the invention, it is contemplated that unit 200 may include a full keyboard compliment including letters, numbers and function keys that are typically found on a computer keyboard so that unit 200 can, in effect, be used as a complete laptop computer to interact with various software applications (e.g., Power Point, spreadsheet applications, word processor applications, etc.).

Referring still to FIGS. 1 and 10a, in at least some embodiments, screen 204 is a fully functional touch sensitive flat panel display screen which can be used to display virtually any type of visual image including images corresponding to software applications, images corresponding to information applied to screen 204 via a stylus 202 or other similar types of interface tools and, in at least some cases, images that combine software generated images and applied information. Thus, for instance, when a Power Point slide is presented on display 204, in at least some cases, a system operator may use stylus 202 to make a mark (e.g., 229 in FIG. 10a) on display 204 which is tracked by processor 203 and in response to which processor 203 changes the image on display 204 so that the mark is represented. Here, the mark is referred to as a virtual ink mark because the mark appears on display 204 despite the fact that no real ink is applied to the surface of screen 204.

Importantly, according to one aspect of the present invention, the information presented via display 204 of control interface 200 is immediately updated on the master display 48 of unit 28. Thus, while a system operator may be anywhere within conference room 11 when using HHD 200, the operator can use HHD 200 to modify the image displayed on display 48 in a real time and collaborative flip chart like manner. After an image on display 48 is completed and when the operator wishes to flip the image from unit 28 to one of the slave units 22a or 22b in FIG. 1, the operator uses HHD 200 to flip the image to the appropriate slave unit. For instance, in the example illustrated in FIG. 1, to flip an image from master unit 28 to slave unit 22a, the operator selects the "1" key on HHD 200 followed by send key 220. After send key 220 is selected, processor 203 forms a flip command data packet commanding an image flip to the selected slave unit and including the master unit network address and transmits the flip command data packet to processor 80 (see again FIG. 3) via transceivers 211 and 20. In response to receiving the flip command, processor 80 forms an image data packet including the currently displayed image and transmits the image data packet to the slave unit selected via HHD 200.

Referring still to FIGS. 10a and 10b and FIG. 1, unit 200 may be a stand alone laptop computer and may provide the complete data processing platform where master unit 28 is simply an output and input device. Here, for instance, programs to track interactivity with display 20 may be run by unit 200 and unit 200 may simply provide display driving data to the master unit processor 80.

In addition, in this case, the unit 200 may completely organize the image presentation and master unit 28 may not perform the flipping and retrieving processes. Here, for instance, unit 200 may store all of the images including the images displayed by the master and slave units. When a presenter indicates via master unit 28 that the master image is to be flipped to a slave unit, the command may be received by unit 200 which in turn causes the flip to occur via transmission of the master image to the designated slave unit. In addition, here, unit 200 may also automatically transmit a command to the master unit to erase the flipped image. Retrieval commands would also be performed via unit 200 as opposed to via the master processor 80.

Figure 11:
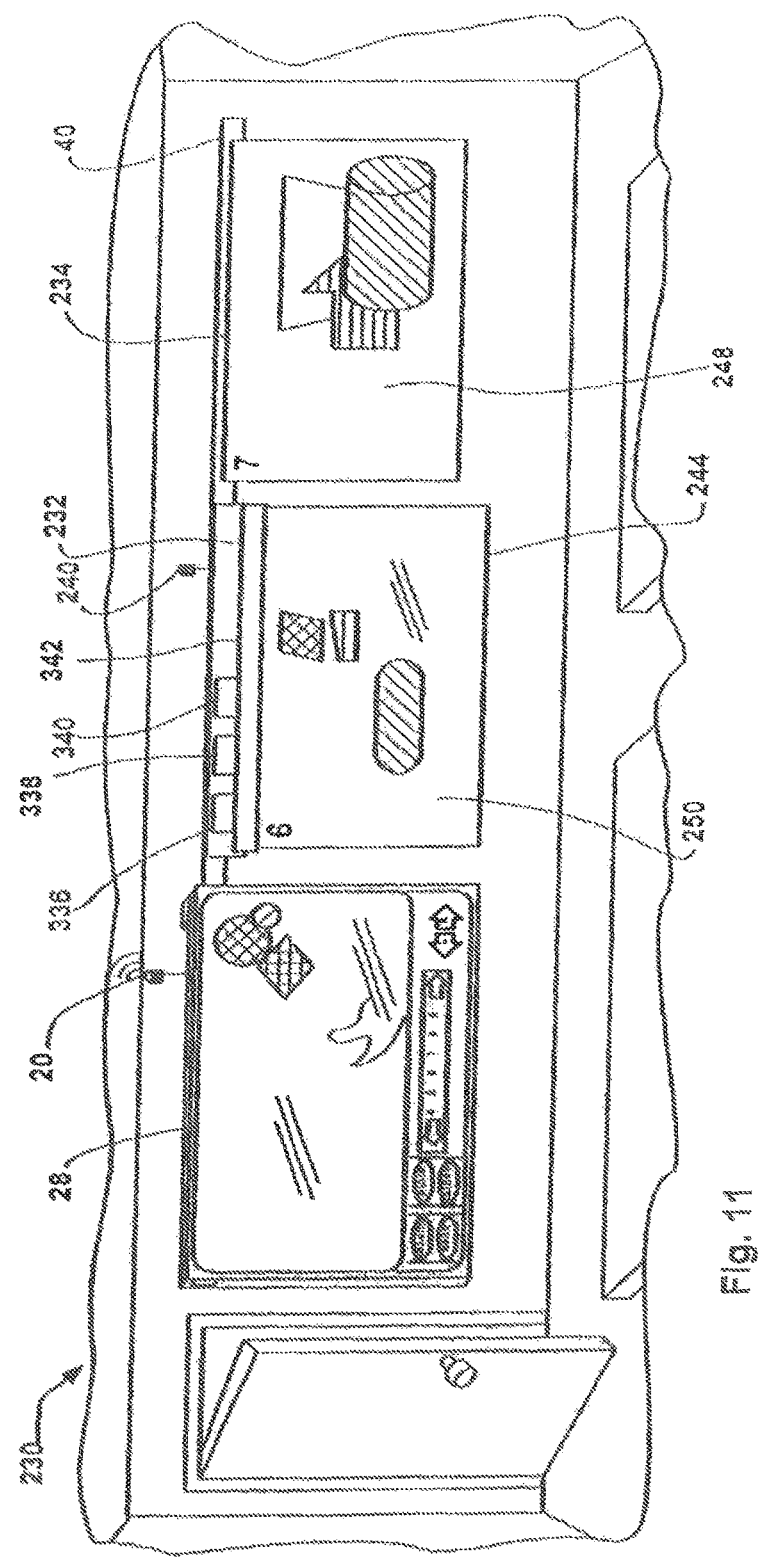
FIG. 11 is similar to FIG. 1, albeit illustrating a system that includes a different type of slave presentation unit.

Referring now to FIG. 11, a second exemplary system 230 according to at least some aspects of the present invention is illustrated. System 230 is shown in the context of a conference room like conference room 11 described above with respect to FIG. 1 where presentation units 48 and 232 are mounted on a rail 40 within the room for easy viewing of associated presentation surfaces by an audience. Here, master unit 28 is similar to the master unit 28 described above with respect to FIG. 1 with few differences. With respect to the differences, referring again to FIG. 3, master unit processor 80 in the FIG. 11 embodiment is programmed slightly differently than the processor described above with respect to FIG. 1. More specifically, because there is only one slave unit 232 in system 230, processor 80 is programmed to flip all images to single slave unit 232 when send commands are received.

Second, prior to flipping an image to slave unit 232, processor 80 is programmed to add an image identifier number to the flipped image which, in the example here, is added to the flipped image in the upper left hand corner. For example, in FIG. 11, image identifier numbers "6" and "7" are associated with images presented on surfaces 250 and 248, respectively, and therefore, identifier numbers 6 and 7 have been added to each of the images so that each image can be subsequently uniquely identified.

Third, prior to flipping an image to slave unit 232, processor 80 correlates and stores the image and the image identifier number in master unit memory 88 for subsequent access. In the above example illustrated in FIG. 11, master unit processor 80 (see again FIG. 3) stores the image on surface 250 with identifier number 6 and similarly stores the image on surface 248 with identifier number 7 when each of those images is flipped to slave unit 232.

Referring still to FIG. 11, slave presentation unit 232 is a large format printer or plotter that includes a subset of the components or a set of components akin to the components illustrated in FIG. 5. To this end, unit 232 includes a processor 336, a motor 338, a printer 340 and a large roll of paper 342 as well as a transceiver 240. In the case of unit 232, processor 336 is linked to motor 338, transceiver 240 and printer 340 and, when an image is flipped to unit 232, processor 336 controls motor 338 and printer 340 simultaneously to unroll a portion of the paper roll while applying ink to a front surface 250 thereof as the unrolled portion of the roll drops downward. In addition to applying the image to surface 250, printer 340 applies the image identifier number (e.g., "6" in FIG. 11) in the upper left hand corner of the image.

After an image is printed, the portion of the roll that was let out of unit 232 can be torn off and posted adjacent unit 232 for continuous viewing. To this end, in at least some embodiments, rail 40 may include a corkboard front surface so that tacks can be used to post torn sheets there along. In FIG. 11, an exemplary torn sheet 234 having the number "7" as an identifier number is illustrated as being posted to rail 40 adjacent unit 232. It is contemplated that perforated lines may be provided at spaced locations along the length of the paper roll so that sheets can be torn off in a clean fashion.

In the embodiment illustrated in FIG. 11, in order to re-present one of the images printed by slave unit 232 via master unit 28, referring to FIGS. 2 and 11, a system operator uses number pad 67 to select the number associated with the image to re-present and then selects retrieve key 62. For instance, to re-present the image on sheet 234 in FIG. 11, the operator selects number "7" and retrieve key 62. After key 62 is selected, referring once again to FIG. 3, master unit processor 80 accesses the image stored in memory 88 corresponding to image identifier number "7" and re-presents that image via display 48. Once the image is re-presented, the image may be modified and then re-flipped to slave unit 232 for printing and posting.

Figure 12:
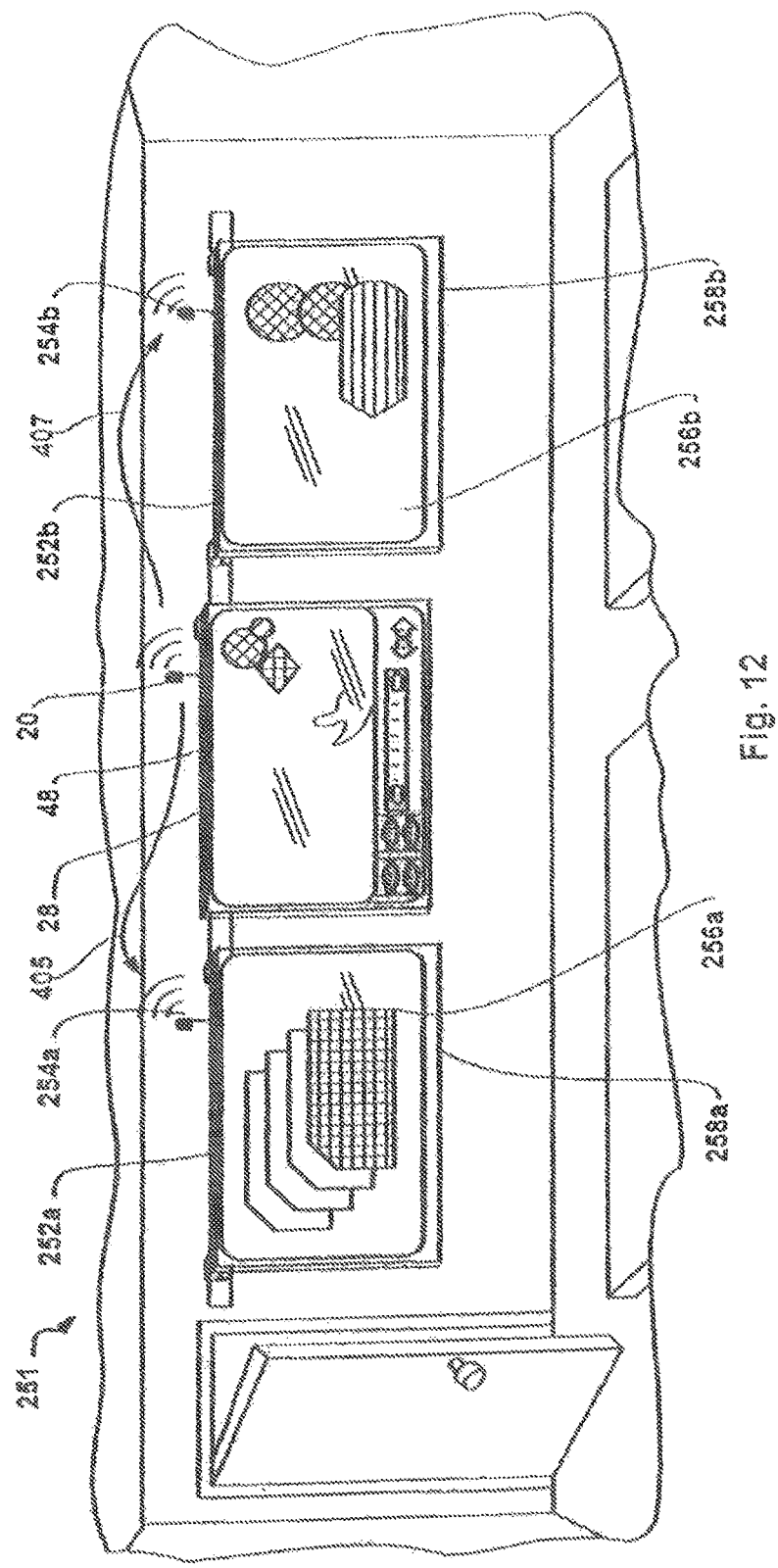
FIG. 12 is similar to FIG. 1, albeit illustrating slave presentation units that include flat panel displays.

Referring now to FIG. 12, yet one additional system 251 according to the present invention as illustrated. Here, the system 251 includes a master presentation unit 48 and first and second slave units 252a and 252b, respectively. In the illustrated embodiment, master unit 48 is mounted to a rail 40 between slave units 252a and 252b so that, when viewed from an audience's perspective, unit 252a is to the left of master unit 48 and unit 252b is to the right of master unit 48.

Master unit 48 is similar to the master units described above and therefore will not be described here in detail. Each of slave units 252a and 252b is similarly constructed and operates in a similar fashion and therefore, in the interest of simplifying this explanation, only unit 252a will be described in any detail. Unit 252a includes a hardened, generally rectilinear, plastic or metallic housing 258a, a transceiver 254a and a large format thin profile plasma, LCD or other thin profile display screen 256a. In addition, unit 252a also includes a processor and a memory linked thereto, neither of the processor nor memory illustrated. The slave processor is linked to display 256a and to slave transceiver 254a as well as to the slave memory.

Referring still to FIG. 12, when an image is flipped from unit 48 to slave unit 252a, the image is transmitted wirelessly to unit 252a and is immediately presented via display 256a. As in the above examples, when an image is flipped from unit 28, unit 28 is immediately blanked so as to mimic the flipping of a sheet on a conventional paper pad type flipchart. Here, when an image is flipped from master unit 28, the image and the slave unit to which the image has been flipped may be correlated and stored in either the master unit memory 88 or in the slave unit memory.

Where an image displayed via one of the slave units is to be retrieved and again displayed via master unit 28, the keyboard on unit 28 may be used to identify the slave unit from which the image is to be retrieved and then to perform the retrieval process. Once again, the retrieval process may be completely internal to unit 28 where the image presented by the slave unit is stored in master unit memory 88. In the alternative, where the slave image is stored in the slave unit memory, the retrieval process may require a retrieval request packet from master unit 28 to the slave unit (e.g., 252a in FIG. 12) to retrieve the image and then a second packet transmission from the slave unit back to master unit 28.

Figure 18:
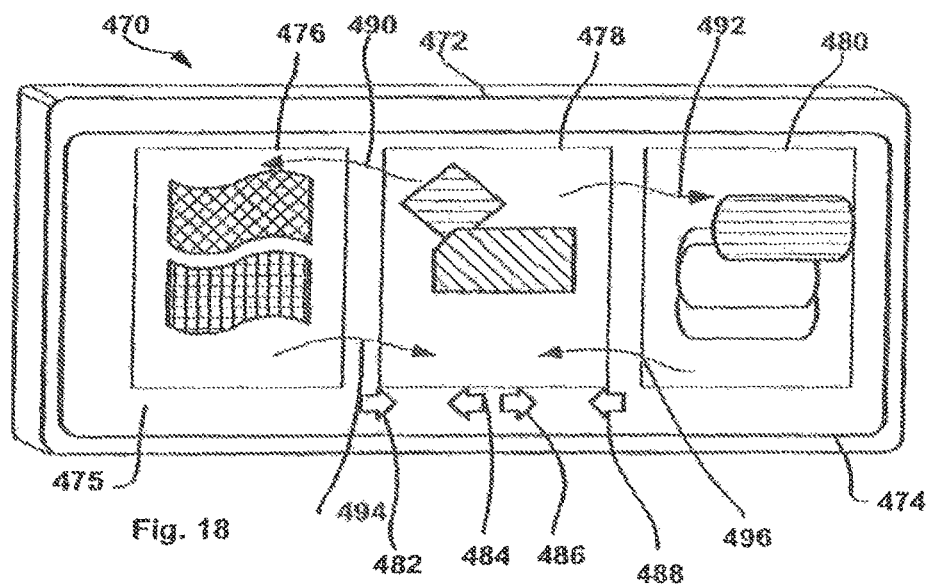
FIG. 18 is a plan view of a system consistent with certain aspects of the present invention including a single presentation unit that divides surface space into a plurality of presentation surfaces that can be used to mimic flip chart activity.
Figure 23:
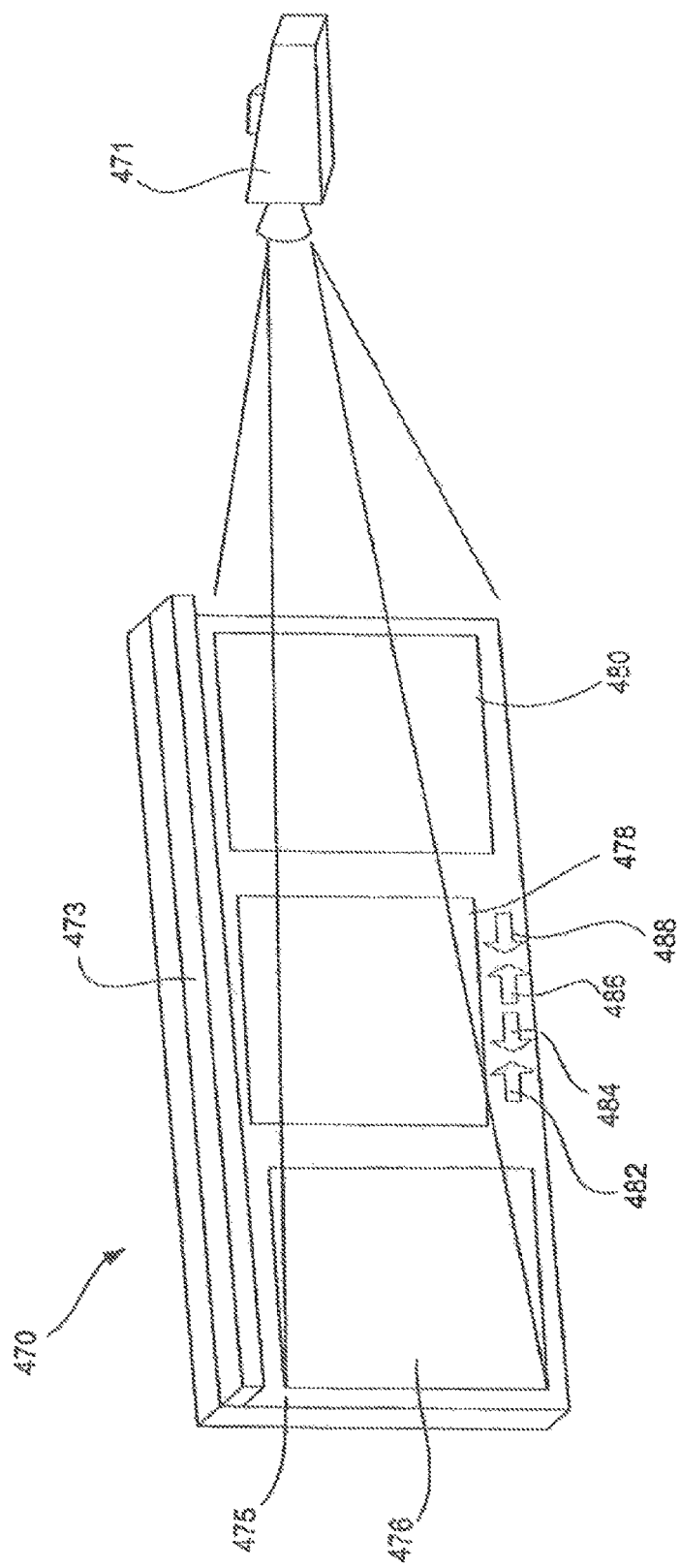
FIG. 23 is a schematic diagram illustrating one additional exemplary inventive system including a single projector that projects a main image and two flipped images.

Referring now to FIG. 18, one additional system 470 consistent with at least some aspects of the present invention is illustrated. System 470 includes a single presentation unit (also referred to by numeral 470) that includes a display 474 mounted within a rigid housing assembly 472 so that a display surface 475 is observable to the audience. Here, surface 475 is generally divided into a plurality of sub-spaces for presentation purposes including adjacent spaces 476, 478 and 480. In at least some embodiments it is contemplated that there will be no mechanical delineators between presentation spaces 476, 478 and 480 and that, instead, those separate spaces will be recognizable as such only when information is presented on surface 475. Thus, for instance, referring also to FIG. 23, system 470 may include a front projector unit 471 that projects images into each of presentation surface spaces 476, 478 and 480 and a sensor assembly 473 that senses activity on display surface 475. In the alternative, unit 470 may be a flat panel plasma, LCD type display or other thin type display where separate images are presented via each of spaces 476, 478 and 480.

Referring still to FIG. 18, four touch sensitive directed arrow icons 482, 484, 486 and 488 are provided below presentation surface 478. Flip icon 484 is selectable to indicate that an image presented via surface 478 should be flipped left to surface 476 as indicated by arrow 490. Flip icon 486 is selectable to indicate that an image presented via surface 478 should be flipped right to surface 480 as indicated by arrow 492. Similarly, arrow icon 482 is selectable to indicate that the image on left surface 476 should be retrieved and presented on surface 478 as indicated by arrow 494 and arrow icon 488 is selectable to indicate that an image on right surface 480 should be retrieved and presented on central surface 478 as indicated via arrow 496. In this case, it is contemplated that the central presentation surface 478 may be useable in the same way that the master units described above are useable to edit images and to flip the images to slave units and retrieve the images from slave units.

Figure 19:
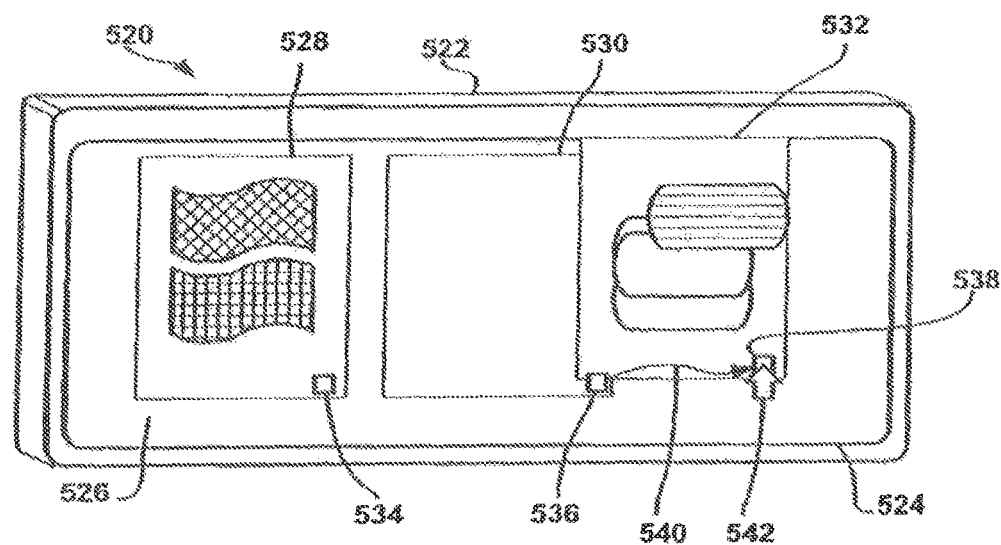
FIG. 19 is similar to FIG. 18, albeit illustrating a different system wherein presented images are managed in a different manner.

Referring to FIG. 19, a system 520 similar to the system of FIG. 18 is illustrated that includes a single presentation unit 522 that is an electronic, flat panel unit having a presentation screen 524 that forms a viewing surface 526. As in the case of the embodiment of FIG. 18, in FIG. 19 it is assumed that some type of sensor components (not illustrated) are provided to identify locations on surface 526 that are selected or indicated via a system operator (e.g., via a stylus, the users finger, etc.). In the case of system 520, it is contemplated that a master presentation space 530 may be represented on surface 526 in a visually distinct manner such as by placing a border or outline line therearound. In FIG. 19 master space 530 is illustrated as being located generally on the central part of surface 526. In some cases more elaborate visual graphics may be provided to distinguish master space 530. For instance, consistent with the desire to mimic a flip chart, space 530 may be distinguished via graphics that resemble a flip chart.

Referring still to FIG. 19, in some cases a control icon 536 is provided within master space 530 that can be used to flip images from master space 530 to other spaces on surface 526.

In the illustrated embodiment after an image has been formed in master space 530, a system operator can place the tip of a stylus in icon 536 to drag the image to another location on surface 526. Here, it is contemplated that when the image is dragged from master space 530, the master space and its visually distinguishing features will remain in their original positions on surface 526. In FIG. 19, one image previously flipped or dragged from master space 530 is labeled 528 and a second image being flipped from space 530 as indicated via arrow 540 is labeled 532. An arrow 542 represents the tip of a stylus used by the operator to perform the dragging process.

In at least some cases when images are dragged from space 530, control icons will move therewith so that the flipped images can be moved about surface 526 after flipping. In addition, in at least some embodiments, images previously flipped may be retrieved to master space 530 by selecting the control icon on the flipped image and dragging the selected icon back into master space 530. Here as in the previously described embodiments, software for master space editing and display of software screen shots are contemplated.

Figure 20:
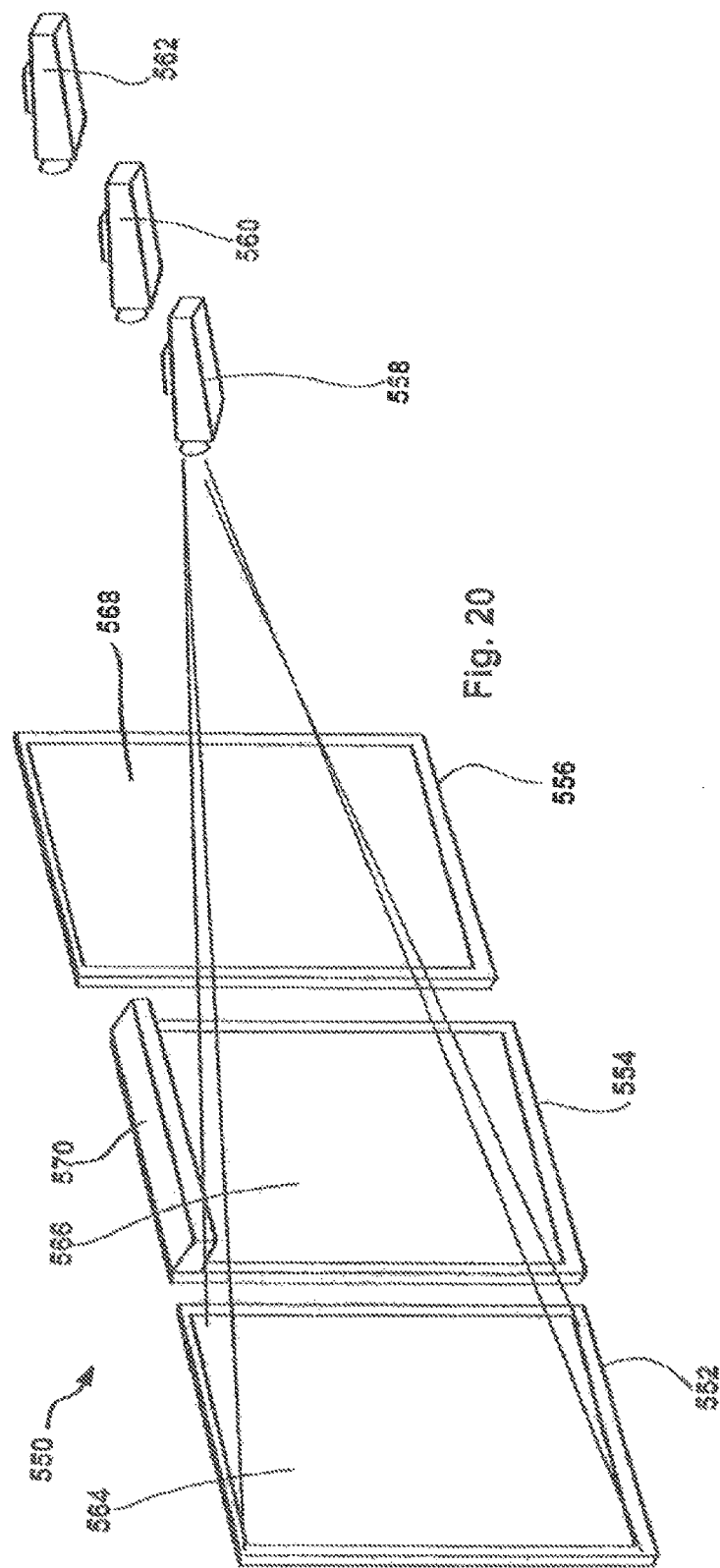
FIG. 20 is a perspective view of another inventive embodiment including three projectors and associated projection screens/assemblies.

Referring now to FIG. 20, another inventive embodiment 550 is illustrated that includes a master unit and two slave units. The master unit includes a master display screen or assembly 554 and a master front projector unit 560 while the first and second slave units include slave screen 552 and first slave projector unit 558 and second slave screen 556 and second slave projector unit 562, respectively. Screens 552, 554 and 556 include display projection surfaces 564, 566 and 568, respectively, that are all of similar dimensions and which would each be juxtaposed for simultaneous viewing by an audience or group participating in collaborative activities. In addition, master assembly 554 includes a laser sensor unit 570 mounted along a top edge of screen 554 for sensing positions of styluses, pens, erasers, etc., on or proximate surface 566.

In FIG. 20, projector units 558, 560 and 562 are positioned to project separate images on each of surfaces 564, 566 and 568. Master assembly 554 is linked to (not illustrated) or includes a processor akin to the processors described above for controlling images and system software generally and, more specifically, for controlling image flipping activity as well as retrieval of images back to master surface 566 for viewing and editing.

Figure 21:
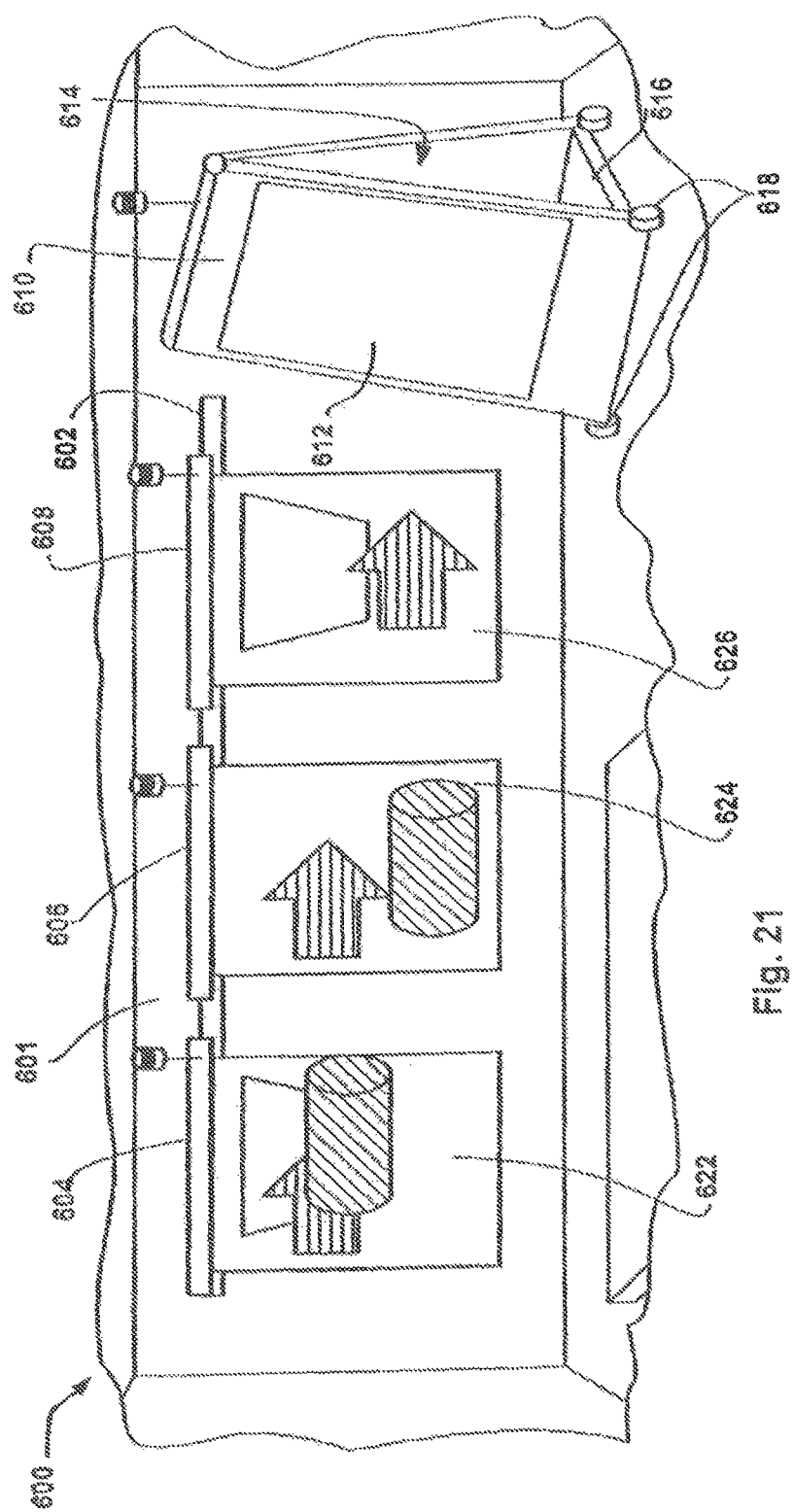
FIG. 21 illustrates yet another embodiment where a master unit is in the form of an easel assembly and slave units are wall mounted.

Referring to FIG. 21, another system 600 consistent with certain inventive aspects is illustrated. System 600 includes a master presentation unit 610 and three slave units 604, 606 and 608. Each of the slave units 604, 606 and 608 is similar to the slave units described above with respect to FIGS. 1, 4 and 5 and therefore are not described again here in detail. Here it should suffice to say that each slave unit 604, 606 and 608 is mounted to a wall 601 and more specifically via a wall mounted rail 602 and is capable of receiving images flipped thereto from master unit 610 and presenting received images via a slave presentation surface (i.e., surfaces 622, 624 and 626).

While each of units 604, 606 and 608 is wall mounted, master unit 610 is a portable floor supported easel type assembly including an easel structure (also identified via numeral 610) having an interior space 614 and one or more shelf members 616. In the illustrated embodiment casters 618 (only two labeled) are mounted at the bottom end of easel structure 610 to facilitate movement within a facility. A computer projector and other system components may be located on shelves 616 within space 614. Unit 610 includes a master presentation surface 612 for presenting master images, modifying the images and generally facilitating collaborative activity. As in the embodiments above, on-screen selectable icons may be provided via surface 612 for flipping master images to the slave units, to retrieve images and to perform other image management functions. Here, screen 612 may take any of several forms including a plasma screen, a rear projection screen where a rear projector is located within space 614, a front projection screen, etc.

Figure 24:
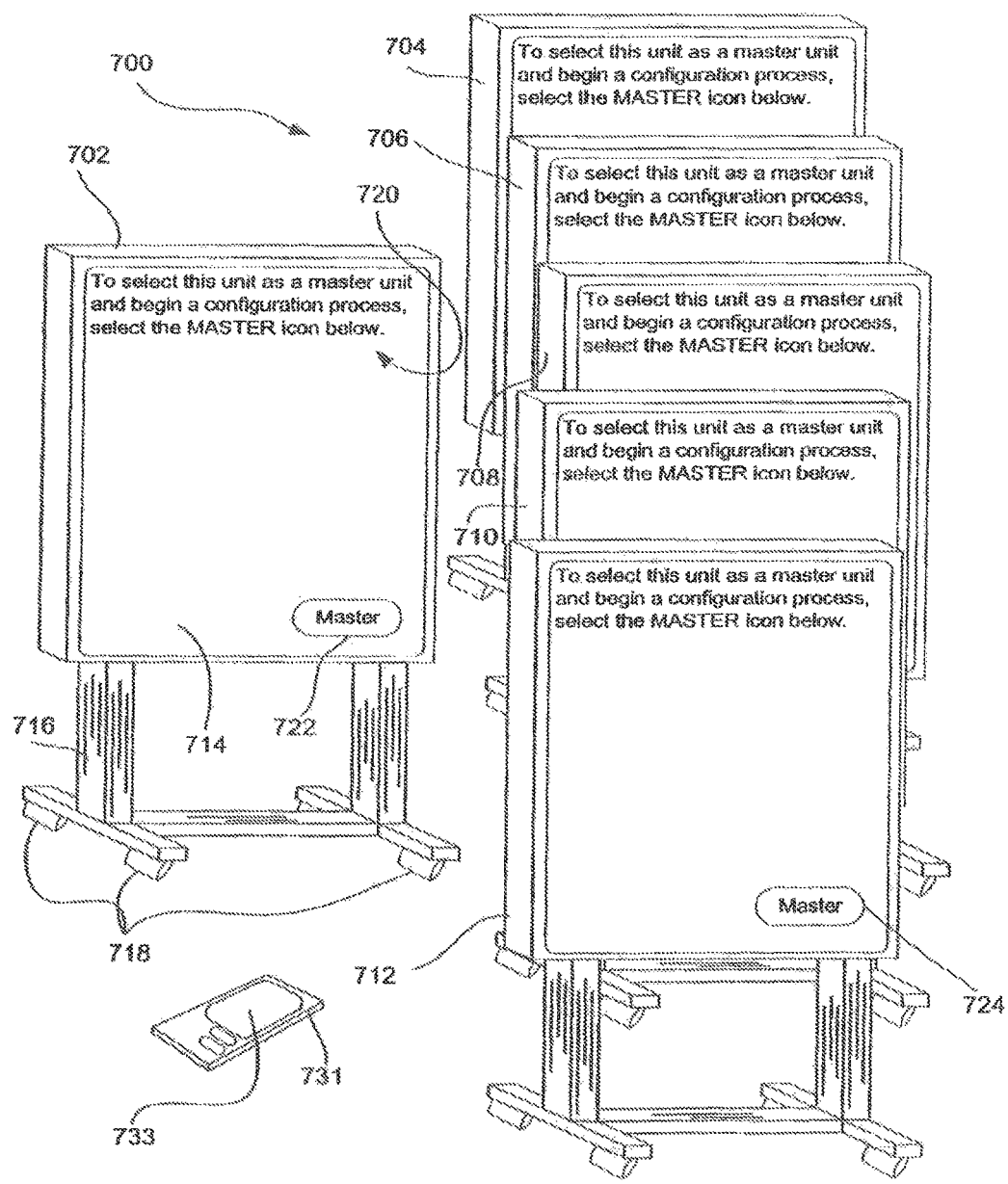
FIG. 24 is a schematic diagram illustrating another exemplary system including multiple portable flat panel displays where one of the displays can be selected as a master display and the others or a subset there are used as slave display.

Referring now to FIG. 24, one additional system 700 is illustrated that is consistent with other aspects of the present invention. System 700 includes a plurality of portable presentation units 702, 704, 706, 708, 710 and 712. Each of units 702, 704, 706, 708, 710 and 712 is similarly constructed and operates in a similar fashion and therefore, in the interest of simplifying this explanation, only unit 702 will be described in any detail. Unit 702 includes a flat panel electronic display screen 714 that is mounted on top of a portable display stand 716. Casters 718 are provided underneath stand 716 to facilitate movement of unit 702. For example, unit 702 may be used in any of several different conference rooms, may be used within a private office at times and at other times within a conference space, etc. Although not illustrated, here, it is contemplated that electronic display 714 would include a tracking system for tracking activity that occurs on or adjacent the front surface of the display 714. Thus, for example, as described above, when a pen, eraser or other electronic type device is used to modify or select information presented via display 714, the pen or eraser activity would be sensed and cause modification to or selection of information presented via display 714. In addition, it is contemplated that unit 702 includes a wireless transceiver (not illustrated) akin to the transceivers described above with respect to other embodiments such that unit 702 can transmit information to other units 704, 706, 708, 710 and 712 and can receive information from those other units. In this embodiment, any of units 702, 704, 706, 708, 710 or 712 may be used as a master unit and any of the other units or a sub-set thereof may be used as slave units.

Figure 28:
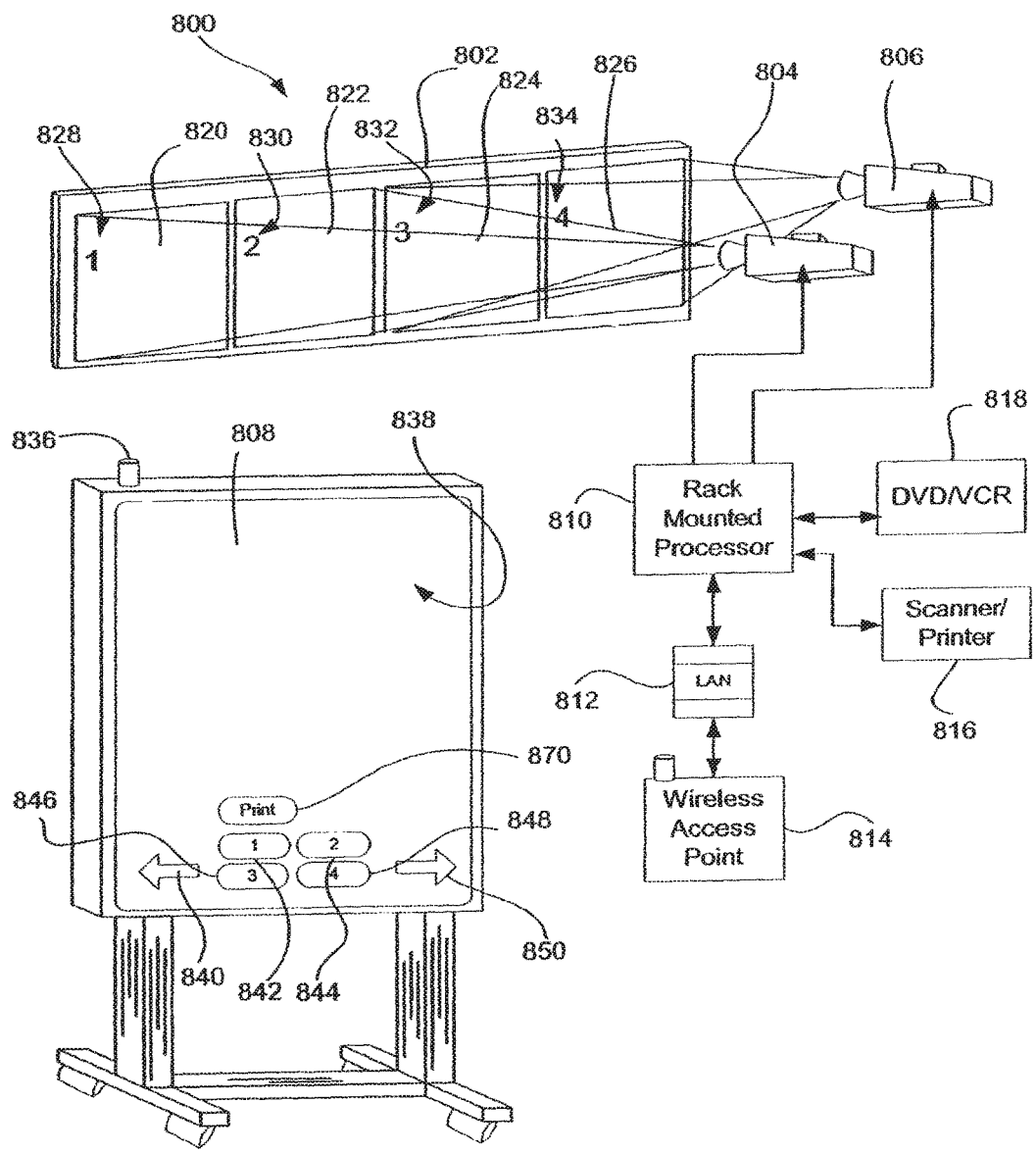
FIG. 28 illustrates another embodiment including a single flat panel display portable unit and multiple projectors for projecting flipped images.

Referring now to FIG. 28, one additional system 800 is illustrated as consistent with at least some aspects of the present invention. System 800 includes a relatively wide display screen or surface 802, two video type projectors 804 and 806, one portable flat panel display presentation unit 808, a rack mounted processor 810, a local area network (LAN) 812, a wireless access point 814, a DVD/VCR 818, and a scanner/printer 816. Portable presentation unit 808 is similar to the presentation units described above with respect to FIG. 24 and therefore will not be described here again in detail. Here, it should suffice to say that unit 808 includes a flat panel display screen 838 that is mounted on top of a portable cart type arrangement (not labeled) and includes a wireless transceiver 836 for transmitting information to access point 814 and receiving information therefrom.

Rack mounted processor 810 is linked via LAN 812 to access point 814 to receive information therefrom and provide information thereto for transmission to unit 808. In addition, processor 810 is hardwired to DVD/VCR 818 and scanner/printer 816 as well as to each of projector units 804 and 806. Projector unit 804 is configured to project information generally on the left half of surface 802 while unit 806 is arranged and configured to generally project information on the right half of surface 802. More specifically, unit 804 is configured to project two images in a side-by-side fashion in adjacent spaces 820 and 822 on the left half of surface 802 while unit 806 is configured to project images into third and fourth spaces 824 and 826 that are adjacent and are generally on the right half of surface 802. When projecting either an image including information or a blank image into spaces 820 and 822, unit 804 also projects an image identifier into the space, the image identifiers in FIG. 28 including identifiers 1 and 2 that are labeled 828 and 830, respectively. Similarly, unit 806 projects identifiers 3 and 4 that are labeled 832 and 834 into spaces 824 and 826. The numbers 1, 2, 3 and 4 are used to distinguish spaces 820, 822, 824 and 826 from each other during system operation. In at least some configurations processor 810 drives each of unit 808 and projectors 804 and 806 and thus controls all displayed/presented images. In these configurations unit 808 is simply an interface and the flipping/retrieving processes are performed by processor 810. For instance, when an image is flipped from unit 808 to space 822, unit 808 transmits a "flip" command to processor 810 which in turn causes projector 804 to display the image from screen 838 in space 822. When the image from space 822 is retrieved, a retrieve command is transmitted to processor 810 which in turn transmits the image being retrieved back to unit 808 to be displayed.

Referring still to FIG. 28, control icons are provided near the lower section of portable unit display screen 838. Control icon includes space selection icons 842, 844, 846 and 848, a retrieve icon 840 and send or flip icon 850. Each of the space selection icons 842, 844, 846 and 848 includes a space label 1, 2, 3 and 4 that matches one of the labels identified by 828, 830, 8,32 and 834 associated with spaces 820, 822, 284 and 826, respectively. In operation, to flip an image from screen 838 to one of spaces 820, 822, 824 and 826, a user simply selects one of the space selecting icons 842, 844, 846 and 848 and then selects flip icon 850. For example, to flip an image from screen 838 to space 822 on surface 802, a user simply selects space selection icon 844 followed by flip icon 850. Similarly, to retrieve an image from one of spaces 820, 822, 824 and 826, the user simply selects a corresponding space selection icon 842, 844, 846 and 848 followed by retrieve icon 840.

Referring still to FIG. 28, when an image is flipped from screen 838, information is transmitted from portable unit 808 via transceiver 836 to access point 814 and through LAN 812 to processor 810. Thereafter, processor 810 controls an associated one of projection units 804 and 806 to update the image projected into a corresponding one of spaces 820, 822, 824 and 826. When retrieve icon 840 is selected via screen 838, information is transmitted to process 810 via access point 814 and LAN 812 requesting that an associated one of the images displayed by one of units 804 and 806 be retrieved and presented via screen 838. In this embodiment, images previously displayed during a session are stored by processor 810 in an associated memory and, in at least some embodiments, only the image currently being displayed by portable unit 808 is stored in a memory of unit 808.

Referring once again to FIG. 28, in addition to displaying images via unit 808 and in spaces 820, 822, 824 and 826, in at least some embodiments DVD's and VCR's played via unit 818 may be presented on screen 838 or one of the projected spaces. In addition, while an image is displayed via screen 838, a print icon 870 provided just above the space control icons on screen 838 may be selected thereby causing processor 810 to print the image currently via screen 838 via scanner/printer 816. Here, information can be scanned in via scanner 816 for display or information modification via screen 838. When an image is scanned in, process 810 transmits the image via LAN 812 and access point 814 to unit 808 for display.

Referring now to FIGS. 13 through 16, various methods and sub-methods consist of with certain aspects of the present invention are described. Each of the methods described herein may be used with at least one and in some cases more than one or even all of the systems described above or variations thereof.

Figures 13, 14:
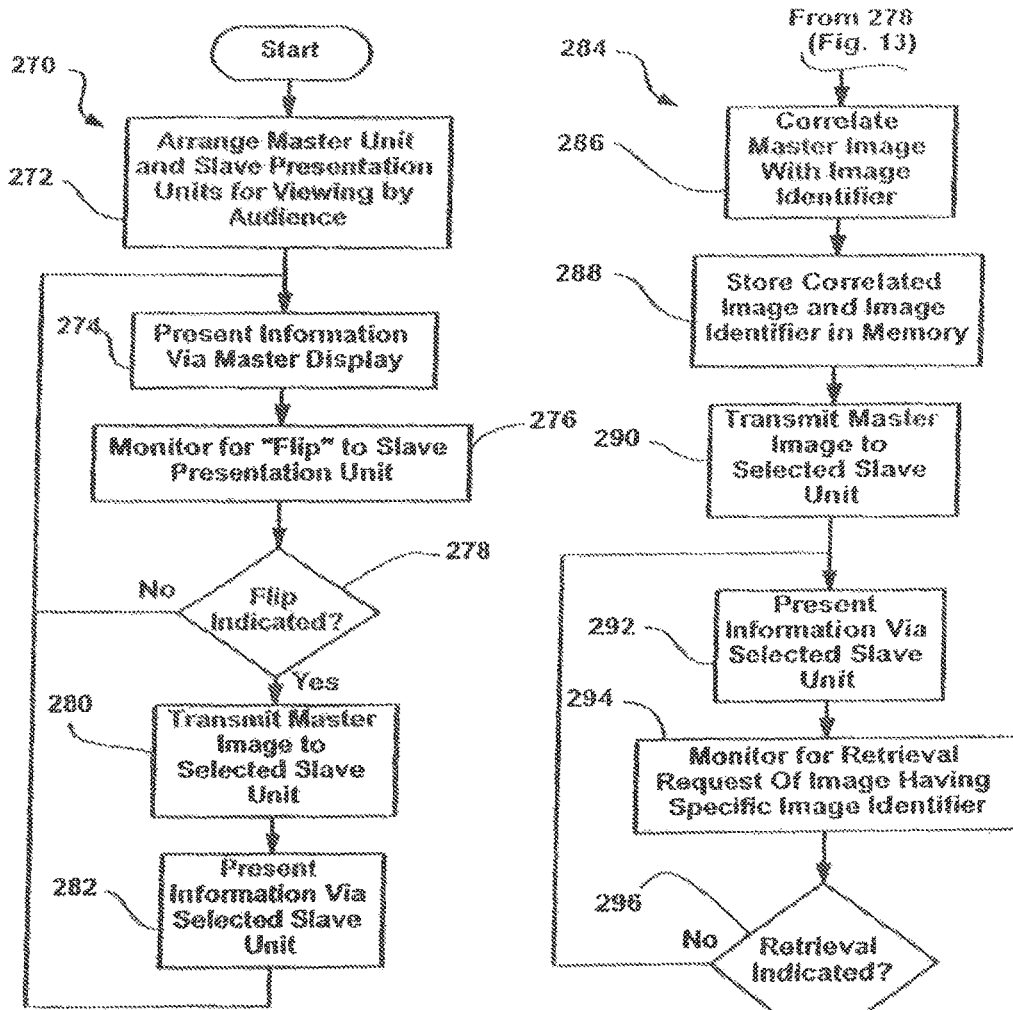
FIG. 13 is a flowchart illustrating a flipping method according to one aspect of the present invention that may be used with any one of the systems shown in FIGS. 1 through 12.
FIG. 14 is a sub-process that may be substituted for a portion of the method illustrated in FIG. 13 for retrieving images from a slave unit and re-presenting the images via the master unit.

Referring specifically to FIG. 13, a method 270 for flipping images from a master unit 28 to a slave unit is illustrated. Referring also to FIGS. 1-5, method 270 will be described in the context of system 10. Beginning at block 272, a system operator arranges the master unit and the slave presentation units or devices for viewing by an audience within room 11. At block 274, information is presented via master display 48. At block 276, processor 80 monitors input devices such as keyboard 30, wireless control signals generated via HHD 200, etc., for a command to flip an image currently presented via unit 28 to one of the slave presentation units 22a and 22b. At decision block 278, where no flip command is received, control loops back up the block 274 where the method described above is repeated. At block 278, after a flip command is received, control passes to block 280 where master unit 48 transmits the master image as part of an image data packet to the selected slave unit. At block 282, the selected slave unit presents the received image in any of the manners described above.

Referring now to FIG. 14, a sub-method 284 which may be used to replace blocks 280 and 282 in FIG. 13 is illustrated which correlates flipped images with image identifiers so that images can be subsequently re-accessed, re-presented and edited via master unit 28. To this end, sub-process 284 is to be used with systems that assign unique image identifiers to images generated by the slave units where the slave units then include (e.g., print) the image identifiers with the images when images are generated. Thus, sub-method 284 will described in the context of system 230 of FIG. 11.

Referring to FIGS. 2, 3, 11, 13 and 14, after a flip from master unit 28 to slave unit 232 has been commanded at block 278, control passes to block 286 in FIG. 14. At block 286, the master image is correlated with a unique image identifier number (e.g., "6" or "7" as illustrated in FIG. 11). At block 288, master processor 80 stores the correlated image and image identifier number in master memory 88. At block 290, master unit 28 transmits the master image to the selected slave unit. At block 292, the selected slave unit presents the transmitted image along with the image identifier number. Thus, for instance, in FIG. 11, slave unit 232 generates the image on surface 250 and adds the image identifier number "6" in the upper left hand corner. At this point the image flip has been completed.

Continuing, at block 294, after an image flip has been completed, master processor 80 monitors for a retrieval request for an image associated with a specific identifier number. For example, where identifier number "7" has been appended to an image on sheet 234 as indicated in FIG. 11, the system operator may request retrieval of the image on sheet 234 via entry of number "7" and selection of the retrieve key 62 (see again FIG. 2). At block 296, where no retrieval is requested, control loops back up through blocks 292 and 294. After a retrieve command is received at block 296, control passes to block 298 where master processor 80 accesses the image correlated with the identifier number entered by the operator and at block 300, master unit 28 re-presents the correlated image via master display 48.

Figure 15:
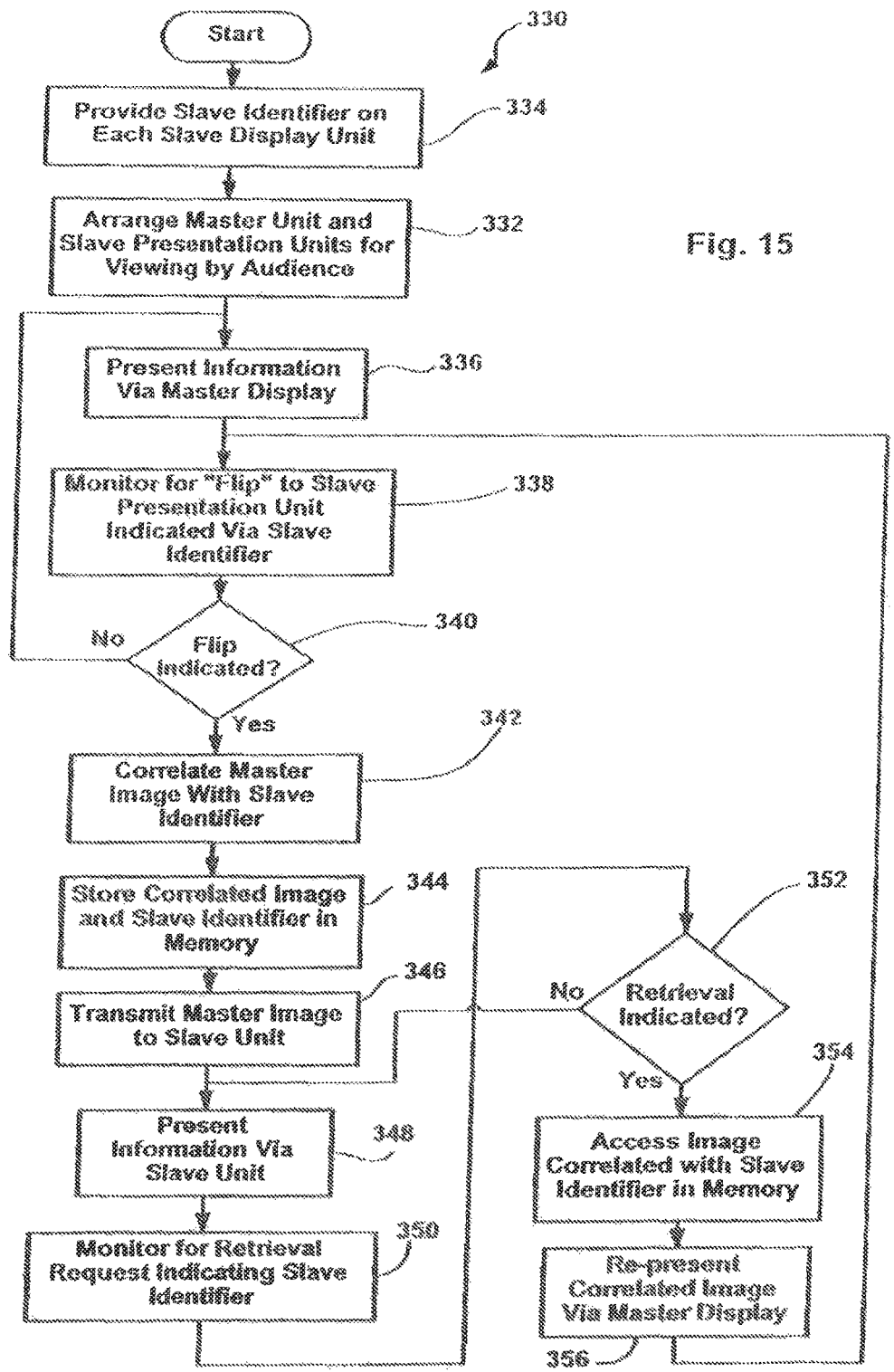
FIG. 15 is a method for flipping images from a master unit to a slave unit and thereafter retrieving an image from a slave unit where the slave unit is uniquely identifiable.

Referring now to FIG. 15, a method 330 for managing flipchart images where each of the slave units is identifiable by a unique slave unit identifier as is the case in the embodiment of FIG. 1 is illustrated. To this end, in FIG. 1, slave unit 22a can be uniquely identified by number "1" while unit 22b can be identified by number "2". Referring to FIGS. 1, 2, 3 and 15, at block 334, a slave identifier (e.g., 24a, 24b, etc.) is provided on each slave display device and the slave identifier is associated in some fashion with the wireless network address corresponding to the identifier on the slave device. The associated slave identifiers and network addresses are stored in master unit memory 88. At block 332, the master unit 28 and the slave presentation units 22a and 22b are arranged within room 11 for viewing by an audience.

At block 336, an image is presented and/or manipulated via master display 48. At block 338, master unit processor 80 monitors for a flip command indicating that the currently displayed image should be flipped to one of the slave presentation units. At block 340, where no flip is indicated, control passes back up and through blocks 336 and 338. Once a flip is indicated at block 340, control passes to block 342 where the master image is correlated with the slave identifier specified by the operator (i.e., the identity of the slave unit to which the image is to be flipped).

At block 344, master processor 80 stores the correlated image and slave identifier number in memory 88 and at block 346 master processor 80 transmits the master image to the slave unit. At block 348, the slave unit presents the received image.

At block 350, master processor 80 monitors for a retrieve request indicating a specific slave identifier associated with a slave unit from which an image should be retrieved. At block 352, if a retrieval command is not received, control passes back up to block 348 and the loop described above is repeated. At block 352, after a retrieval command is received, control passes to block 354 where processor 80 accesses the image correlated with the slave identifier in master memory 88. At block 356, processor 80 re-presents the correlated image via master display 48.

Figure 16:
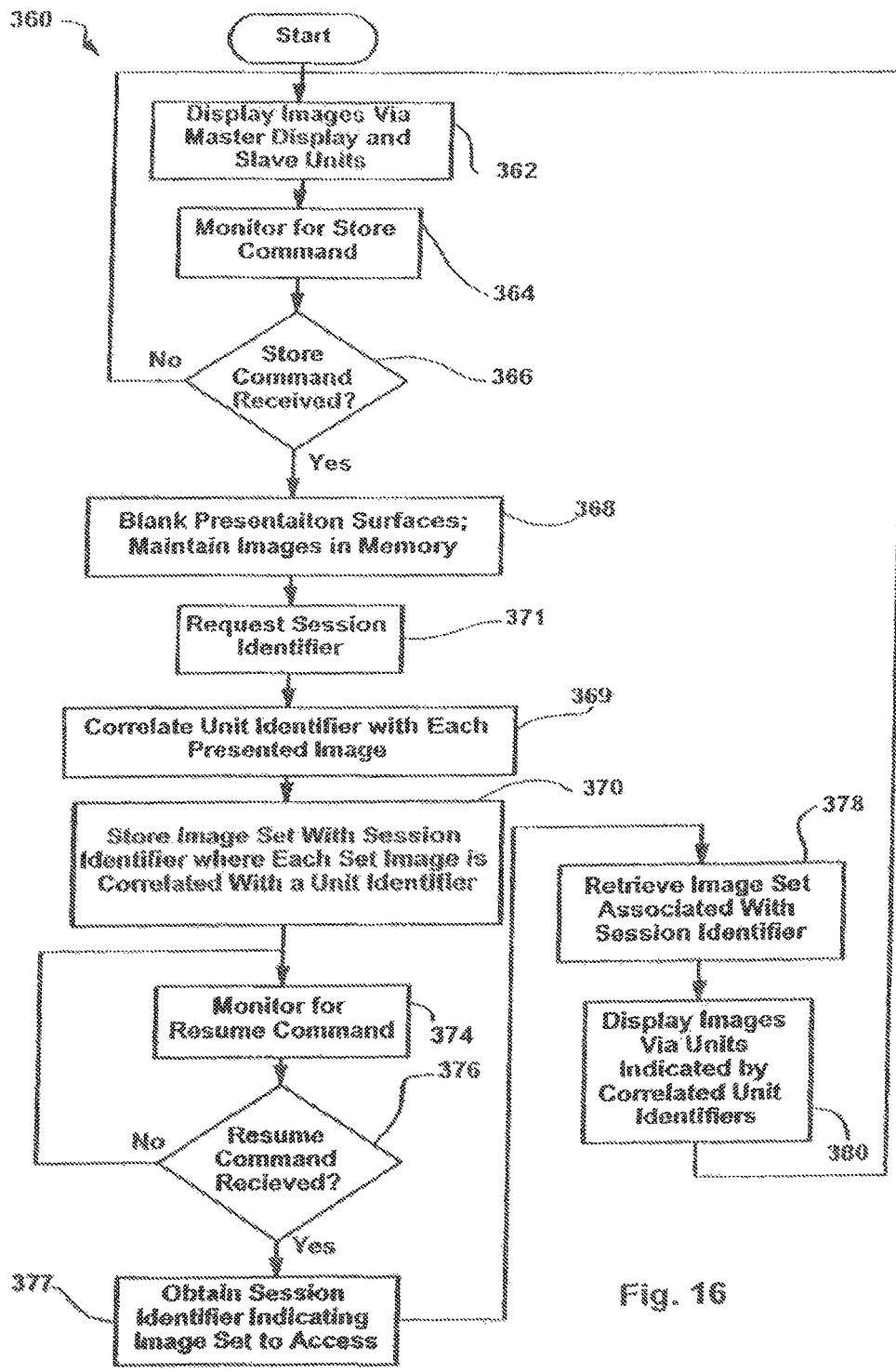
FIG. 16 is a flowchart illustrating a method whereby images currently displayed via a master presentation unit and slave presentation units may be quickly stored and subsequently re-accessed and re-presented via the same units on which the images were presented prior to being saved.

Referring now to FIG. 16, a method 360 that may be run by master unit processor 80 in parallel with any of the methods described above with respect to FIGS. 13 through 15 is illustrated. Method 360 is a method for correlating currently presented images with specific presentation units when a session store command is received, storing the correlated images and unit identifiers for subsequent access and then, when a resume command is received, for re-presenting the images via the presentation units associated therewith when the session store command was received. Thus, for instance, referring to FIG. 1, assume that during a collaborative session first, second and third images are presented via units 22a, 22b and master unit 28 when the store key 60 is selected, respectively. Here, upon selection of key 60, the first, second and third images are correlated with unit identifiers associated with units 22a, 22b and 28, respectively, the correlated data is stored in master memory 88 as an image set and then the presentation surfaces of units 22a, 22b and 28 are cleared. Subsequently, when an operator resumes the session corresponding to the stored image set, processor 28 flips the first and second images to slave units 22a and 22b, respectively, for presentation and presents the third image via display 48 so that the session can continue where the session left off.

Referring to FIGS. 1, 2, 3 and 16, at block 362, images are presented via master display 48 and each of slave units 22a and 22b. At block 364, processor 80 monitors for selection of store key 60. At block 366, where store key 60 has not been selected, control passes back up to block 362. Once store key 60 is selected at block 366, control passes to block 368 where processor 28 blanks master display 48 and transmits signals to each slave unit (e.g., 22a, 22b, etc.) causing each of the slave units to blank their respective presentation surfaces. Here, while the presentation surfaces are blanked, data corresponding to the images from the presentation surfaces is maintained in master memory 88 or a combination of master memory 88 and the slave memories (e.g., 119 in FIG. 5).

Continuing, at block 171 processor 80 requests a session identifier from the operator that can be subsequently used to access the session images. For instance, processor 80 may provide a session identifier field and a query prompting the operator to name the session image set via master display 48. Where a text session identifier is preferred, processor 80 may also provide touch selectable icons comprising a full alphabetical keyboard via display 48 or, in the alternative, may be capable of recognizing hand writing within the session identifier field. Instead of requesting a session identifier at block 171, processor 80 may simply assign a random access code to the session image set and temporarily provide the code to the operator via display 48.

At block 369, processor 80 correlates each image in the image set with a unique presentation unit identifier (i.e., an identifier that is unique to one of master unit 28 or one of the slave units (e.g., 22a, 22b, etc.). At block 370, master processor 80 stores the session image set with the session identifier where each of the images is associated with a specific one of the master unit and the slave unit identifiers in master memory 88. After block 370 all of the session images have been stored in an accessible format for future reference.

Next, at block 374, master processor 80 monitors for selection of resume icon 56 indicating that a previous collaborative session is to be resumed and therefore that a stored image set should be reaccessed and presented. At block 376, where no resume command is received, control passes back up to block 374. Once a resume command is received at block 376, control passes to block 377.

At block 377, master processor 80 provides a request prompting a system operator to provide a session identifier corresponding to a previously stored image set. Here, the prompt may include a text query and a session identifier field along with a suitable set of touch sensitive icons (e.g., numbers, alphanumeric, etc.) for specifying an identifier.

At block 378, the image set associated with an entered session identifier is retrieved from memory 88 and at block 380 the images in the set are displayed via the master display and the slave units so that the previous session can continue where it left off. After block 380, control passes back up to block 362 where the process described above continues.

In addition to being able to store sets of images that are simultaneously presented via the system presentation units for subsequent access, it is also contemplated that, in at least some embodiments of the present invention, separate images may be selectable for storage and subsequent access independent of whether or not the images are flipped to slave units. For example, referring once again to FIGS. 2 and 3, it at least some cases, master processor 80 may be programmed such that, when store key 60 is selected once, the image currently presented via display 48 is stored and, when key 60 is selected twice in rapid succession (e.g., an action akin to a double-click of a mouse), processor 80 is programmed to store an entire compliment of session images as an image set. Where single images are stored for subsequent access, in some cases those images may be added to a session set associated with the collaborative session occurring when the image is stored. In the alternative, in some cases, when a single image is stored, processor 80 may perform a process similar to the one described above with respect to storage of session image sets, requiring a specific text or numeric image identifier from the system operator that can be used to subsequently reaccess the image.

Where images are separately stored, referring still to FIGS. 2 and 3, when retrieve key 62 is selected, because images can be retrieved from either the master memory or from one of the slave presentation devices, processor 80 may provide a menu of options indicating the possible sources from which an image can be retrieved and suitable tools for accessing those images.

Figure 17:
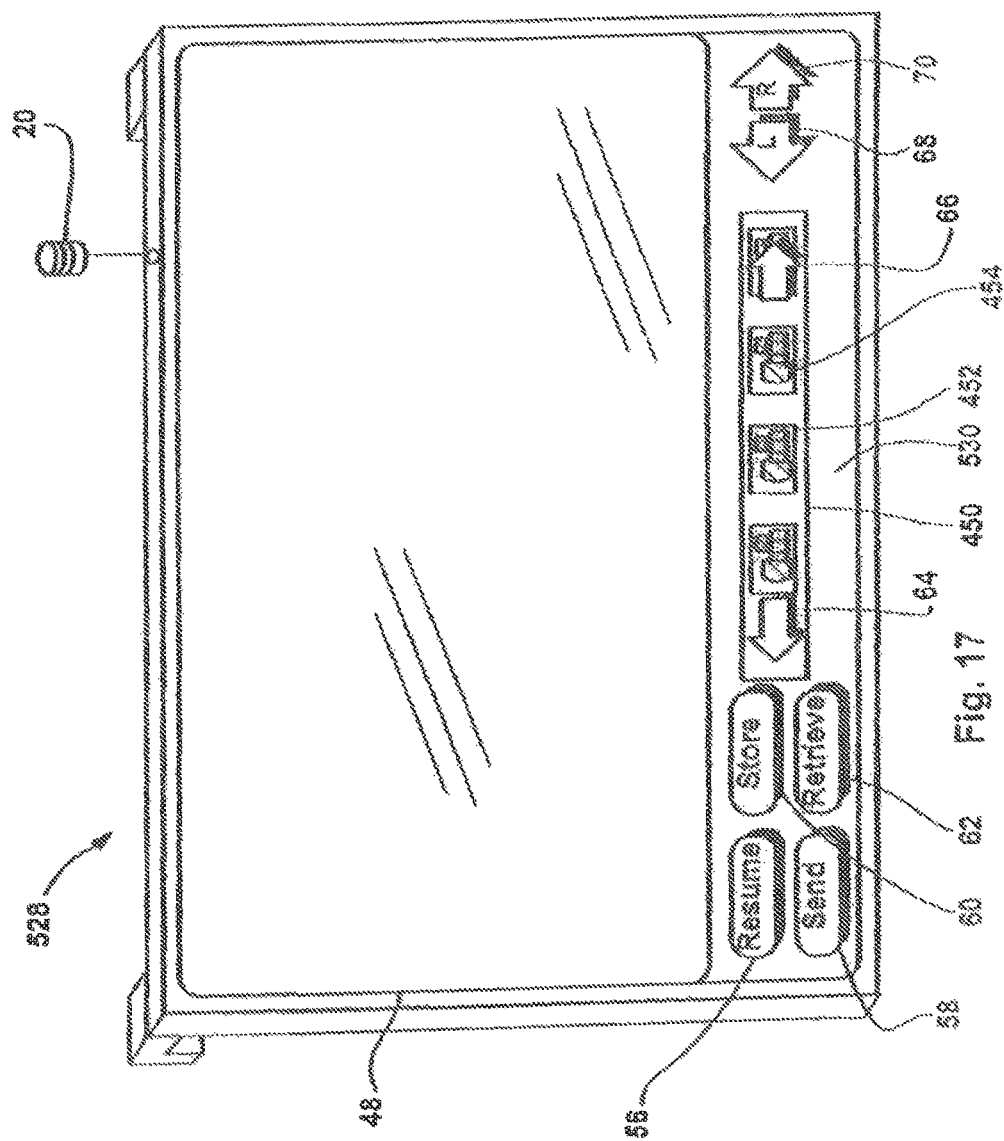
FIG. 17 is similar to FIG. 2, albeit illustrating a master unit that includes a different compliment of control buttons.

Referring to FIG. 17, a master presentation unit 528 similar to the master unit 28 of FIG. 2 is illustrated where the master unit 528 provides a set of touch sensitive icons in a lower margin area 530. Here, the resume icon 56, send icon 58, store icon 60 and retrieve icon 62 as well as the left and right flip icons 68 and 70, respectively, have functions that mirror the functions described above with respect to the similarly numbered keys in FIG. 2 and therefore, in the interest of simplifying this explanation, will not be described again here in detail. The main difference between the icon set provided via unit 528 and the key set provided via unit 28 is that the number pad 67 in FIG. 2 has been replaced by a thumb nail sketch bar 450 in FIG. 17. Here, it is contemplated that, whenever an image is flipped from master unit 528 to one of the slave units, a thumb nail of the flipped image will be presented via bar 450. In FIG. 17, two exemplary thumb nail sketches are identified by numerals 452 and 454. Here, to re-present an image via master display 48 that is being presented by one of the slave units, instead of identifying the specific slave unit or an image identifier that has been applied to an image to access the image, the system operator can simply select one of the thumb nail sketches (e.g., 452, 454, etc.) and retrieve icons 62 to re-present the image via display 48.

In at least some cases, it is contemplated that all images flipped from master unit 528 to any of the slave units are stored and maintained within the master memory 88 until a system operator terminates a collaborative session and corresponding thumb nail sketches (e.g., 452, 454, etc.) are added to bar 450. Here, where the number of flipped images exceeds the number of slave presentation units which is often the case during prolonged collaborative sessions, the system operator will still be able to quickly and easily access all flipped images independent of whether or not the images are currently presented via slave units or are simply stored in the master memory. Icons 64 and 66 are left and right scrolling icons that enable the operator to graphically search a large number of thumbnail sketches for specific images to re-present. In some cases it is contemplated that all flipped images and all stored images that are not flipped will be stored in master memory 88 and represented as selectable thumbnail sketches in bar 450.

Referring once again to FIG. 24, in at least some inventive embodiments it is contemplated that where multiple presentation units are available and where any of the presentation units may serve as either a master or slave unit, a method may be implemented in software to quickly help a system user identify one of the units as a master unit, select a sub-set of units to operate as slave units from a larger set of units, to associate the master and selected slave units and provide tools for flipping images among the master and slave units. To this end, referring once again to FIG. 24, in this example it will be assumed that presentation units 702, 704, 706, 708, 710 and 712 can be used for various purposes such as, for example, in private offices, in conference rooms, in public spaces such as a hallway or the entry to a cafeteria, etc. To this end, each of the units includes a flat panel display 714 mounted on top of a castered stand 716 so that the units can easily be transported from one location to another. When two or more of the units are to be used together to facilitate a conferencing process where one of the units will be used as a master unit and the other unit or units will be used as slave units, it is contemplated that several units are brought to a conference space, associated with each other and can then run applications to facilitate the conferencing process.

Figure 25:
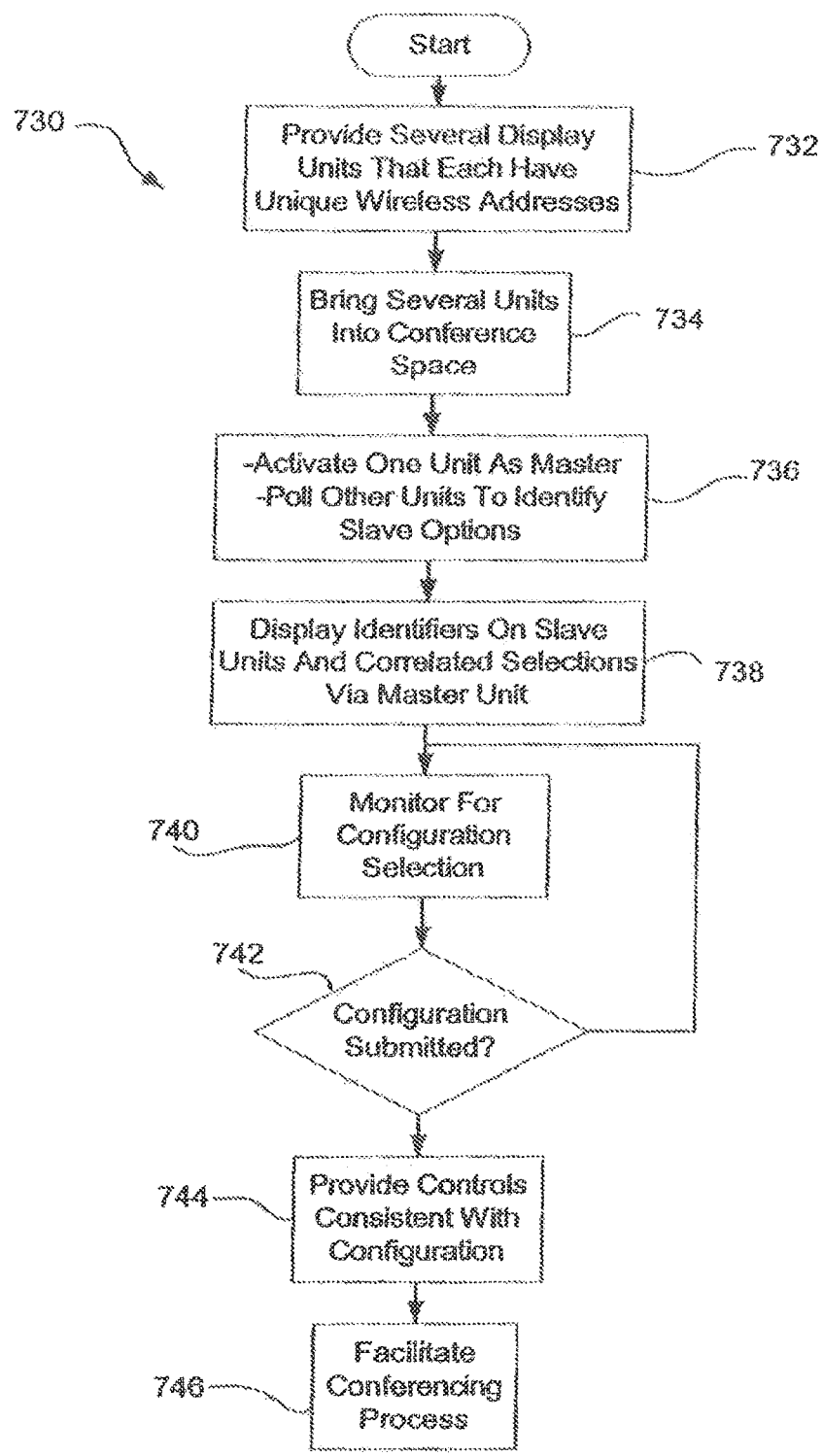
FIG. 25 is a flow chart illustrating another method according to at least some aspects of the present invention.

Referring now to FIG. 25, a method 730 consistent with the process described above is illustrated. Referring also to FIG. 24, at block 732, several display units (e.g., 702, 704, 706, 708, 710 and 712) are provided where each of the display units has a unique wireless address. For example, display unit 702 may have a wireless address 00425A1, unit 704 may have a wireless address 5447861, unit 706 may have a wireless address 8990861, etc. At process block 734, several of the display units are brought into a conferencing space (see FIG. 24).

At process block 736, with each of the units in the conferencing space turned on, a system operator indicates that one of the units is to be employed as a master unit. To this end, as illustrated in FIG. 24, in at least some embodiments whenever one of the units (e.g., 702) is turned on, information (i.e., an initial interface) is presented via the unit's display (e.g., 714) that instructs the system operator on how to select the unit as a master unit. In this regard, instructions 720 may be provided via display 714 along with a selectable MASTER icon 722 for identifying unit 702 as the master unit. Similar instructions and master icon (e.g., see 724) are provided via each of units 704, 706, 708, 710 and 712. When an operator indicates that one of the units is to be a master unit, by default, the other units in the conference space are identified as possible slave units. In the present example it will be assumed that an operator selects MASTER icon 722 via display 714 thereby indicating that unit 702 is to be the master unit.

Continuing, at block 736, after an operator selects unit 702 as the master unit, unit 702 wirelessly polls the conference space to identify other presentation units 704, 706, 708, 710 and 712 within the space. When each of units 704, 706, 708, 710 and 712 receives the polling signals requesting that the units identify themselves as possible slave units, each unit 704, 706, 708, 710 and 712 transmits an information packet back to master unit 702 identifying the slave unit by its unique wireless network address. For example, consistent with the exemplary addresses above, unit 704 transmits an information packet including unique address 5447861, unit 706 transmits an information packet including unique address 8990861, etc. When unit 702 receives the return information packets from the possible slave units, unit 702 identifies each of the possible slave units, associates a unique simple identifier with each of the slave units and then further facilitates the configuration process. To this end, in the present example, master unit 702 identifies five separate slave units 704, 706, 708, 710 and 712 and associates simple identifiers 1, 2, 3, 4 and 5 therewith, respectively.

Figure 26:
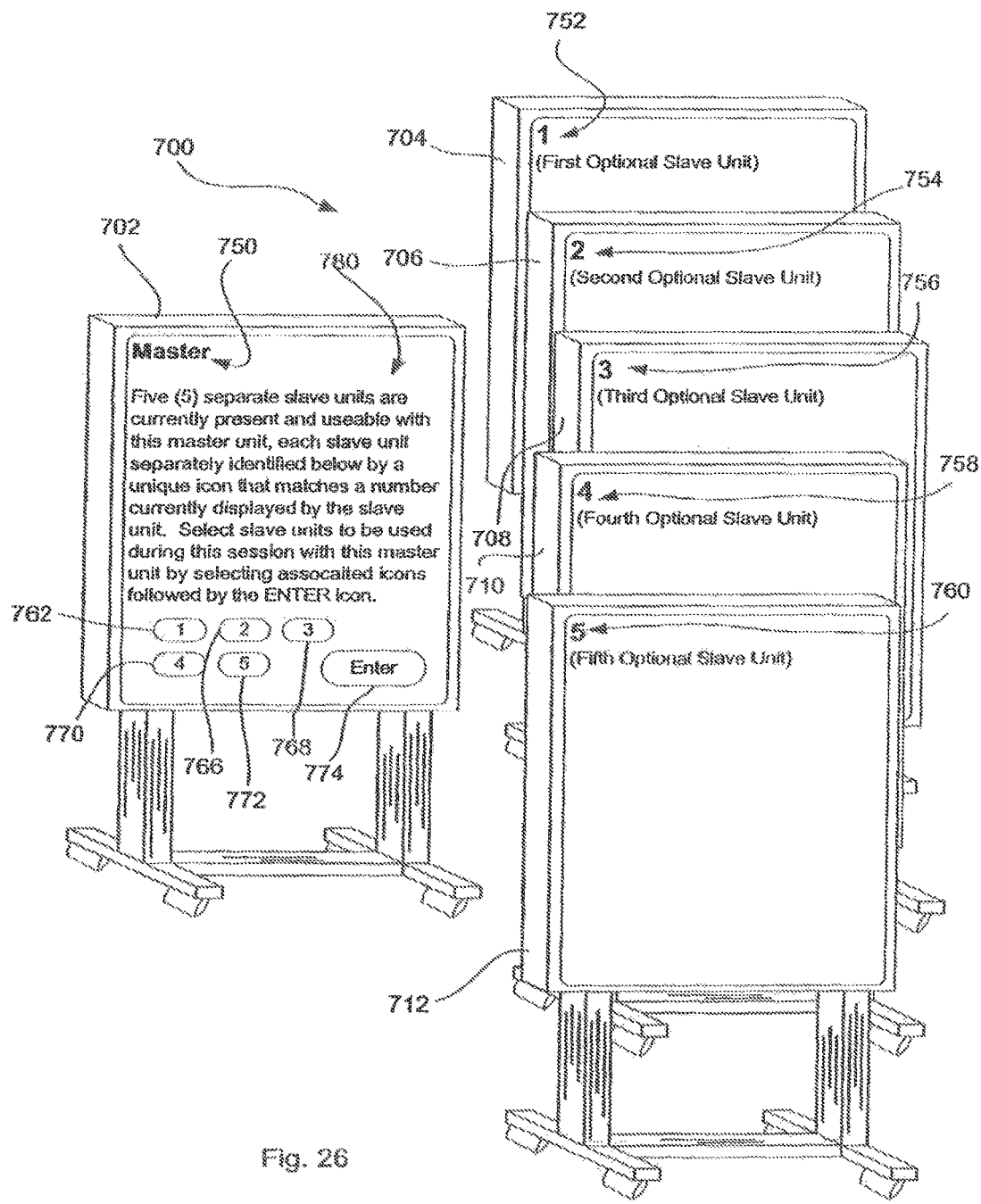
FIG. 26 is similar to FIG. 24, albeit illustrating the system after one of the portable units has been selected as a master unit.

Referring still to FIG. 25 and also to FIG. 26 at block 738, after identifying the five slave units, master unit 702 transmits information packets back to each of the five slave units 704, 706, 708, 710 and 712 assigning the simple identifier labels to each. In the present example, the identifier labels include numbers 1, 2, 3, 4 and 5 which are transmitted to units 704, 706, 708, 710 and 712, respectively. When a slave unit receives a simple identifier label, the unit displays the label via its display screen. In FIG. 26, the displayed simple labels are shown at 752, 754, 756, 758 and 760.

In addition, referring still to FIGS. 25 and 26, at block 738 master unit 702 provides a configuration interface including a master label 750 designation near the top thereof, instructions 780 for selecting a sub-set of the slave units within the conference space to be used in conjunction with master unit 702 to facilitate the conferencing process and icons corresponding to the simple labels (e.g., 752, 754, etc.) associated with each of the slave units 704, 706, 708, etc. For example, icon 762 is associated with label 752 and hence with slave unit 704. Similarly, icons 766, 768, 770 and 772 are associated with labels 754, 756, 758 and 760 and hence with slave units 706, 708, 710 and 712, respectively. An enter icon 774 is also provided near the bottom of the master unit display. Here, consistent with instructions 780, a sub-set of the slave units 704-712 can be selected by selecting a sub-set of the icons 762, 766, 768, 770 and 772 and then selecting ENTER icon 774. For example, to select slave units 706, 708 and 710 as units to be used in conjunction with master unit 702 during the conferencing session, an operator select icons 766, 768 and 770 and then selects ENTER icon 774. This process of monitoring for slave unit sub-set specifying activity is represented by blocks 740 and 742 in FIG. 25.

Figure 27:
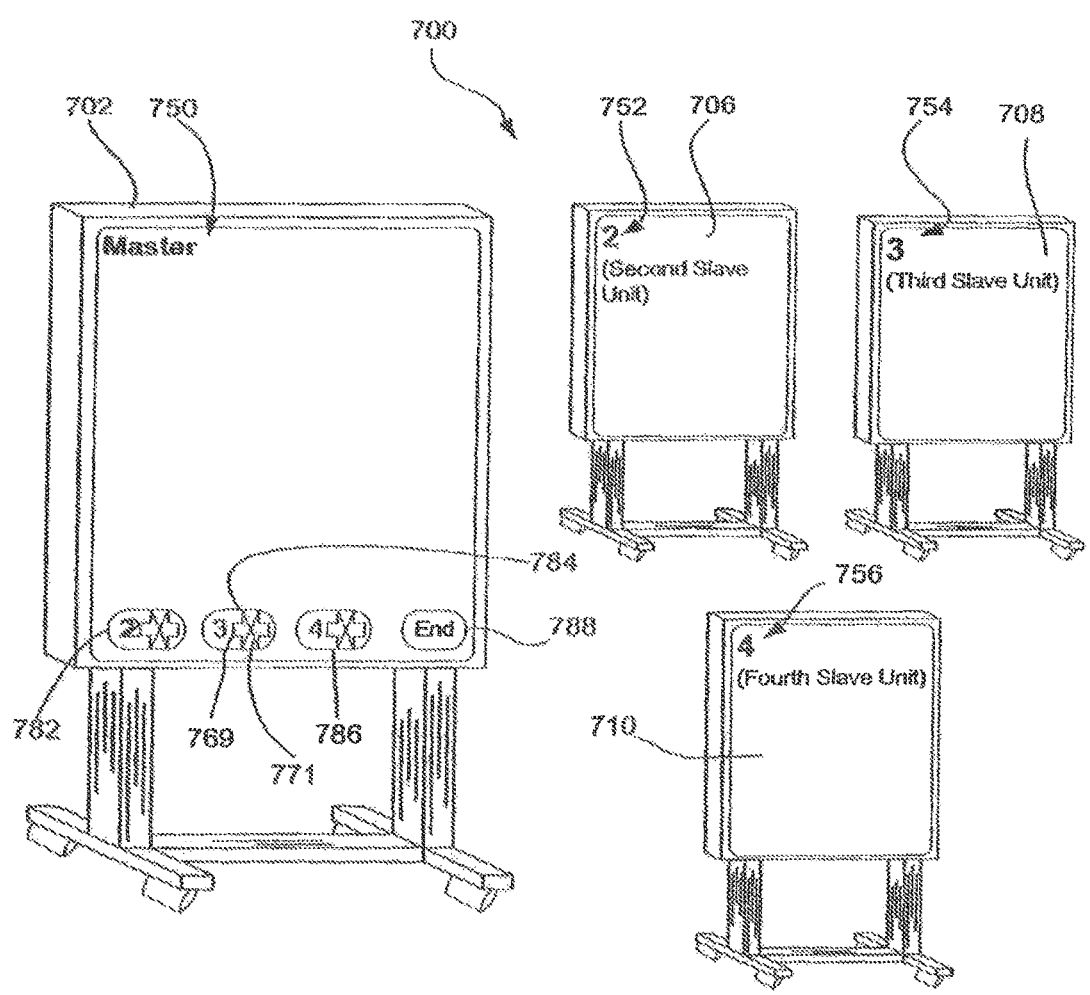
FIG. 27 is similar to FIG. 26, albeit wherein the system is shown after slave units have been selected.

Once ENTER icon 774 is selected, at process block 744, master unit 702 provides a control interface including the master label 750 designation and provides icons suitable for flipping master images to the sub-set of selected slave units and for retrieving images from the selected sub-set of slave units. To this end, referring to FIG. 27, master unit 702 provides a separate flipping/retrieving icon 782, 784 and 786 for each of the selected sub-set of slave units 706, 708 and 710, respectively. The flipping/retrieving icons 782, 784 and 786 are similar and operate in a similar fashion and therefore, of interest of simplifying this explanation, only icon 784 will be described here in any detail. Icon 784 includes a flip arrow icon 769 and a retrieve arrow icon 771. When flip icon 769 is selected, an image currently displayed via the master display is flipped or transmitted to the slave unit 708 associated with icon 784 (i.e., unit 708 that is associated with simple label 754). Similarly, when retrieve arrow icon 771 is selected, the image currently displayed via slave unit 708 is retrieved and displayed via the master display unit 702. An END icon 788 is provided for ending the current conferencing process.

Thus, it should be appreciated that multiple use electronic displays can be configured in many different ways for separate and combined uses. It should also be appreciated that where displays are equipped for wireless communication, software can be provided that allows the displays to streamline a configuring process.

Figure 29:
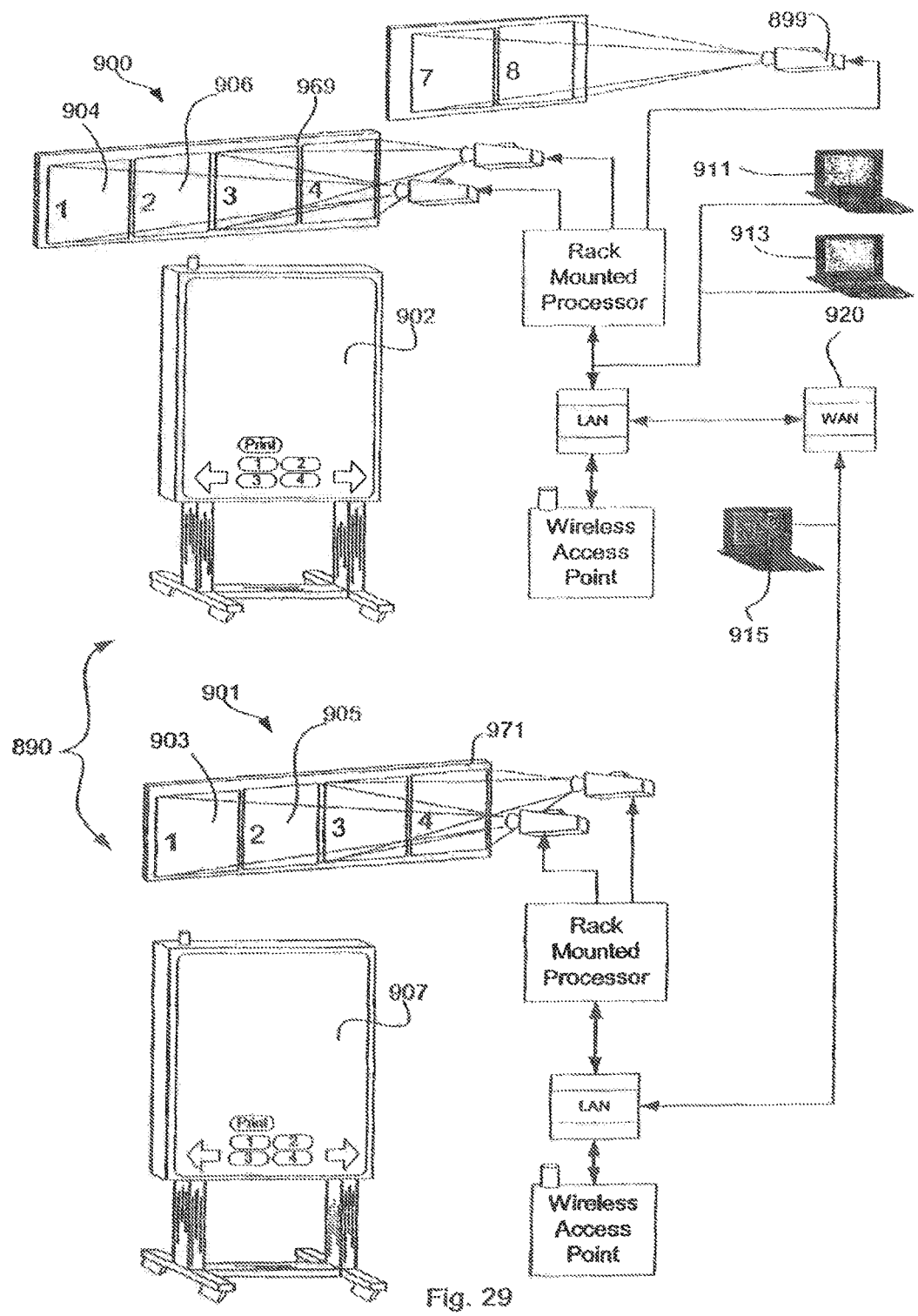
FIG. 29 is a schematic view of a system including two subsystems like the configuration of FIG. 28 that are linked by a wide area network.

Referring now to FIG. 29, yet one more system 890 that is consistent with at least some aspects of certain embodiments of the present invention is illustrated. Referring also to FIG. 28, the system 890 includes first and second sub systems 900 and 901 that are each akin to system 800 described above with respect to FIG. 28. Thus, each of systems 900 and 901 includes a portable master presentation unit, first and second projector units, a display screen, a rack mounted processor, a local area network and a wireless access point, none of which are separately labeled in FIG. 29. As in the embodiment illustrated in FIG. 28, each of the projectors is configured to project two separate images onto the display screen. For example, in FIG. 29, one of the projectors in subsystem 900 projects first and second separate images into first and second separate spaces 904 and 906 while one of the projectors in subsystem 901 projects first and second images into first and second spaces 903 and 905, respectively. In FIG. 29, in addition to the components described above, the local area networks are linked via a wide-area network (WAN) 920.

Referring still to FIG. 29, in at least some configurations, it is contemplated that system 901 would be remotely located from system 900 and that either of the portable presentation units could be used as a master presentation unit. It is also contemplated that, in at least some applications, when a system user uses one of the master presentation units to perform a presentation, all activity that occurs in the corresponding subsystem would be replicated in the other subsystem. For example, when a system user makes changes to information on master display screen 902, those changes would be, essentially in real time, replicated on remote master presentation screen 907. In addition, when a system user flips an image from master presentation space 902 to one of the slave presentation spaces (e.g., 904, 906, etc.), the flipping activity would also be replicated within system 901. For example, if a system user flips an image from space 902 to space 904 in system 900, the same image would be flipped from space 907 to space 903 in subsystem 901. Similarly, if a system user retrieves an image from space 906 back to master presentation space 902, the image from space 905 would also be retrieved back to master space 907 in subsystem 901.

In addition, activity that alters an image in master presentation space 907, in at least some embodiments, would also automatically and essentially in real time alter a similar image in master presentation space 902. Similarly, flipping and retrieving of images via space 907, in at least some embodiments, would be reflected by similar activity occurring in subsystem 900.

Figure 30:
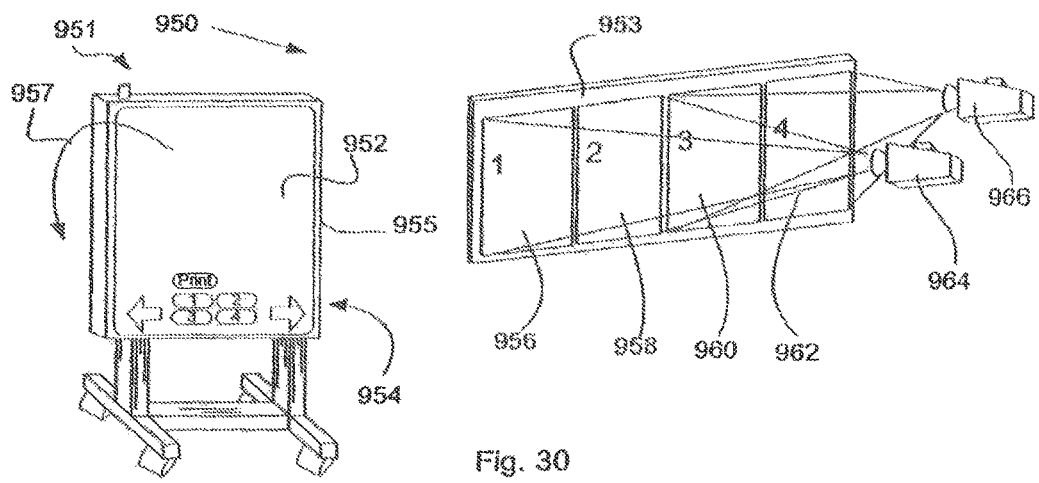
FIG. 30 is a schematic diagram of a system like the system illustrated in FIG. 28 wherein a flat panel display is mounted for rotation between a portrait orientation and a landscape orientation, in FIG. 30 the display is shown in the portrait orientation.

Referring now to FIG. 30, another embodiment 950 that is consistent with at least some aspects of some embodiments of the present invention is illustrated. Referring also to FIG. 28, system 950 is similar to system 800 in that system 950 includes a portable master presentation unit 951, a display screen 953 and first and second projectors 964 and 966. Other components illustrated in FIG. 28 are not shown in FIG. 30 in the interest of simplifying this explanation. The primary difference between the system in FIG. 30 and the system illustrated in FIG. 28 is that unit 951 includes a flat panel display 955 that can be rotated from the portrait view as illustrated in FIG. 30 to the landscape view illustrated in FIG. 31 as indicated by arrow 957. Here, it is contemplated that when display 955 is rotated from the portrait orientation to the landscape orientation, at least two changes may, in at least some embodiments, automatically occur. First, the number of slave images projected may be dependent upon unit 955 orientation. To this end, in at least some embodiments it is contemplated that when display 955 is in the portrait orientation as illustrated in FIG. 30, each projector 964 and 966 may be programmed to project two separate adjacent images. For instance, as illustrated in FIG. 30, projector 964 projects first and second images into adjacent spaces 956 and 958 while projector 966 projects first and second images into adjacent spaces 960 and 962 where each of the projected images has a portrait form. Referring to FIG.

Figure 31:
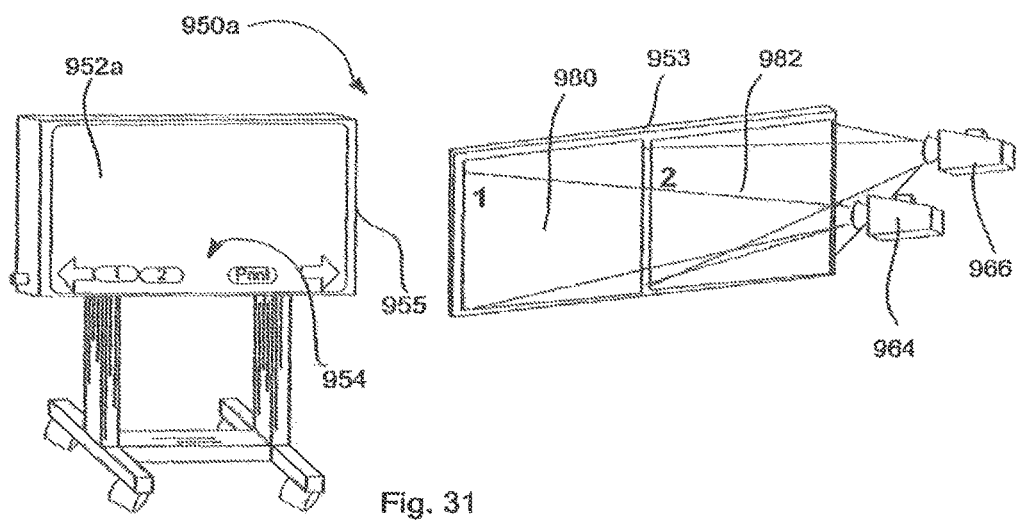
FIG. 31 is similar to FIG. 30, albeit illustrating the system where the display is in the landscape orientation.

31, when unit 955 is rotated into the landscape orientation, the processor that drives the projectors is programmed to automatically reformat so that each of projectors 964 and 966 only projects one landscape image. In FIG. 31, projector 964 projects a first landscape image into landscape space 980 while projector 966 projects a second image into landscape space 982.

Second, when display 955 is rotated from the portrait orientation to the landscape orientation, the control icons 954 presented via display 955 are altered to, first, correspond to the changes made to the slave presentation spaces and so that the control icons 954 are better oriented within the viewing portion of display 955. To this end, as illustrated, while four slave space selection icons are illustrated if FIG. 30, only two slave space selection icons are illustrated in FIG. 31, a separate one of the slave space selection icons corresponding to each one of the slave spaces 980 and 982. From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims. For example, master unit 28 may simply be a conventional whiteboard equipped with a camera wherein, when an image is flipped from the master unit to one of the slave units, the camera takes a picture of the image presented via the master unit and transmits that image to a selected slave unit for presentation.

In addition, while all of the presentation units described herein include mounting members that mount the presentation units to a wall mounted rail, it should be appreciated that other types of support structures for the presentation units are contemplated. For instance, master unit 28 may be supported by an easel type assembly or may be a cart mounted assembly where the cart includes casters to facilitate easy movement of the unit within a facility.

Moreover, while a simple eraser and printer are described above, it should be appreciated that various types of printers and erasers are contemplated and may be used with the various embodiments of the present invention. For instances, in some cases, slave presentation surfaces may be provided by rigid whiteboard member and the printers described above may be plotters that move along the presentation surface or relative thereto (i.e., the rigid whiteboards may in fact be moved with respect to the plotters) and the eraser may be supported and moved in a similar fashion to provide images on the presentation surface and to erase images therefrom.

Furthermore, both the slave and master presentation units may be supported in any fashion including permanent wall mounts, easel type support structures (see FIGS. 24, 26 and 27) with or without casters to facilitate movement, ceiling mounts, structure that secures the units to partition walls, etc.

While systems described herein include only two slave units, it should be appreciated that some systems will include three or more slave units. In addition, some systems may include more than one type of slave unit. For instance, referring again to FIGS. 11 and 12, a printer type slave unit like unit 232 may be added to the system 251 of FIG. 12 so that the system includes the printer 232 as well as flat panel units 252a and 252b. Other slave unit combinations are contemplated.

In at least some cases all of the system units (e.g., the master and slave units) may have identical constructions and functionality so that images can be edited via any of the units and can be flipped from or retrieved to any of the units. Thus, for instance, where three units like master unit 28 comprise a system, an operator may move among the units editing and flipping and retrieving in an enhanced collaborative fashion.

In addition, while one simple rail 40 configuration is described above, the invention contemplates many different types of rail configurations including other hook to hook type rails, rails that may receive wheels mounted on the master and slave units, rails that are only mountable via the ends thereof (e.g., the rail may restrict removal of mounted units via upward or forward motion—this is particularly important in cases where the units are relatively expensive) and other system where the units include securing structure to more effectively secure the units to the rail members 40.

As illustrated in FIG. 28, in addition to the components above, any of the inventive systems may also include a standard sized printer/scanner (e.g., 8½"×11", legal size, etc.) for printing copies of displayed images for meeting attendants to use during a meeting or to take from the meeting or so that documents can be quickly scanned in for viewing and editing via the system.

Figure 22:
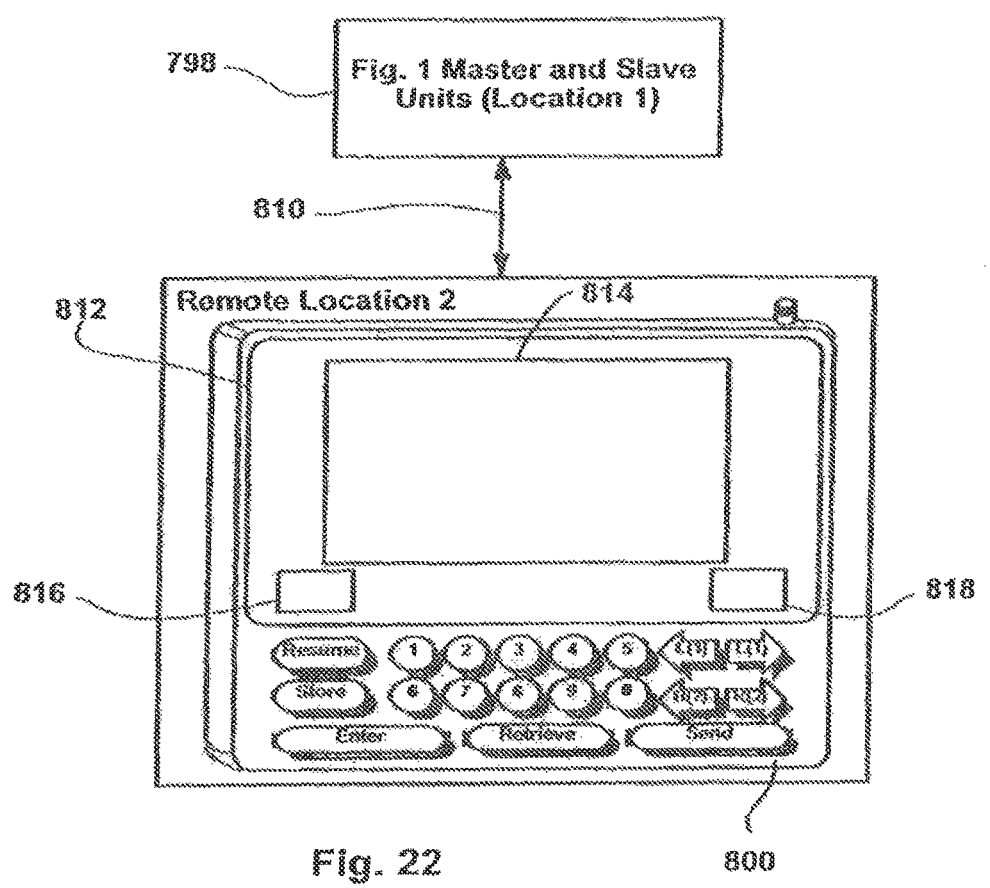
FIG. 22 is a schematic illustrating a system where an interface unit is used to remotely control a presentation using remotely located master and slave units.

Moreover, referring to FIGS. 1 and 22, in at least some cases, it is contemplated that one or all of the master and slave units 28, 221, 22b, may be located remotely 798 from a presenter using a laptop or personal computer to control master and slave units and the images presented thereon. Here, for instance, if a presenter in Chicago makes a mark on a Chicago based unit 800 display, the mark may be immediately provided on a master unit 28 (see again FIG. 1) located in a New York conference room. Here, if the user indicates that the master image should be flipped to the first slave unit 22a, the image in New York is flipped to the first slave unit 22a in New York. Similarly, images from the New York located slave units may be retrieved to the master unit 28 for editing via commands entered in Chicago. In the case described above, referring to FIG. 22, the remote control unit 200 (see again FIG. 10a) communicates via a network link 810 (e.g., the Internet) with the master unit 28 to drive the New York based presentation.

In some cases unit 800 may include representations of each of the master and slave unit images to help the presenter keep track of the remote presentation. To this end display 812 in FIG. 22 includes a master unit image box 814 and first and second slave unit image thumbnail sketches 816 and 818. In this case flipping and retrieving may be as simple as dragging images from one box or sketch or the other. For instance, to flip to the first slave unit 22a, a presenter may simply drag the master image in box 814 to thumbnail 816. Similarly, to retrieve the second slave unit image, the user may simply drag the second slave unit thumbnail 818 to the master box 814. This feature may also be used in the context of a unit 800 to control master and slave images locally (i.e., with unit 800 in the same space as the presentation units).

In some cases the master unit 28 and sub-set of the slave units 22a, 22b may be located in Chicago while one or more slave units are remotely located in New York. Here the presenter could control the flipping process to the different slave units in a manner similar to that described above.

In addition, referring again to FIG. 24, in at least some cases a handheld interface device 731 may be provided for designating master and slave units. To this end, device 731 may be programmed to wirelessly poll units 702, 704, 706, 708, 710 and 712 to identify possible master and slave units and provide selectable icons via a display 733. Here, once a master unit and sub-set of slave units are selected, device 731 may transmit the designation information to the corresponding units 702, 704, etc., causing appropriate configuration to facilitate flipping/retrieving of images from and to the master unit. After configuration, control interface tools may be provided via either the master unit or device 731 or via both.

Moreover, while the system of FIG. 24 is described in the context of wireless communication, in at least some cases the communication may be via hardwire hookup.

Furthermore, the configuration aiding process described above with respect to FIGS. 24-27 could be employed with other types of presentation units such as roll down or projection type units, etc., and may not require all of the steps of FIG. 25. For instance, a master unit may be predefined or one unit type may always be the master unit when used with other unit types. For instance, where one unit is an electronic flat panel touch screen and the other units are roll down type units, the touch screen unit may always be the master unit and may poll other units in a conferencing space during commissioning.

Next, an exemplary interface that includes several inventive features will be described in the context of the system 890 illustrated in FIG. 29 wherein an information presenter uses master unit 902 to present information to conference attendees within a conference room including the components which make up subsystem 900 and to another group of attendees in a remote conference room that includes subsystem 901 components. At least some of the conference attendees may have and may be using personal interface devices including, for instance, laptop computers 911, 913, 915, etc., to participate in the conference. In FIG. 29, laptops 911 and 913 are linked via a LAN to subsystem 900 while laptop 915 is linked to subsystem 900 via WAN 920. In the illustrated embodiment laptops 911 and 913 are used within the conferencing space that includes subsystem 900 such that the laptop users can view their laptop displays, the image presented via master unit 902 or the slave images (e.g., 904, 906, etc.) presented via a slave presentation space 969. Similarly, one or more of the laptops may be used within the conference space associated with sub-subsystem 901. In addition, in the illustrated embodiment, laptop 915 is used remotely to patch in and monitor/participate in conference activities. Hereinafter, unless indicated otherwise, laptops 911, 913, 915, etc., will be referred to as personal interface devices.

Figure 32:
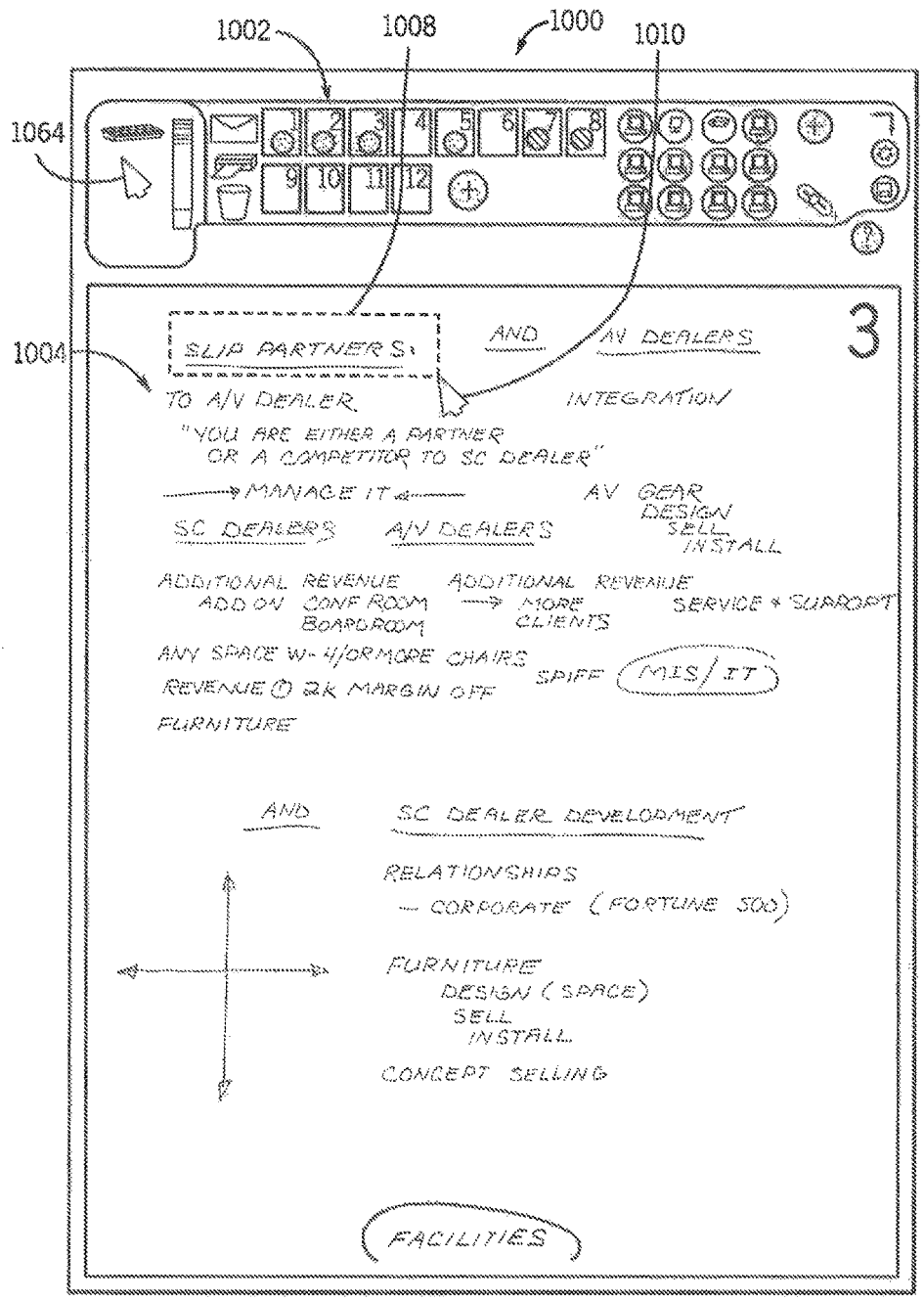
FIG. 32 is a schematic diagram of a 16:9 aspect ratio screenshot in a portrait orientation that may be presented via a master unit according to at least one embodiment of the present invention.
Figure 33:
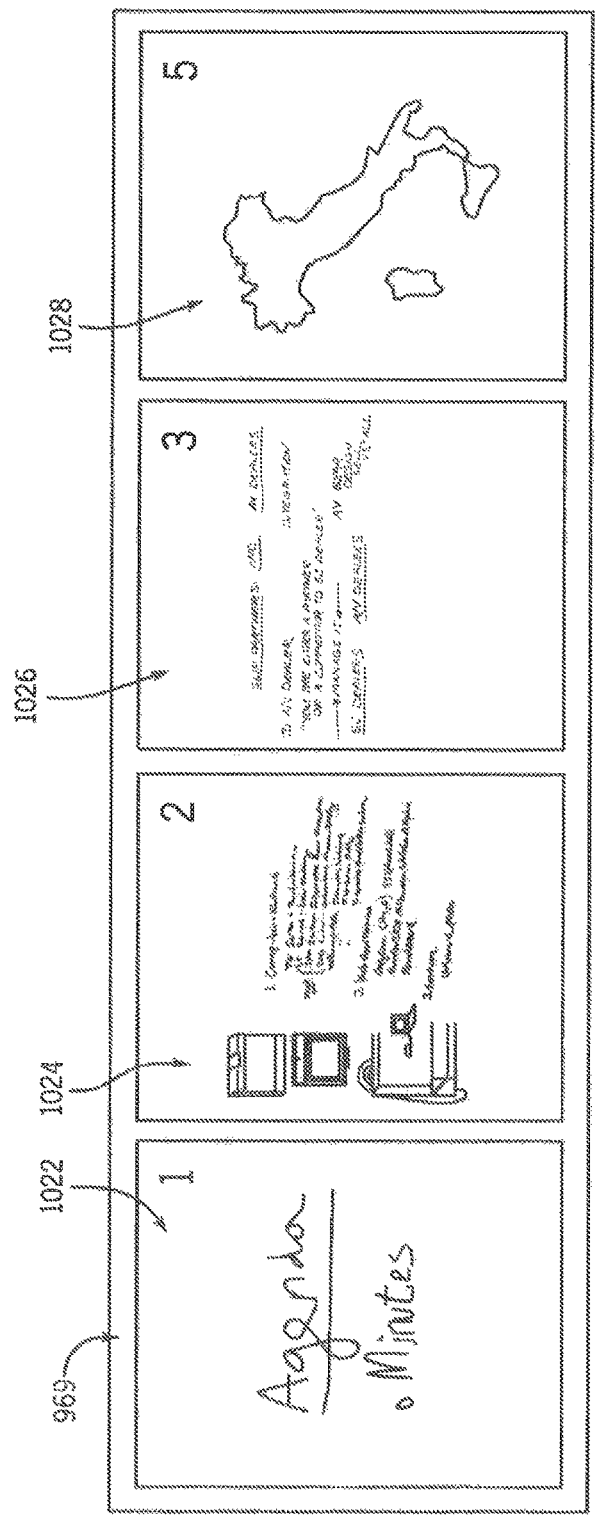
FIG. 33 is a schematic view of four slave images that may be presented via a slave presentation space according to at least some aspects of the present invention.

Referring still to FIG. 29 and also to FIGS. 32 and 33, in the present example it will be assumed that at a certain point during a presentation, master unit 902 provides an interface to the presenter that has characteristics that are consistent with screen shot 1000 and that the presenter has caused instances of four images 1022, 1024, 1026 and 1028 to be displayed on slave presentation surface 969. Thus, conference attendees within the conference room that includes subsystem 900 can observe an image presented via master unit 902 as well as each of the four images illustrated in FIG. 33.

Referring again to FIGS. 29, 32 and 33, in at least some embodiments where two sub-systems 900, 901 that have similar presentation capabilities are linked, all of the images that are presented via one of the sub-systems (e.g., sub-system 900) are repeated or re-presented by the components of the other subsystem (e.g., subsystem 901). Thus, for instance, where the images in FIGS. 32 and 33 are presented via master unit 902 and space 969, five identical images are simultaneously presented via unit 907 and slave presentation space 971. Similarly, in at least some embodiments, any activity that is performed by the components of sub-system 900 may be repeated via the components of sub-system 901 essentially in real time so that attendees in the separate conference spaces associated with subsystems 900 and 901 can simultaneously view image activities. Thus, for instance, if the image displayed via the sub-space of space 969 that is labeled "2" is altered, the image displayed via the sub-space of space 971 that is labeled "2" would likewise be altered so that whatever images are presented via sub-system 900 would likewise be presented via sub-system 901. As another instance, if an image presented via master unit 902 is altered, the similar image presented via unit 907 is also altered in the same fashion.

Referring still to FIG. 32, interface screen shot 1000 is shown in a format suitable for display via a 16 by 9 aspect ratio display screen where the display screen is in a portrait orientation (i.e., the long dimension 16 is vertical and the short dimension 9 is horizontal). As illustrated, when a 16 by 9 screen is in the portrait orientation, in at least some embodiments exemplary screen shot 1000 includes a tool area 1002 along a top edge of the screen shot 1000 and a workspace area 1004 there below. With respect to the general 16:9 portrait layout shown in FIG. 32, it has been recognized that it is advantageous to provide a workspace area 1004 that has dimensions that are similar to the dimensions of a typical mechanical flip chart pad or a typical personal computer screen in order to maintain a form factor that many conference attendees have become accustomed to. A typical flip chart pad has an aspect ratio of approximately two units wide by three units high while a personal computer display screen typically has an aspect ratio of approximately four units wide by three units high. Here, in at least some embodiments, when the master unit is in a portrait landscape as illustrated in FIG. 32, area 1004 has a 2:3 aspect ratio (e.g., 2 wide by 3 high) and the remaining space is used to accommodate tool area 1004. As described in greater detail below, when the master unit is in a landscape orientation (FIG. 40), a workspace area 1216 has a 4:3 aspect ratio (i.e., 4 wide by 3 high) and the remaining space is used to accommodate tool area 1202.

Referring again to FIG. 32, with a 16:9 aspect ratio screen, by providing the tool area along a top edge or, in at least some embodiments, along a bottom edge (not illustrated) of the screen, a maximum size 2:3 aspect ratio (i.e., 2 wide by 3 high) can be formatted. Here, to provide a 2:3 format workspace area 1004, an 18:5 format tool area 1002 can be configured.

The 18:5 tool area format was selected primarily because that ratio is generally consistent with the largest 2:3 workspace area 1004 that can be obtained with a 16:9 display screen. Here, it should be appreciated that other screen layouts are contemplated that would be consistent with the general teaching that the workspace area 1004 should be dimensioned within the 2:3 to 3:4 range. To this end, referring to FIG. 32, in another embodiment, instead of locating tool area 1002 along the top edge of the screen, tool area 1002 could be located along the bottom edge. Similarly, tool area 1002 could be divided into first and second separate tool areas located along the top and bottom edges of the screen where each of the tool areas has a 36:5 aspect ratio or some other ratios that, when combined, result in an 18:5 ratio. In still other embodiments the workspace area 1004 may be made smaller than the maximum size possible for a 16:9 screen but still having the desired 2:3 to 3:4 aspect ratio. Other exemplary screen shots corresponding to 4:3 aspect ratio display screens in portrait and landscape orientation and to a 16:9 aspect ratio display screen in landscape orientation are described hereafter with reference to FIGS. 40, 42 and 43.

Referring still to FIG. 32, as the label implies, tool area 1002 includes a plurality of on-screen icons that are selectable by the presenter for changing the information displayed via unit 902 and on slave presentation space 969. The on-screen icons may be selectable in any of several different ways such as, for example, via touch, stylus, movement and activation of a mouse controlled pointing icon, a track ball, etc. For the purposes of this explanation it will be assumed that unit 902 includes sensors for identifying when a location on the display screen is touched and the position of the touching activity, unless indicated otherwise.

Figure 34:
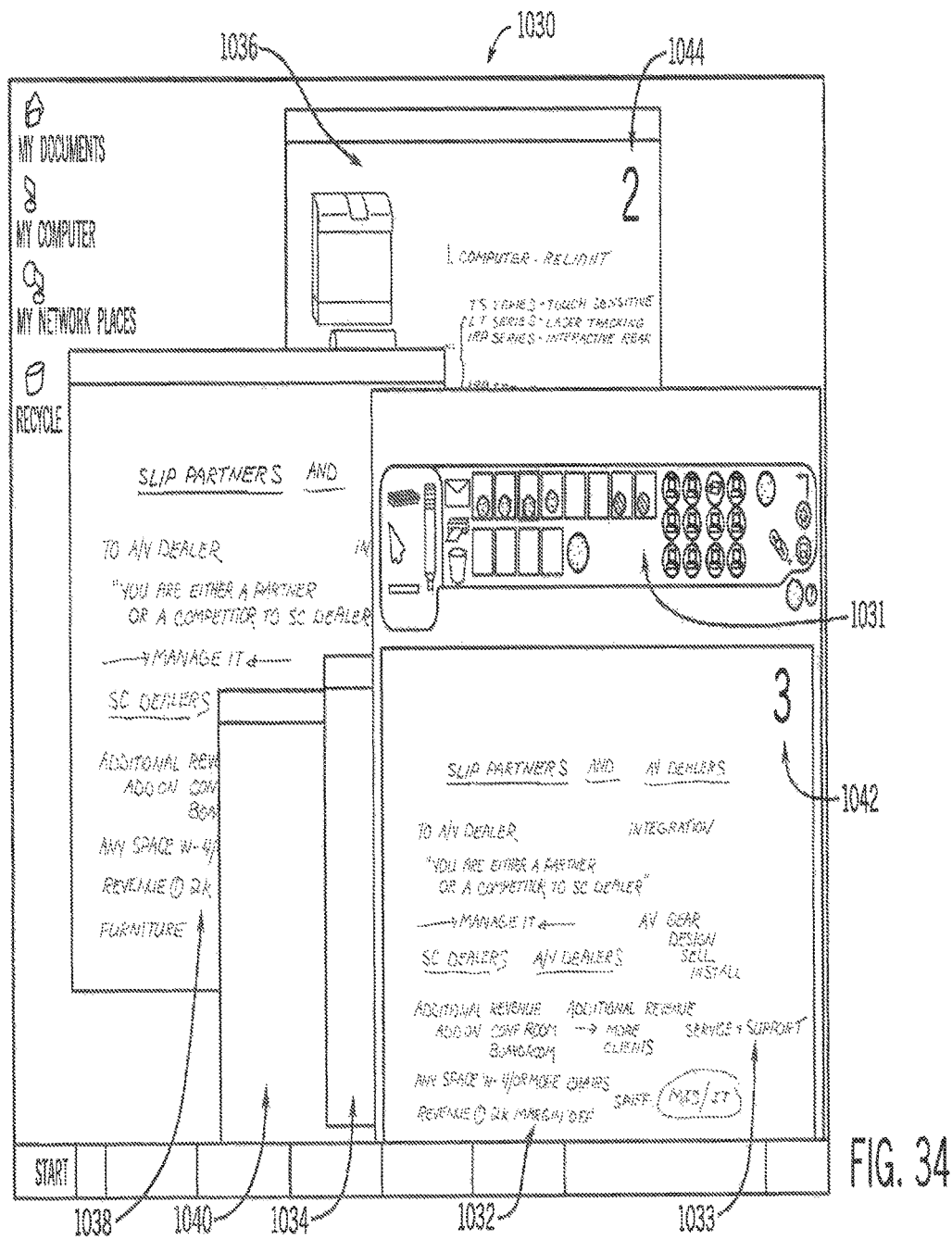
FIG. 34 is a schematic diagram of a screenshot that may be provided via one of the laptop computers illustrated in FIG. 29.

Referring now to FIGS. 29 and 34, FIG. 34 illustrates an exemplary screen shot 1030 that may be presented to a user of one of the personal interface devices 911, 913, 915, etc., according to at least some inventive embodiments. Referring also to FIGS. 32 and 33, as illustrated in FIG. 34, the information presented to the remote user includes all of the information that is presented to conference attendees within the conference space that includes subsystem 900. Thus, as illustrated in FIG. 34, exemplary screen shot 1030 includes five windows, a separate window corresponding to each of the images currently displayed via master unit 902 and the slave images 1022, 1024, 1026 and 1028 presented in space 969. In FIG. 34, window 1032 corresponds to the image displayed via master unit 902 while windows 1034, 1036, 1038 and 1040 correspond to slave images 1022, 1024, 1026 and 1028, respectively, as illustrated in FIG. 33.

Referring once again to FIGS. 32 and 34 and, more specifically, to window 1032 in FIG. 34, like screen shot 1000 that includes tool area 1002 and workspace area 1004, window 1032 that corresponds to master unit 902 includes a tool area 1031 as well as a workspace area 1033 that are arranged in the same fashion as sections 1002 and 1004. As illustrated, tool area 1031 includes a full complement of screen selectable icons corresponding to the tool icons illustrated in FIG. 32.

In at least some inventive embodiments, in addition to a presenter using master unit 902 being able to modify image information, any conference attendee is able to modify image information via workspace section 1033 and, when an image is modified via section 1033, the modifications are used, essentially in real time, to modify the image presented via master unit 902 and hence to modify all images that repeat the master unit image. Thus, in at least some embodiments, all or at least a sub-set of attendees are able to perform the same image manipulating functions as the presenter that uses master unit 902. Similarly, in at least some embodiments, any attendee using a personal interface device 911, 913, 915, etc., is able to alter which images are displayed within the on screen windows 1032, 1034, 1036, 1038 and 1040 using the tools in tool area 1031 in a fashion similar to that used by a presenter using master unit 902. Thus, for instance, an attendee using personal interface device 911 can, in the present example, move a new image into window 1036 using a tool from area 1031 which in turn causes the same new image to be displayed as one of the slave images on presentation space 969 (see again FIG. 29).

Figure 35:
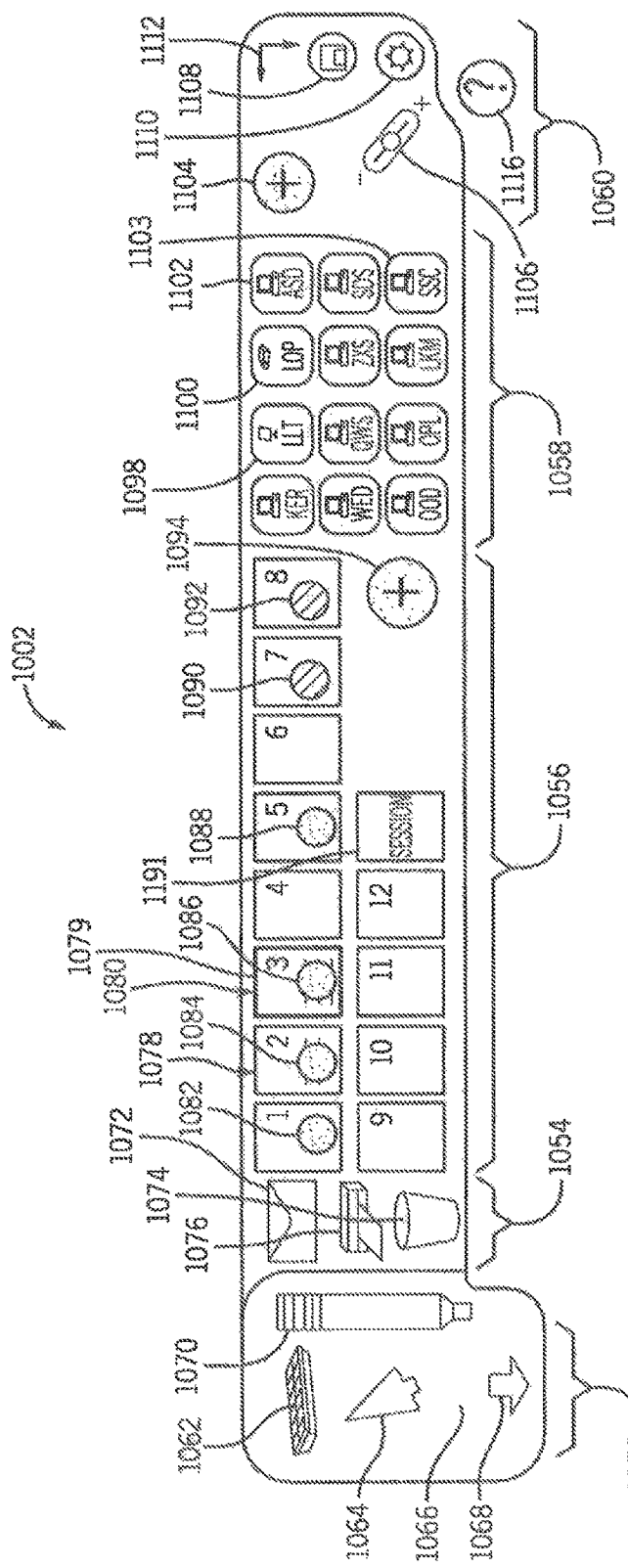
FIG. 35 is a schematic diagram illustrating the tool area of FIG. 32 in greater detail.

Referring now to FIG. 35, exemplary tool area 1002 is illustrated and includes a first tool section 1052, a target section 1054, a panel section 1056, a source section 1058 and a second tool section 1060. As the labels imply, tool sections 1052 and 1060 include on screen selectable icons that correspond to different types of tools that can be used to modify images that are displayed within a corresponding workspace section (see again 1004 in FIG. 32) as well as other types of icons to be described hereinafter. First tool section 1052 includes an eraser icon 1062, a pointer icon 1064, a pen icon 1070, a drop down arrow icon 1068 and a "current settings" indicator 1066. Pen icon 1070 is selectable to indicate to master unit 902 that a mechanical or electronic stylus device to be used with unit 902 is to be used as a pen to add information to a displayed image. Once pen icon 1070 has been selected, the mechanical or electronic stylus is useable to apply markings to the image in workspace area 1004.

Eraser icon 1062 is selectable to indicate to master unit 902 that the mechanical stylus is to be treated as an eraser for removing or erasing information from the master unit display screen. Once icon 1062 is selected, the mechanical stylus tip can be moved about the screen surface within area 1004 to remove information previously applied via the pen tool. In at lease some embodiments a button (not illustrated) on the stylus may be selected to indicate a desire to use the stylus as an eraser. When the stylus eraser button is selected and the master unit sensors sense stylus activity, the activity is assumed to be erasing activity.

Pointer icon 1064 is selectable to indicate to master unit 902 that the stylus should be used as a pointing device instead of as an eraser or as a pen for, for example, selecting information within workspace area 1004, selecting on screen icons within workspace area 1004 when software applications that use on screen icons as input are running, moving selected and/or non-selected information on the display screen, rotating screen information, re-sizing screen information, etc.

When one of the icons 1062, 1064 or 1070 is selected, the selected icon is, in at least some embodiments, highlighted in some fashion to indicate selection. For instance, when pen icon 1070 is not selected, a pen cap is presented as covering the pen tip as illustrated in FIG. 32. When pen icon 1070 is selected, the cap is eliminated to expose the tip as illustrated in FIG. 35. Similarly, eraser icon 1062 and pointer icon 1064 will be visually distinguished in some fashion when selected.

Icon 1068 is selectable to open one or more drop down menus associated with a currently selected one of icons 1062, 1064 or 1070. Thus, for example, when pen icon 1070 is selected and then icon 1068 is selected, a drop down menu opens up enabling a presenter to select pen type, thickness, line effect (e.g., dashed, full, etc.). An another example, when eraser icon 1062 is selected and then icon 1068 is selected, a drop down menu opens up enabling a presenter to select eraser characteristics such as eraser swath width, what information an eraser will erase (e.g., erasing may be limited to a specific color marking), etc.

Current settings icon 1066 is an on-screen indicator that, as the label implies, indicates current characteristics associated with a currently selected tool such as pen color, line thickness, line effect, etc., or eraser swath width, etc.

Referring still to FIG. 35, source section 1058 includes a plurality of icons, each of which corresponds to a different source for information that can be presented via master unit workspace area 1004. In FIG. 35, the source icons include twelve separate icons arranged in three rows of four icons each. The illustrated icons include three different types including computer icons (e.g., 1102), 1103, etc., video icons, one of which is labeled 1100 in FIG. 35, and an easel icon 1098 corresponding to another apparatus akin to master unit 902. A separate computer icon like icon 1102 is provided that corresponds to each of the personal interface devices 911, 913, 915, etc. that is used to patch into the conference. Thus, for example, consistent with FIG. 29, a separate computer source icon 1102 is provided for each of devices 911, 913, 915, etc. Here, it is assumed that when a person patches into a conference and becomes an attendee, identifying information will be obtained in some fashion (e.g., received from the attendee or automatically obtained via a system processor). In the present example it is assumed that a system processor derives a unique identifier such as an attendee's initials from the identifying information. In the present example attendee initials are provided with each of the separate computer icons so that the attendee associated with each specific icon can easily be identified. For instance, in FIG. 35, the initials ASD, are associated with computer icon 1102 while initials SSC are associated with icon 1103 to indicate identity of the attendees using the interface devices associated with icons 1102 and 1103, respectively.

Here, it is contemplated, in at least some embodiments, that when one of the computer icons (e.g., 1102) is selected, the information currently displayed via the laptop associated with the selected icon is simultaneously displayed via the master unit 902. More specifically, when one of the computer icons is selected, a window is opened on the master unit screen that corresponds to the associated laptop and the information currently displayed via the associated laptop is simultaneously displayed via the master unit. For example, referring again to FIGS. 29, 35 and 36, assume that personal interface devices 911 and 913 are used by conference attendees having the initials "ASD" and "SSC" and that the two attendees would like to share sales information with other attendees for comparison purposes. Here, each attendee ASD and SSC can use interface device software to access the sales information to be presented and compared in a dedicated window, can use the tool area 1031 provided via the attendee's interface device (see also FIG. 34) to select the icon (i.e., icon 1102 or 1103) from space 1058 corresponding to the specific user and can then maximize the information (i.e., increase the size to cover an entire interface device screen) to present the sales information via the master unit screen.

Figure 36:
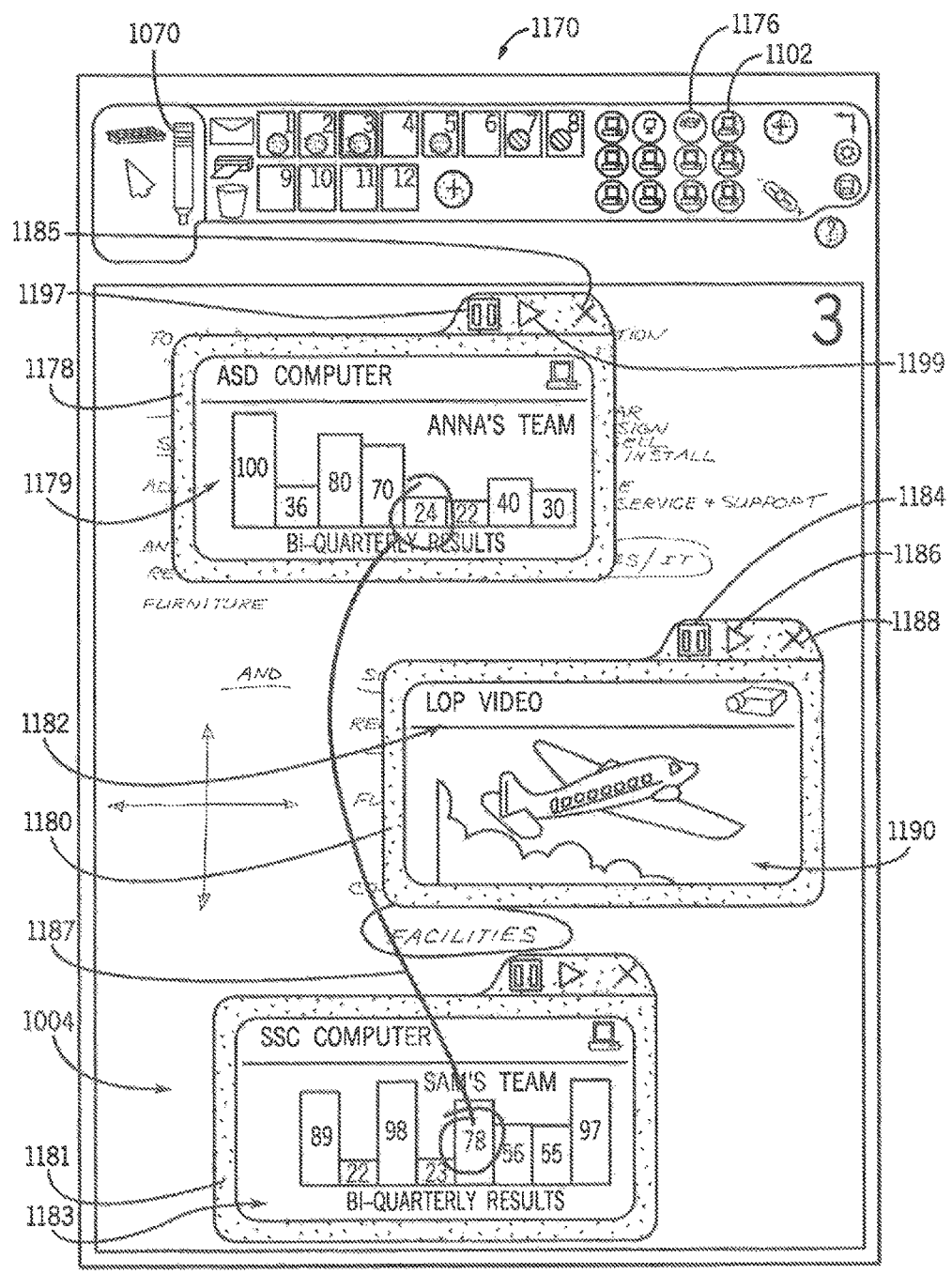
FIG. 36 is a schematic diagram similar to the diagram of FIG. 32, albeit illustrating additional information provided in a workspace area.

In FIG. 36, activity like that described above, causes exemplary windows 1178 and 1181 to be opened to display sales information for attendees ASD and SSC as images 1179 and 1183, respectively. Referring to FIG. 36, when computer icon 1102 is selected (i.e., double clicked dragged into workspace area 1032, etc.), window 1178 is opened and an image 1179 is displayed therein corresponding to an image currently displayed by the interface device associated with icon 1102. In FIG. 36 it is assumed that user ASD has maximized the window including the displayed bi-quarterly results on her laptop computer so that window 1178 only shows the bi-quarterly results. Similarly, when icon 1103 is selected, window 1181 is opened and an image 1183 is displayed therein corresponding to an image currently displayed by the interface device associated with icon 1103. Thus, multiple windows corresponding to multiple sources are openable via the master unit 902 within workspace area 1004.

Referring again to FIGS. 29 and 36, because information including windows 1178 and 1181 that is displayed in workspace area 1004 can be "moved" and displayed via the slave projector units (i.e., the units that project onto space 969), it is possible to show "live views" (i.e., the information currently displayed via the personal computing devices 911, 913, 915, etc.) of multiple personal computing devices on multiple slave images projected onto space 969. For instance, in FIG. 36, the master unit user may increase the sizes of windows 1178 and 1181 (i.e., drag corners of the windows) and move the windows (e.g., the top window bar may be dragged to another location to move the window) so that the windows 1178 and 1181 cover the top and bottom halves of area 1004 and then move the image including windows 1178 and 1181 to slave space 904. Next, the master unit user may select two additional computer icons from section 1158 (see again FIG. 35) to display sales results currently displayed via two other personal computing devices (e.g., 911, 913, 915, etc.) thereby opening two other windows in area 1004. After resizing the newly opened windows to each cover half of area 1004, the user may then move the image including the new windows to slave space 906 in FIG. 29. This process can be repeated several times to display multiple live windows in space 969.

In at least some embodiments an icon in section 1058 is selectable by touching the icon with the tip of the mechanical stylus and dragging the icon into area 1004. In other cases an icon in section 1058 can be selected by tapping the stylus tip on the icon once or twice. To close an open window (e.g., 1178), each window includes a screen selectable close icon 1185 (only one illustrated). Although not illustrated, window 1178, 1181, etc., size may be altered in at least some embodiments so that, for instance, windows 1178 and 1181 in FIG. 36 may be resized to fill the upper and lower halves of workspace area 1004.

When a window (e.g., 1178, 1181) is opened in area 1004, pen icon 1070 is useable to mark anywhere within area 1004 including on the window images and between windows and other space within area 1004. For example. In FIG. 36, markings 1187 have been added to the information displayed within section 1004 to highlight differences between information in each of windows 1178 and 1181 where the markings 1187 are on windows 1178 and 1181 as well as in the space between the windows.

In at least some embodiments, when an image displayed in workspace area 1004 includes windows 1178, 1181, etc. and is minimized (i.e., is removed from workspace area 1004 but still appears as a panel icon in section 1056) so that another image can be displayed or created within section 1004, the open windows remain associated with the minimized image such that, if the minimized image is again maximized (i.e., displayed in section 1004), the windows are again presented. Similarly, when an image including windows is stored, the window information is stored along with the image such that when the image is reaccessed, the windows are re-presented. In short, in these embodiments all information presented via area 1004 is maintained upon minimization and/or storage for subsequent access.

Referring again to FIG. 36, stop and resume icons 1197 and 1199 are provided adjacent close icons (e.g., 1158) at the top of each window 1178, 1181, etc., associated with one of the personal computing devices. Stop icons 1197 are selectable to freeze the information displayed in corresponding windows. For instance, when icon 1197 is selected, the currently displayed information in window 1178 is maintained irrespective of which information is displayed via the personal computing device associated with window 1178. To update window 1178 to reflect information currently displayed via the personal computing device associated with window 1178 after icon 1197 has been selected, resume icon 1199 is selectable.

With respect to video icon 1100, it is contemplated that, in at least some inventive embodiments, there may be video sources such as DVD players, cameras, tape players, hard drives, etc., that can provide streaming video clips useable by a presenter or an attendee during a conference. Icon 1100 corresponds to one video source and, when selected, provides a corresponding video clip in a window. In FIG. 36, a video window 1180 corresponding to source video icon 1100 is shown open and includes a video clip image 1190, source identifier information 1182 and a control bar that includes a pause icon 1184, a play icon 1186 and a close icon 1188. The identifier information 1182 provides initials identifying an attendee that controls the video device that is the source of the video. When window 1180 is opened, in at least some embodiments, clip 1190 automatically begins to play. Clip 1190 can be paused by selecting icon 1184 and can be resumed by selecting icon 1186. Window 1180 is closable by selecting icon 1188. In at least some embodiments window controls 1184, 1186, 1188, etc., may be linked to a conference room control system to physically control window activity (e.g., play, pause, etc.).

Here, as in the case of windows 1178 and 1181, in at least some embodiments window 1180 can be moved and/or scaled within area 1004. In addition, multiple video type windows like window 1180 can be opened at one time and multiple video clips can be played at one time. Moreover, pen tool 1070 can be used to make markings on a video clip and/or on a still video clip image. In at least some embodiments, when an image including a video type window is minimized and/or stored, the window is included with the image and is re-presented when the image is again accessed via area 1004.

Easel icon 1098 is associated with an interface unit akin to master unit 902. Referring again to FIG. 29, device 907 is a second large scale interface device like master unit 902 and may be used in several different ways. First, unit 907 may be used to, in effect, shadow unit 902 and always display exactly what is displayed via unit 902 as described above. Second, unit 907 may be used separately like one of personal interface devices 911, 913, 915, etc., to run applications and/or create images. In this second case, unit 907 can be used as a source like interface devices 911, 913, 915, etc., and the image displayed thereby can be duplicated via unit 902 when master unit icon 1098 is selected. Although not illustrated there may be more than just two units 902 and 907.

To add a new source, a "+" icon 1104 that is spatially associated with section icon 1158 is selectable. When icon 1104 is selected, in at least some embodiments, a window (not illustrated) will open that is useable to identify the new source to be added. In some embodiments the user of a new source may attempt to join a conference via a personal interface device or the like and may either automatically be admitted, may be accepted by a current attendee in some fashion or via password entry, etc. In either case, when a new source is added, a new source icon is likewise added to section 1058. When a source is rendered in accessible to a conference such as when an attendee using an interface device 915 disconnects from the conference, the associated source icon is removed from section 1058.

Referring again to FIG. 35, panel section 1056 includes a separate panel icon corresponding to each image or newly opened image that has not been deleted or closed during a presentation. In FIG. 35, twelve separate panel icons are illustrated where each panel icon has been assigned and is labeled with one of numbers 1-12. Each panel icon includes a thumbnail sketch of the image associated therewith. In the present example, while images are associated with each of panel icons 1, 2, 3 and 5, no information has been associated with panel icons 4 and 6-12 (i.e., blank pages have been created that correspond to icons 4 and 6-12 and no images have been included on those pages). To create a new blank page, a "+" icon 1094 spatially associated with section 1056 is selectable. Panel icons can be eliminated by selecting a panel icon and moving the panel icon to a trash icon 1074 which is described in greater detail below.

Referring yet again to FIGS. 29 and 35, the panel icon corresponding to an image currently displayed via the master unit 902 is visually distinguished from other panel icons in section 1056. For example, referring again to FIGS. 32 and 35, when the image corresponding to panel icon 3 is displayed in workspace area 1004, the third panel icon is highlighted via a visually distinguishable box 1079 about the panel icon. In addition, as seen in FIG. 32, the icon number associated with the panel icon that corresponds to the image being displayed via the master unit is presented as part of the displayed image. For instance, in FIG. 32, the number 3 is illustrated in the upper right hand corner of the image displayed in area 1004.

Referring still to FIG. 35, in at least some embodiments, in addition to visually distinguishing a panel icon that corresponds to an image currently being displayed via the master presentation unit 902, the interface software visually distinguishes panel icons currently presented via the slave units. To this end, in FIG. 35, slave markers 1082, 1084, 1086 and 1088 are provided on top of each panel icon that corresponds to a currently displayed slave image. Consistent with FIG. 33, the slave markers are provided on top of each of the panel icons associated with panels labeled 1, 2, 3 and 5. Although not illustrated, in at least some embodiments, slave markers 1082, 1084, 1086 and 1088 will appear at least somewhat translucent so that a presenter and attendees can see information there below and generally recognize which panel corresponds to which icon despite inclusion of the slave markers.

Referring once again to FIG. 29, in at least some embodiments it is contemplated that when two or more subsystems 900, 901, etc., are linked together for conferencing, the subsystems 900, 901, etc., may include different numbers of slave images at certain times (e.g., one sub-system may include more slave hardware than another or others). For example, while system 900 displays four slave images, system 901 may display six slave images, eight slave images, etc. (not illustrated). Where subsystems display different numbers of slave images, in at least some embodiments, it is contemplated that panel icons corresponding to commonly displayed images will be visually distinguished via the master presentation unit 902 and that panel icons corresponding to uniquely displayed slave images (i.e., images only displayed via one or a sub-set of the subsystems) will be visually distinguished in a different manner. To this end, referring once again to FIGS. 29 and 35, in the present example it will be assumed that images corresponding to panel icons 1, 2, 3 and 5 are commonly displayed via subsystems like subsystems 900 and 901 while the images corresponding to panel icons 7 and 8 are only displayed via a projector 899 associated with subsystem 901. Here, the commonly displayed panels are marked with markers of one type (see markers 1082, 1084, 1086 and 1088) while the uniquely displayed panels are marked with a second and different type of marker (see 1090 and 1092).

Referring once again to FIGS. 33 and 35, in at least some embodiments, when slave images are displayed, image labels corresponding to the panel icon numbers associated therewith are provided as part of each slave image. For instance, consistent with the markers 1082, 1084, 1086 and 1088 in FIG. 35 that mark panels 1, 2, 3, and 5, the images 1022, 1024, 1026 and 1028 in FIG. 33 include number labels 1, 2, 3 and 5, respectively.

To alter the displayed slave images, the presenter or a conference attendee can select one of the markers 1082, 1084, 1086 or 1088 and move the marker to another one of the panel icons in section 1056. Thus, for example, when a presenter moves marker 1084 from panel icon 2 to panel icon 10, an image corresponding to panel icon 10 is displayed on presentation space 969 in the location occupied by image 1024 in FIG. 33. Here, the displayed image would include the label "10" in the upper right-hand corner to indicate which image is currently being displayed.

In addition to the panel icons and the "+" icon 1094, in at least some embodiments a session icon 1091 is provided in section 1056 which corresponds to all of the images associated with panel icons in section 1056.

Referring again to FIG. 35, tool section 1060 includes a save icon 1108, a settings icon 1110, and a zoom icon 1106. In at least some embodiments, images generated via a master unit 902 have to be separately saved. Here, for instance, to save an image currently displayed via master unit 902, icon 1108 is selectable which, in at least some embodiments, opens up a menu including screen selectable "save", "open", "close" and "print" icons for saving images in a session, opening other images, closing a session without saving, or printing session images, respectively. In other embodiments, when save icon 1108 is selected, all of the images currently corresponding to any of the panel icons in section 1056 are stored as part of a session database such that, when the session database is subsequently accessed, all of the panels are re-presented so that, in effect, the conference can be picked up where it was left off. In still other embodiments session icon 1091 may be selected and dragged to or otherwise associated with icon 1108 to store all session images.

Settings icon 1110 is selectable to access tools for altering settings for a current session such as a time before master unit 902 goes into a hibernation mode, how a mechanical stylus operates (e.g., one or two tap activity, etc.), how a keyboard or mouse input device operates, etc.

Figure 37:
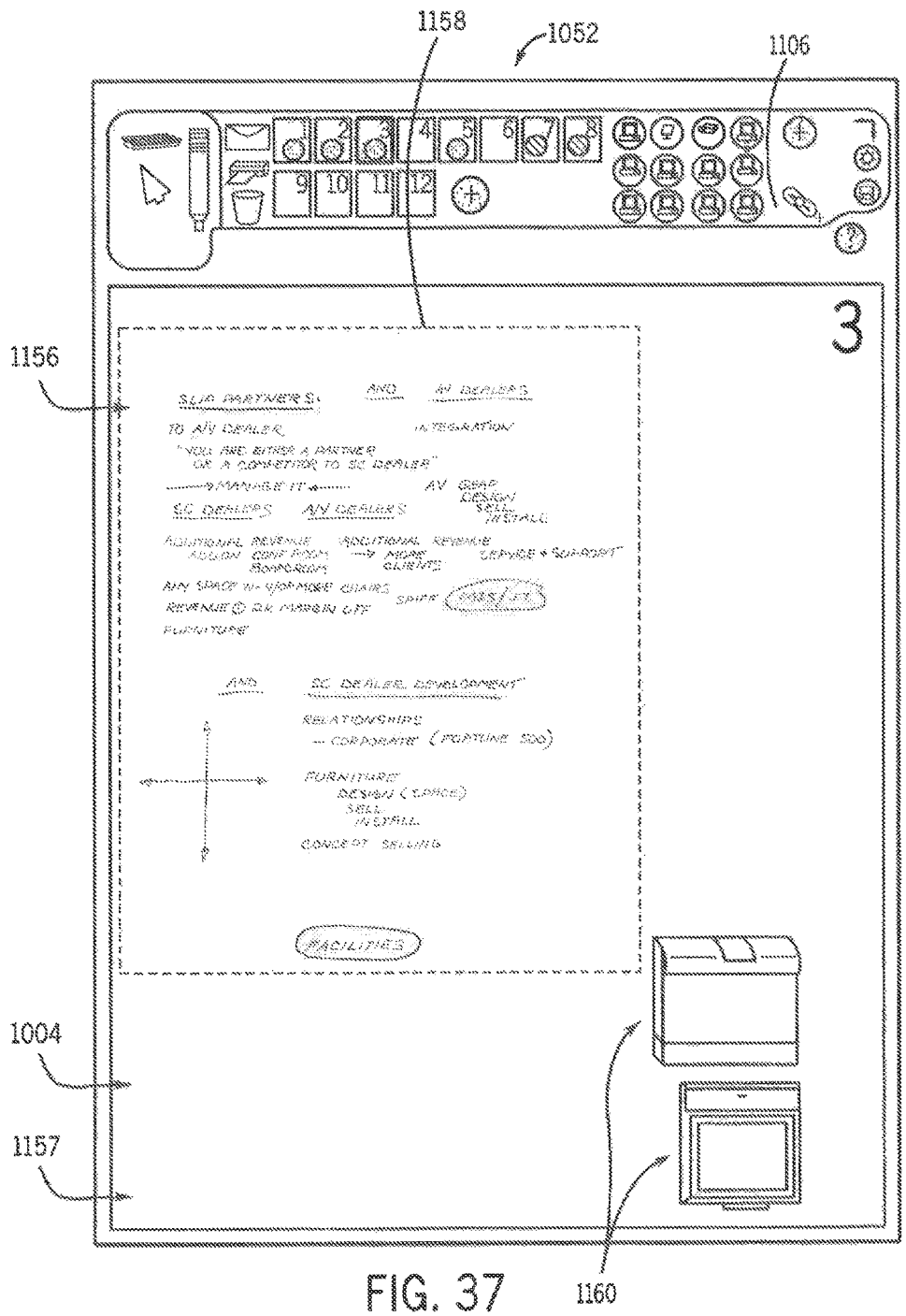
FIG. 37 is similar to FIG. 32, albeit illustrating an initial image in a reduced size and additional information added to a workspace area.

Zoom icon 1106, as the label implies, is useable to change the size of information currently displayed within workspace area 1004. To this end, icon 1106 includes selectable negative and positive ends and a sliding button indicator. By selecting the negative end of icon 1106, the size of an image currently displayed in workspace area 1004 is reduced while selecting the positive end increases the size of the displayed image. To this end, referring also to FIG. 37, an initial image 1156 corresponding to panel icon 3 is shown in a reduced size format within a dashed box 1158 which frees up space 1157 within area 1004 for adding additional information. In FIG. 37, additional information 1160 has been added via pen tool 1070. Although not illustrated, where an image is enlarged such that the image is too large to fit in area 1004, scrolling icons may be provided for left-right and up-down scrolling to access different sections of the image. In other cases, the growth of data within workspace 1004 may be restricted so that the information never extends past the displayed area which renders scroll bars and/or tools unnecessary.

Referring one more time to FIG. 35, target space 1054 includes an envelope icon 1072, a printer icon 1076 and a trash can icon 1074. Envelope icon 1072 corresponds to an e-mail function whereby, when a panel icon in section 1056 is associated with envelope icon 1072, the image associated with the panel icon is e-mailed to some destination. For instance, in at least some embodiments, a presenter may select panel icon 1 in section 1056 and drag that panel icon to envelope icon 1072 after which the master unit software requests an e-mail address of a person to which the associated image should be e-mailed. In other embodiments, when a panel icon is associated with envelope icon 1072, the associated image is automatically e-mailed to each registered conference attendee such as, for instance, each attendee associated with one of the sources corresponding to icons in section 1058. E-mail information may be stored in a separate device such as a room wizard or the like. In still other embodiments, when icon 1072 is selected while an image is displayed in area 1004, a copy of the image in area 1004 is e-mail to one or more destinations. In some embodiments when session icon 1091 is dragged to or otherwise associated with icon 1072, copies of all of the images associated with the session are e-mailed to one or more destinations. Other mail routing schemes are contemplated.

Printer icon 1076 corresponds to a printer and, as the label implies, when a panel icon or the session icon 1091 from section 1056 is associated with printer icon 1076, a hard copy of the image or images corresponding to the panel icon or session icon 1091 is printed. Here, association may take the form of dragging a panel icon to printer icon 1076.

Trash can icon 1074 is useable to delete or remove panel icons from section 1056. To this end, when a panel icon from section 1056 is dragged to or otherwise associated with trash can icon 1074, the panel icon is removed from section 1056. When a panel icon or an image in area 1004 is associated with icon 1074, in at least some cases, it is contemplated that a page trashing animation or audio presentation will occur. For instance, when an image is trashed, a large page crumpling animation may be presented via area 1004 and/or audio output that sounds like crumpling paper.

Referring once again to FIG. 32, in addition to being useable to select on-screen button icons within workspace area 1004, the pointer tool corresponding to pointer icon 1064 can be used for other purposes. For instance, in at least some inventive embodiments, the pointer tool 1064 can be used to select information within an image in area 1004 to be resized. To this end, in FIG. 32, a pointer icon 1010 is illustrated that has been used to select a rectilinear space 1008 that includes a portion of the information displayed in area 1004. The rectilinear space is shown by a dotted line. After space 1008 has been selected, pointer icon 1010 may be used to select a corner of the box about space 1008 and drag that corner outward or inward relative to space 1008 to resize the portion of the image within the box.

As another instance, the pointer icon 1010 may be used to, after a space has been selected within area 1004, move information within the space to a different location within area 1004. Thus, for example, while not illustrated, in FIG. 32, after space 1008 has been selected, icon 1010 may be used to move the information within space 1008 from the upper left-hand corner of area 1004 down to the lower right-hand corner where the information may be dropped.

Figure 38:
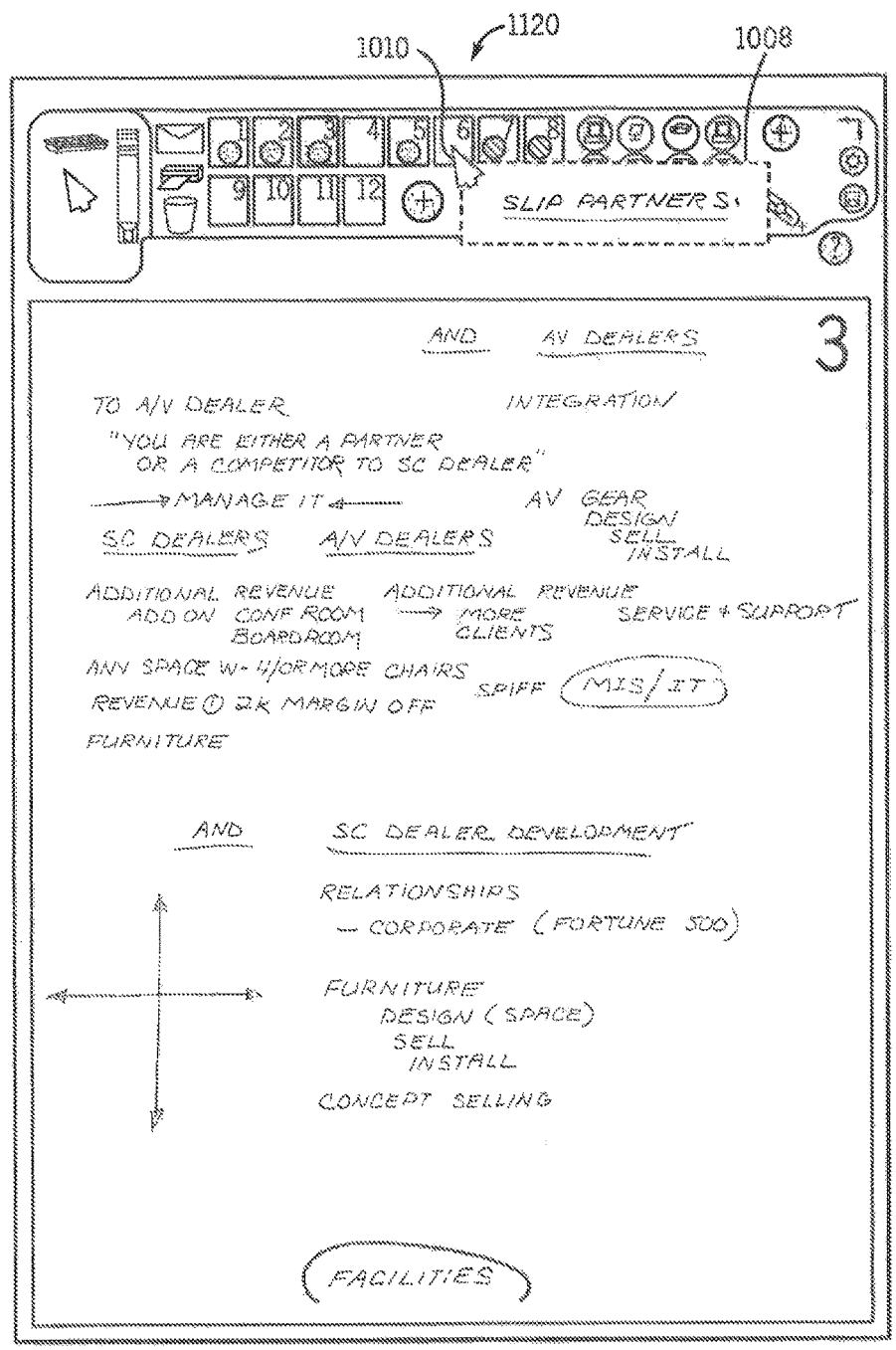
FIG. 38 is a schematic diagram similar to the diagram of FIG. 32, albeit illustrating an activity corresponding to movement of some of the information from a workspace area to a panel icon.
Figure 39:
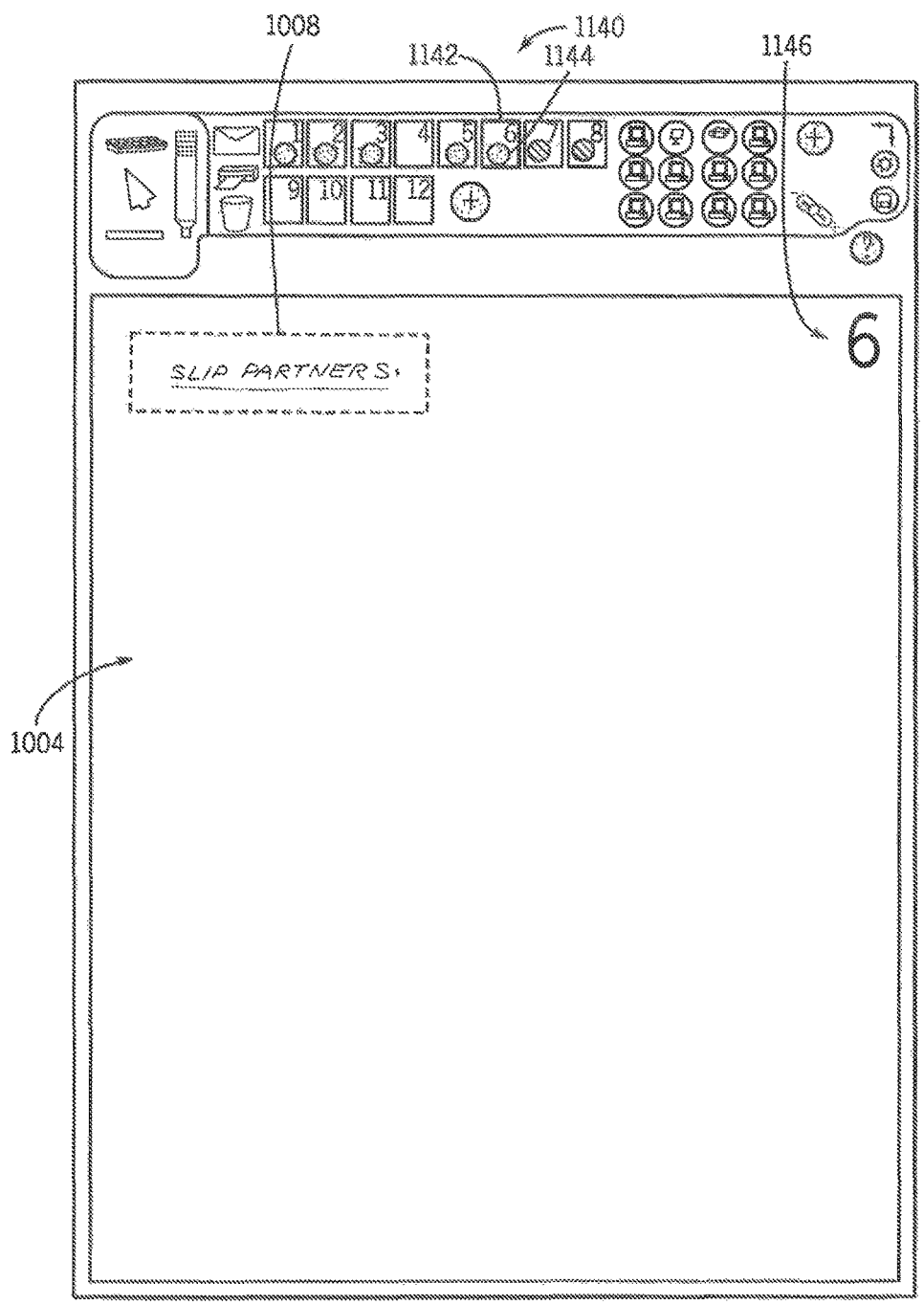
FIG. 39 is similar to FIG. 38, albeit illustrating an image in a workspace area to which information has been moved.

As yet one other instance, in at least some embodiments, it is contemplated that pointer 1010 may be used to move information from an image displayed via workspace area 1004 to one of the panel icons in tool area 1002 and hence to an image associated with the panel icon. In this regard, referring still to FIG. 32, after space 1008 has been defined, pointer icon 1010 can be used to move the information in space 1008 up and into an associating position relative to one of the panel icons in area 1002. Referring also to FIG. 38, area 1008 is shown as attached to icon 1010 which is moved up to panel icon 6 to move the information in space 1008 to the image associated with panel icon 6. Referring also to FIG. 39, after information has been moved to the image associated with panel icon 6, the next time the image associated with panel icon 6 is displayed via either the master unit 902 or as one of the slave images, the information moved thereto is presented as a visually distinguished part of the image. In FIG. 39, space 1008 is illustrated in the upper left-hand corner with a rectilinear dotted line box therearound to visually distinguish the information from the remainder of the image. The pointer icon can be used at this time to move space 1008 to any location within area 1004. The pointer icon can also be used to click, double click, drag, etc., on a personal computing device "remote view" as they are locally connected. In addition, a separate keyboard can be used to type information into the personal computing device.

Referring once again to FIGS. 30 and 31, as described above, in at least some embodiments, it is contemplated that the display screen 955 of a master unit 951 may be rotated between portrait and landscape orientations and that, when the display is rotated, several things occur. First, as illustrated, when screen 955 is rotated from the portrait orientation to the landscape orientation, the on-screen icons or tools may be rearranged to best accommodate presentation of information. To this end, referring once again to FIG. 32 and as described above, it has been recognized that, to the extent possible, workspace area 1004 should have dimensions that are similar to the dimensions of a typical flip-chart page irrespective of the master unit display format (i.e., aspect ratio) and orientation. In this regard, a typical flip-chart page will usually have between a 3:2 and a 4:3 format while master unit display screens will typically come in two different formats including either a 4:3 or a 16:9 format. In at least some embodiments, to provide a workspace area 1004 that generally has a 4:3 or 3:2 format, the tool area may be differently oriented when a master display screen is in the portrait and landscape orientations. In this regard, referring also to FIG. 32, in at least some embodiments, when a 16:9 format master unit screen 955 is in the portrait orientation, the tool area 1002 is presented along the upper edge of screenshots 1000. In at least some cases, the tool area 1002 will have an 18:5 format (i.e., 18 wide by 5 high) which leaves a 2:3 format workspace 1004. In this case, in at least some embodiments, because the master image presented has a 2:3 format, each of the displayed slave images may also have a 2:3 format (see generally FIG. 30).

Figure 40:
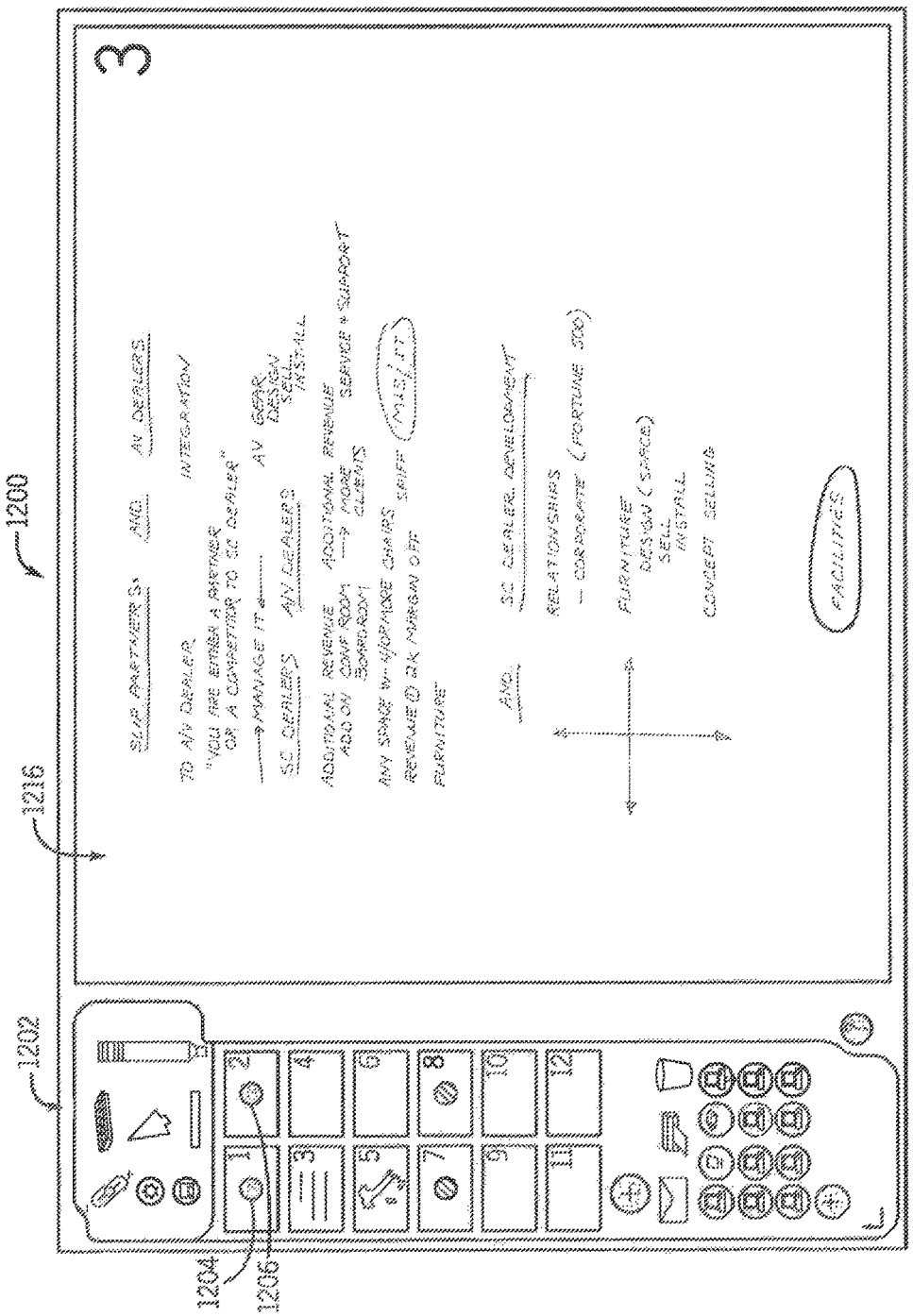
FIG. 40 is a schematic diagram similar to the diagram of FIG. 32, albeit illustrating a 16:9 aspect ratio screenshot after a display unit has been rotated from a portrait orientation to a landscape orientation.
Figure 41:
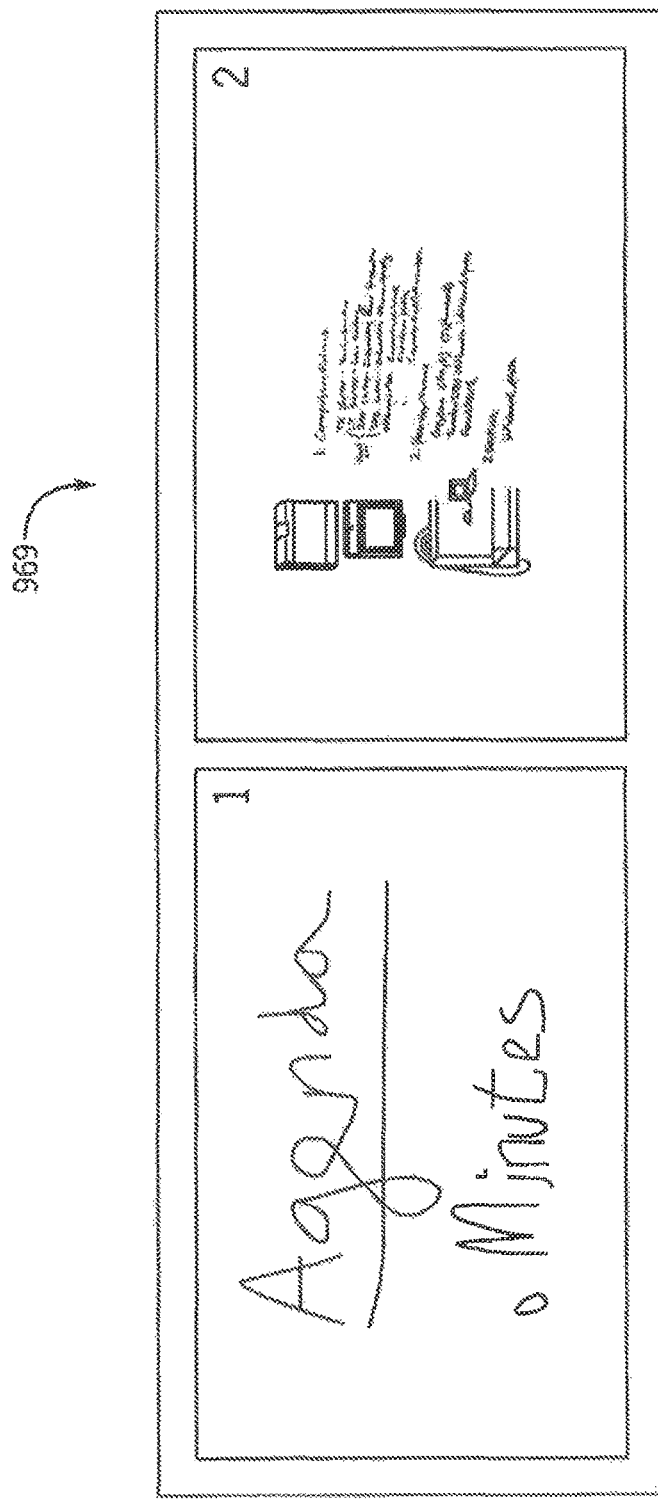
FIG. 41 is similar to FIG. 33, albeit illustrating slave images in a landscape orientation.

Referring to FIG. 40, when a 16:9 format master unit screen is rotated into the landscape orientation, in at least some embodiments, the tool area 1202 is provided along a left-hand edge of a resulting screen shot 1200 with a workspace area 1216 to the right thereof. Here, area 1216 is presented in a 4:3 format with the tool area 1202 presented in a 4:9 format. In FIG. 40, to accommodate all of the tool icons in area 1202 that were accommodated in area 1002 (see also FIG. 32), the tool icons are rearranged. Nevertheless, the tools have a similar look and feel to the tools that were provided when the screen was in the portrait orientation and therefore operation thereof should be intuitive. In at least some embodiments when the master unit screen is rotated into the landscape orientation, the slave images are also rotated from portrait into landscape orientation and the sizes of the slave images are increased such that a reduced set of slave images are presented (see and compare FIGS. 33 and 41). In the example illustrated in FIGS. 33 and 41, instead of presenting four portrait slave images as in FIG. 33 after rotation into the landscape orientation, only two slave images are presented on space 969 and each of those images is in the landscape orientation. Just as area 1216 in FIG. 40 has a 4:3 format, slave images in FIG. 41 would also have a 4:3 format in this example.

In at least some embodiments, when a master unit screen is rotated between portrait orientation and landscape orientation, tool area/workspace area repositioning as well as slave image rotation is automatic. In other embodiments, however, it is contemplated that a presenter will have to take affirmative action in addition to physical rotation to effect the presentation changes. In this regard, referring again to FIG. 35, in at least some embodiments, an orientation change button icon 1112 is provided in tool section 1060 for switching between portrait and landscape orientations. Thus, when button 1112 is selected and the information is currently displayed via the master unit screen such that the workspace area is in a portrait orientation, the displayed information is rearranged so that the workspace area is in a landscape orientation and the tool area is repositioned accordingly.

Referring once again to FIG. 40, modifications to at least some of the tool icons when the master screen is in the landscape orientation are of interest. First, referring also to FIG. 32, instead of presenting the panel icons labeled 1-12 in a portrait orientation, in FIG. 40, the panel icons 1-12 are presented in a landscape orientation similar to the orientation of workspace area 1216. Second, in embodiments where the number of displayed slave images is different when the master screen is in the portrait and landscape orientations, the number of markers on panel icons will be automatically changed to reflect only the displayed images. In this regard, in FIG. 40, consistent with the example above where the number of slave images displayed is cut from 4 to 2 when a master unit screen is rotated from the portrait orientation to the landscape orientation, only two markers 1204 and 1206 are provided in FIG. 40 that are associated with the panels labeled 1 and 2 and the marker icons that were previously associated with panels 3 and 4 have been removed.

Figure 42:
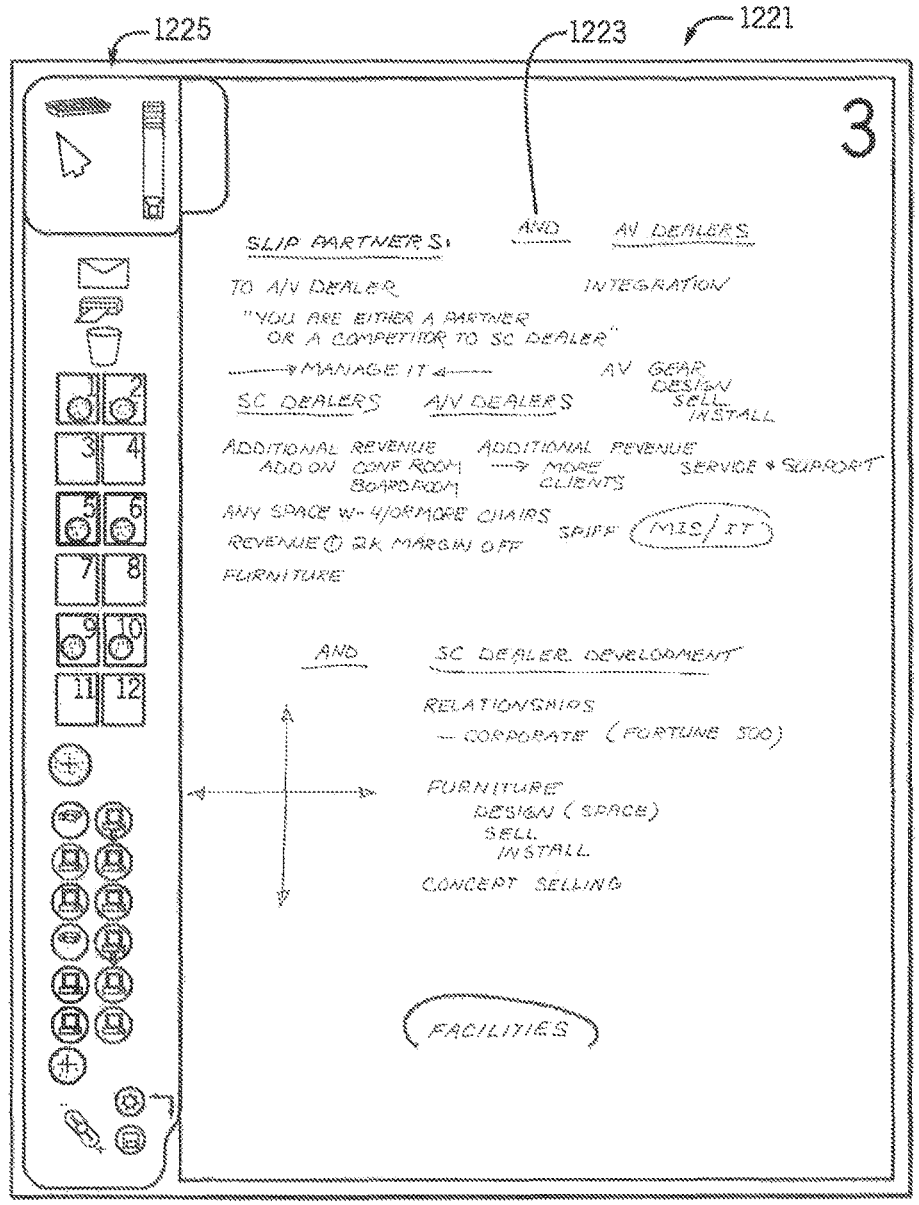
FIG. 42 is a schematic diagram similar to the diagram of FIG. 32, albeit illustrating a 4:3 aspect ratio screenshot in a portrait orientation.
Figure 43:
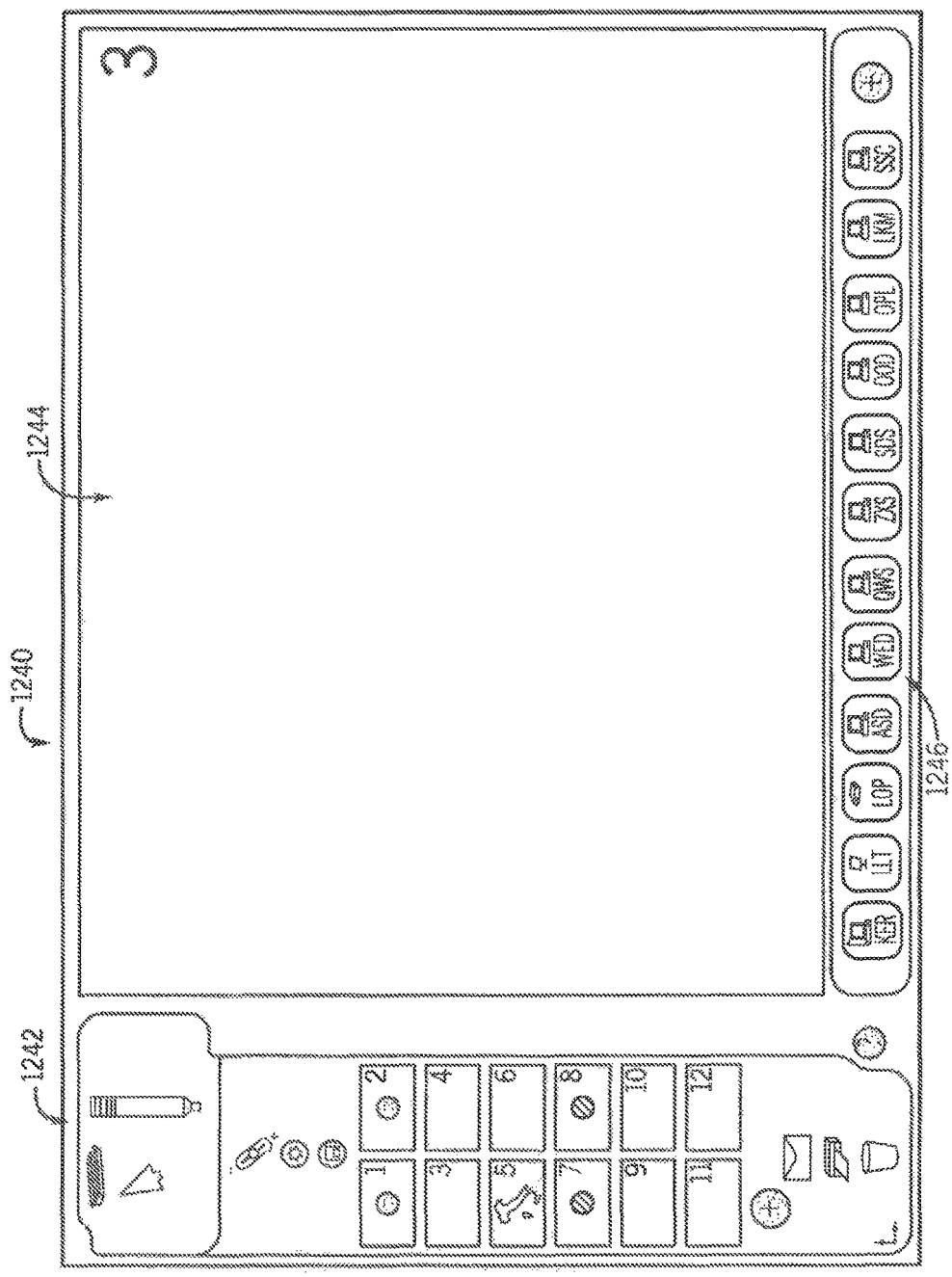
FIG. 43 is similar to FIG. 42, albeit illustrating a 4:3 aspect ratio screenshot in a landscape orientation.

Referring now to FIGS. 42 and 43, exemplary screenshots 1221 and 1240 are illustrated that correspond to portrait and landscape orientations of a 4:3 format screen. In FIG. 42, portrait oriented screenshot 1221 includes a relatively thin tool area 1225 that extends along a left edge thereof and a workspace area 1223 to the right of tool area 1225. The tool area has a 1:12 format while the workspace area 1223 has a 2:3 format. In FIG. 43, the on-screen tool icons are divided into two separate sub-groups and are arranged in two separate tool areas, a first area 1242 along the left edge of the screenshot 1240 and a second area 1246 along the lower edge of screenshot 1240. In FIG. 43, the source icons are provided within second area 1246 and all other tool icons are provided in first area 1242. The remaining area 1244 forms a workspace area which, in this embodiment, has a 4:3 format. In at lease some embodiments, first tool area 1242 will have a 1:9 format and second area 1246 will have a 16:1 format. Other screenshot formats are contemplated.

Figure 44:
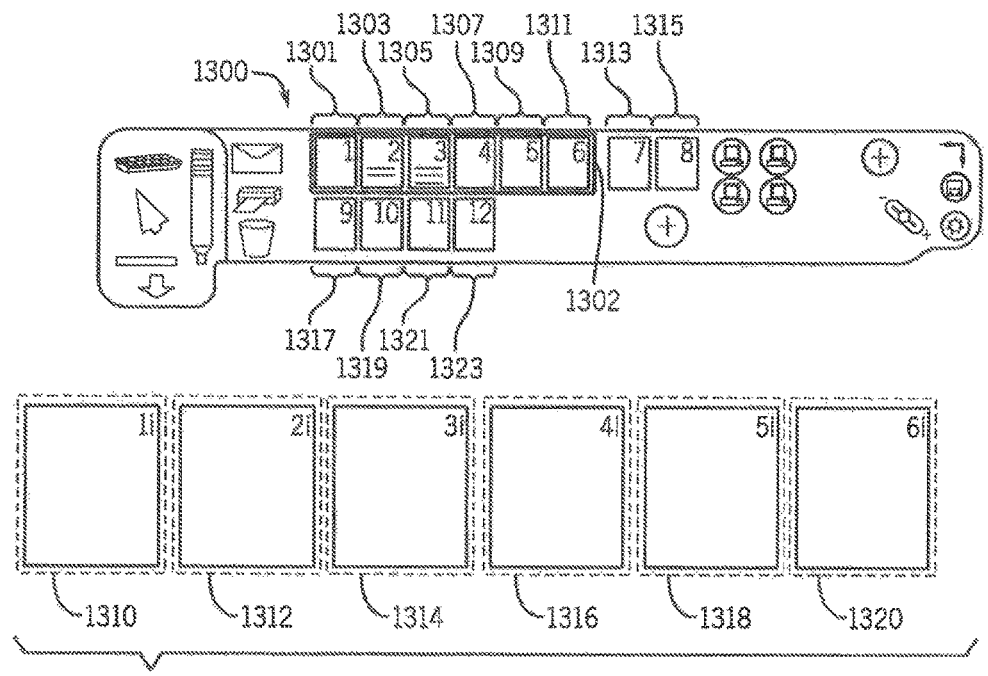
FIG. 44 is a schematic illustrating another exemplary tool area similar to the area illustrated in FIG. 35 as well as six slave presentation spaces associated with panel icons at the tool area.

Referring now to FIG. 44, a second exemplary tool area 1300 that is similar to area 1002 shown in FIG. 35 is illustrated. Many of the tool icons shown in tool area 1300 are identical or substantially identical to the tool icons shown in FIG. 35 and operate in a similar fashion and therefore, in the interest of simplifying this explanation, many of the tool icons shown in FIG. 44 will not again be described here in detail. The primary distinction between tool area 1300 and tool area 1002 is the way in which panel icons or session image representations within area 1300 that correspond to images presented via slave presentation spaces or units are visually distinguished from other panel icons or session image representations (i.e., session image representations that are not associated with currently presented slave images). In FIG. 44, currently presented slave images are identified as 1; 2; 3; 4; 5; and 6; that are presented in slave presentation spaces 1310, 1312, 1314, 1316, 1318 and 1320, respectively. In this regard, referring to FIGS. 35 and 44, while panel icons that are associated with currently displayed slave images in FIG. 35 are marked via token icons (e.g., 1083, 1084, etc.), in tool area 1300, panel icons associated with currently presented slave images are provided within a slave representation area 1302 that is circumscribed by a field boundary (also labeled 1302) that forms a box. In the illustrated example, the slave representation area 1302 is provided in the upper left hand corner of the space within tool area 1300 reserved for panel icons.

Referring still to FIG. 44, slave representation area 1302 is further divided into a plurality of slave representation fields, a separate field for each of the slave image presentation spaces in which slave images can be displayed. For example, where a presentation system includes three projectors and each projector can project two separate images so that the system can project a total of six slave images, the slave representation area 1302 includes six separate slave representation fields. Consistent with this example, in FIG. 44, six separate slave presentation spaces 1310, 1312, 1314, 1316, 1318 and 1320 for presenting six slave images 1i, 2i, 3i, 4i, 5i, and 6i for conference attendees to view are illustrated. Here, slave representation area 1302 is divided into first through sixth separate slave representation fields that are aligned in a single row within area 1302 and that are identified by numerals 1301, 1303, 1305, 1307, 1309 and 1311, respectively. Additional session image representation fields 1313, 1315, 1317, 1319, 1321 and 1323 are provide outside slave representation area 1302 for panel icons that are not associated with currently presented slave images. In FIG. 44, panel icons within slave representation area 1302 are identified by numeral 1, 2, 3, 4, 5, and 6 and correspond to currently presented slave images identified by labels 1i, 2i, 3i, 4i, 5i and 6i that are presented within slave presentation spaces 1310, 1312, 1314, 1316, 1318 and 1320, respectively.

Figure 45:
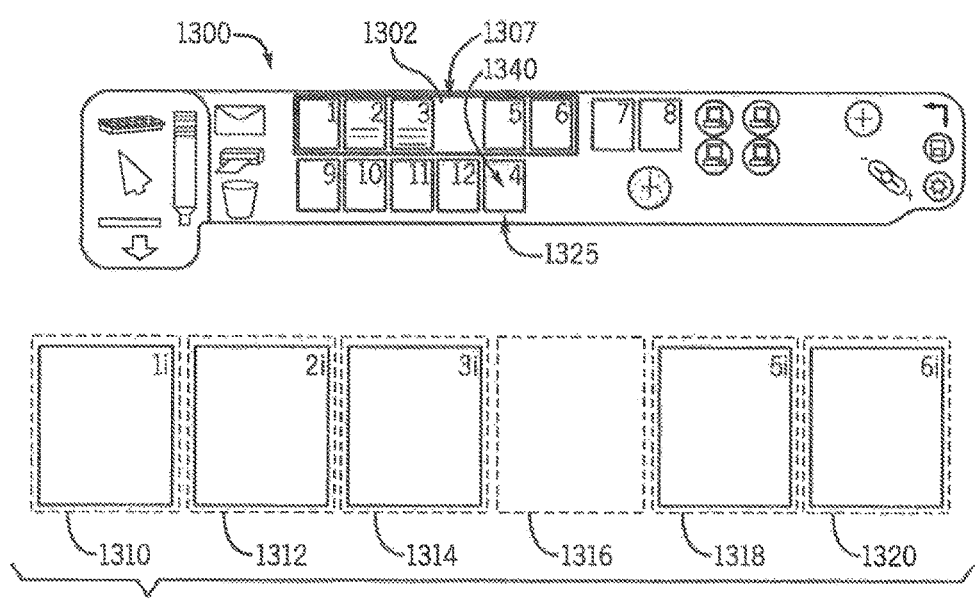
FIG. 45 is similar to FIG. 44 albeit illustrating the tool area and associated slave presentation spaces in a different state.

Several ways to modify which slave images are presented via a conferencing system by manipulating icons within tool area 1300 are contemplated. To this end, referring to FIG. 45, one way to modify presented slave images is to select one of the panel icons within slave representation area 1302 via a mouse controlled cursor or the like and drag the selected icon or representation to another location outside area 1302. In FIG. 45, a dragging action is shown wherein panel icon 4 is dragged from slave representation field 1307 down to a field 1325 located outside area 1302 as indicated by arrow 1340. When icon 4 is released, the panel icon 4 is positioned within field 1325 adjacent panel icon 12.

Referring still to FIG. 45, when panel icon 4 is removed from slave representation area 1302, field 1307 is empty and, as illustrated, the image 4i previously presented within slave presentation space 1316 (compare FIGS. 44 and 45) is removed leaving space 1316 blank.

Referring once again to FIG. 44, another way to modify the images currently presented via the slave presentation spaces is to select one of the panel icons within slave representation area 1302 via a mouse controlled pointing icon or the like and drag the selected panel icon to another location within area 1302. For example, although not illustrated, a pointing icon may be used to select panel icon 4 and drag the selected representation to a location between fields 1301 and 1303. When the selected panel icon is released between fields 1301 and 1303, the panel icon 4 is placed within field 1303 and panel icons 2 and 3 are moved one field to the right into fields 1305 and 1307, respectively. As the panel icons within area 1302 are repositioned in this manner, the images presented with presentation spaces 1312, 1314 and 1316 are similarly modified such that images 4i, 2i and 3i are presented within presentation spaces 1312, 1314, and 1316.

Figure 46:
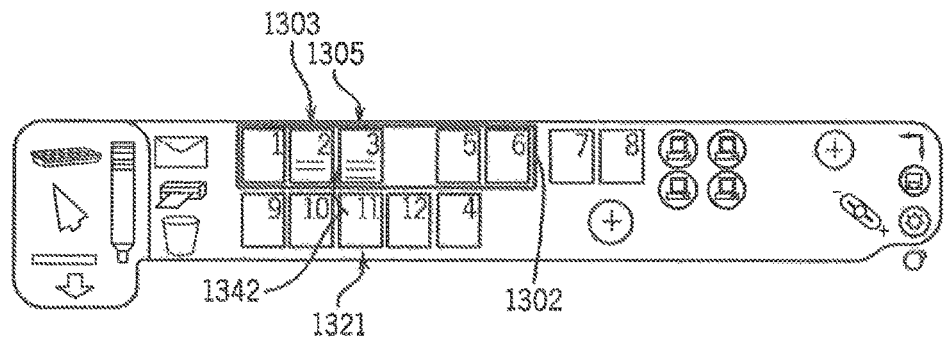
FIG. 46 illustrates the tool area of FIG. 44, albeit in a different state.
Figure 47:
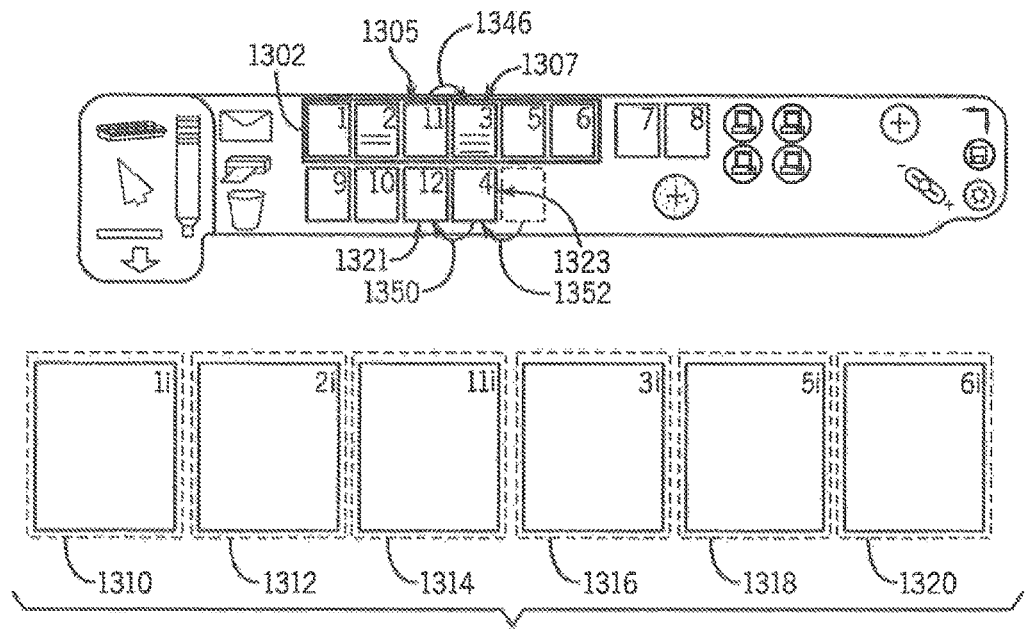
FIG. 47 is similar to FIG. 44, albeit illustrating the tool area and slave presentation spaces in another state.

Referring now to FIG. 46, another way to modify the currently presented slave images is to move a panel icon from outside representation area 1302 to a location within area 1302. For example, referring to FIG. 46, a pointer icon may be used to select panel icon 11 and to drag the selected panel icon to a location within area 1302 between fields 1303 and 1305 as indicated by arrow 1342. Here, referring also to FIG. 47, when panel icon 11 is released between fields 1303 and 1305, panel icon 3 is moved from its location in field 1305 to field 1307 and panel icon 11 is positioned with field 1305. Reflecting the change, within area 1302, the presented slave images in slave presentation spaces 1314 and 1316 are updated to include images 11i and 3i (see FIG. 47). In addition, because panel icon 11 has been moved from field 1321, panel icons to the right of field 1321 are moved one field to the left as indicated by arrows 1350 and 1352 that show panel icons 12 and 4 moving leftward, respectively. Thus, when a panel icon is moved into representation area 1302 and to a location before an empty field, panel icons within area 1302 to the right of the location to which the panel icon is dragged move one field to the right and the next empty field to the right receives a panel icon.

Referring to FIG. 48, with a separate panel icon in each of the slave representation fields in area 1302, when another panel icon is moved to a specific location within area 1302, panel icons within fields to the right of the specific location within area 1302 move one field to the right and the right most panel icon within area 1302 is moved out of area 1302. For example, as shown in FIG. 48, when panel icon 12 is selected from field 1321 and dragged to a location between fields 1301 and 1303 within area 1302, when panel icon 12 is released, panel icon 2 moves one field to the right, icon 11 moves one field to the right, icon 3 moves one field to the right and so on to clear field 303 for panel icon 12. This rippling effect of panel icon movement is shown in FIG. 49 by multidirectional arrow 1362. As shown in FIG. 49, panel icon 6 which was initially located within field 1311 inside representation areas 1302 is moved to field 1313 outside area 1302. As seen in FIG. 49, as the panel icons within fields 1301, 1303, 1305, 1307, 1309 and 1311 are modified, the images presented within slave presentation spaces 1310, 1312, 1314, 1316, 1318 and 1320 are similarly modified. Thus, because panel icons 1, 12, 2, 11, 3 and 5 are shown in fields 1301, 1303, 1305, 1307, 1309 and 1311, corresponding images 1i, 12i, 2i, 11i, 3i and 5i are presented within spaces 1310, 1312, 1314, 1316, 1318 and 1320, respectively.

Figure 50:
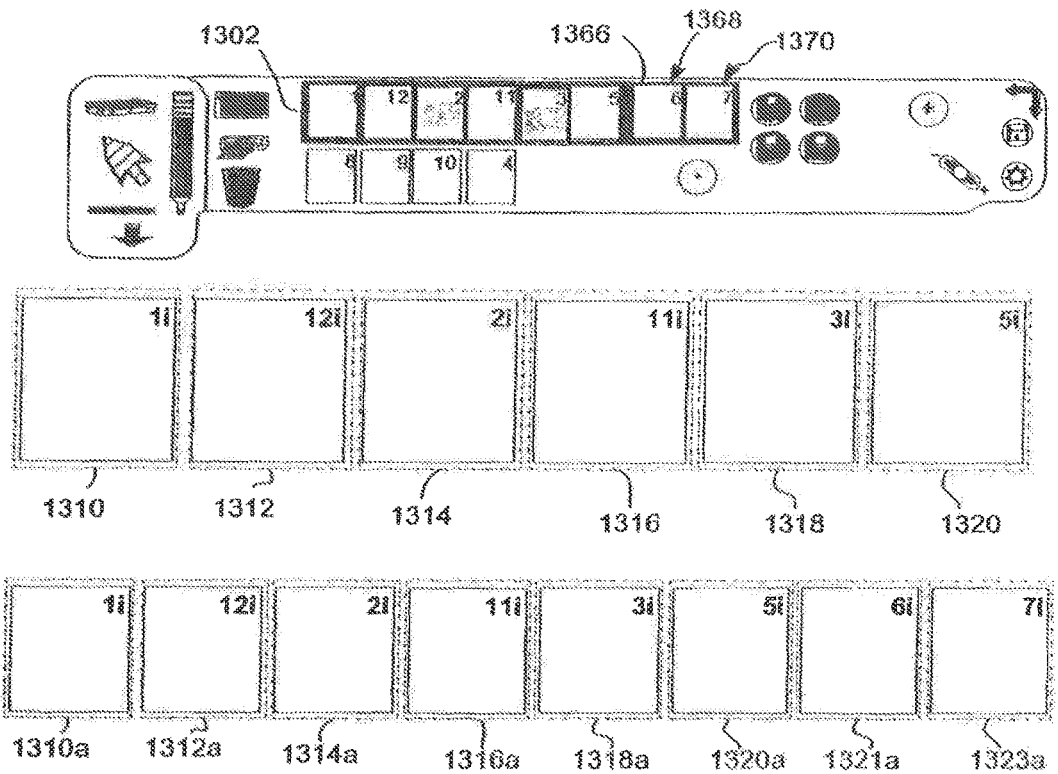
FIG. 50 illustrates another version of the tool area of FIG. 44 that includes both primary and secondary slave representation areas as well as two different sets of slave presentation spaces corresponding to two linked remote systems according to at least some inventive embodiments.

In at least some applications it is contemplated that when two presentation systems located in different conferencing spaces are linked to facilitate remote conferencing between two different groups of conference attendees, as described above, one of the systems may support more slave presentation spaces than the other. For example, a first presentation system may include three projectors where each projector is capable of presenting two separate images for a total of six slave images while a second system may include four projectors, each projector capable of displaying two separate slave images for a total of eight slave images. Here, in at least some cases, it is contemplated that panel icons corresponding to slave images that are common to both the first and second systems may be presented within a shared or primary slave representation area while panel icons corresponding to currently presented slave image that are presented by only one of the systems may be shown in a secondary slave representation area. To this end, referring to FIG. 50, a secondary slave representation area 1366 is shown adjacent a primary slave representation area 1302 and includes two additional slave representation fields 1368 and 1370 that correspond to seventh and eighth slave presentation spaces 1321*a* 1323*a* of one of the presentation systems. In FIG. 50, slave presentation spaces 1310, 1312, 1314, 1316, 1318 and 1320 corresponding to a first presentation system present images 1i, 12i, 2i, 11i, 3i and 5i, respectively, which are associated with panel icons 1, 12, 2, 11, 3 and 5, respectively, in slave representation area 1302. Similarly, images 1i, 12i, 2k, 11i, 3i, and 5i are presented via the second system in slave presentation spaces 1310*a*, 1312*a*, 1314*a*, 1316*a*, 1318*a* and 1320*a*, respectively, while images 6i and 7i are presented in presentation spaces 1321*a* 1323*a* that correspond to fields 1368 and 1370 in secondary slave representation area 1366.

Figure 51:
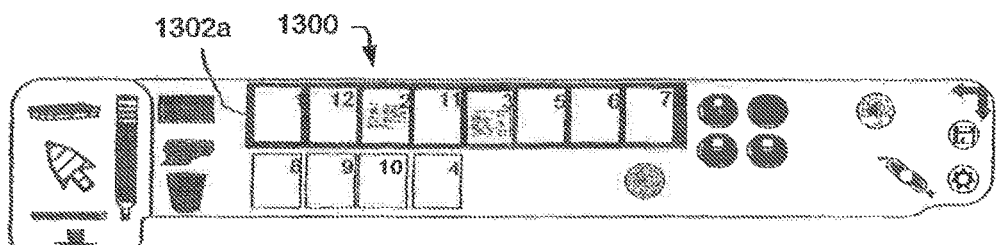
FIG. 51 illustrates a tool area, albeit including a relatively larger slave representation area.

In at least some embodiments it is contemplated that, when two presentation systems are linked to facilitate remote conferencing between two groups of conference attendees, upon delinking of the two system, each of the systems will retain copies of session images such that the session may be continued despite termination of the remote link. When the remote link is terminated, where a first system supports fewer slave presentations spaces than a second system, upon delinking, the secondary slave representation area 1366 is removed so that panel icons therein are no longer visually distinguished in the first system. Here, in the case of the second system, the primary slave representation area 1302 is expanded to include panel icons and associated fields corresponding to all of the supported slave presentation spaces. Thus, for instance, where first and second systems are linked and slave representation area 1302 is populated with icons as illustrated in FIG. 50, upon delinking, the first system generates a tool area 1300 as illustrated in FIG. 49 wherein the representation area 1302 includes six panel icons while the second system generates a tool area 1300 as illustrated in FIG. 51 where the slave representation area 1302*a* includes eight panel icons and eight separate slave representation fields (not labeled).

In at least some embodiments it is contemplated that, when computers or secondary conferencing systems are used to remotely participate in a conference, in at least some cases it would be advantageous to print session images to any printing resources linked to computing devices used to facilitate the conference. For example, where four people participate in a conference via four remotely located laptops and each of the laptops is associated with a specific primary printer located proximate the laptop (e.g., within the same office) at the end of a conference, a conference leader may want to distribute hard copies of session images to each of the remote attendees.

Figure 52:
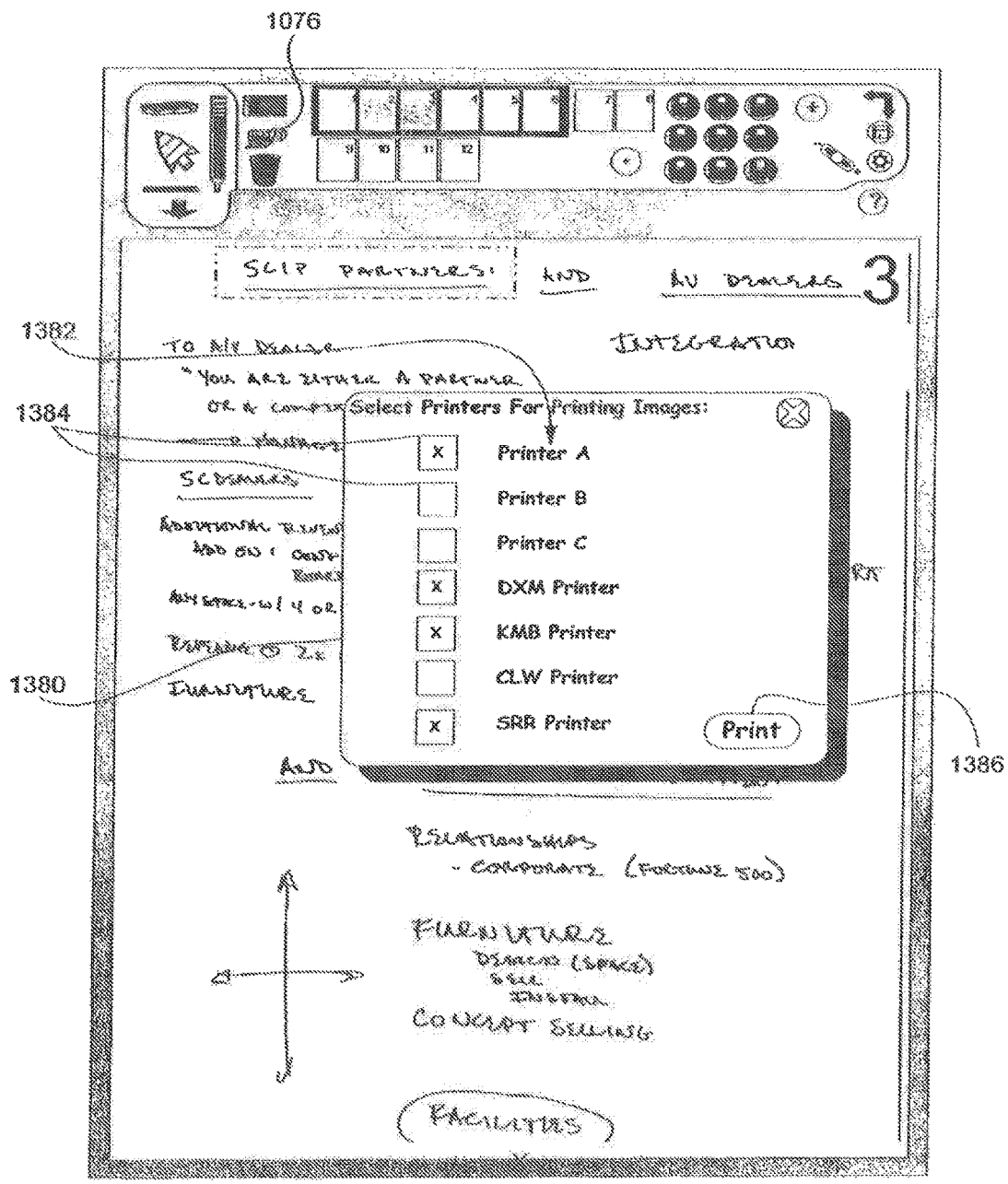
FIG. 52 is a screen shot including a print window according to at least some inventive embodiments.

To facilitate remote distribution of hard copies of session images, in at least some inventive embodiments it is contemplated that, when a remotely located device is used to connect to a conference, a server managing the conference will poll the remote device to identify printers associated therewith and will then store network addresses associated with the identified printers for subsequent use. Thereafter, referring to FIG. 52, any time during a conference or thereafter, a system user may select printer icon 1076 to open a print window 1380. Exemplary print window 1380 includes a list 1382 of printers associated with devices used to facilitate a conferencing session, a separate selection field 1384 for each one of the associated printers and a print button icon 1386. Here, to print to a subset of the printers associated with devices used to facilitate the conference, a system user simply selects a subset of the fields 1384 corresponding to the printers targeted for printing in list 1382 and then selects print icon 1386 to send complete copies of the session images to each of the selected printers for printing.

Figure 53:
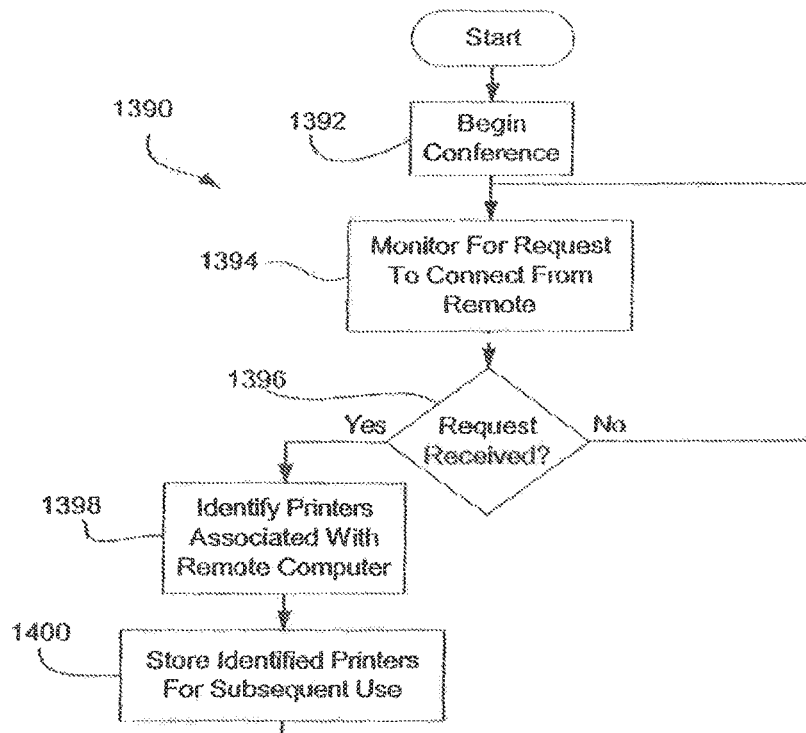
FIG. 53 is a flowchart illustrating a method for identifying printing devices associated with networked computer devices.

Referring now to FIG. 53, a method 1390 for identifying printers associated with networking devices when devices are linked to a conference is illustrated. At process block 1392, a conference is commenced via a master presentation unit. At block 1394, a conferencing server monitors a network linked to the master presentation unit for requests to connect from remote devices (e.g., laptop computers, desktop computers, secondary master presentation units, etc.). At decision block 1396, when no request is received to connect, control passes back up to block 1394 where monitoring continues. After a request to connect is received at block 1396, control passed to block 1398 where the conferencing server polls the connecting device for associated printers. At block 1400, the conferencing server stores the network addresses in an associated database for the identified printers for subsequent use and control passes back up to block 1394 where the server continues to monitor for requests from additional devices to join the conference.

Figure 54:
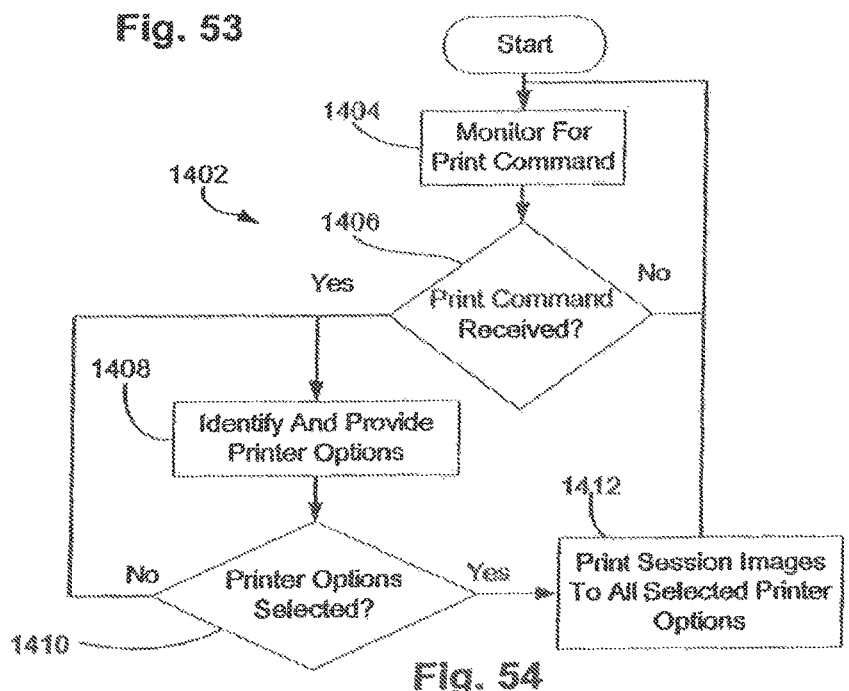
FIG. 54 is a flowchart illustrating a print method according to at least some inventive embodiments.

Referring to FIG. 54, a method for printing session images to printers associated with devices used to facilitate a conference is illustrated. At block 1404, the conferencing server monitors for a print command. At block 1406, where no print command is received control passes back up to block 1404 where monitoring continues. At decision block 1406, after a print command is received, control passes to block 1408 where the list of printers stored at block 1400 in FIG. 53 is accessed and is provided within a print window (see 1380 in FIG. 52). At decision block 1410, the conferencing server monitors to determine when print options have been selected. Until print options are selected, control loops back up to block 1408. After print options are selected, control passes to block 1412 where the conferencing server prints session images to all of the selected printers after which control passes back up to block 1404 where the server continues to monitor for print commands.

Figure 55:
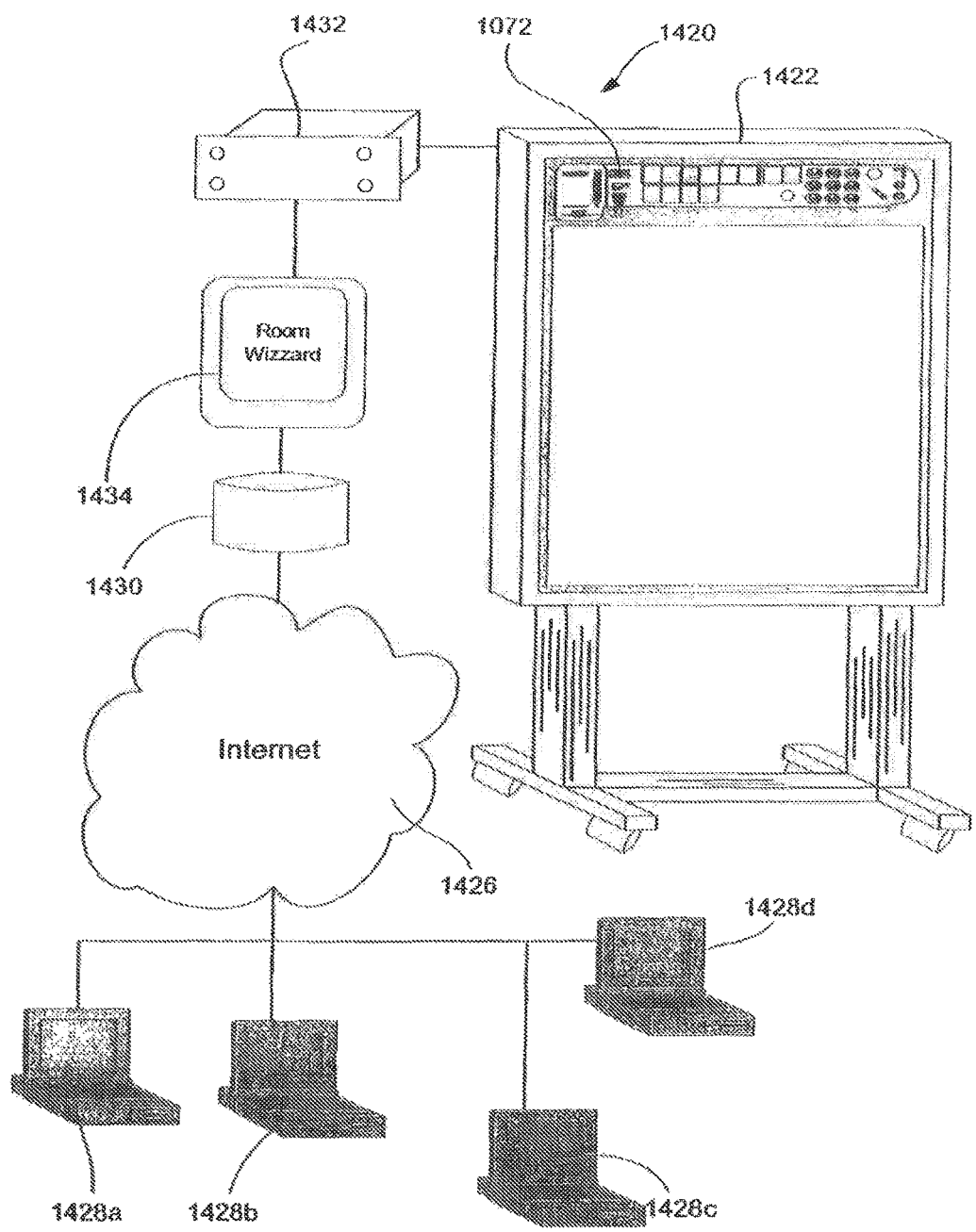
FIG. 55 is a schematic illustrating a room wizard that facilitates distribution of electronic copies of session images.

In addition to being able to send session images to all devices linked to a conferencing session for printing purposes, in at least some embodiments it is contemplated that it would be advantageous to be able to quickly and easily distribute electronic copies of session images to both local and remote conference attendees. To this end, in at least some cases it is contemplated that when a person agrees to attend a conference or remotely logs into a conferencing session, some processor associated with a conference may be programmed to request or obtain and store an e-mail address for the attendee. Thereafter, referring now to FIG. 55, after at least one session image has been generated, when mail icon 1072 is selected, in at least some cases, session images may be distributed electronically to all of the previously stored e-mail addresses associated with a specific session. In other cases, when mail icon 1072 is selected, a mail window (not illustrated) akin to print window 1380 in FIG. 52 may be opened to allow a system user to select a subset of conference attendees to receive electronic versions of the session images.

Referring still again to FIG. 55, an exemplary system 1420 includes a master presentation unit 1422, a conferencing server 1432, a conference room wizard 1434, a networking server 1430, a network 1426 to facilitate remote linking and a plurality of remotely located laptops 1428*a*, 1428*b*, 1428*c* and 1428*d*. Master unit 1422 is linked to conferencing server 1432 which is in turn linked to room wizard 1434. Room wizard 1434 is linked to networking server 1430 which is connected via network 1426 to remote computers 1428*a* through 1428*d*. Here, in at least some cases, room wizard 1434 is used to set up or schedule a conference for a conferencing room in which master presentation unit 1422 will be used. As conference attendees register via the remote computers (e.g., 1428*a*, 1428*b*, etc.) and network 1426, room wizard 1434 receives and stores e-mail addresses for each attendee. Thereafter, when session images are to be e-mailed to attendees, master unit 1422 sends the images to room wizard 1434 which in turn distributes the images to the session attendees via the stored e-mail addresses.

Figure 56:
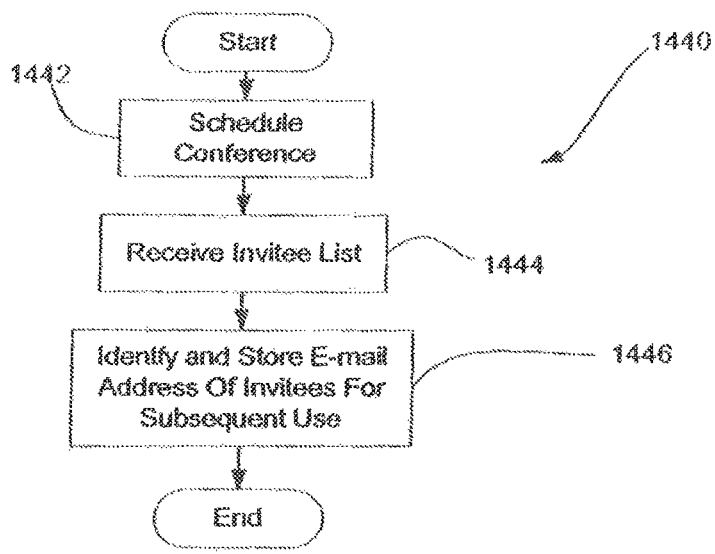
FIG. 56 is a flowchart illustrating a method for identifying and storing e-mail addresses of conference participants.

Referring now to FIG. 56, a method 1440 for obtaining e-mail address of conference attendees is illustrated. At block 1442, a conference initiator uses a remote device such as laptop 1428*a* to link to room wizard 1434 and schedule a conference. As part of the conference scheduling process, in initiator identifies other people that the initiator would like to invite to the conference at block 1444. At block 1446, room wizard 1434 identifies and stores e-mail addresses for each of the conference invitees for subsequent use.

Figure 57:
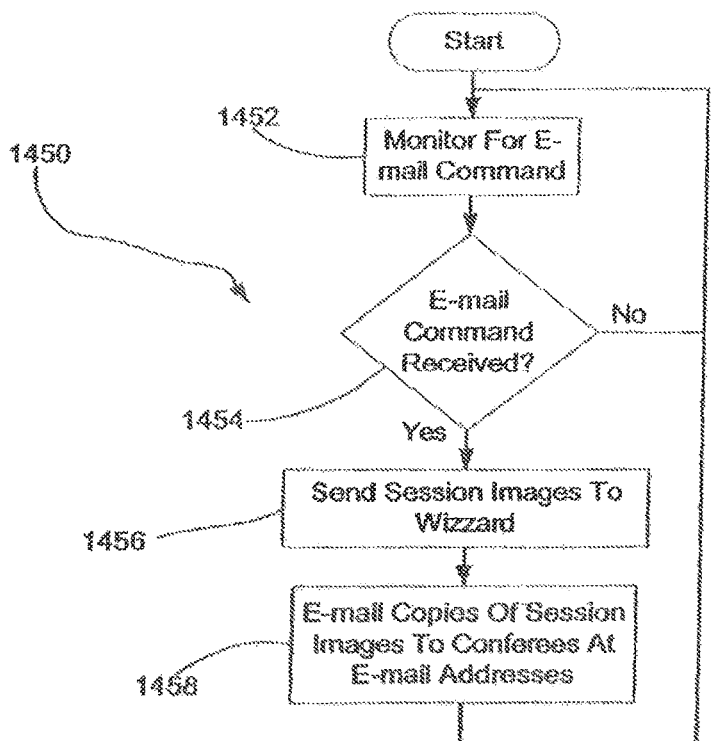
FIG. 57 is a flowchart illustrating a method for sending electronic versions of session images to conference attendees.

Referring to FIG. 57, a method 1450 for e-mailing session images to conference attendees is illustrated. At process block 1452, server 1432 monitors for an e-mail command from master unit 1422. At decision block 1454, until an e-mail command is received, control passes back up to block 1452. After an e-mail command is received at block 1454, control passes to block 1456 where server 1432 sends session images to room wizard 1434. At block 1458, room wizard 1434 e-mails copies of the session images to the conference attendees at the stored e-mail addresses.

Here, it should be appreciated that, in at least some cases, it is contemplated that the functions of room wizard 1434 or functions akin thereto may be performed by the conferencing server 1432 so that room wizard 1434 may not be required. To this end, instead of scheduling a conference via a room wizard 1434, conferences may be scheduled or use of a conferencing system may be scheduled via software operated by conferencing server 1432.

While most of the systems described above include either separate master and slave presentation units or a single presentation unit that includes multiple presentation spaces including at least one master and several slave presentation spaces where the single unit is stationarily mounted, in at least some case it is contemplated that it may be advantageous to provide a portable presentation system that includes both a master presentation space and one or more slave presentation spaces. To this end, referring to FIG. 58, an exemplary portable presentation system 1460 is illustrated and includes a single presentation housing structure 1462 mounted at a top end of leg members 1470 and 1472 where casters or wheels collectively identified by numeral 1474 are provided at the bottom ends of leg members 1470 and 1472. Here, a master presentation space 1464 and two slave presentation spaces 1466 and 1468 are provided in a front surface (not labeled) of housing structure 1462. In at least some embodiments all of the presentation spaces 1464, 1466 and 1468 may be provided via a single flat panel monitor screen. In other embodiments, each of the three presentation spaces 1464, 1466 and 1468 may be provided by a separate electronic flat panel display screen. In still other embodiments, master space 1464 may be provided by an interactive flat panel display screen while spaces 1466 and 1468 are provided by a rear projector unit. In still other cases, all three spaces 1464, 1466 and 1468 may be provided via a single projector unit mounted within housing structure 1462. In at least some cases position sensing devices will be provided for sensing the location of a pointing device (e.g., a stylus or a users' finger) within space 1464.

Figure 58:
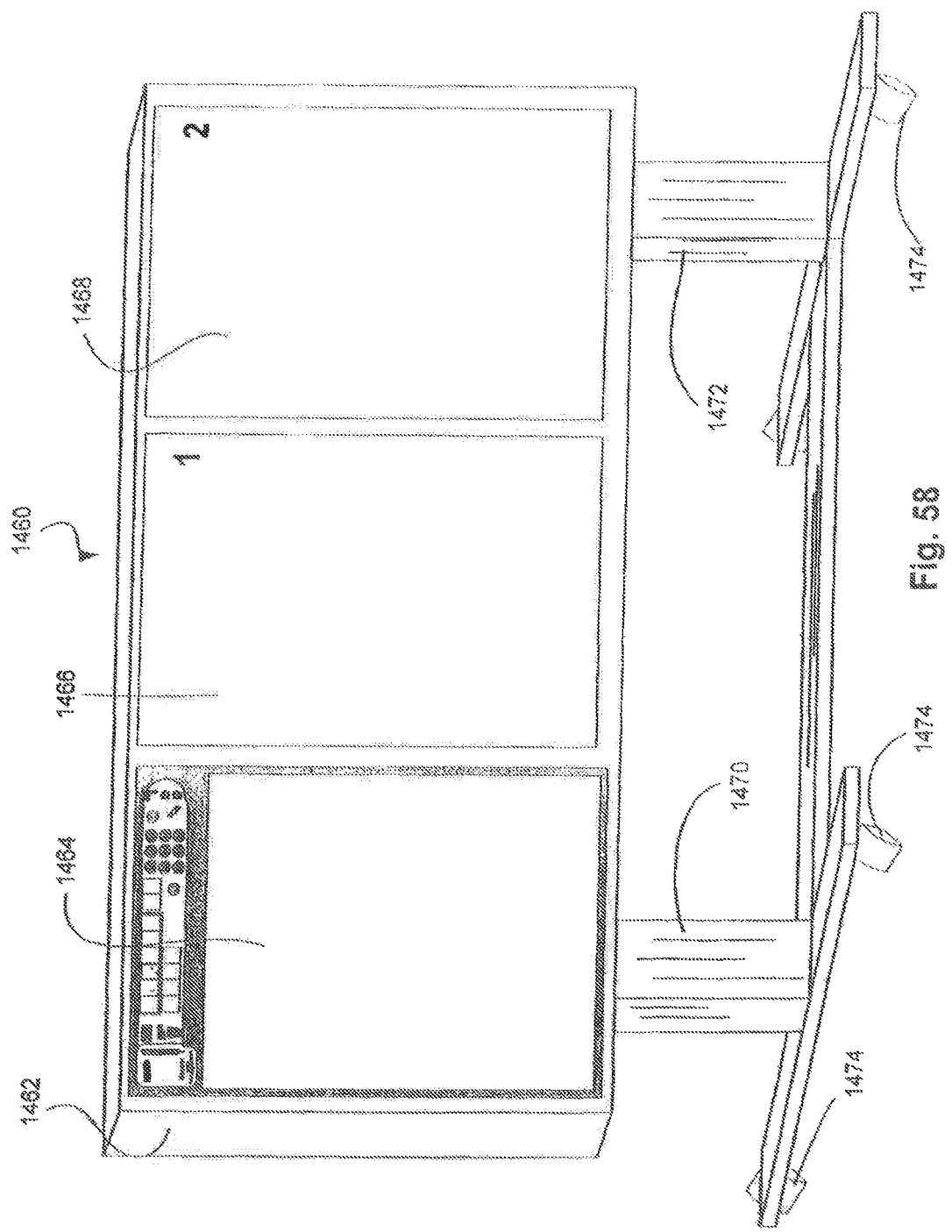
FIG. 58 is a prospective view of an exemplary portable and self-contained conference presentation unit.
Figure 59:
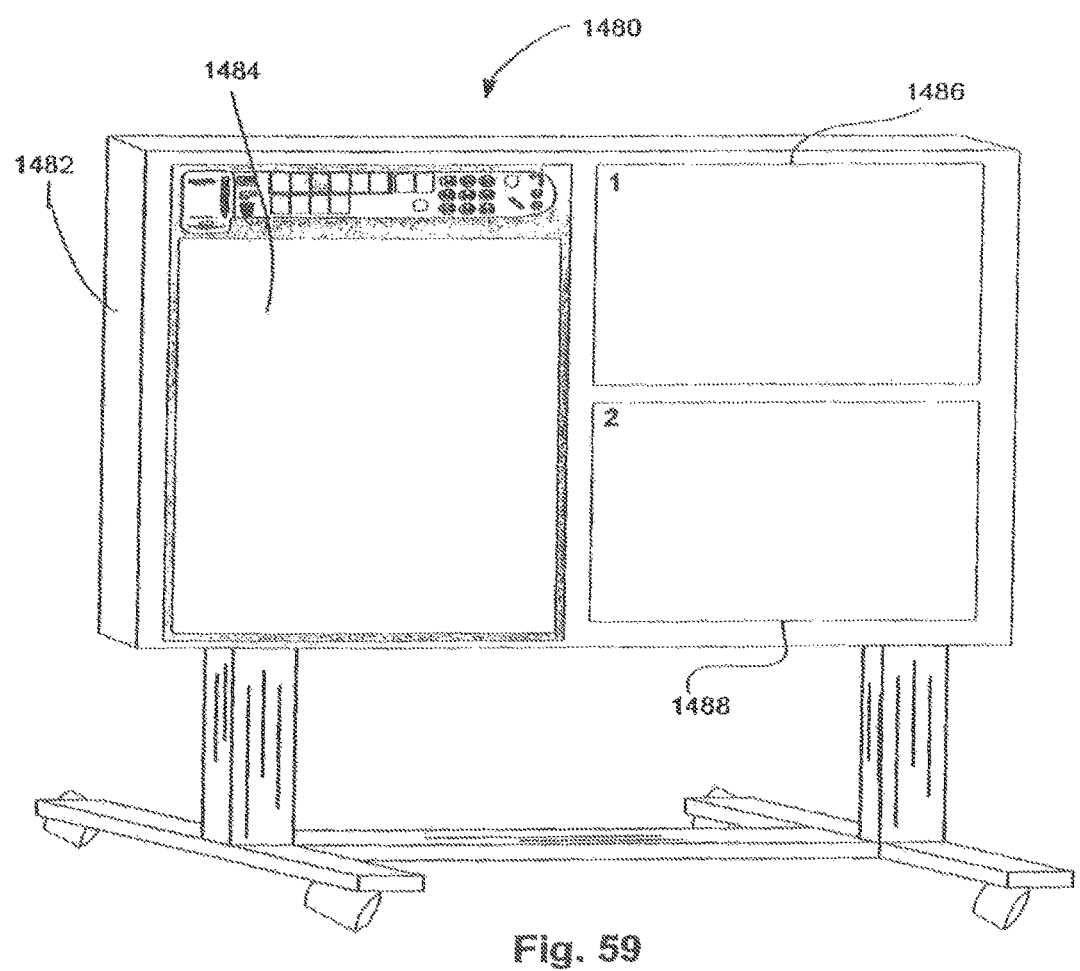
FIG. 59 is similar to FIG. 58, albeit illustrating another portable embodiment.

Referring now to FIG. 59, a second exemplary portable conferencing system 1480 is illustrated that includes a single housing structure 1482 and that provides a master presentation space 1484 and two slave presentation spaces 1486 and 1488 in a single front surface (not labeled) of the housing structure 1482. In FIG. 59, slave presentation spaces 1486 and 1488 are arranged so as to be horizontally longer than they are vertically which is the exact opposite of the system illustrated in FIG. 58.

In at least some embodiments it is contemplated that any type of pointing device may be used to directly interact with a master presentation unit via contact. For instance, a unit operator may be able to use the tip of her finger to select on-screen icons, to draw within a work space, to erase objects within a work space, to select and drag objects within a work space, etc. or, may be able to use a stylus or pen type device to perform the same functions.

Where a finger or a stylus type device can each be employed, it has been recognized that, in at least some embodiments, operator interaction with a master unit can be enhanced by employing dual sensing technologies and different algorithms depending upon which of a finger and another pointing device are employed to perform interactive functions.

Figure 60:
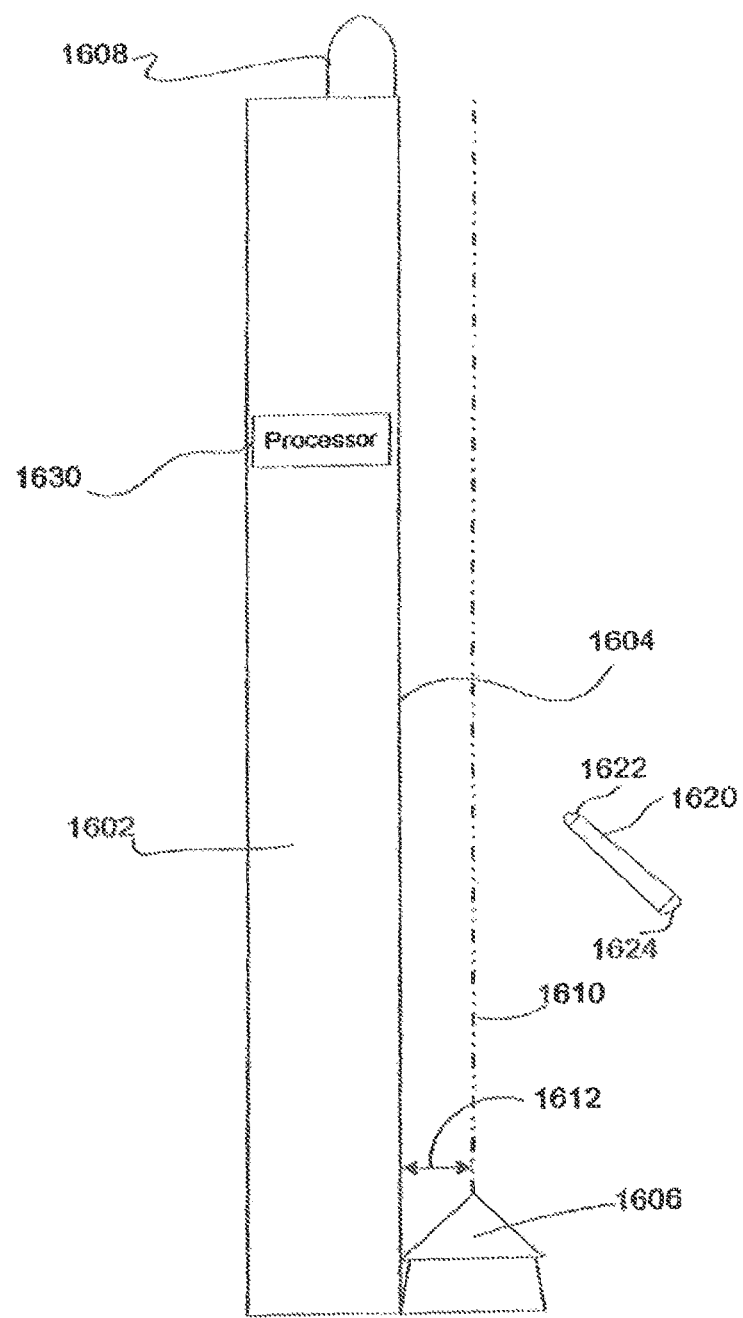
FIG. 60 is a schematic diagram illustrating a display unit, a light sensing device, a wireless receiver and illustrating a method for facilitating interaction with a display surface where interactivity is a function of the object used to interact with the surface.

Referring to FIG. 60, in at least some embodiments, the primary sensor for sensing interactivity with a display surface 1604 of a master presentation unit 1602 will include a laser 1606 or other system that generates a light plane 1610 parallel to and slightly separated from surface 1604 by a gap 1612 (e.g., ⅛ to ¼ inch). In these systems, surface interaction and interaction location are generally determined by sensing light plane 1610 penetration and the location at which the penetration occurs.

While light plane type sensing systems work well, these types of systems have some shortcomings. One primary shortcoming where a light sensor system is exclusively employed is that interactivity is often sensed immediately before and just after contact is made with surface 1604. In this regard, most users that interact with a display surface prefer for the interactivity to mimic interaction with a conventional writing surface such as a paper flip chart sheet where interaction only occurs during contact with the sheet surface. Because of gap 1612, a light plane sensing system senses activity whenever plane 1610 is penetrated and irrespective of whether or not simultaneous contact with surface 1604 occurs. Thus, as a fingertip or a stylus tip is moved toward (or away from) surface 1604 to generate a stroke, if the tip moves within plane 1610 prior to and/or after contact with surface 1604, the stroke will include a front portion and/or a rear portion in addition to the portion that occurs during contact. Hereafter, this non-contact activity will be referred to generally as "non-contact activity" unless indicated otherwise. Usually non-contact activity only occurs over a short duration (e.g., 0.5 to 1.0 seconds).

It has been recognized that while non-contact activity is bothersome in all cases (e.g., words and letters may tend to undesirably run into each other), such activity is particularly bothersome in the case where a stylus/pen type device is used to interact as opposed to a finger tip. In this regard, a finger tip is a relatively blunt instrument when compared to a stylus/pen tip and non-contact activity is therefore less bothersome when a finger tip is employed.

In at least some inventive systems, in addition to a light plane sensing system for sensing penetration location, a secondary sensing system is employed for sensing contact of a stylus/pen tip with a display surface. To this end, referring again to FIG. 60, the secondary sensing system includes a stylus/pen device 1620 and a receiver 1608. Stylus device 1620 includes a tip contact sensor 1622 and an rf or other type transmitter 1624. Sensor 1622, as the label implies, senses when the tip of the device 1620 contacts a surface such as, for instance, display surface 1604. When surface 1604 is contacted, transmitter 1624 transmits an rf or other type signal to receiver indicating that a device other than a finger tip has contacted surface 1604. In addition, device 1620 may transmit additional information such as the nature of device 1620 (e.g., a pen, eraser, pointing device, etc.) color, swath thickness, etc.

A processor 1630 linked to receiver 1608 and the penetration sensor (not separately labeled) that forms part of the light plane sensing system is programmed to identify both position using the light plane sensing system and contact using signals from receiver 1608. Thus, according to one inventive method when a finger is employed to interact with surface 1604, non-contact activity may occur, but when a transmitting stylus type device is employed, non-contact activity can be eliminated.

Figure 61:
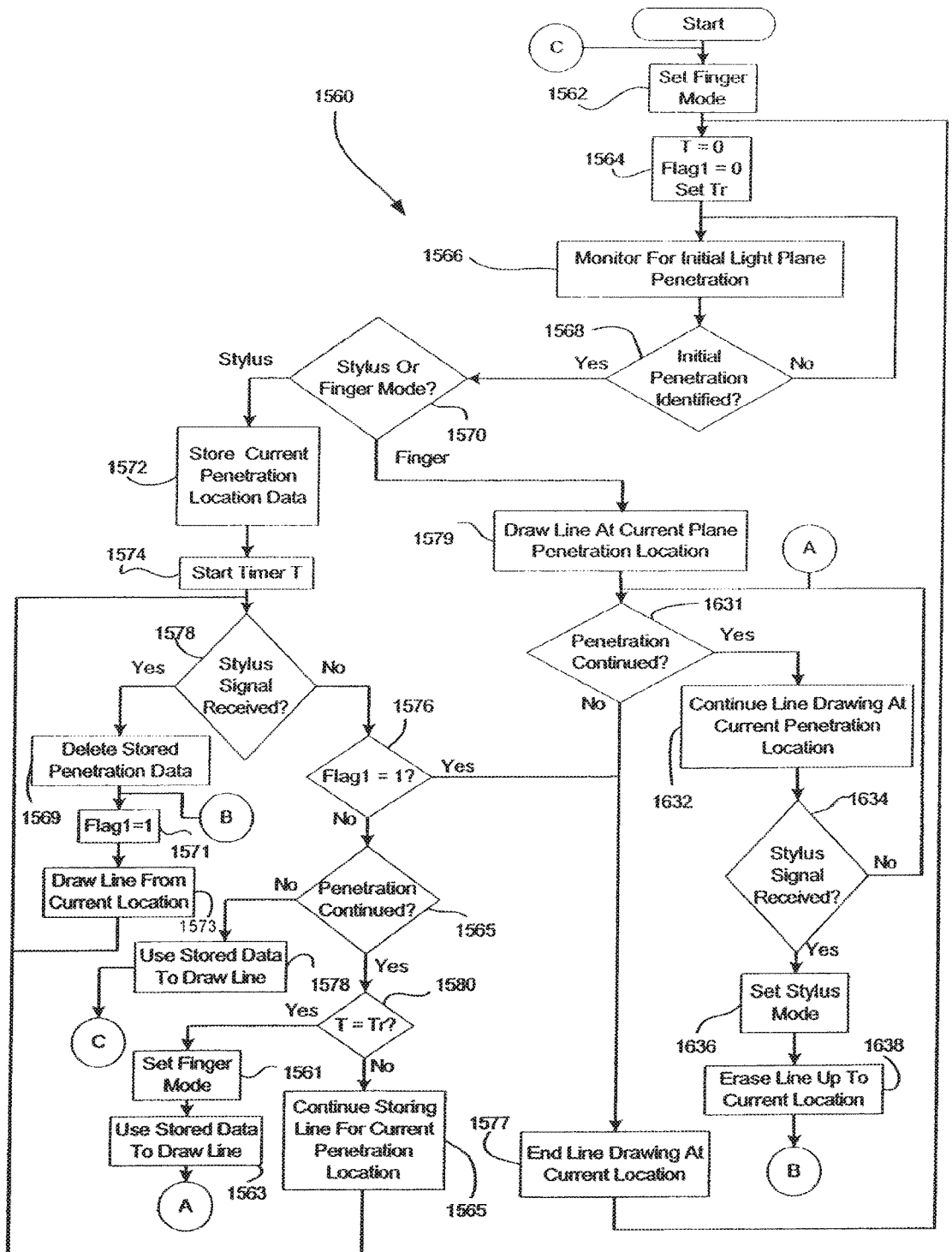
FIG. 61 is a help feature according to at least some inventive embodiments.

To distinguish between stylus and finger interactivity, at least some inventive embodiments include a system processor (see 1630 in FIG. 60) programmed to perform the distinguishing method illustrated in FIG. 61. Here, it is assumed that the processor 1630 is programmed to operate in either one of two interactive modes including a finger mode and a stylus mode. When in the finger mode, all sensed interactivity with a display surface 1604 causes interactive results. In contrast, during stylus mode operation, only interactive activity that occurs when the stylus transmits a "contact signal" open tip 1622 contacting a surface (e.g., surface 1604) causes interactive results.

Referring at block 1562, when the master unit shown in FIG. 60 is initially activated, the master unit processor 1630 sets the operating mode to the finger mode. At block 1564, a timer T is set equal to zero, flag labeled flag1 is set equal to zero and a threshold duration $T_r$ is set. For example, to one second.

Referring still to FIGS. 60 and 61, at block 1566, processor at block 1568, where no light plane penetration has occurred, control passes up to block 1566. After light plane penetration does occur at block 1568, control passes to block 1570.

At block 1570, processor 1630 determines whether or not the currently set mode is the finger mode or the stylus mode. Where the stylus mode is set, control passes from block 1570 to block 1572. At block 1572, processor 1630 stores penetration location information. At block 1574, processor 1630 starts timer T. At block 1578, processor 1630 determines whether or not a stylus signal has been received from a transmitting stylus like the stylus 1620 illustrated in FIG. 60. When a transmitted stylus signal is received, control passes to block 1569 where the stored penetration data is deleted. At block 1571, flag1 is set equal to one to indicate that, for the current light plane penetration, a stylus signal has been received. At block 1573, processor 1630 commences drawing a line from the current location after which control passes back up to block 1578. While a stylus signal continues to be received, control passes from block 1578 down through block 1573 and line drawing continues. At block 1578, when a stylus user lifts the stylus 1620 so that the tip thereof no longer is in contact with display service 1604, control passes from decision block 1578 to decision block 1576. When flag1 is equal to 1 indicating that a stylus signal was previously received during display surface interaction, control passes from block 1576 to block 1577 where processor 1630 causes the master unit to halt line drawing after which control passes back up to block 1564 where the timer T and flag1 are reset. After block 1564, the process described above continues.

Referring still to FIG. 61, after timer T is started at block 1574 and control passes to block 1578, if a stylus signal is not received by processor 1630, control passes to block 1576. The control passes from block 1574 to block 1578 and then to block 1576, flag1 will not equal one because no stylus signal was received corresponding to the current light plane penetration and therefore control will pass from block 1576 to decision block 1565. At block 1565, processor 1630 determines whether or not penetration continues. Where penetration ceases, control passes from block 1565 to block 1578 where the stored penetration data is used to draw a line. After block 1578, control passes back up to block 1562 as illustrated where the finger mode is reset.

Referring yet again to FIG. 61, where penetration continues at block 1565, control passes to block 1580. Timer value T is compared to threshold duration $T_r$. Here, it has been recognized that whenever a stylus or a finger tip or any other device is used to contact a display surface 1604, there may be a short period between the time when the tip or device penetrates light plane 1610 and when the tip or device contacts surface 1604. Threshold duration $T_r$ is set equal to a reasonable time period for passing from the light plane level to the surface contacting level. For example, in some cases, duration $T_r$ may be one second, two seconds, one-half second, etc. When the threshold duration is exceeded, processor 1630 is programmed to perform as if the tip or device that penetrated light plane 1610 is a tip or device other than a transmitting stylus type device and control passes to block 1561. At block 1561, processor 1630 sets the mode to the finger mode. At block 1563, processor 1630 uses the stored data to draw a line penetration location. After block 1563, control passes to block 1631 in FIG. 61.

Referring again to FIG. 61, at block 1570, when the system is in the finger mode, control passes to block 1579 where commences line drawing at the current light plane penetration location. After block 1579, control passes to block 1631 where processor 1630 determines whether or not penetration continues. Where penetration ceases, control passes to block 1577 where processor 1630 ceases line drawing after which control passes to block 1564.

At block 1631, while penetration continues, control passes to block 1632 where processor 1630 caused the master unit to continue drawing a line at the current penetration location. At block 1634, processor 1630 determines whether or not a stylus signal has been received. If no stylus signal has been received, processor 1630 continues to operate in finger mode and control passes back up to block 1631 where the process described above is repeated. At block 1634, if a stylus signal is received, control passes to block 1636 where processor 1630 sets the stylus mode. Processor 1630 erases the line currently being drawn up to the current penetration location after which control passes to block 1571 where flag1 is again set equal to one to indicate that a stylus signal has been received.

While the stylus/finger mode setting algorithm has been described above in the context of a stylus that continually transmits a signal when the stylus tip contacts the surface of a display, in other embodiments the stylus may transmit pen down and pen up signals when the stylus makes initial contact and when contact ceases, respectively, and the processor may be programmed to recognize the period between down and up signals as a contact period.

According to another inventive aspect, a system that includes a master unit and multiple slave presentation spaces can be used to facilitate unique help functions where help information can be provided simultaneously via a subset of presentation spaces and/or during normal operation of the system to perform interactive tasks. To this end, referring to FIG. 62, a master unit screen shot 1509 and related first through sixth slave presentation spaces 1522, 1524, 1526, 1528, 1530 and 1532, respectively, are illustrated where the master screen shot includes, among other things, a workspace area 1510, a tool area 1300, a slave representation area 1302 and a help button 1512. In at least some inventive embodiments, when help button 1510 is selected, a help window 1516 is opened within workspace area 1510 that presents help topics in some fashion, a "close help" icon 1521 and a close help window icon 1518. After window 1516 is opened, to close the window, icon 1518 can be selected. When icon 1516 is selected, while window 1516 closes, in at least some embodiments other help information that may have been accessed may remain in some presented format for viewing. In at least some cases, to close all help information and to present information that was presented prior to opening the help window, the close help icon 1521 can be selected.

Figure 62:
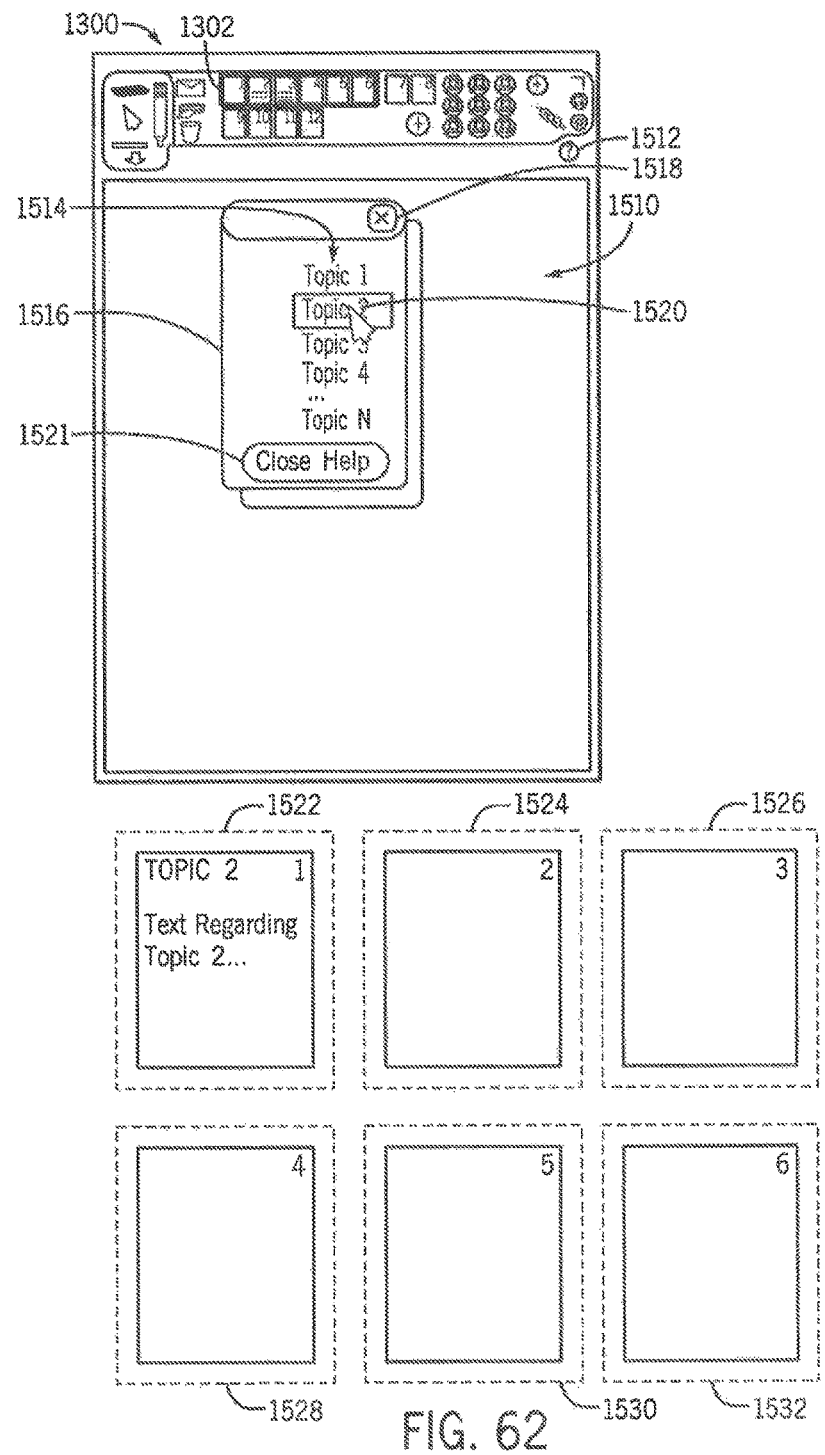
FIG. 62 is a schematic illustrating a master unit screenshot and a plurality of slave presentations spaces where a help function is employed.

In FIG. 62, help topics are shown in a list format 1514 and topics are selectable via a mouse or other controlled pointing icon 1520. When icon 1520 is positioned over a topic, the topic is highlighted to indicate alignment with the topic. Once a topic is selected, the topic is highlighted in a different fashion to indicate that selection has occurred.

After a topic is selected from list 1514, in at least some embodiments, a system processor accesses a help database, retrieves help information and presents the help information within workspace area 1510 or within a window that appears over the screen shot 1509. Here and in other contemplated embodiments, the presented help information may include simple text, hyperlink or other linking text that, when selected, leads to other related information, animation to show activities related to selected topics, etc.

In at least some cases, it is contemplated that a system user may want to simultaneously use a system including a master unit and slave units while viewing or having access to help information. For instance, where a system user is not sure how to move panel icons into and out of the slave representation area 1302 and the resulting effect of movement on the images presented via the slave presentation spaces (e.g., 1522, 1524, etc.), it may be advantageous for the user to have access to help information (e.g., text, an animation, etc.) that explains how panel icons can be moved in and out of area 1302 and the resulting effect on slave images while simultaneously being able to perform the panel icon dragging and releasing activity. To facilitate simultaneous access to help information and interactive activity, in at least some embodiments when help information is presented in the master workspace area 1510, a system user can flip the help information from the master area 1510 to one of the slave presentation spaces 1522, 1524, etc., and can then use the master unit to perform some activity while help information is presented in the slave space.

Where help information is presented in a window that lies over a workspace area 1510 instead of directly within a workspace area, the window may be flipped to a slave presentation space in at least some embodiments by selecting the window (i.e., selecting the top bar of the window), dragging the window to a location over one of the panel icons within the slave representation space 1302 and releasing the panel icon. Once the panel icon is released, the help window is moved to the slave presentation space associated with the panel icon and will appear as a window over the image that currently exists within the slave presentation space.

A flipped help window may be associated with the slave presentation space or the image over which the help window was flipped. Where the help window is associated with the slave presentation space to which the window was flipped, as other images are moved about the slave spaces, the help window would not simultaneously be moved. Where the help window is associated with an image over which the window is initially flipped, as the image is moved, the help window would simultaneously move.

The advantage of presenting help information in a window format is that, at least where the help window does not take up an entire slave presentation space, at least a portion of the any underlying image is still visible and hence, when an activity affects the underlying image, at least a portion of the affect can be observed to confirm the effect.

In at least some embodiments where help information is presented directly within workspace area 1510 (as opposed to in an overlying window), when the help information is flipped to a slave presentation space, the help information may either be treated like any other slave image and supplant an existing image or may be treated in an overlaying fashion so that any initial image in the space to which the information is flipped remains associated with the space.

Where the flipped information is treated like any other flipped image, any image presented within a slave presentation space prior to flipping is removed from the space and repositioned according to the image management rules described above. For instance, where an image is initially presented in slave presentation space 1522 when a help information image is dragged to and released to a location over the first panel icon in slave representation space 1302 that is associated with slave presentation space 1522 (see again FIG. 62), the initial image in space 1522 is moved to space 1524, any initial image is space 1524 is moved to space 1526 and so on.

Where the flipped image is treated as an overlay, any image presented within a slave presentation space prior to flipping is removed from the space so that the help information can be presented within the space but the removed image is not repositioned in another of the slave presentation spaces and the flipping action does not cause other images presented in the slave presentation spaces to be moved within the spaces. For instance, where an image is initially presented in slave presentation space 1522 when a help information image is dragged to and released to a location over the first panel icon in slave representation space 1302 that is associated with slave presentation space 1522 (see again FIG. 62), the initial image in space 1522 is removed from space 1522 so that the help information can be presented.

In some embodiments, referring again to FIG. 62, when a help topic is selected from a help window 1516, the topic information may initially be presented in a slave presentation space instead of being presented in the master unit workspace area 1510. Where help information for a specific topic requires more space than the space afforded by a single presentation space, the help information may be presented via multiple slave presentation spaces.

In some embodiments, when a help topic is selected and help information is initially presented within the master unit workspace area 1510, as additional topics are selected, information related to previous help topics may be displayed via the slave presentation spaces. For instance, where a user initially selects a first help topic to obtain related information and a help window is opened over workspace area 1510 that includes additional selectable help sub-topics in addition to information related to the first topic, when a second help topic is selected from the additional sub-topics, information related to the first topic may automatically be flipped in a window or other format to the first slave presentation space 1522 and either another window may be opened within workspace area 1510 to present information related to the second topic or the second help topic information may be presented in the initial window. Similarly, when a third help topic is selected from the additional sub-topics, information related to the second topic may automatically be flipped in another window or other format to the second slave presentation space 1524 and either another window may be opened within workspace area 1510 to present information related to the third topic or the third help topic information may be presented in the initial window.

In all cases where help information is presented in slave presentation spaces and/or in windows that are provided over images in slave presentation spaces, the help information can be removed from the presented images by simply turning off the help function. In at least some embodiments the help function can be turned off by simply selecting help icon 1512 in FIG. 62 and then selecting the close help icon 1521.

In some embodiments when the help function is turned off, the state of the system returns to the state that existed just prior to the help function being turned on. Here, for instance, where six images were presented via slave presentation spaces 1522 through 1532 and one image was displayed via workspace area 1510 prior to initiating the help function, when the help function is turned off, all of the seven originally presented images are again presented.

In other embodiments when the help function is turned off, any changes that occurred to the presented information while the help function was turned on remain. For instance, if three help images are presented during help activities via slave presentation spaces 1522, 1524 and 1526 where the help information images were treated like normal flipped images (i.e., caused movement of other images among presentation spaces), when the help function is turned off the three spaces 1522, 1524 and 1526 are left blank.

In at least some embodiments it is contemplated that a help function may be supported by a system wherein a related activity is simulated via the system for a user. For instance, again, where a user seeks help information related to movement of panel icons into and out of a slave representation area 1302 (see again FIG. 47), to show the activity and the result, a system processor may actually show a dragging and releasing activity via the master unit and the effect of the activity via the slave presentation spaces (i.e., the slave images may be moved or altered accordingly). Thus, for example, the processor may cause the master unit to show a pointing icon move to a panel icon in the tool area 1300 to select one of the panel icons, dragging of the panel icon to another location, releasing of the icon and replacement of the icon while causing the slave presentation unit to alter the displayed slave images accordingly.

In at least some embodiments where help information is presented in windows, it is contemplated that the windows may be presented as small sticky notes where, as new help topics are opened, the new notes are presented via either the master unit or within the slave presentation spaces. Here, the note appearance is an indication to a system user that the information on presented via the notes is not permanent and that the images under the presented information still exist and will be there after the help function is turned off. In at least some cases the sticky notes may only be used for help navigation. For instance, when a help function is initially commenced, general help topics may be presented via a first sticky note. When a sub-topic from the first note is selected, a second note may be presented either via the master or via the slave spaces that includes more specific topics and so on.

According to another inventive aspect, a master unit or other interface device that is used with a master presentation unit may be useable to adjust viewing aspects such as, for instance, brightness, contrast, etc., of the slave presentation units so that each presentation unit projects images that have similar appearances. In this regard, in many cases where a presentation system includes two or more projectors, the projectors will project images that have different brightness levels, color contrasts, etc., because different types of projectors are employed or, where identical projectors are employed, because the usage time of the projectors is substantially different (i.e., as projectors are used, the quality of the projected images is denigrated, projector light brightness is reduced, etc.).

When multiple projectors or display screens that have different image generating sources are used to present information, it is often the case that the different projectors or screens and sources generate images that have disparate qualities. For instance, where first and second instances of a single image are presented via first and second separate projectors in first and second presentation spaces, often because of hardware differences, despite the fact that the images are identical, the images may have very different appearances. While different appearances are acceptable when the first and second presentation spaces are used in different locations (i.e., separate conference rooms), when the two spaces are adjacent, the differences in appearance are noticeable and, in many cases, can be distracting.

One image characteristic that is particularly distracting when two or more images are presented in an adjacent juxtaposition is image brightness. With projectors, image brightness varies appreciably from manufacturer to manufacturer and even among projectors of the same type where one projected is older than the other (i.e., projector brightness often decreases over time and with projector use).

Figure 63:
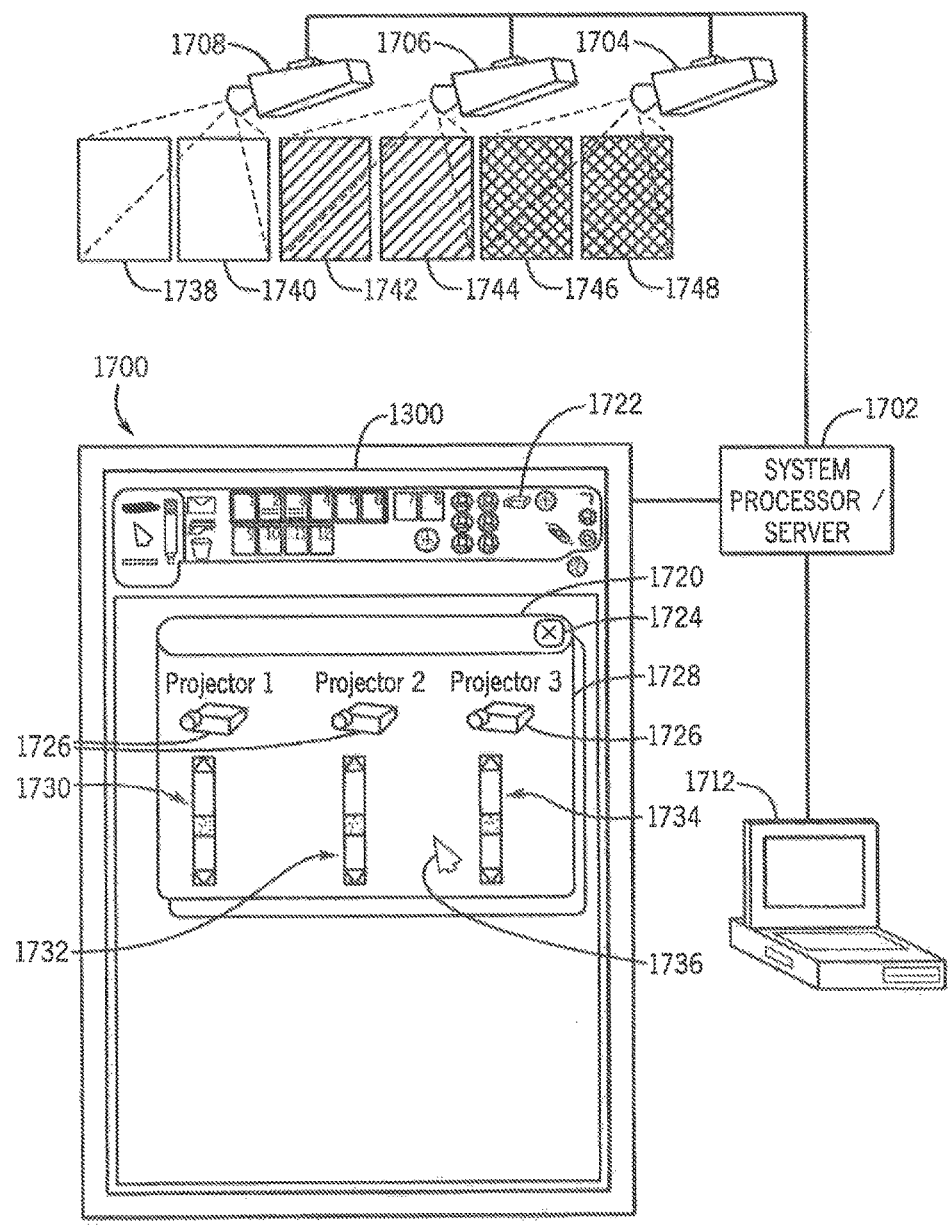
FIG. 63 is a schematic illustrating a system where projector brightness control is facilitated via a master unit screenshot.

Referring to FIG. 63, an exemplary system is illustrated wherein projector brightness is adjustable via a master display unit 1700. In FIG. 63, three projectors 1708, 1706 and 1704 are linked to master unit 1700 via a system processor/server 1702 where the first projector 1708 projects two images into presentation spaces 1738 and 1740, the second projector 1706 projects two images into spaces 1742 and 1744 and the third projector projects two images into spaces 1746 and 1748. As illustrated, the images in spaces 1738 and 1740 are shown as unfilled to indicate relatively bright images, the images in spaced 1742 and 1744 are shown as left to right upward slanting cross hatched to indicate images that are darker than the images in spaces 1738 and 1740 and the images in spaces 1746 and 1748 are shown as double cross hatched to indicate images that are darker than the images in spaces 1742 and 1744 where image brightness is a function of the specific projectors that generate the images.

In FIG. 63, it is contemplated that processor 1702 is capable of providing control signals to each of projectors 1708, 1706 and 1704 to adjust perceived projector brightness. To this end, in the case of many projectors, projector bulb intensity is not adjustable and therefore brightness cannot be adjusted by altering bulb intensity. In these cases, it has been recognized that other projector settings can be adjusted to modify projected image characteristics in ways such that the perceived brightness of the projected images is modified. For instance, in some cases image colors can be altered to adjust perceived brightness.

Referring still to FIG. 63, in at least some inventive embodiments a projector adjust icon 1722 (also referred to herein as a "projector icon" 1722) may be provided in a tool area 1300 of a master unit screen shot where a workspace area 1725 resides below the tool area 1300. When icon 1722 is selected, a projector control window 1728 is opened in a master unit workspace area 1725 that includes a close icon 1724 that can be used to close window 1728. In addition to icon 1724, window 1728 also includes a separate projector icon (three projector icons collectively identified by numeral 1726) for each of the projectors that are linked to server 1702 and associated sliding bar adjustment tools 1730, 1732 and 1734, one for each of the projector icons 1726. Consistent with the above discussion regarding brightness, a system user can select and drag a sliding bar on any of the adjustment tools 1730, 1732, 1734 to adjust perceived brightness of associated projected images up or down. Other projector adjustments (e.g., specific adjustments to the three colors used to generate images—red, green and blue, etc.) are contemplated and could be performed via the master unit 1700. Where adjustments for specific blue, green and red colors are provided, each of the colors may be separately adjustable where, as adjustments are made, the projectors are controlled so that the projectors provide feedback to the adjusting user.

In at least some embodiments it is contemplated that color correction may be used to correct images generated by any single one of the projectors. To this end, in at least some embodiments an interface may be provided that enables a user to select different portions of a projected image and adjust brightness of the separate portions of the image to compensate for brightness irregularities at the edge or in the middle of the projected image. Here, again, in at least some cases color correction may include separate adjustment of each of the three projector colors red, green and blue.

Referring yet again to FIG. 63, while a system is described above wherein a master presentation unit is used to adjust perceived projector brightness, in at least some embodiments it is contemplated that other interface devices such as a laptop 1712 linked to processor 1702 may be used to adjust brightness. Here, instead of providing the projector control window 1728 via the master unit, the control window 1728 may be provided via the laptop display or some other linked interface device and the window tools may operate in a similar fashion.

In at least some embodiments it is contemplated that a conferencing system including a master unit and associated slave presentation units may be associated with a specific conference room or may be able to be associated with a specific conference room where the conference room includes other environmental apparatus that can be controlled via a master unit in a fashion similar to the way in which the projector characteristics are controlled.

Figure 64:
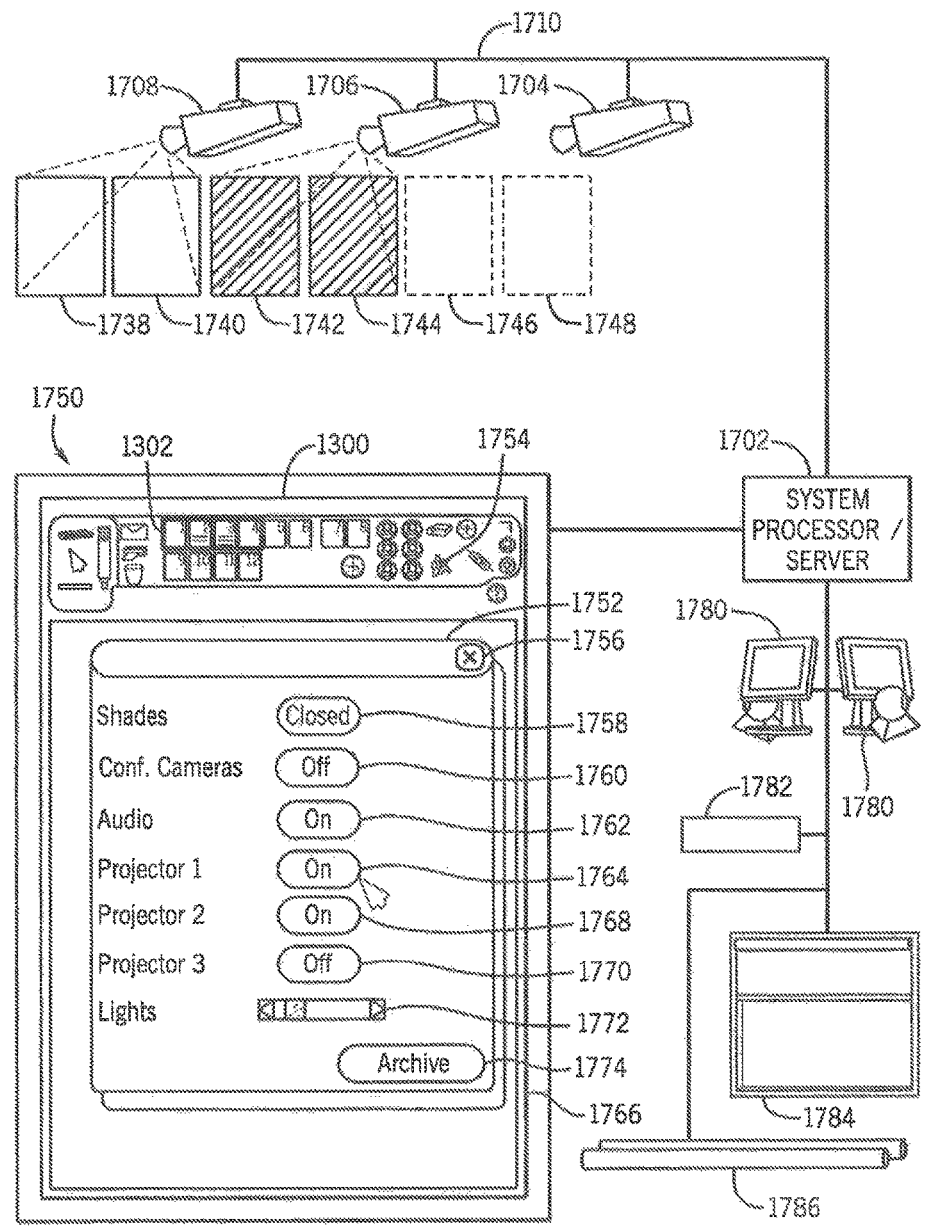
FIG. 64 is a schematic of a system wherein a master unit screenshot is used to control room or environmental apparatus.

Referring to FIG. 64, an exemplary system is illustrated wherein projectors and other environmental apparatus are controllable via a master display unit 1750. In FIG. 64, as in FIG. 63, three projectors 1708, 1706 and 1704 are linked to master unit 1700 via a system processor/server 1702 where the first projector 1708 projects two images into presentation spaces 1738 and 1740, the second projector 1706 projects two images into spaces 1742 and 1744 and the third projector is capable of projecting two images into spaces 1746 and 1748. The other apparatus that are controllable via unit 1750 include but are not limited to conferencing cameras and related display hardware 1780, audio equipment 1782, window shades 1784, lighting 1786, etc.

In FIG. 63, each of the environmental apparatus as well as the projectors 1708, 1706 and 1704 are linked to system processor/server 1702 which is in turn linked to master unit 1750. The illustrated master unit screen shot includes a tool area 1300 and a workspace area 1766 there below. Within the tool area 1300, an additional environment icon (i.e., a plant icon) 1754 is provided that is selectable to access room apparatus controls. To this end, when environment icon 1754 is selected, a room control window 1752 is opened within workspace area 1766.

Exemplary room control window 1752 includes a includes a window close icon 1756 for closing the window as well as apparatus control tools including a close/open icon 1758 for room window shades 1784, an on/off icon 1760 for conference cameras 1780, an audio on/off icon for controlling audio equipment 1782, projector on/off icons 1764, 1766 and 1768, for controlling the state of each of projectors 1708, 1706 and 1704, respectively, and a sliding light control bar for controlling intensity of room lights 1786. Each of icons 1758, 1760, 1762, 1764, 1766, 1768 and 1770 are toggle type icon that change state (e.g., on to off and vice versa) when selected. As selections are made via window 1752, the selections are carried out by processor 1702. After selections have been made, a user can select icon 1756 to close the room control window 1752.

In the illustrated example in FIG. 64, while projectors 1708 and 1706 are turned on (see icons 1764 and 1766, icon 1768 indicates that projector 1704 is turned off. Consistent with the control icon states, each of projectors 1708 and 1706 are shown projecting images while projector 1704 is not projecting an image. Reflecting the states of the projectors, note that the slave representation area 1302 in tool area 1300 only encloses four images corresponding to the four images projected by projectors 1708 and i1706 instead of enclosing six images as in previously described cases.

It has been recognized that environmental conditions for using a conferencing system like the ones described above will often be similar during different conferencing sessions. To facilitate easy system and conference room use, in some embodiments the master unit 1750 may be programmed to present the environment/room control window 1752 the first time master unit 1750 is activated to obtain user preferences as described above. Thereafter, the specified preferences may be stored for future use so that, subsequently, when the master unit is activated, the environment apparatus are controlled to automatically assume states consistent with the specified preferences. In at least some embodiments, as illustrated in FIG. 63, to facilitate storage of preferences for future use, room control window 1752 will include an "archive" icon or some other tool akin thereto for indicating that specified preferences should be stored. After preferences have been stored, the next time the master unit is activated, the apparatus are automatically controlled to assume the preferenced states.

At any time after a master unit is activated, a unit user can access the room control window by selecting environment icon 1754 to change current apparatus states. After one or more apparatus states have been altered, the states can either be archived as preferences by selecting archive icon 1774 or they can be used for the current session only by selecting the close icon 1756, after which the specified changed apparatus states will be maintained during the current session but will not be archived for future sessions (i.e., the previously specified preferences will be maintained until new preferences are archived).

In at least some embodiments the room control window may be provided via an Active-X plug in that enables control of an existing room control system.

In the case of the multiple display units shown in FIGS. 58 and 59, in at least some embodiments the presentation spaces may be mechanically or electronically rotatable so that the presentation spaces can assume either vertical or horizontal orientations. Thus, for instance, in FIG. 58 where slave displays 1466 and 1468 are shown vertically oriented, in some embodiments displays 1466 and 1468 may be mounted mechanically to facilitate rotation into horizontal orientations like the orientations of the slave displays 1486 and 1488 in FIG. 59. In other cases rotation may be electronic. Similarly, in at least some embodiments the location of the master unit and the slave presentation spaces may be modifiable either mechanically or electronically so that the master unit may be placed on either the right or the left hand side of the unit.

Referring again to FIG. 55, in some embodiments server 1432 may be programmed to monitor system use and remote connection to the master unit 1422 and to periodically transmit usage information via a network to another server that tracks system and remote connection for billing purposes.

Figure 65:
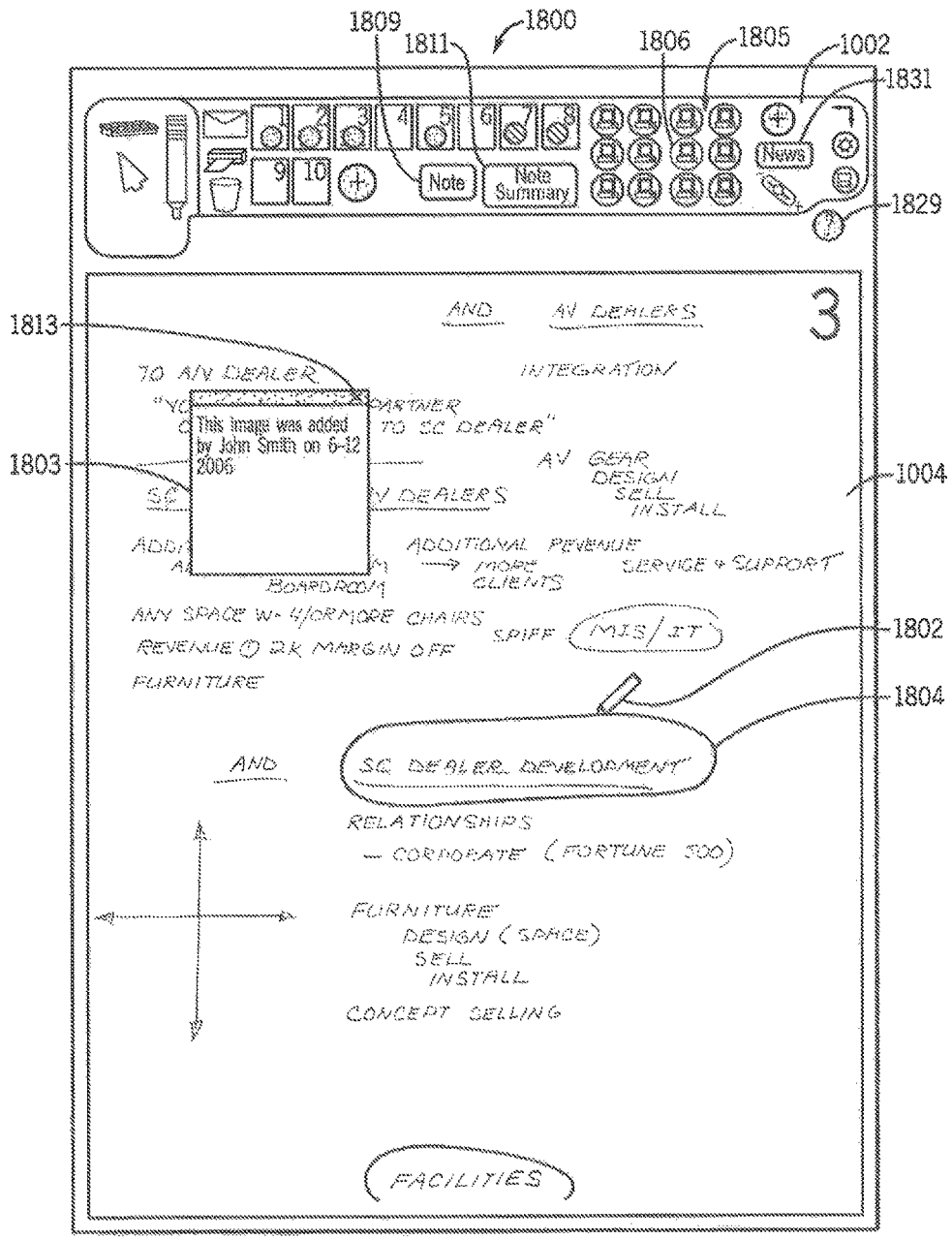
FIG. 65 is a screen shot that illustrates several additional features that may be implemented via a master presentation unit.

According to another aspect of at least some exemplary systems, where multiple conference attendees are located at different locations and where a system can be controlled by more than one attendee, it is contemplated that when a specific attendee performs some activity that alters a displayed image or that interacts with the master presentation unit, an icon corresponding to the attendee may be highlighted to indicate who has control of the system and who is making the change. To this end, referring to FIG. 65 an exemplary master display screen shot 1800 akin to the screen shot described above with respect to FIG. 38 is shown. In FIG. 65 icons 1805 associated with each remote conference attendee are provided in tool area 1002 including one icon 1806 associated with a specific remote user. When the user associated with icon 1806 uses a remote computer to control a pen type cursor 1802 to draw an oval around the words "SC DEALER DEVELOPMENT" as indicated at 1804, in at least some cases, as the oval is being drawn, the icon 1806 may be visually distinguished (e.g., turned yellow, blinked on and off, etc.). Here, when the user stops drawing oval 1804, if the user ceases making some other modification in workspace 1004, the icon 1806 may no longer be visually distinguished.

In another case, when a user uses the remote device associated with icon 1806 to begin to draw oval 1804, icon 1806 may be visually distinguished and may remain visually distinguished until another user performs some image altering activity via another interface device (e.g., a master unit or another remote computer). For instance, if the remote associated with icon 1806 is used to draw oval 1804 and no other remote device is used to alter the master unit image or to interact with the master to perform some other function, in this case, icon 1806 remains visually distinguished for the entire ten minute period. Here, the distinguished icon indicates the last user or remote device used to alter the mast space image or to interact with the master unit.

In still other cases where a specific user is associated with each remote device, when a remote user is altering an image displayed in master space 1004, a user identifier 1807 may be provided in tool space 1002 that indicates the current user by providing a user ID (e.g. a user name like "John Smith" as illustrated, a user's initials, etc.) or a similar user identifier box may follow a pen or cursor icon about on a display to indicate who is controlling the cursor at any time.

Figure 66:
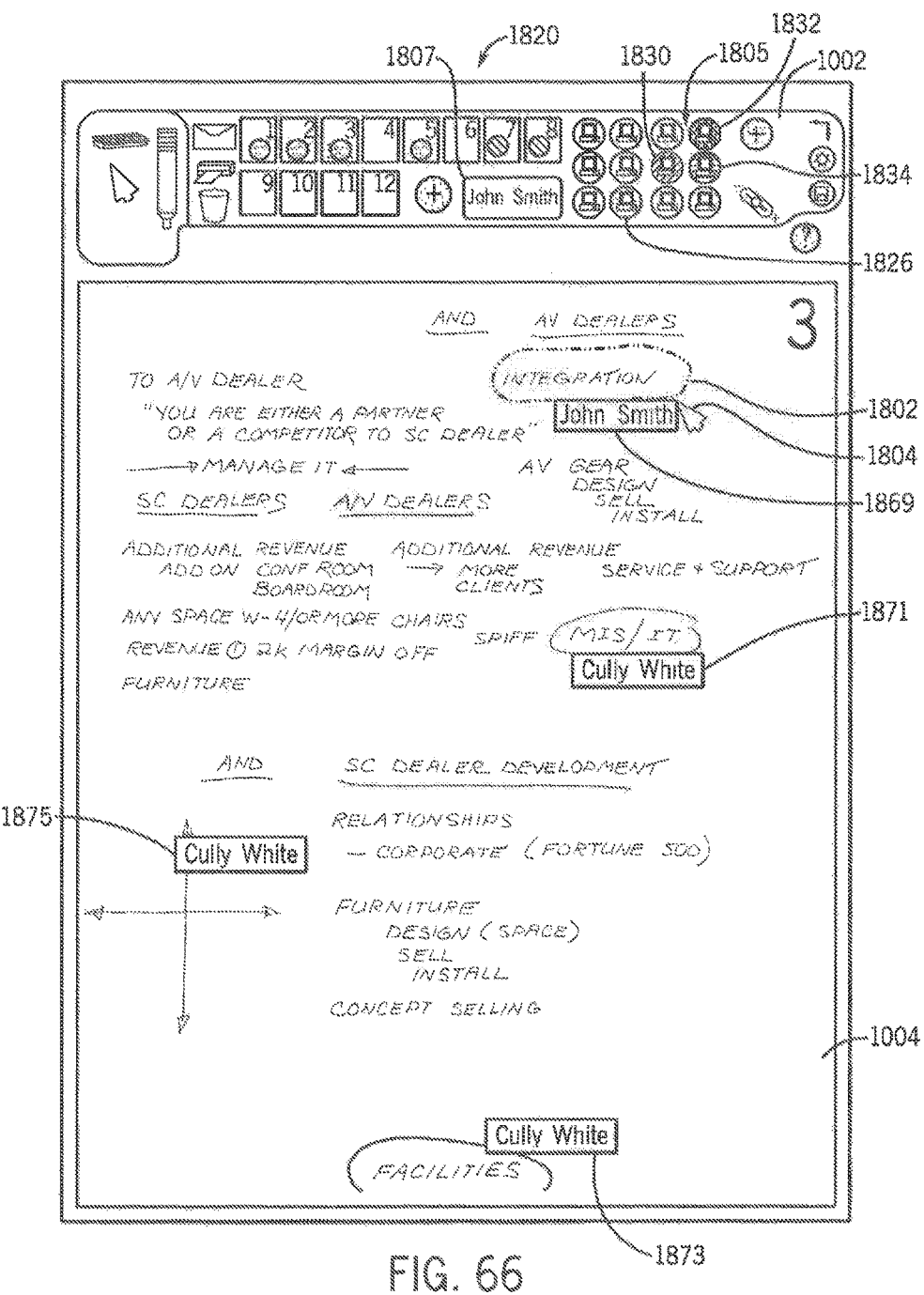
FIG. 66 is similar to FIG. 65, albeit illustrating additional features and aspects of at least some embodiments.

In still some other cases it is contemplated that a feature may be turned on whereby, when a stroke or other image object on an image is selected (e.g., via hovering an icon over the stroke/object or via clicking on the stroke/object), the identity of the person that added the stroke or object to the image may be indicated. Here, the identity may be indicated in any of several ways including highlighting the remote icon (e.g., one of icons 1805 in FIG. 65) that is associated with the remote computer that was used to make the stroke or add the object, by providing a user identifier akin to field 1807 in FIG. 66), by providing a field or box akin to field 1807 adjacent a pointing icon used to select the stroke or object, by providing a field adjacent the stroke or object (see 1869 in FIG. 66), etc. Other ways to associate a stroke or object with an author/editor are contemplated.

In some cases a feature may be provided such that when the feature is turned on the authors of all of the information on an image may be provided. For instance, referring to FIG. 66, when this feature is turned on fields 1869, 1871, 1873 and 1875 may be provided adjacent each object that forms an image where the editors that added the objects are identified in the fields. Here, in at least some cases, in addition to providing the editor fields, the objects may be color coded by editor so that all of the objects added by one editor are presented in a first color, all of the objects added by a second editor are presented in a second color and so on.

In yet one other case it is contemplated that as a specific user alters a master workspace image in space 1004, all of the alterations made by the specific user that occurred after some other user most recently made a change to the image would be highlighted or otherwise visually distinguished to indicate changes that are related to each other by the identity of the remote device used to make the changes. For instance, in FIG. 65, assume that after some other user alters the displayed image, the user associated with icon 1806 creates oval 1804 and places the text that appears below oval 1804 in the master workspace 1004. Here, while other text may appear in black or in the colors selected by users when the text was added to the image, oval 1804 and text added by the user associated with icon 1804 may appear highlighted in yellow and other added text and graphics may appear highlighted in yellow until some other attendee uses another device to make a change to the displayed image. When another remote device is used to make a change to the displayed image, the previously yellow highlighted changes made by the user using the remote associated with icon 1806 would be un-highlighted and the new changes by the other attendee would now be shown in some visually distinguishing fashion. Here, in addition to showing a string of changes by a most recent image editor in a visually distinguished fashion, the remote used to edit may also be indicated in one of the ways described above (e.g., highlighting an associated one of icons 1805, providing an identifying field 1807, etc.).

In some cases is it contemplated that a master unit may have a mode wherein changes that are made using specific remote devices and the master unit may be visually distinguished from each other. For instance, in some cases each remote device that links to a conference may be assigned a specific color and any image changes made using the remote device may show up in an image in the color associated with the device. To this end, referring to FIG. 66, a screen shot 1820 of a master unit is shown that is similar to the screen shot shown in FIG. 65 which includes a tool space 1002 and a workspace 1004 in which an image is provided. Here, each of remote icons 1826, 1830, 1832 and 1834 is highlighted differently. For instance, while icon 1826 may have a blue hue to it, icon 1830 may have a red hue, icon 1832 may have a green hue and so on. When the user associated with remote icon 1826 makes a change to the image illustrated in workspace 1004, the change would be shown in the color associated with the specific remote icon, in this case, in blue. Similarly, changes caused using the device associated with icon 1830 would be shown in red. In at least some cases it is contemplated that this color coding feature could be turned on and off. For instance, when the color coding feature is off, all image objects would be shown in whatever colors were chosen by the editors that made the changes. Then, when the color coding feature is on, all of the image objects would be shown in the colors associated with the specific remote device icons.

In some embodiments it is contemplated that all changes made by a specific conference attendee on all displayed and thumbnail images or just on the master unit image could be highlighted or otherwise visually distinguished from other image features. Here, for instance, a drop down menu (not illustrated) may be associated with each of the remote user icons 1805 that includes options to "Distinguish Master Image Changes" and "Distinguish All Image Changes". Here, where the "Distinguish Master Image Changes" option is selected for a specific remote device icon, the changes made to the master image using the associated remote device would be highlighted or otherwise visually distinguished. Similarly, where the "Distinguish All Image Changes" option is selected for a specific remote device icon, the changes made to all of the displayed and thumbnail image using the associated remote device would be highlighted or otherwise visually distinguished.

Figure 67:
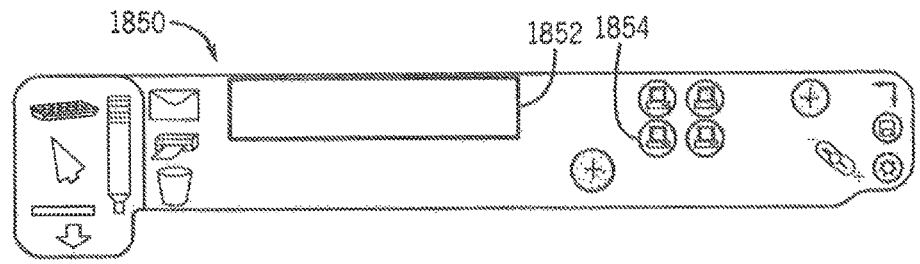
FIG. 67 is a schematic of a tool area akin to the area illustrated in FIG. 44, albeit under different conditions.
Figure 68:
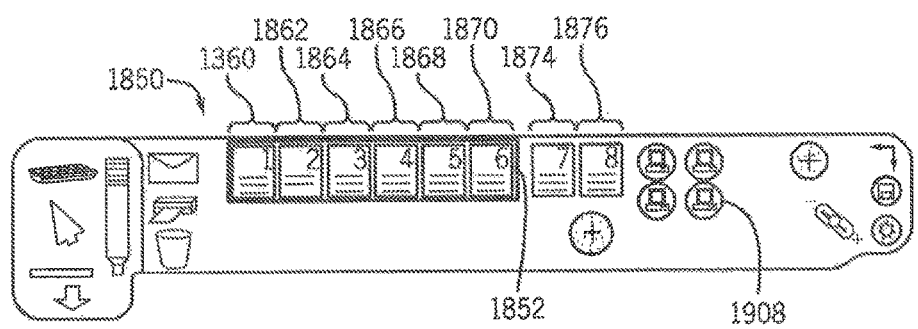
FIG. 68 is similar to FIG. 67, albeit under different conditions.

According to another aspect, in at least some embodiments it is contemplated that any device used to electronically link to a system conference may be used to load documents up to the conference through a print type process. To this end, referring to FIG. 67, a tool space 1850 akin to the space described with respect to FIG. 44 is shown which includes a slave representation area 1852 and a plurality of remote user icons including one remote user icon 1854. As shown in FIG. 67, initially no images are shown in slave representation area 1852. If the attendee associated with remote icon 1854 wants to load an eight page document from some other application such as MS Word™, the attendee can select a print command and can then select the conferencing system including the master unit or easel as the target to which the image should be printed. After the selections above, a version of the eight page document can be generated within the remote computer and presented on the remote computer via windows associated with the conferencing system. In addition, a version of the eight page document can be transmitted to the master unit or easel and used to populate the six slave representation fields 1860, 1862, 1864, 1866, 1868 and 1870 in space 1852 as well as two session image fields 1874 and 1876 as seen in FIG. 68. The images would also be presented via the master unit workspace 1004 as well as via the slave presentation spaces for viewing. Thereafter, any of the image changing and session image rearranging processes described above may be performed on the images displayed.

Figure 69:
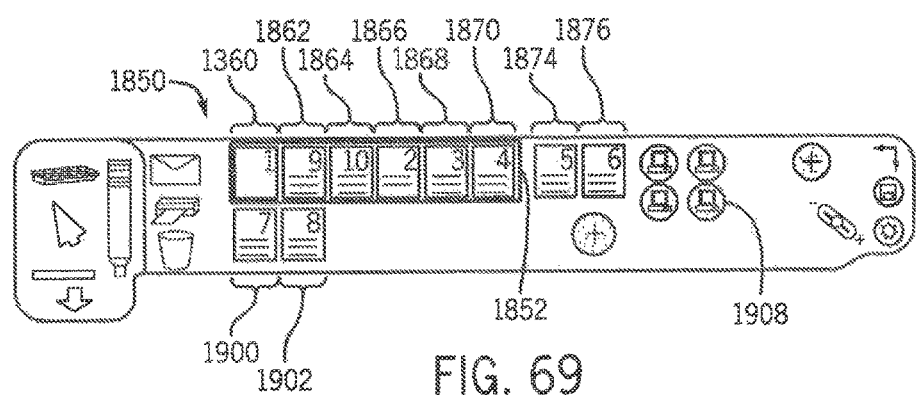
FIG. 69 is similar to FIG. 67, albeit under yet another set of conditions.

In the above example, if another attendee associated with icon 1908 subsequently wants to upload two additional images and the second image in field 1862 is currently displayed on the master unit as indicated by the highlighting in FIG. 68, when the two page document is printed to the conferencing system, versions of the two new images are generated that cause the previous images to ripple from space 1862 onward to make room for the two new images. The results of this rippling activity are shown in FIG. 69 where new images 9 and 10 occupy spaces 1862 and 1864, image 2 that was initially in space 1862 ripples to space 1866 and images 7 and 8 are moved to additional session image spaces 1900 and 1902. This printing activity enables any remote device to be used to publish documents to the conferencing system for sharing with other remote devices in a simple fashion.

Figure 70:
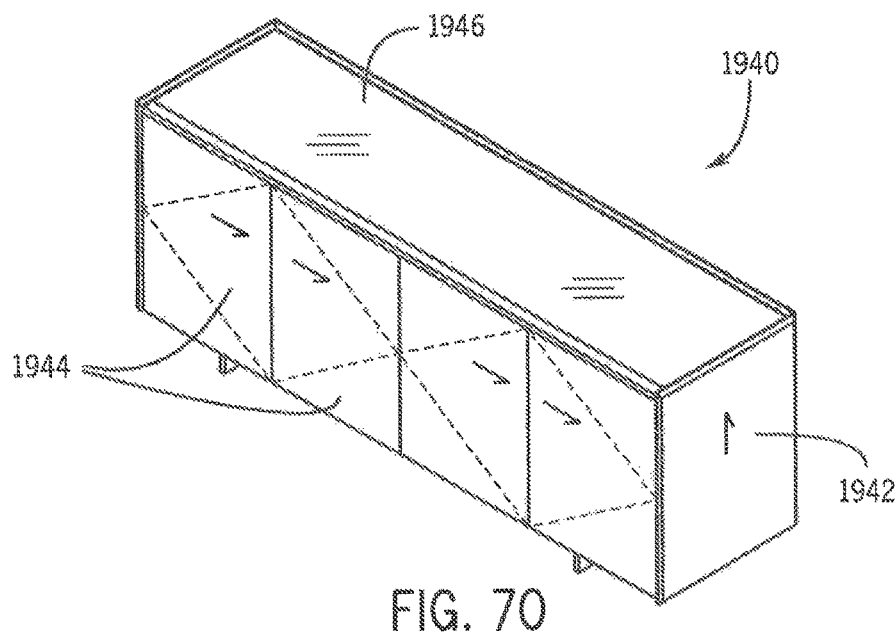
FIG. 70 is a perspective view of a credenza that includes a projector assembly according to at least one inventive embodiment.
Figure 71:
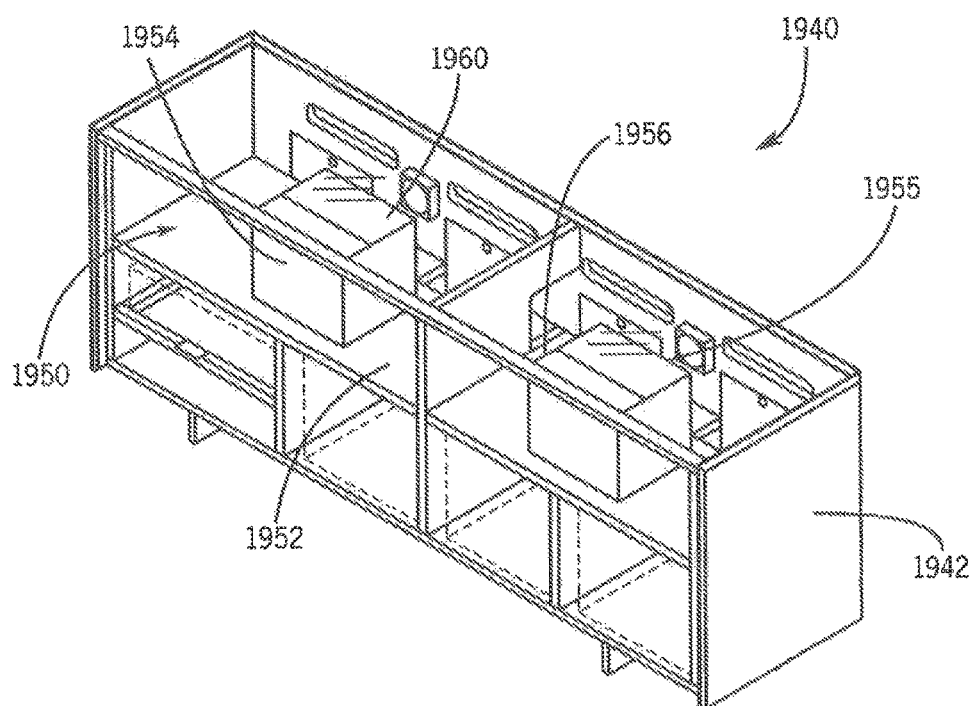
FIG. 71 shows the credenza assembly of FIG. 70 where a top member and door members have been removed.
Figure 72:
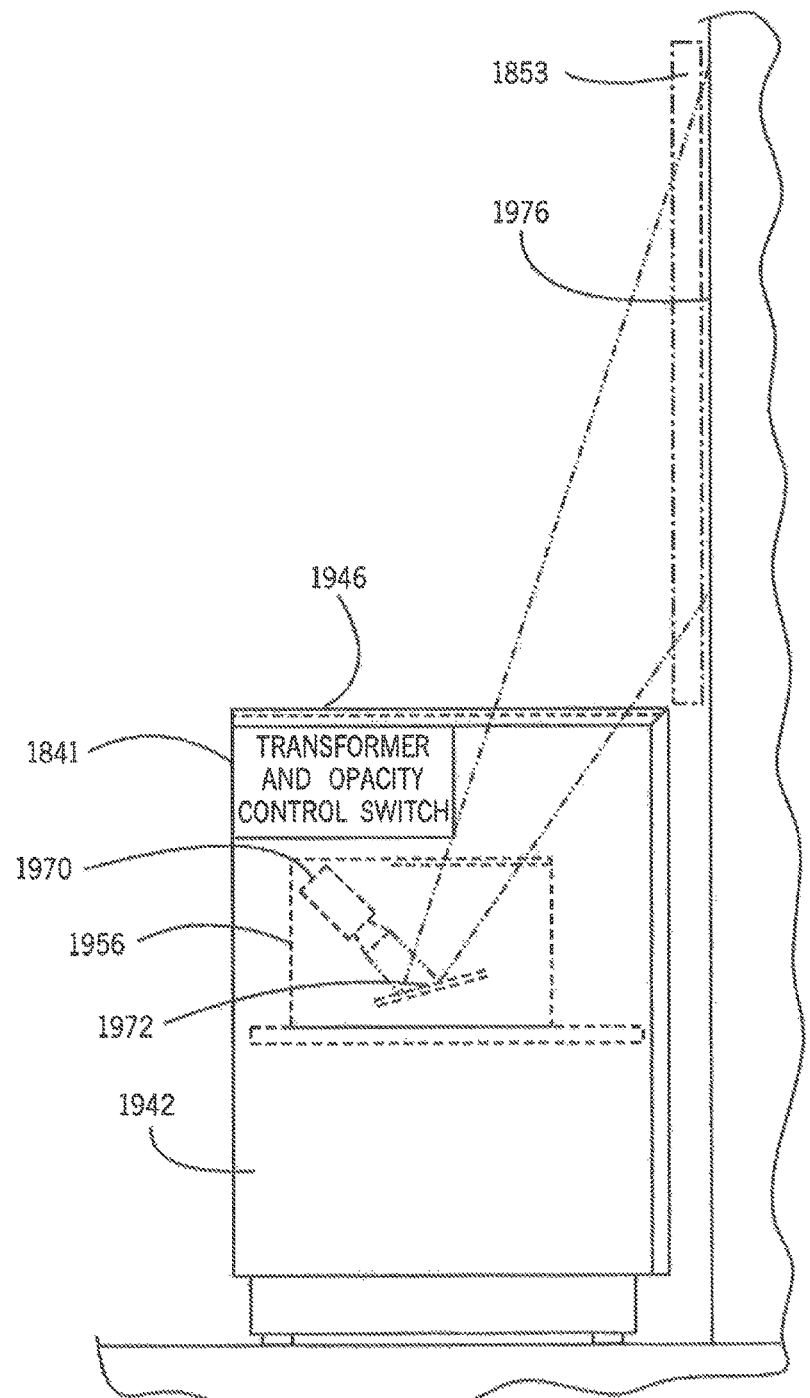
FIG. 72 shows the credenza assembly of FIG. 70 from the side and adjacent a wall structure where a projector assembly is shown in phantom.

In yet some other embodiments it is contemplated that projector systems similar to the systems described above with respect to FIGS. 58 and 59 may be designed into furniture that has a conventional appearance where the furniture does not include a slave display space (e.g., the furniture includes no screen) but rather uses a flat substantially vertical surface provided by some other structure as a projection surface. To this end, an exemplary system 1940 is shown in FIGS. 70-72 where two projector assemblies 1954 and 1956 are included in a credenza shelving assembly 1942. In this embodiment, credenza 1940 includes a rectilinear wall structure 1942 that forms an internal cavity 50 for receiving at least a subset of system components, a plurality of doors, two collectively identified by numeral 1944, internal wall and shelf structure 1952 and a glass top member 1946. Projectors 1954 and 1956 are arranged on a top shelf just below the glass top.

Each projector 1954 and 1956 has a similar design and operates in a similar fashion and therefore, in the interest of simplifying this explanation, only projector 1956 is described here in any detail. Referring to FIG. 72, projector 1956 includes a housing (not separately labeled) that includes a top wall window 1955, a projector unit 1970 and a mirror 1972. Projector unit 1970 and mirror 1972 are arranged in the housing so that images projected by unit 1970 reflects off mirror 1972 and upward through window 1955 and generally behind credenza 1940 (i.e., to a side of the credenza opposite the side that doors 1944 face and to the rear of a rear edge of the top member 1946 and generally vertically upward there from into a space 1851). Here, because the top member 1946 is glass, the images projected upward from projectors 1956 and 1956 pass through the top member. When a rear surface of credenza 1940 opposite doors 1944 is generally against a flat wall, projected images appear on the wall surface. Here, it is contemplated that the projectors in credenza 1944 would only be used in at least some applications to provide slave images and that a master presentation unit akin to those described above would be used along with the credenza assembly 1940 to facilitate the methods described above. As shown in FIG. 72, in at least some cases it is contemplated that casters or wheels may be provided on the bottom of the credenza 1942 so that the credenza and components located therein could be moved from one location to other locations for use. In at least some cases a printer 1943 and other system components (e.g., a master unit server or the like (not labeled)) may be provided in space 1950.

In at least some cases the glass top 1946 may comprise a polymer dispersed liquid crystal (PDLC) window or member that can be controlled to be either opaque or transparent. PDLCs operate on the principle of electrically controlled light scattering. They consist of liquid crystal droplets surrounded by a polymer mixture sandwiched between two pieces of conducting glass. When no electricity is applied the liquid crystal droplets are randomly oriented, creating an opaque state. When electricity is applied the liquid crystals align parallel to the electric field and light passes through the member creating a transparent state. Here, then, when the projectors are not used to generate images, the glass top 1946 may be deactivated so that the top member is opaque and the projectors and other components inside the space 1950 are hidden. When the projectors are to be used electricity can be applied to the glass thereby causing the glass to become transparent so that projected images can pass there through. In this regard, a power transformer and a control switch are shown as 1841 in FIG. 72. In at least some cases the opacity controlling switch would be linked in some fashion to the master unit for control when slave images are required. While the opacity controlled glass is described herein as a PDLC type glass, it should be appreciated that any type of electronically controlled glass assembly that has variable opacity may be employed. Hereinafter, glass that has controllable opacity will generally be referred to as opacity controllable glass unless indicated otherwise. In addition, other furniture types are contemplated such as desks, tables, shelved, etc., that include controllable opacity glass for hiding and revealing projectors.

According to still one other aspect, it is contemplated that an automatic scaling feature may be included as part of the master unit interface system wherein, as activities are performed that increase the size of an image beyond a size that will fit in an image space, the image size is automatically reduced to allow for additional application of information at the peripheral edges of the image.

Figure 73:
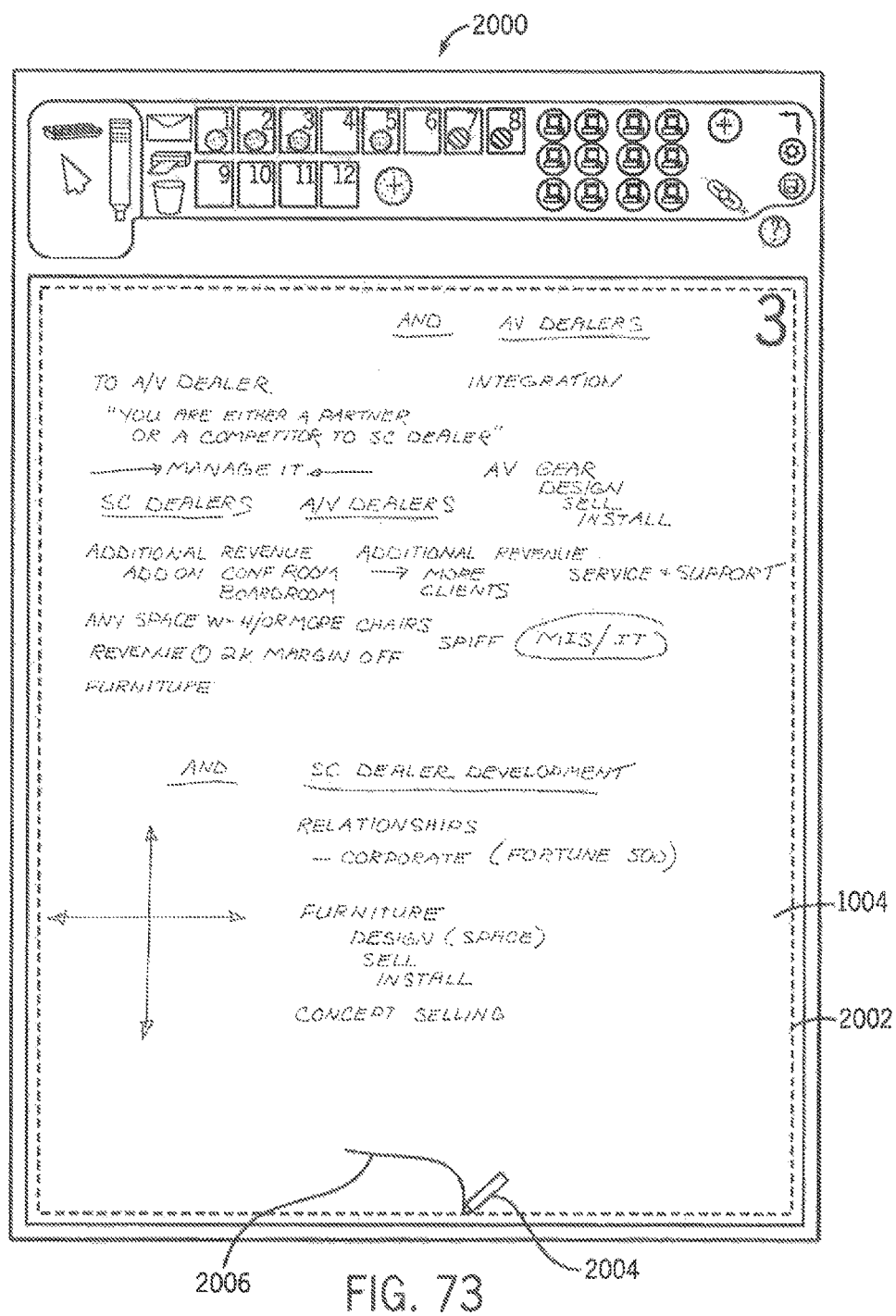
FIG. 73 is a screen shot similar to the image in FIG. 65, albeit where a frame or boundary line is shown in phantom that is used to determine when an image displayed in a workspace should be reduced in size to enable a user to add additional information along the peripheral edge of the image.
Figure 74:
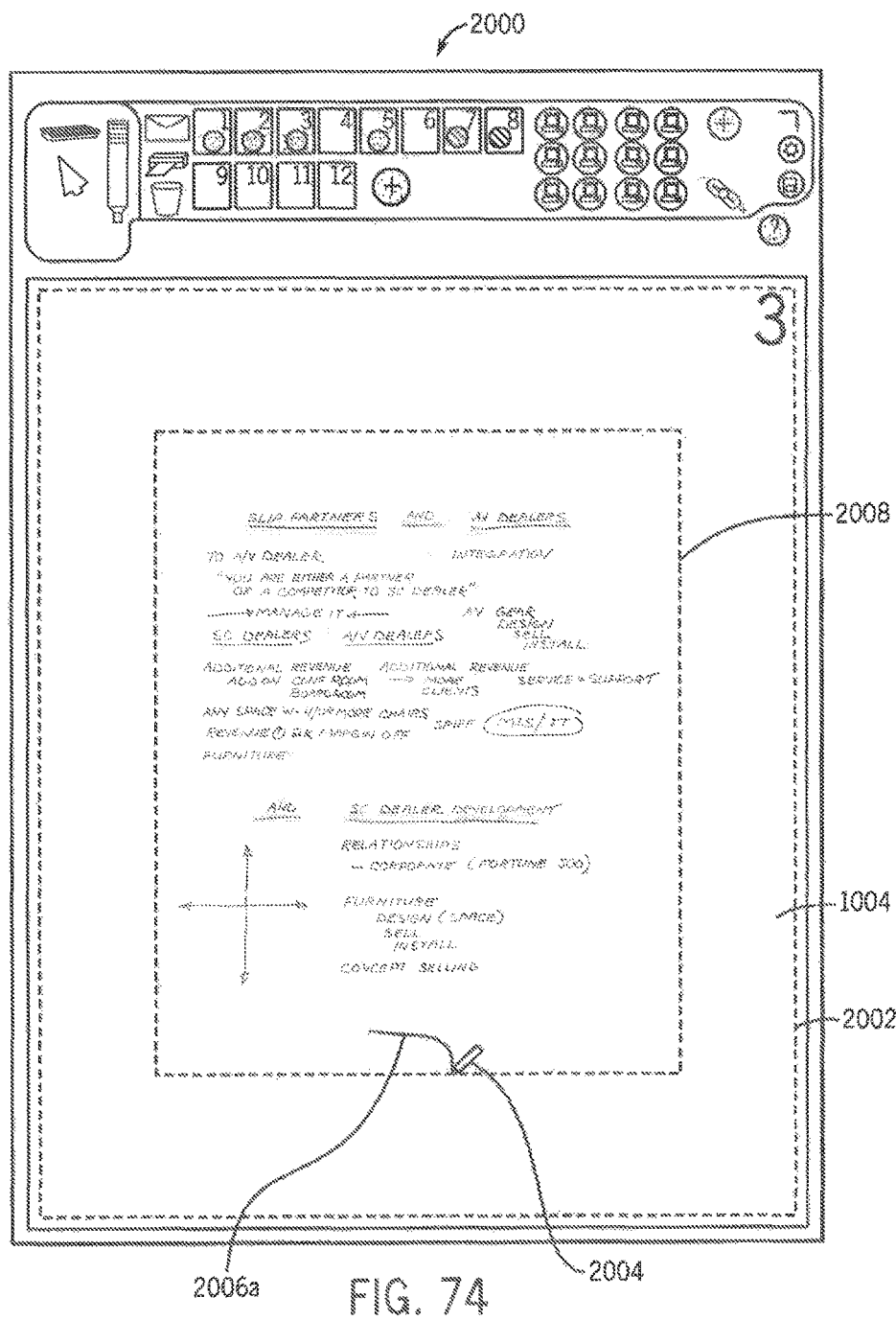
FIG. 74 is a screen shot similar to the image in FIG. 73, albeit where the image presented in a workspace has been reduced in size to enable a user to add additional information to the image at the peripheral edges.

To this end, referring to FIG. 73, an exemplary master unit screen shot 2000 is shown that includes a workspace 1004 in which a master unit image is displayed. Here, an invisible border or frame space along the edge of the workspace 1004 is shown by a dashed line 2002. For instance, the frame space may include the two inch space along each of the four sides of a displayed image. When the displayed image is altered such that altering activity causes information to be added to the frame space, the image may be shrunk so that the alterations can be shown. For example, in FIG. 73, a pen icon 2004 is shown where a curve 2006 that is made on the master image extents into frame space indicated by line 2002 at a lower edge of the displayed image. Referring to FIG. 74, when the curve enters the frame space, the displayed image including the curve 2006a being added is shrunk and moved and the pen icon 2004 is also moved along with the curve 2006a.

In some cases, as shown in FIG. 74, the shrunken image is moved to the center of the workspace 1004 so that information can be added around all four sides of the shrunken image. In other cases, although not illustrated, the shrunken image may be moved to some other location within workspace 1004 such as the upper left hand corner or the top center of the space. In some cases the shrunken image may be moved to the location within workspace 1004 that is most distant from the location at which an image altering activity entered the frame space 2002. For instance, referring again to FIG. 73 where curve 2006 entered space at the lower edge of workspace 1004, here, the shrunken image would be moved to be adjacent the top center edge of workspace 1004. Similarly, if a curve were made that entered space 2002 along the right hand edge of workspace 1004, the shrunken image may be moved to be relocated along the left center edge of workspace 1004.

In at least some cases a dynamic resizing may occur. For instance, where an image is initial shrunk by 30% when space 2002 is required by image altering activity, if the altering activity only slightly enters the space 2002 and thereafter changes to the displayed image occur within the bounds of the smaller image space, as subsequent image changes are being made, the image may be rescaled up to a larger image size (e.g., only 10% smaller than the original image size instead of 30% smaller) so that the largest image possible to accommodate an entire image can be provided automatically. In this case, the rescaling of the image may be performed in between changes to the image so that the rescaling does not adversely affect a system user's interaction with the image. Thus, for instance, after an initial downsizing by 30% when an image altering activity extends out of the original image space by a small amount, if subsequent changes to the image over the next fifteen seconds are within a the confines of the original image plus the small extension outside the original confines, when a break in image modifying activity occurs, the image may be resized up by 20% so that the largest possible image is provided automatically.

Moreover, in at least some cases, reduction of image size may not occur immediately when activity enters the boundary space but may occur when a current activity ceases so that the shrinking activity does not result in discontinuous activity. For instance, referring again to FIG. 73, if a curve passes through boundary 2002 and into the frame space, the resizing may only occur after a stylus used to form the curve is lifted up. Here, in at least some cases, the desired curve may be completed within the frame space or the curve may continue back into the space within the frame boundary 2002 where the curve is completed. Once the stylus is lifted indicating the end to a current activity, the resizing may occur.

When a pen icon is used to alter an image and altering activity extends into the frame space 2002, immediate image repositioning may cause the immediate location of the pen icon to be misaligned with the activity that was being performed. For instance, referring again to FIG. 745, when the shrunken image 2008 is repositioned, while a user may be pointing a pen icon controlling stylus at location 2009, the curve 2006a would be moved up to the illustrated location so that a mis-registration occurs. Here, to continue the curve, the user has to realign the icon controlling stylus with the tip of icon 2004. In at least some cases it is contemplated that realignment with the tip of icon 2004 and hence with the end of curve 2006a may not be easy to perform given stylus position sensing capabilities of some master units. In at least some embodiments a realignment feature is contemplated wherein the master unit helps realign by slightly shifting a shrunken image when a realigning activity is attempted.

Figure 75:
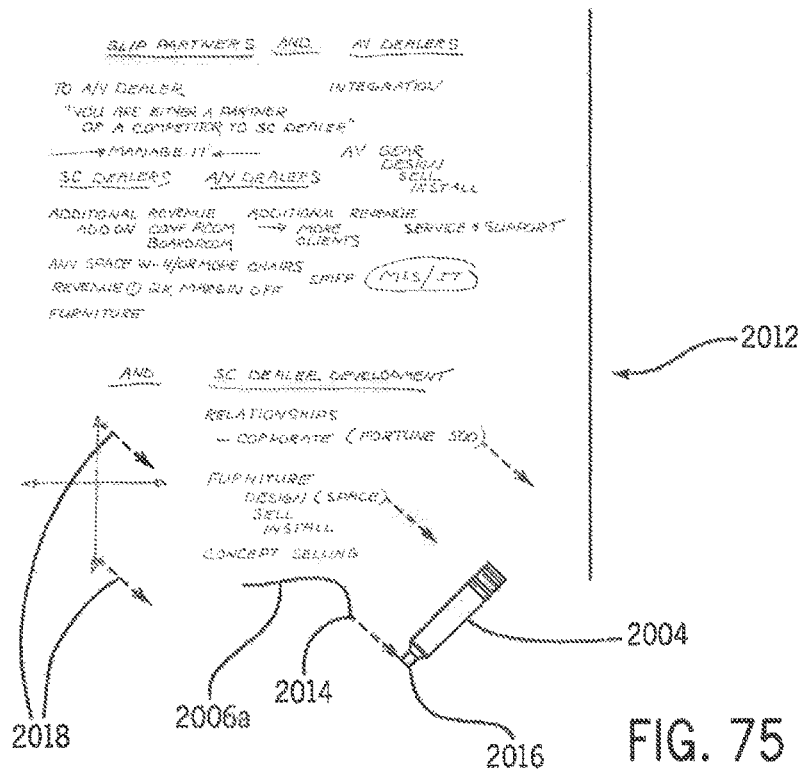
FIG. 75 is a schematic illustrating a reduced size image and a shifting activity that can help a user realign a stylus tip with a recent image altering activity so that the activity can be continued.
Figure 76:
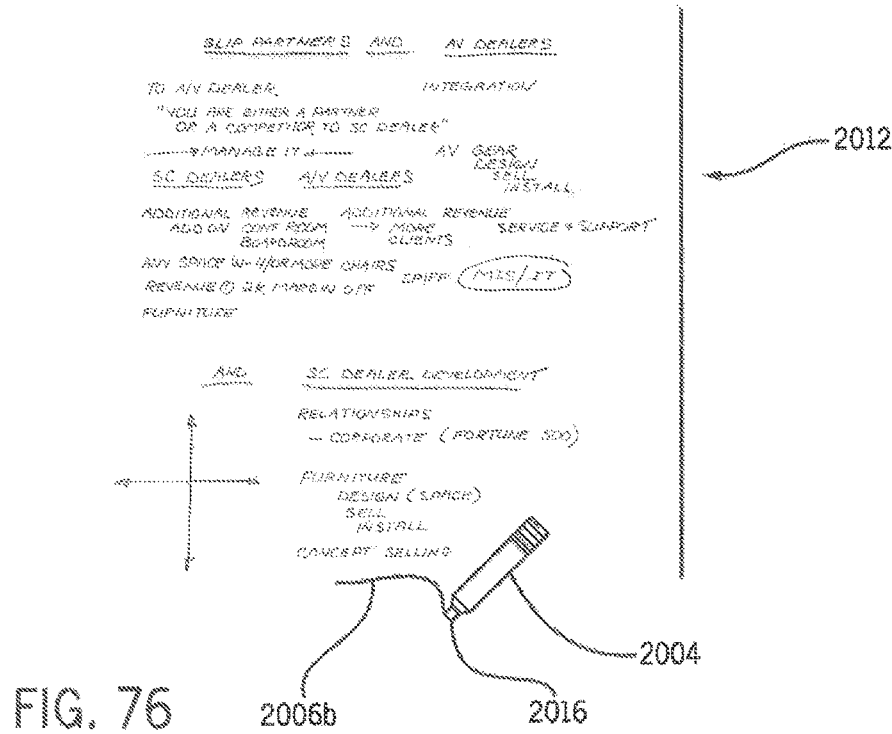
FIG. 76 is a schematic similar to FIG. 75, albeit where the reduced size image has been shifted to align with a stylus tip.

To this end, referring to FIG. 75, a shrunken image 2012 is illustrated that is consistent with the discussion above regarding FIGS. 73 and 74. Here, after the shrunken image is repositioned (e.g., in the center of the workspace 1004—see again FIG. 74), it is assumed that a system user repositions a pen icon controlling stylus so that icon 2004 is located as shown with tip end 2016 near but separated (e.g., 2 inches) from the location of end 2014 of shrunken curve 2006a. When the master unit senses the new location of icon 2004 and that the tip 2016 is located near end 2014, the unit may be programmed to assume that the user is attempting to realign the pen tip 2014 with the end 2014 of curve 2006a. To help realign, as shown by dotted lines, two of which are collectively identified by numeral 2018, the shrunken image 2012 may be shifted in its entirety so that curve end 2014 is located at the location of tip 2016 as illustrated in FIG. 2016 after which the user can proceed to complete curve 2006a as desired.

According to one other aspect, in at least some cases it is contemplated that a sticky notes feature may be included wherein conference attendees can add small proverbial "sticky notes" to session images that stay with images unless deleted or moved to other images. To this end, referring to FIG. 65, one additional icon 1809 in tool area 1002 is labeled "Note" which can be selected to add a note to an image currently displayed in the master unit workspace 1004. When icon 1809 is selected, a note image is opened up 1803 on top of the currently displayed image in workspace 1004. The note 1803 can be moved around in workspace 1004 by selecting the note and dragging the note around the displayed image. Note 1803 can be closed by simply selecting a delete button 1813 that is associated with the note. Once note 1803 is opened and if the note is not deleted or moved to another image, the note remains associated with the image. Note 1803 can be moved to another image by selecting the note with a pointer icon and dragging the note like an object to a thumbnail of the other image located in tool area 1002.

Figure 77:
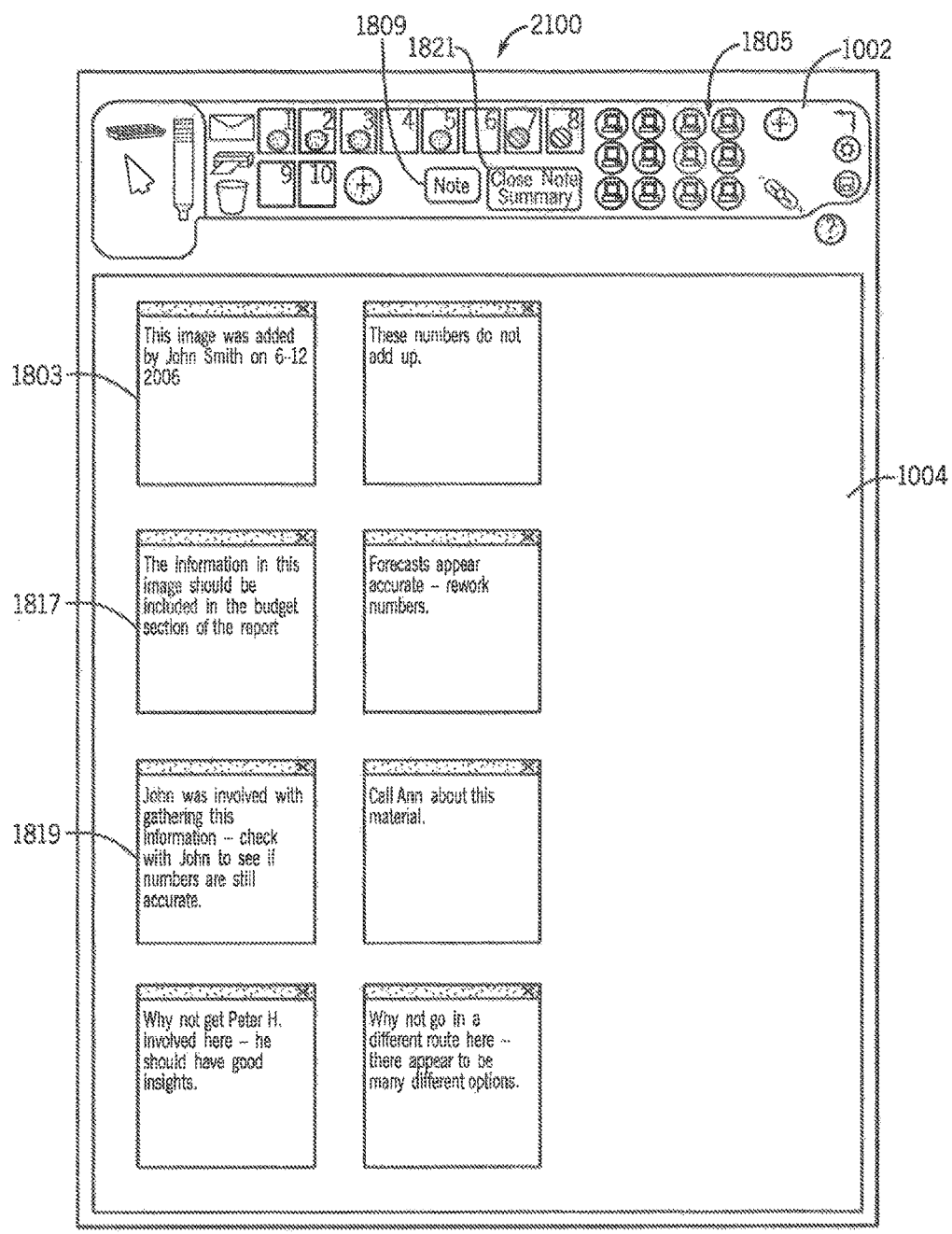
FIG. 77 is a screen shot illustrating a notes summary page that is consistent with at least some contemplated embodiments.

In at least some cases it is contemplated that a tool may be provided whereby all notes associated with session images can be viewed on a summary page and that images associated with the notes could then be accessed via the master unit by selecting associated notes. To this end, referring still to FIG. 65, a "Notes Summary" icon 1811 is provided in tool area 1002 that, when selected, may cause a notes summary screen shot 2100 to be illustrated as in FIG. 77. In FIG. 77, a plurality of notes that are associated with a current session image set are shown in workspace 1004 including notes 1803, 1817, 1819, etc. When a note is selected (e.g., a double tap via a pointing stylus device), in at least some embodiments an image associated with the selected note is provided in space 1002. As shown in FIG. 77, when a notes screen shot is provided in space 1004, a "Close Notes Summary" icon 1821 is provided in tool area 1002 that can be selected to close the notes screen shot and replace a previously displayed image in workspace 1004. In at least some embodiments, although not illustrated, it is contemplated that date, time and author information associated with notes will be stored in a database so that notes corresponding to specific dates and times and/or specific authors can be accessed in a notes summary screen shot akin to image 2100 in FIG. 77. To this end, for instance, in one case a pull down menu may be associated with each of the remote device icons 1805 in tool area 1002 which includes a notes option so that author specific notes can be accessed. In another case a pull down menu may be associated with "Notes Summary" icon 1811 that can be selected so that a range of dates/times can be specified over which notes should be accessed in a summary format.

According to one other aspect, in at least some cases it is contemplated that pre-canned session templates may be stored in a system database that can be accessed at the beginning of a session to place some structure on session images. For instance, in at least some cases a session template may include a single page that includes a company logo. Here, where a template is a single page, when the template is used, the template may be provided each time a new image is generated so that all of the images in a session set include the logo or whatever else is included on the template. Thereafter the images may be altered in any of the ways described above. In other cases a template may include a plurality of pages (e.g., initial images) that are provided as the first or last pages in a session image set when a session is initiated. For instance, a company may want to enforce system rules wherein the first three pages of each session image set include standard session information such as a session title, a list of participants, session time and date information, participant time and date information, topics discussed, etc. Here, whenever a new session is started, an instance of a new session template may be opened that includes the three first pages and that either includes information gleaned by the master unit or that requires information to be added to the template by a user. Additional images generated during a session would initially be blank in this multiple page template example. In some cases it is contemplated that a large number of single and multi-page templates may be supported by the system so that a user can select any of the different template types. Other template types are contemplated. In at least some cases it may be that the initial or final template image order cannot be altered so that the location of the session information within a set of session images cannot be modified.

While the system described above is particularly useful when used to link several persons together during a conferencing session, in at least some cases session images may be accessed, viewed and/or edited offline and then restored for subsequent on line access. To this end, in at least some cases it is contemplated that a remote device user may log onto the server associated with a master unit, download a session including a plurality of images and then disconnect from the master unit server. Thereafter, the remote device user may be able to edit the session images in any of the ways described above using the remote device. After editing, the remote user can then re-access the master unit server and upload the edited session images for subsequent access during a conferencing session or for access by another remote device user for independent review and editing.

According to yet another aspect, some systems may include customizable help screens that allow an information technology (IT) department to provide customized help information such as a phone number or an e-mail link for contacting the IT department when help is needed. For instance, whenever the master unit is first activated to start a new session, a help splash screen may be provided via the master workspace that includes the IT department contact information. As another example, in addition to providing topical information to a system user when selected, a help button 1829 (see FIG. 65) may be selectable to access a customized IT department contact screen shot (not illustrated).

According to still another aspect, some systems may include a system news button 1831 (see FIG. 65) that is selectable to access downloadable system content (e.g., templates, new software tools for the master unit, etc.) and to provide news about new system features and ways to use the system most efficiently. Here, in at least some cases, it is contemplated that when button 1831 is selected, a list of news topics and perhaps a list of downloadable content would be provided via the master unit that could be selected in any fashion known in the art.

In at lest some applications it is contemplated that the system described above may support a Lightweight Directory Access Protocol (LDAP) (e.g., may be made active directory (AD) aware) so that a system administrator can easily manage who has access to the system applications supported by an entity (e.g., by a company). As with other active directory aware applications, the administrator would be able to grant and take away authorization to access system sessions as well as to open and/or edit session images.

In addition to the systems and components described above, other systems that employ portable projectors and either a portable easel like the easels described above (see again FIG. 24) or a portable/mobile podium are contemplated. To this end, referring to FIG. 78, one exemplary presentation kit system 2202 is shown in a conference space 2200 where the conference space 2200 includes a wall 2206 on which images may be projected and a single entry 2204. In the illustrated example in FIG. 78, eight separate presentation spaces identified by numerals 2208, 2210, 2212, 2214, 2216, 2218, 2220 and 2222, respectively, are illustrated on wall 2206. Kit system 2202 includes a portable podium assembly 2224 and first, second, third and fourth projector carts identified by numerals 2226, 2228, 2230 and 2232, respectively. Each of the carts 2226, 2228, 2230 and 2232 is similarly constructed and operates in a similar fashion and therefore, in the interest of simplifying this explanation, only cart 2226 will be described here in detail.

Figure 78:
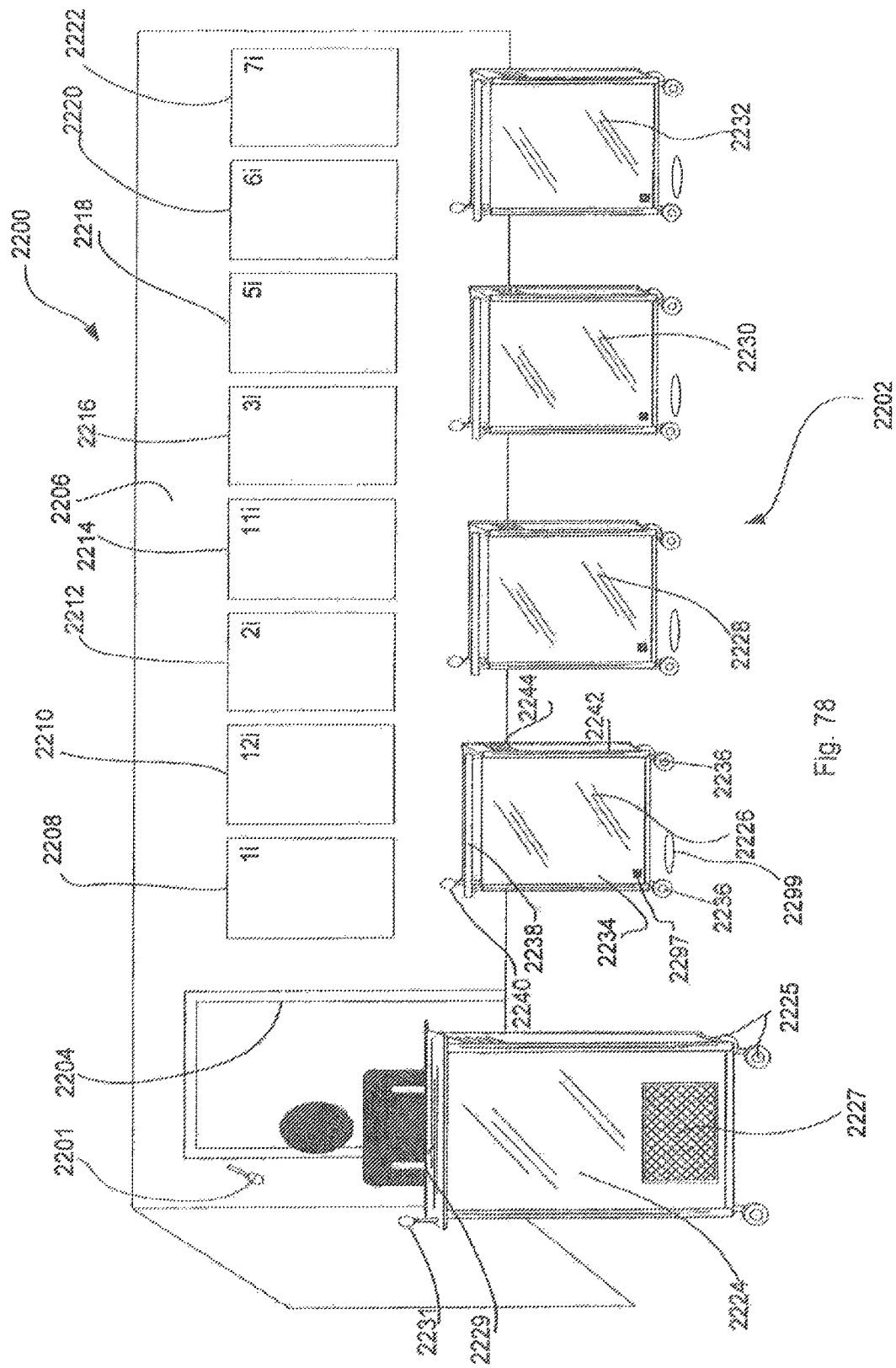
FIG. 78 is a schematic illustrating an exemplary wireless portable kit system according to another embodiment of the invention.
Figure 79:
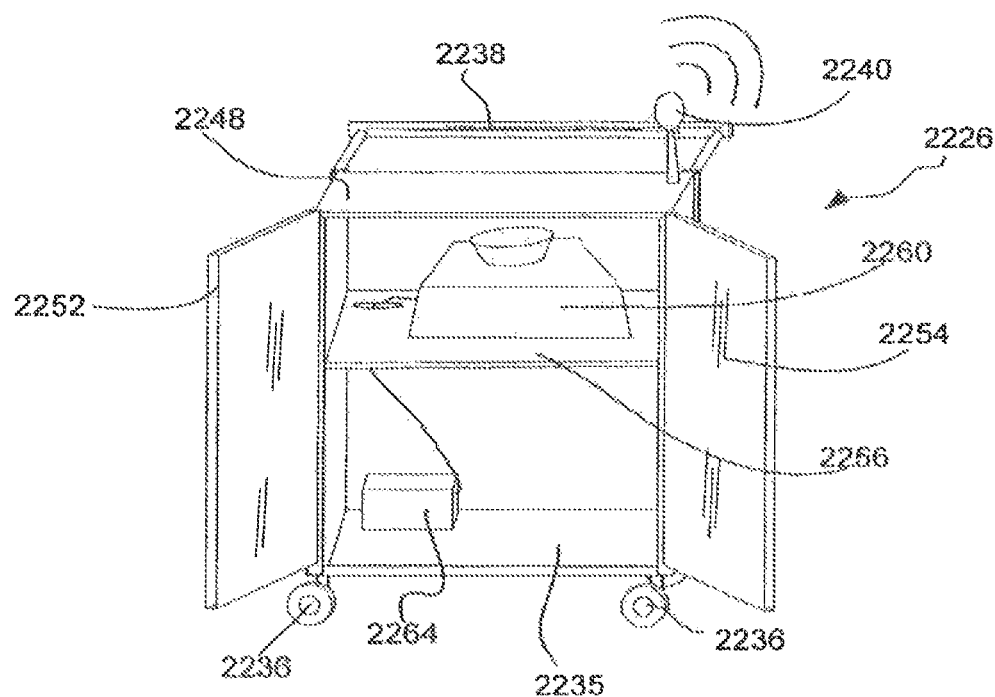
FIG. 79 is a perspective view of one of the portable projector carts of FIG. 78.
Figure 80:
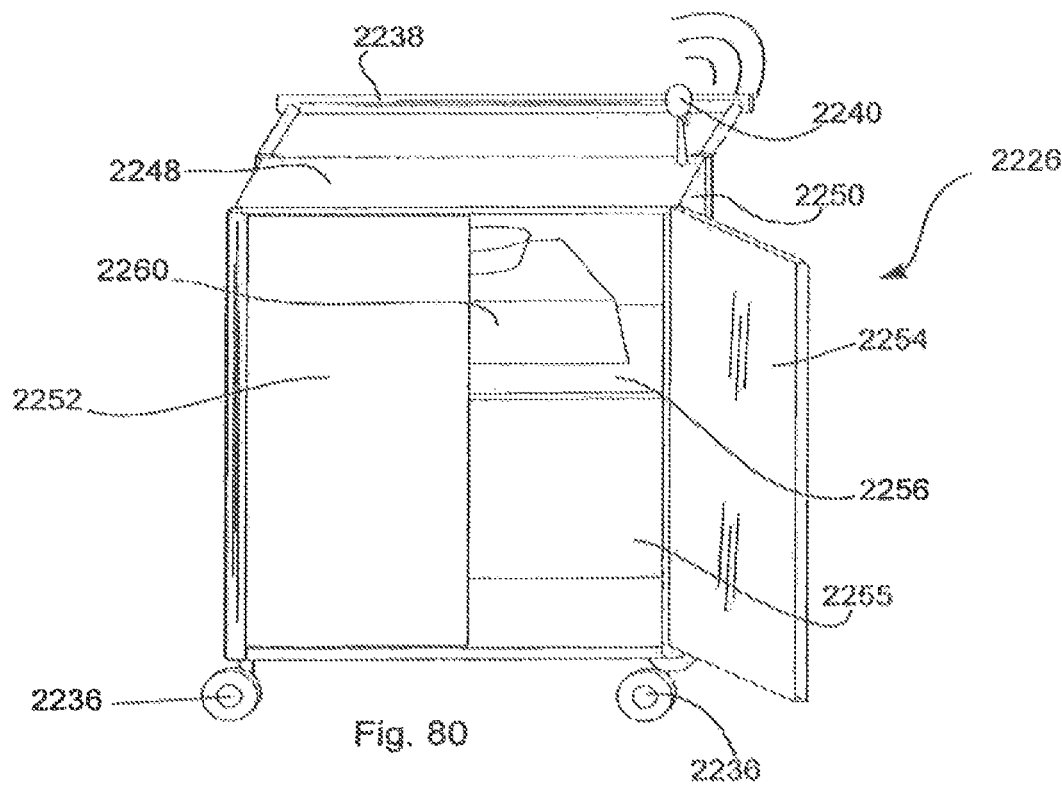
FIG. 80 is similar to FIG. 79, albeit showing one of the doors of the cart in a closed position.
Figures 81, 82:
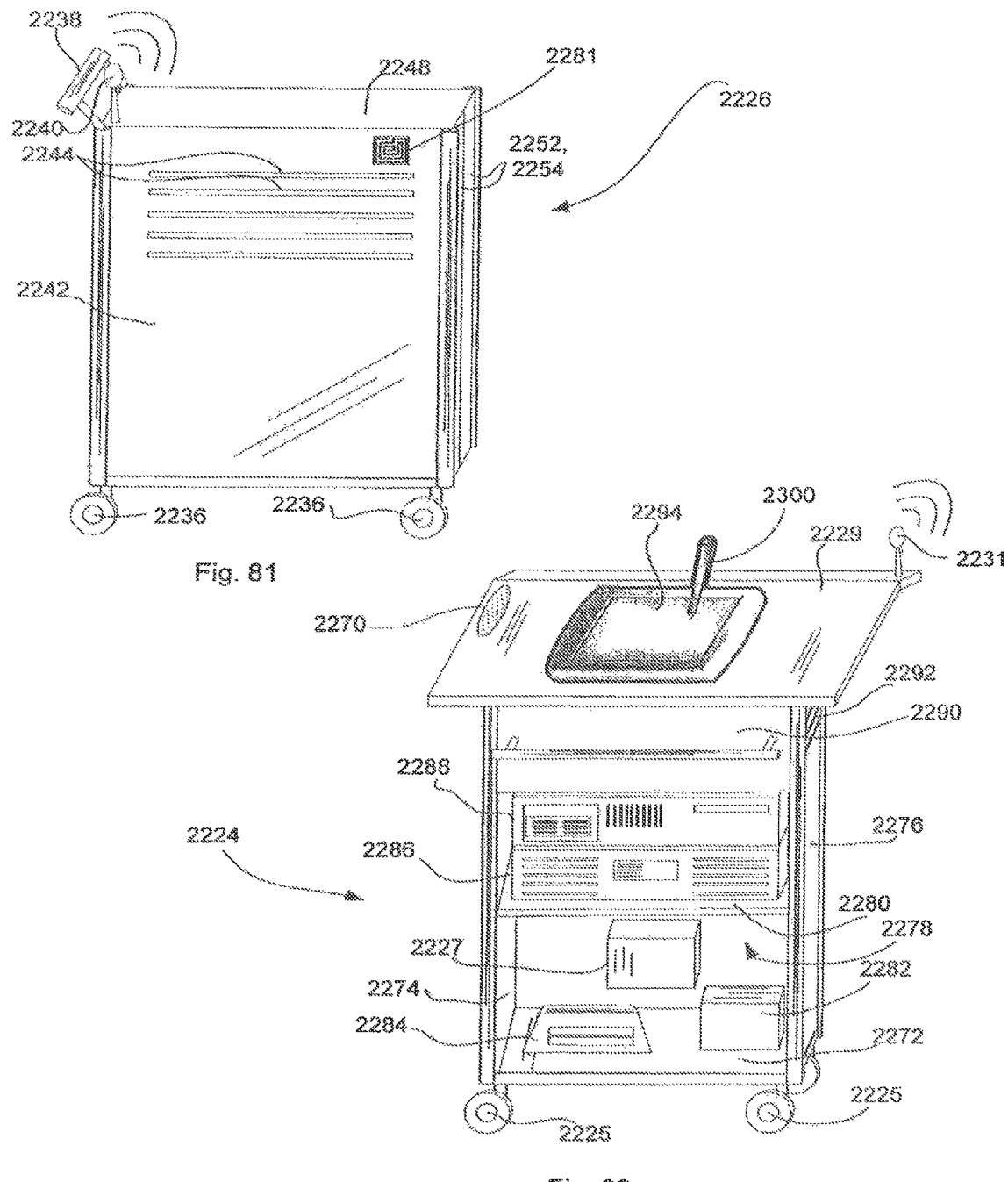
FIG. 81 is a side perspective view of the cart of FIG. 79, albeit with the doors in the closed position.
FIG. 82 is a perspective view of the portable podium assembly of FIG. 78.

Referring still to FIG. 78 and also to FIGS. 79, 80 and 81, exemplary cart 2226 includes a bottom member (not labeled), first and second lateral wall members 2242 and 2250, a rear wall member 2234, first and second door members 2252 and 2254, a top member 2248, a shelf member 2256, a handle 2238, four wheels collectively identified by a numeral 2236, a projector 2260, and in the embodiment shown in FIG. 79, a power supply 2264 and a wireless transceiver (i.e., a receiver/transmitter) 2240.

Bottom member 2235 is a rigid rectilinear and substantially horizontal member. Wheels 2236 are mounted to the undersurface of bottom member 2235, one adjacent each of the four corners of member 2235 so that member 2235 and other cart components secured thereto can be moved about in conference space 2200 and out of space 2200 to other areas (e.g., into other conference spaces, private offices, etc.) for use.

Lateral wall members 2242 and 2250 have similar configurations and function in a similar fashion and therefore only member 2242 (see FIG. 81) will be described here in detail. Member 2242 is a rigid rectilinear member that extends along one of the straight edges of bottom member 2235 and upward therefrom. Member 2242 forms a plurality of vent slots 2244 proximate a top end thereof. Slots 2244 are horizontal in the illustrated embodiment but may take other forms (e.g., vertical slots, circular openings, etc.) in other embodiments. Lateral member 2242 is rigidly mounted at a lower edge along the edge of member 2235 as illustrated. When members 2242 and 2250 are mounted, they are substantially vertical and are spaced apart along opposite edges of member 2235.

Referring still to FIGS. 79 through 81, top member 2248 has a shape and dimension similar to the shape and dimensions of bottom member 2235 and traverses the distance between top edges of the first and second lateral wall members 2242 and 2250. Top member 2248 is transparent and, to that end, may be formed of a Plexiglas type material or a tempered glass material.

Rear wall member 2234 is a rigid rectilinear member that extends along and from a rear edge of bottom member 2235 up to and along a rear edge of top member 2248 and extends between rear edges of the first and second lateral members 2242 and 2250, respectively.

Each door member 2252 and 2254 is a rigid rectilinear member having a height dimension similar to that of rear member 2234 and having a width dimension (not labeled) that is about half the width of rear wall member 2234. Member 2252 is hingedly mounted along a front edge of lateral wall member 2242. Similarly, door member 2254 is hingedly mounted along a front edge of lateral wall member 2250.

The bottom wall member 2235, top wall member 2248, lateral wall members 2242 and 2250, rear wall member 2234 and door members 2252 and 2254 together form an internal chamber 2255. Shelf member 2256 is mounted within chamber 2255 and is substantially horizontal when mounted. Doors 2252 and 2254 can be opened as shown in FIG. 79 or closed as door 2252 is shown in FIG. 80. Handle 2238 extends upward and rearward from rear wall member 2234 and can be used to push cart assembly 2226 during transport. Wireless transceiver 2240 is mounted to and extends up from top member 2248.

Referring still to FIG. 79, projector 2260 is supported on a top surface of shelf member 2256 within chamber 2255 and just below transparent top member 2248. Projector 2260 is positioned and oriented such that when the projector is turned on, images projected thereby are projected through transparent top member 2248 and toward a presentation space or surface formed by a structure such as wall 2206 that is adjacent the door members 2252 and 2254. In at least some embodiments each projector is a short throw projector so that when the projector cart is placed adjacent a wall, images can be projected onto the wall for viewing. In the wireless embodiment described here, each of the projectors may include a memory and a projector driver. The memory is capable of storing images to be generated for the projector and the driver is provided to drive the projector to display images. Thus, after an image is transmitted from the podium assembly or some other source to a projector cart, the image can be stored at the cart and displayed independent of the podium and until another image is received to be displayed. In other embodiments the projectors may not include separate memory and drivers and instead, images and video to be projected may be wirelessly transmitted (e.g., at 30 frames a second) from the system server 2286 (see FIG. 82) to each of the projectors.

Referring still to FIG. 79, a power supply 2264 (e.g., a battery pack) is provided below projector 2260 for providing power to projector 2260. Although not shown, where power supply 2264 is a battery pack, the supply may include a cable for linking a power outlet for recharging the battery.

Referring again to FIG. 78 and also to FIG. 82, exemplary podium assembly 2224 includes a bottom wall member 2272, first and second lateral wall members 2274 and 2276, a top work surface member 2229, a rear wall member (not labeled), a shelf member 2280, a drawer subassembly 2290, wheels collectively identified by numeral 2225, a power supply 2282 (e.g., a rechargeable battery), a speaker 2227, a printer 2284, a server 2286, a DVD player 2288, a wireless transceiver 2231, a microphone 2270 and an input/output (I/O) tablet or device 2294. Bottom member 2272 is a rectilinear rigid and substantially horizontal member that has wheels 2225 mounted to an undersurface thereof such that member 2272 and other podium assembly components can be moved/transported within conference space 2200 and indeed out of space 2200 and to other locations for use.

Lateral members 2274 and 2276 are rigid rectilinear members and extend upward from and along opposite edges of bottom member 2272. Each lateral wall member 2274 and 2276 forms vent slots 2292 for venting heat generated by electronics (e.g., the server 2286, the DVD player 2288, etc.).

Top work surface member 2229 is a rigid rectilinear member that is mounted at the top edges of lateral wall members 2274 and 2276. In the illustrated embodiment, at least a portion of member 2229 is slanted or angled from a rear edge down to a front edge so that materials placed thereon are supported at a comfortable angle for use by a podium user. Microphone 2270 is mounted to top member 2229 to pick up speech of a person using podium assembly 2224.

Rear wall member 2227 is a rigid rectilinear and substantially vertical member that extends from a rear edge of bottom wall member 2272 up to and adjacent a rear edge of top member 2229 and that traverses the distance between the rear edges of the lateral wall members 2274 and 2276. Thus, rear wall member 2272, lateral wall members 2274 and 2276 and top wall member 2229 together form an internal podium chamber 2278.

Shelf member 2280 is mounted within chamber 2278 and forms a substantially horizontal top surface when mounted. Drawer subassembly 2290 is mounted just below top member 2229 within chamber 2278 for sliding movement between a closed position (as illustrated in FIG. 82) and an open position (not illustrated) wherein an internal space formed by the drawer subassembly 2290 can be accessed. When not in use, I/O tablet 2294 can be placed within drawer subassembly 2290 for storage and/or transport.

Referring still to FIGS. 78 and 82, the rear wall member forms an opening near a lower end to accommodate speaker 2227 which is mounted therein. When a podium user speaks and the speech is picked up by microphone 2270, the speech is amplified via the speaker 2227 for an audience to hear. In addition, when software is operated or a DVD or other movie-type presentation occurs that includes sound, the sound therefrom can be amplified for an audience to hear via speaker 2227.

Referring to FIG. 82, server 2286 is supported on the top surface (e.g., may be rack mounted) of shelf member 2280 and DVD player 2288 is supported on the top surface of server 2286 just below drawer subassembly 2290. Here, it is contemplated that server 2286 may include a processor capable of running software to facilitate any of the functions described with respect to other embodiments above.

Referring yet again to FIG. 82, power supply 2282 and printer 2284 are positioned on a top surface of bottom member 2272. Supply 2282 may include a battery for providing power to server 2286, DVD player 2288, printer 2284, I/O tablet, etc. where supply 2282 is a battery, the battery may be rechargeable and may include a cable for connecting to a power outlet. Wireless transceiver 2231 is mounted to the top surface of top member 2229 and is capable of transmitting information to and receiving information from the wireless transceivers mounted on each of the carts (e.g., see 2240 in FIG. 81). I/O tablet 2294 may be hardwired to server 2286 or, in the alternative, may be a wireless tablets capable of communicating with server 2286 via transceiver 2231.

Figure 83:
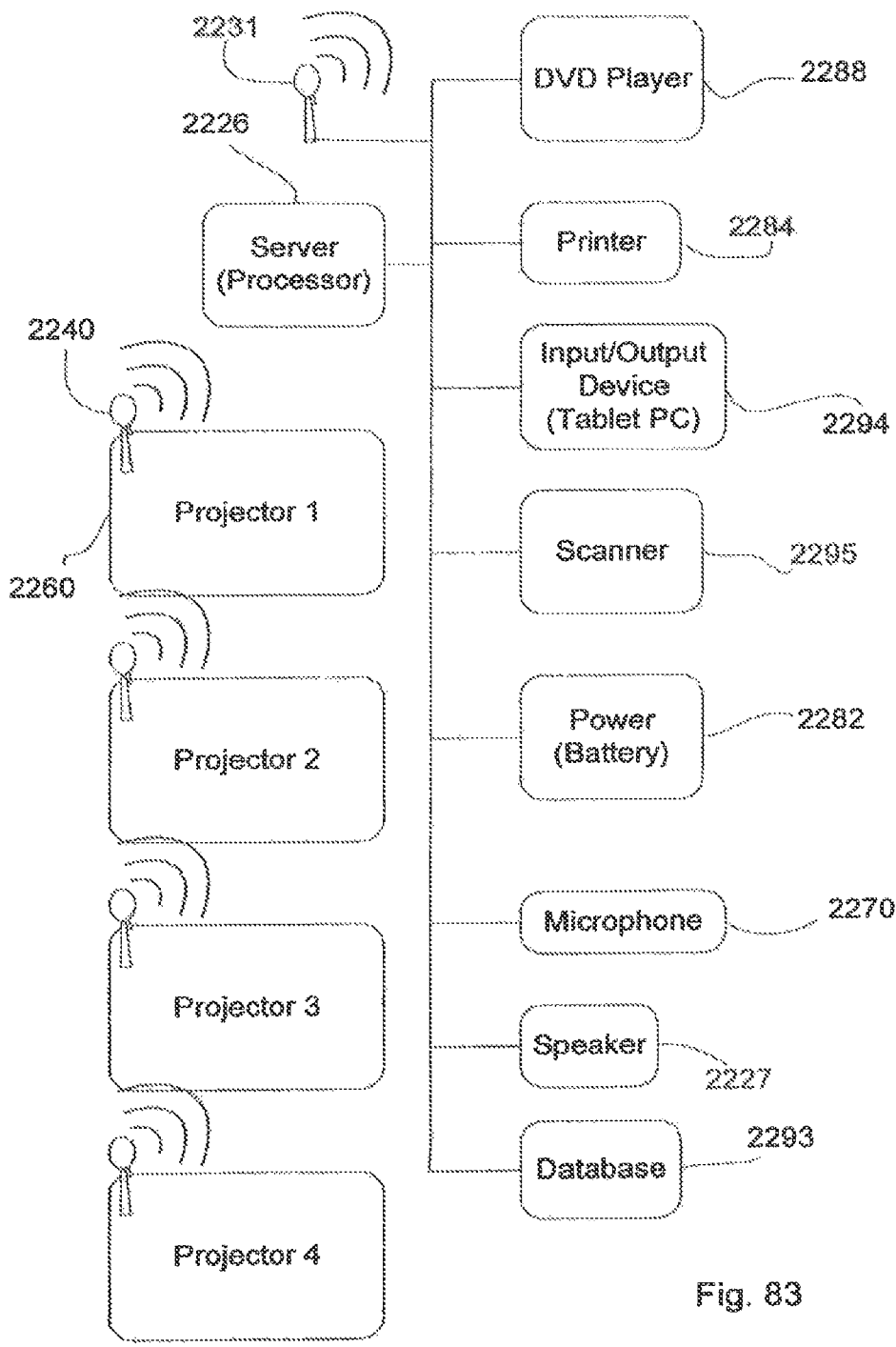
FIG. 83 is a schematic view showing various components of the podium assembly of FIG. 78.

Referring still to FIG. 82 and also to FIG. 83, server 2286 is hardwired within the podium cabinet to wireless transceiver 2231, DVD player 2288, printer 2284, power source 2282, microphone 2270 and speaker 2227. In addition, server 2286 may be hardwired (or wirelessly connected) to a scanner 2295 (not illustrated in FIG. 82) housed in the podium cabinet and, in at least some cases, a portable database 2293 also housed in the cabinet. In the illustrated embodiment of FIG. 83 the server 2286 is also hardwired to I/O tablet 2294 although this linkage may be wireless as indicated above. Here, server 2286 transmits image data to the projectors in the portable carts (e.g., 2226) wirelessly via the transceiver 2231 and the cart mounted receivers (e.g., 2240 in FIG. 79).

Referring still to FIGS. 82 and 83, while the illustrated embodiment includes the server, a printer, a DVD player and other components mounted in the podium cabinet, it should be appreciated that those components could be located elsewhere and could be linked either wirelessly via transceiver 2231 or a wireless access card in the I/O tablet 2294 or via a hardware cable. For example, server 2286 could be located within an information technology room of a building that includes conference space 2200 or indeed in some other building. Similarly, while server 2286 may be podium mounted, the database 2293 used thereby may be separate from the podium and linked to either via hardware cables or via transceiver 2231.

Referring once again to FIG. 78, to use the kit system 2201, a user moves the four projector carts 2226, 2228, 2230 and 2232 into conference space 2200 and moves podium assembly 2224 into space 2200, and positions the projector carts in a line proximate wall 2206 as illustrated so that when the projectors project, the projected images are directed at wall 2206. Next, the user places podium assembly 2224 in an advantageous position with respect to an audience within space 2200, associates the projectors within the projection carts with the podium which is to operate as a master presentation unit and then starts a collaboration session using the kit system 2202.

In the illustrated embodiment, it is presumed that each one of the projectors in carts 2226, 2228, 2230 and 2232 is configured to project two separate flip chart sized images onto projection or presentation wall 2206. For example, the projector in cart 2226 projects the images into presentation spaces 2208 and 2210, while the projector in cart 2228 projects the images into spaces 2212 and 2214, and so on. Here, images are transferred to the projectors wirelessly via podium transceiver 2231 and the projection cart transceivers (e.g., 2240).

In at least some embodiments, it is contemplated that the process of associating the master presentation unit (e.g., the podium 2241) and the projector carts 2226, 2228, 2230 and 2232 may be similar to the process described above with respect to FIG. 25 except that there is no need to identify one of the units as a master unit. In the kit system 2202, podium assembly 2224 is always the master unit. Here, if six projector carts are located within space 2200 and the kit user only wants to use the four projector carts illustrated in FIG. 78, the user may use the podium (e.g., the I/O tablet 2294, server 2286 and transceiver 2231) to poll the projectors in the conference space 2200 and receive a list via the I/O tablet 2294 (see again FIG. 82). Here, polling to generate the projector inventory list would include transmitting a signal from server 2286 to each projector in space 2200 requesting that the projector respond by transmitting a message that identifies the projector via a projector specific ID code. When the ID codes are received, server 2286 generates the inventory list, provides the list via I/O tablet 2294 and provides on-screen tools to select projectors from the list to be associated with the server 2286 during the session to be facilitated.

In the present example, the user would select the projectors associated with the four carts illustrated in FIG. 78 via the I/O tablet 2294 to associate therewith. After selection of the projectors associated with the four illustrated carts, the server 2286 configures the presentation software to support the four projectors and to allow the I/O tablet user to manipulate images displayed by the four projectors. In this regard, where each projector is to project two separate images as shown in FIG. 78, a display screen including a tool bar like the one shown in FIG. 50 may be provided that shows eight thumbnail icons within representation area 1302 that correspond to the eight projected images.

In some embodiments where a facility (e.g., conferencing space 2200) already includes an existing wireless infrastructure including access points or the like, the system 2202 may use the existing wireless infrastructure to facilitate communication and data transfer among the system components.

As another example of how the podium and carts can be associated, the projector cart and podium transceivers (e.g., 2231; 2240) may be able to transmit identification information to wireless access points within or proximate space 2200 that can be used in a triangulation process to determine the locations of those resources and more specifically that those resources are located within space 2200. Once the resources in space 2200 have been identified, the projector inventory list may be provided to an I/O tablet user for selection and association.

Referring to FIGS. 50 and 78, to minimize confusion during a presentation session and to configure a system that operates in an intuitive fashion, the order of images projected by the kit projectors associated with a podium 2224 should match the order of thumbnail icons in the representation area 1302 provided on the display of the I/O tablet 2294. Thus, as illustrated in FIGS. 50 and 78, where the thumbnail icons in area 1302 include, from left to right, thumbnails 1, 12, 2, 11, 3, 5, 6 and 7, the displayed images should include corresponding images 1i, 12i, 2i, 11i, 3i, 5i, 6i and 7i. For this reason, it is important that the projector and cart 2226 closest to the podium 2224 in FIG. 78 be associated with the first and second presentation spaces 2208 and 2210 and the first and second thumbnails in area 1302, that the second closest projector and cart 2228 be associated with the third and fourth presentation spaces 2212, 2214 and the third and fourth thumbnails in area 1302, that the third closest projector and cart 2230 be associated with the fifth and sixth presentation spaces 2216 and 2218 and the fifth and sixth thumbnails in area 1302 and that the farthest projector and cart 2232 be associated with the seventh and farthest or eighth presentation spaces and the seventh and eighth thumbnails in area 1302.

To automatically associate specifically and relatively positioned projectors with specific thumbnail icons within area 1302, where projectors and the podium 2224 transmit identification codes to access points that are useable to determine projector and podium locations via triangulation or the like, the relative locations of projectors and the podium 2224 in space 2200 can be determined automatically. Once relative locations within the space 2200 are known, server 2286 can automatically associate projectors with thumbnail icons in the representation area 1302. Here, if the order of projectors/carts were changed for some reason, the new locations could be automatically determined. Moreover, if one of the projectors malfunctioned or was needed at another location during a session, the projector could be removed from the operating list and the server 2286 could reassociate thumbnail icons and projectors as needed. For example, assume the projector associated with third cart 2230 malfunctions half way through a presentation and has to be removed from the operating kit. Here, once cart 2230 is moved out of the line of carts, cart 2232 can be moved over to a location adjacent cart 2228 and an automatic reassociation can occur so that the projector in cart 2232 is associated with the fifth and sixth thumbnail icons in area 1302 (see again FIG. 50). Because only six images would be displayed via the kit projectors instead of the original eight, the representation area 1302 in FIG. 50 would be reduced to a size including six icons.

One other way to track and generate an inventory list of podium/projectors in space 2200 is to provide ID tags on each resource and provide a sensor system at each entry (e.g., 2204) into space 2200. Referring again to FIG. 78, an exemplary wireless sensor 2201 is provided proximate entry 2204 for sensing resource tags. Although not illustrated, sensor 2201 is linked to a server that tracks resource locations. In at least some embodiments, the tags may be RF ID tags and sensor 2201 may be an RF ID sensor. In this regard, see again FIG. 81 where an exemplary RF ID tag 2281 is shown mounted to the external surface of the side wall 2242 of cart 2226. Here, when cart 2226 passes through entry 2204, sensor 2201 collects identification information from tag 2281 and the inventory server adds the projector in cart 2226 to the inventory list for space 2200. When cart 2226 is removed from space 2200, the inventory server removes the projector in cart 2226 from the inventory list. Tags 2281 may be passive or active (e.g., able to transmit as in the case of RF ID tags).

In some spaces (e.g., 2206), because of space layout, it may be that projectors are always to be used to project on a single wall. Here, referring again to FIG. 78, another inventory type system may provide RF ID tags (e.g., 2297) or the like on an undersurface of each cart or proximate a lower end of the cart and separate RF ID sensors (e.g., 2299) may be mounted in the floor proximate the locations at which the projector carts are typically located. In this case, when a cart is located proximate a sensor, the sensor may obtain ID information from the tag and a server linked to the sensors may automatically associate the cart and projector therein with the location within space 2200.

Figure 84:
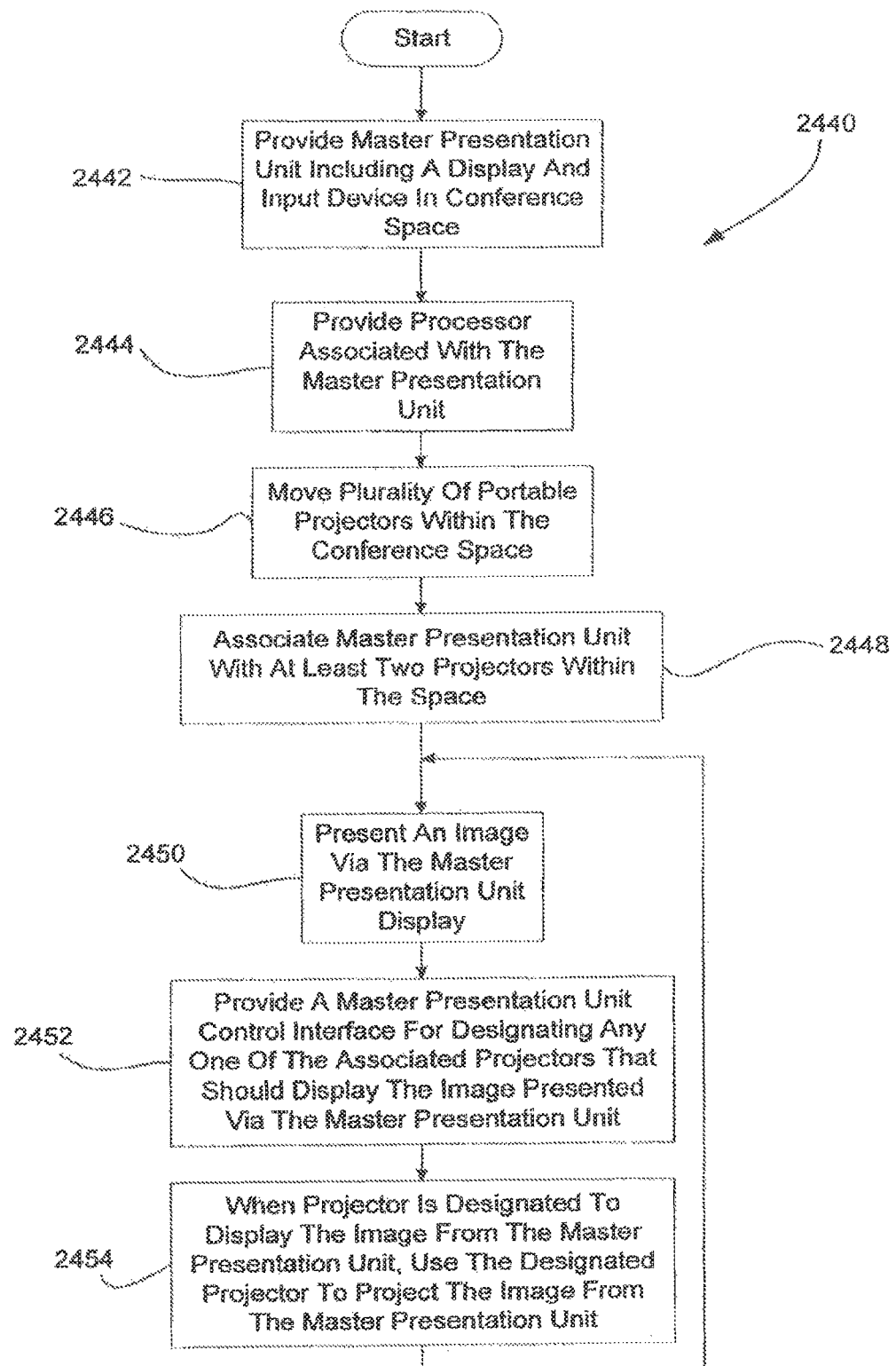
FIG. 84 is a method that may be performed using the system of 78.

Referring now to FIG. 84, an exemplary method 2240 performed using the kit system 2202 described above is illustrated. At block 2442, the master presentation unit or podium 2224 that includes I/O tablet 2294 is moved into conference space 2200. At block 2444, a processor is associated with the master presentation unit. Here, where a server 2286 is mounted within the podium assembly 2224 as shown in FIG. 82, the server processor is already provided. In other cases where a server is separate from the podium assembly, the step of providing a processor may require linking of the I/O tablet 2294 to the server.

Referring still to FIGS. 78 and 84, at block 2446, a plurality of portable projector carts (e.g., 2226, 2228, 2230 and 2232) are moved into conference space 2200. At block 21, some process is performed to associate the podium assembly and server associated therewith with at least two of the portable projectors. Any of the associating processes described above may be used here. At block 2450, after the podium assembly 2224 and carts are associated, a presentation and conferencing session can commence wherein an image is accessed by the podium user via the display screen on the I/O tablet 2294. In addition, referring once again to FIG. 50, a control interface including the illustrated tool bar or another tool bar having similar functionality is provided via the I/O tablet 2294. At block 2454, the tablet PC user designates one of the projectors to receive and display the image currently on the table display, the image is transmitted to the designated projector via transceiver 2231 and the transceiver (e.g., 2240) associated with the designated projector and the designated projector projects the image into the appropriate presentation space (e.g., 2208, 2210, etc.). In the wireless case the projectors continue to project an image until another image is received or a command is received from the tablet to remove the image from the presentation space.

Figure 85:
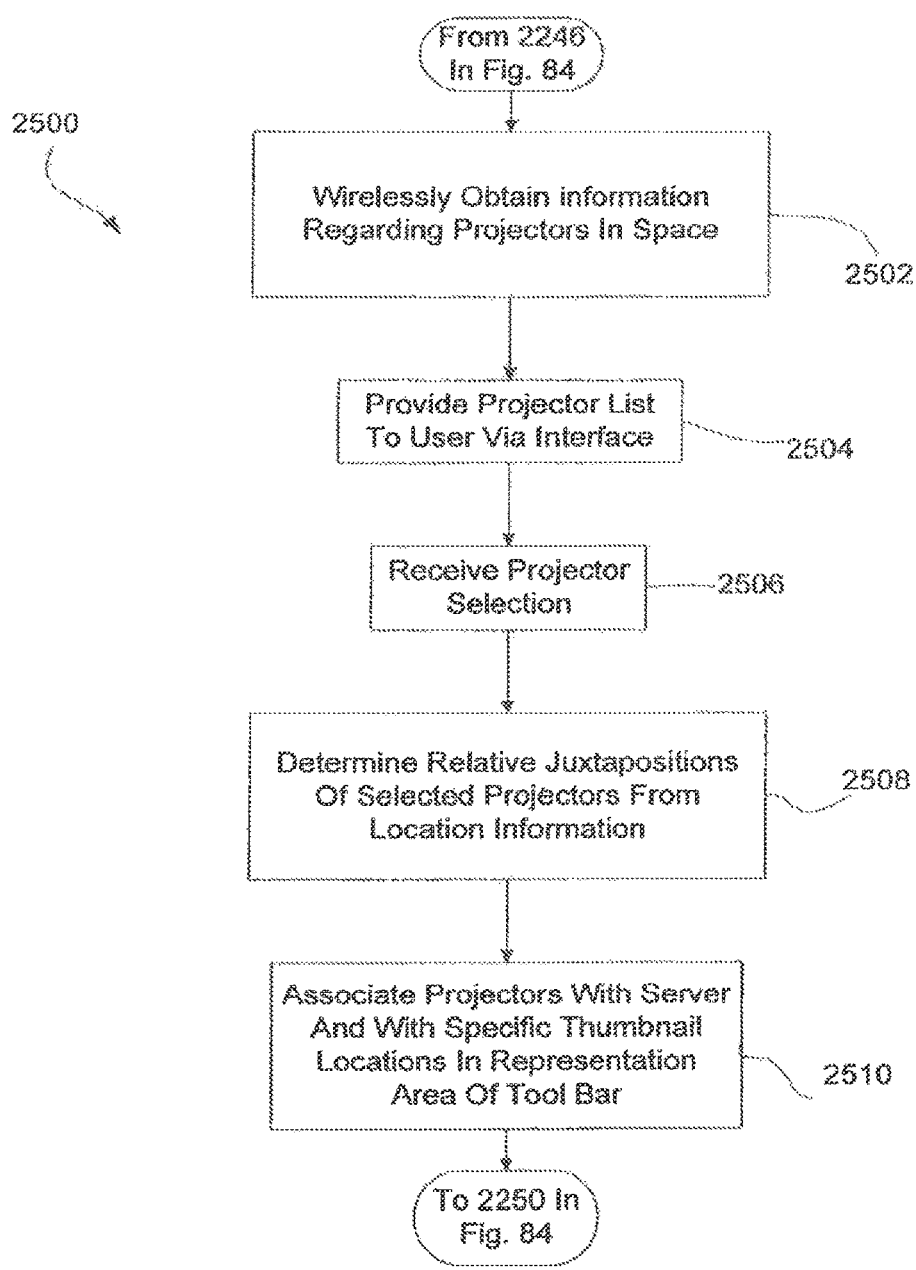
FIG. 85 is a subprocess that may be substituted for one of the method steps in the method of FIG. 84.

Referring now to FIG. 85, a sub-method 2500 that may be substituted for the associating block 2448 in FIG. 84 is illustrated where, in addition to associating a server with specific projectors, the relative juxtapositions of the projectors is used to associate the projectors with specific thumbnail icon locations in a thumbnail representation area like area 1302 in FIG. 50. Referring also to FIG. 84, after block 2446, control may pass to block 2502 in FIG. 85 where information regarding the projectors within space 2200 is wirelessly obtained via the cart transceivers (e.g., 2240) and access points within the space 2200. At block 2504, a list of the projectors within space 2200 is provided to the tablet PC 2294 user. At block 2506, the user makes a selection of the projectors to be used during the session. At block 2508, after the projectors to be employed have been selected from the list, location information obtained from the access points is used to determine a relative juxtaposition of the selected projectors within space 2200 and, more specifically, to determine which projector is closest to the podium 2224, which projector is second closest, which is third closest and which projector is farthest away from the podium. At block 2510, the selected projectors are associated with the presentation server 2286 and each projector is associated with specific thumbnail locations in the representation area 1302 (see again FIG. 50) of the interface tool bar. After block 2510 control passes back to block 2250 in FIG. 84.

Figure 86:
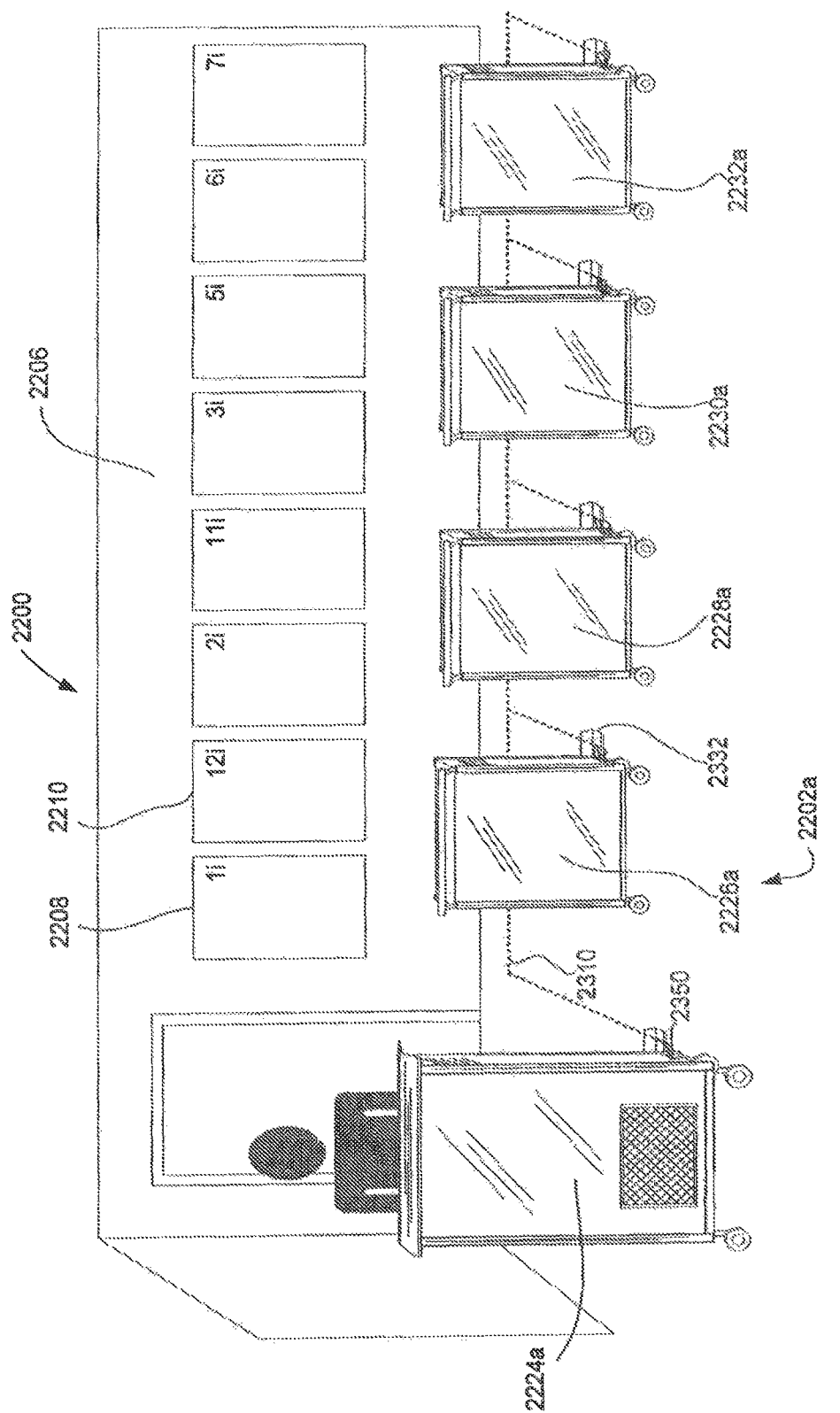
FIG. 86 is a schematic illustrating another kit assembly similar to the assembly of FIG. 78, albeit including hardwire cables connecting the system components together.

Referring now to FIG. 86, a second projector based kit system 2202a which is similar to the kit system 2202 shown in FIG. 78 described above is illustrated in conference space 2200. Kit 2202a includes a podium assembly 2224a, four projector carts 2226a, 2228a, 2230a and 2232a and a hardware network 2310 for linking the server in podium assembly 2224a to each of the projector carts 2226a, 2228a, 2230a and 2232a. In this regard, the hardwire network 2310 may be embedded in the floor of space 2200 or may be placed under the floor in the case of a raised floor space.

Referring still to FIG. 86, except for the way in which the server inside podium 2224a links with the projectors in the projector carts and the way in which the podium and cart components receive power, podium assembly 2224a is similar in construction and operation to podium assembly 2224 described above and the carts illustrated in FIG. 86 are similar to the carts illustrated in FIG. 78 and that are described above.

Figure 87:
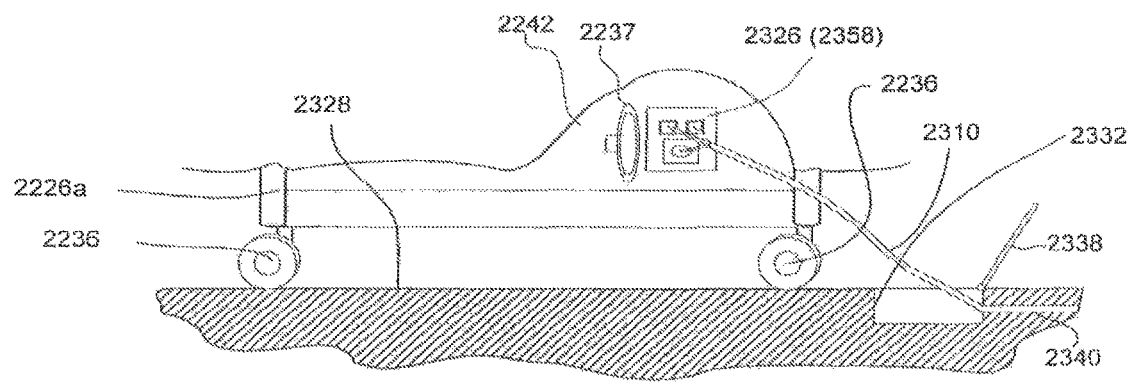
FIG. 87 is a partial side view of one of the carts of FIG. 86.

Referring once again to FIG. 86 and also to FIG. 87, to facilitate hardwired linkage between podium assembly 2224a and each of the carts 2226a, 2228a, 2230a and 2232a, podium assembly 2224a includes a power/data/video port 2263 mounted within one of the lateral side walls near a bottom edge of that wall and each of the carts includes a power/data/video port (see 2326 in FIG. 87) mounted in one of the lateral side walls near a lower edge.

Figure 88:
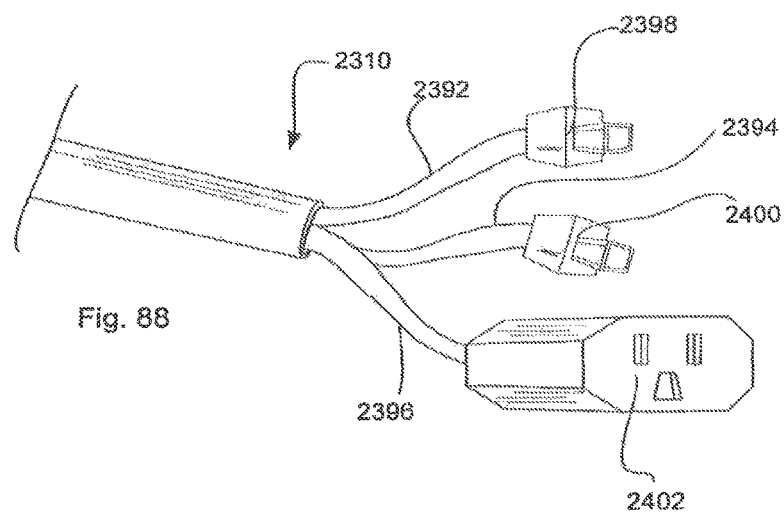
FIG. 88 is a partial perspective view of the power/data/video connector cable shown in FIG. 87.

Referring still to FIGS. 86 and 87 and now also to FIG. 88, the network 2310 includes power, data and video cable lines 2390 where each line includes separate data and video cables (e.g., CAT 5) 2392, 2394, respectively, that terminate with typical data connectors 2398 and 2400, respectively, and a power cable 2396 that includes a female power plug 2402. The terminating end of cable 2390 illustrated in FIG. 88 will be referred to herein as a power/data/video terminator. As shown in FIG. 86, a separate power/data terminator is provided for each of the podium assembly 2224a and the carts 2226a through 2232a proximate locations at which each of the podium assembly 2224a and each of the carts would ideally be used within space 2200 (e.g., proximate wall 2206). To conceal the terminators when the podium assembly and carts are not being used within space 2200, as shown in FIG. 86 and also in FIG. 87, a floor box 2332 may be provided for each termination assembly where the box includes a cover 2338.

Referring still to FIG. 86, in this embodiment, after podium assembly 2224a and the carts 2226a through 2232a are moved into space 2200, the podium assembly 2224a and carts are positioned adjacent the floor boxes and are linked as illustrated. Here, once the podium server 2286 is powered, the server 2286 can poll the network to identify the configuration of projectors linked to the network 2310 (i.e., the server can determine which projectors are linked and the positions of the projectors) and association can be performed automatically prior to commencing a presentation.

Referring now to FIGS. 89 and 90, a third projector based kit system 2202b is shown that includes a podium assembly 2224b and four projector carts 2226b, 2228b, 2230 and 2232b. Here, the podium assembly and carts are similar to the podium and carts described above with respect to FIGS. 79 through 82, the primary differences being how the podium and carts are linked for communication and power. In this case, podium assembly 2224b includes a power/data/ video port 2350 that is similar to the power/data/video port described above with respect to FIG. 87.

Each of the projector carts is similarly constructed and operates in a similar fashion and therefore, in the interest of simplifying this explanation, only cart 2226b will be described here in detail.

Cart 2226b includes a cart power/data/video network that includes first and second power/data/video splitters 2356 and 2372, respectively, and power/data/video cables 2368 that link the splitters 2356 and 2372. The splitters 2365 and 2372 are mounted in opposite ones of the lateral side wall members of cart 2226b. Each of the splitters 2356 and 2372 is similarly constructed and operates in a similar fashion and therefore, in the interest of simplifying this explanation, only splitter 2356 will be described here in detail.

Splitter 2356, as the label implies, includes a single external power/data/video port arrangement including power/data/video ports 2358 as shown in FIG. 87 that are flush with an external surface of the lateral wall member in which the splitter 2356 is mounted. Inside the cart, splitter 2356 includes first and second power/data/video port arrangements 2360 and 2364, each of which is linked to port arrangement 2358 so that data, power and video from arrangement 2358 can be provided to each of the split arrangements 2360 and 2364. The projector in cart 2226b may be linked to either of the internal arrangements 2360 or 2364 and the other of the arrangements 2360 or 2364 is linked to a similar power/data/video port arrangement 2361 associated with splitter 2372.

Referring still to FIGS. 89 and 90, jumpers or jumper cables are provided that can be used to link adjacent carts or to link the podium assembly 2224b to an adjacent cart to provide a power/data/video network between the podium and associated carts. In FIGS. 89 and 90, one jumper cable 2366 is shown linking the port 2263 of podium assembly 2224b to cart 2226b via the external arrangement 2358 of splitter 2356. Similarly, a jumper cable 2380 links second splitter 2372 of cart 2226b to the first splitter (not labeled) of adjacent cart 2228b, another jumper cable 2382 links splitters in adjacent carts 2228b and 2230b and one other jumper cable 2384 links splitters in adjacent carts 2230b and 2232b. The second splitter 2386 of cart 232b is not linked to another cart, but could be linked to another cart if a fifth cart were to be added to the kit system 2202b or if cart 2232b were swapped with one of the other carts illustrated in FIGS. 89 and 90.

Figure 91:
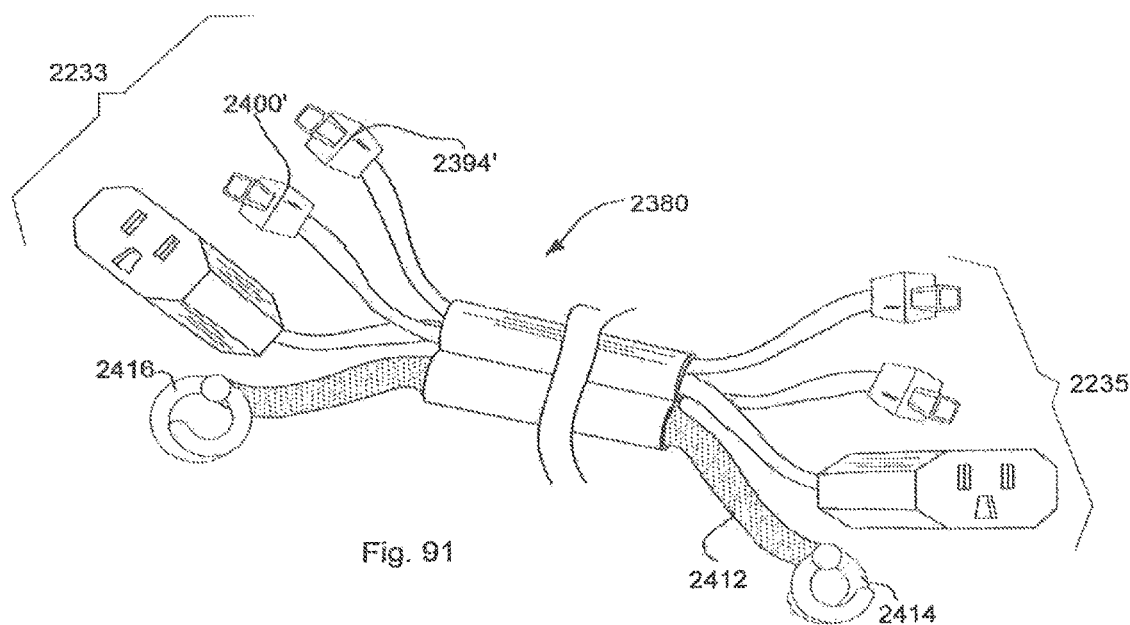
FIG. 91 shows one of the jumper cable assemblies of FIG. 90.

Referring now to FIG. 91, an exemplary jumper cable assembly 2380 is illustrated which includes power/data/ video terminators 2233 and 2235 that are akin to the terminators described above with respect to FIG. 88. In addition to the terminators, jumper cable assembly 2380 also includes a braided/twisted cable 2412 that includes mechanical clasps or connectors 2416 and 2416 at opposite ends. Referring once again to FIG. 87, in this embodiment, an eyelet 2237 is mounted adjacent the external splitter receptacle 2358 on each lateral side wall of each cart. The clasps 2414 and 2416 are designed to lock to the eyelets 2237 adjacent the splitter receptacles so that as one of the carts is moved, another cart connected thereto by the jumper cable assembly 2380 is pulled along by the braided cable 2412 in a train like fashion. The cable 2412 may be shorter than the power/data/video cables so that, as connected carts are moved, the power/data/video linkages are not pulled apart which could damage connectors/plugs.

Figure 92:
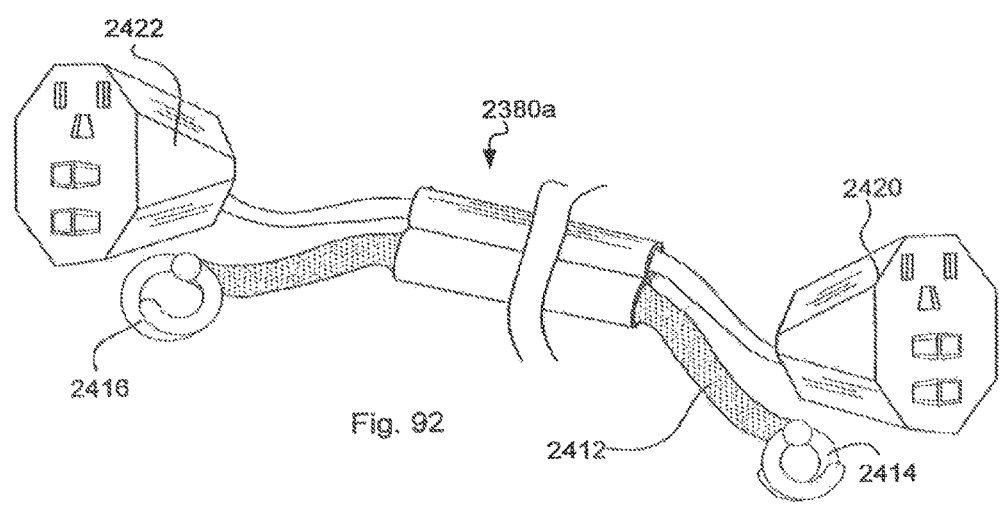
FIG. 92 is similar to FIG. 91, albeit showing a different embodiment of the jumper cable assembly

Referring now to FIG. 92, one additional exemplary jumper cable assembly 2380a is shown. Assembly 2380a is similar to the assembly 2380 in FIG. 91, the primary difference being that the power/data/video terminators at each end of the cable includes only a single power/data/video plug instead of three connectors (e.g., see plugs 2420 and 2422).

At this point, it should be appreciated that any of the kit systems illustrated in FIGS. 78, 86 and 89 and described above is particularly useful in that projectors that can be separately used for single projector presentations can be cobbled together relatively quickly and efficiently to form a kit system for displaying multiple images and for manipulating those images in various ways. In addition, it should be appreciated that the kits described above may be used with fewer or greater numbers of projector where larger numbers of projectors result in enhanced presentations.

Figure 93:
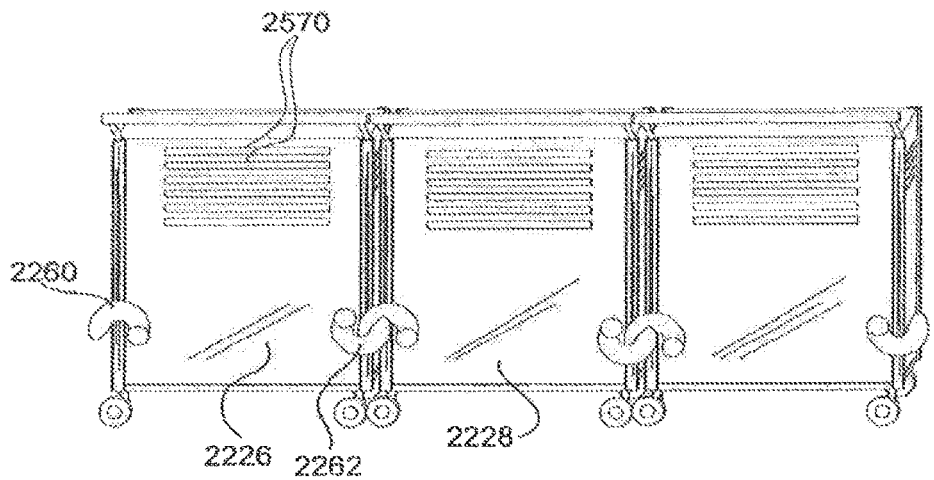
FIG. 93 is a perspective view of a set of portable projector carts that are locked or secured together via clasps type assemblies.

In addition to using a braided cable or the like to mechanically link adjacent carts together to form a "cart train", other types of mechanical linkages are contemplated. For instance, referring to FIG. 93, each projector cart may include mechanical clasps such as clasps 2260 and 2262 that cooperate with clasps on adjacent carts to rigidly secure adjacent carts together with very little, if any, space therebetween so that when one cart is moved, the others follow precisely. Other more complex clasping mechanisms are contemplated. Where carts are connected in an immediately adjacent fashion via clasps or the like, power/data/video linkages may be formed via the clasps or other mechanical connectors automatically or other dedicated network forming connectors akin to the jumper cables described above may be employed.

Figure 94:
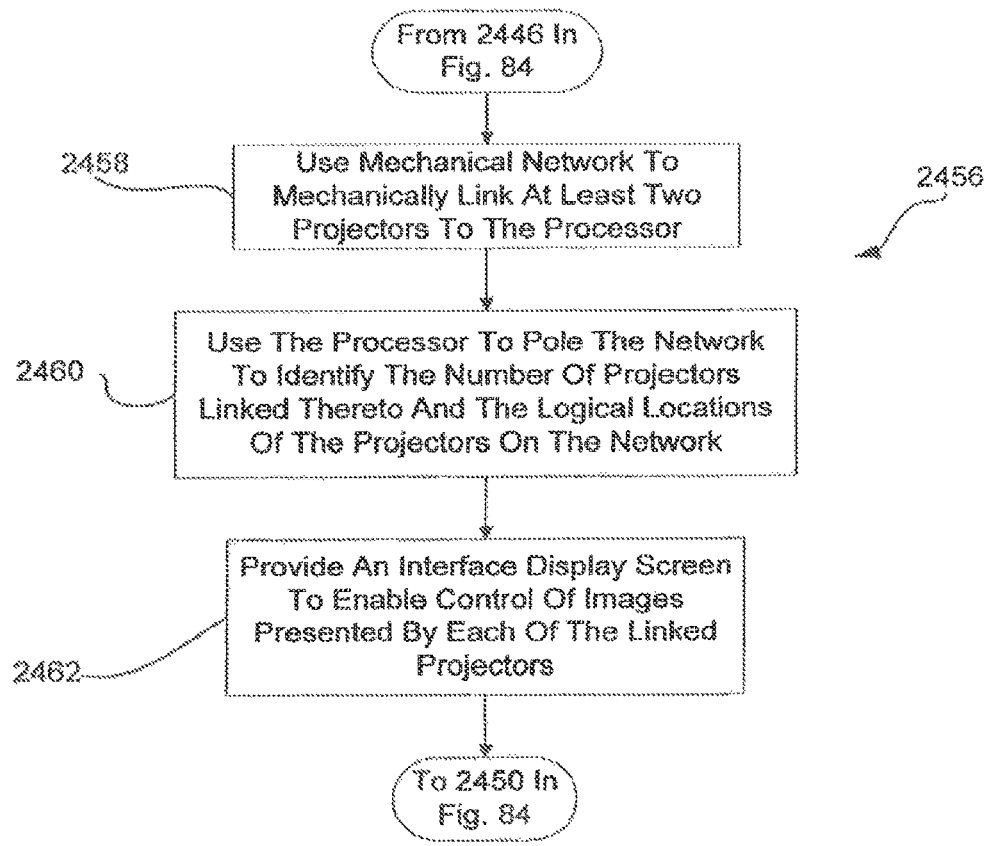
FIG. 94 is a subprocess that may be substituted for one of the steps in FIG. 84.

Referring now to FIG. 94, a subprocess 2456 that may be substituted for the associating block 2448 in FIG. 84 is shown that is useful when hardware communication and power cables are required to link projectors with a presentation server. Referring also to FIG. 84, after block 2448, control passes to block 2458 in FIG. 94 where a system user mechanically links the podium to the projectors in one of the fashions described above with respect to either of FIG. 86 or 89. At block 2460, the server processor polls the network to identify the number of projectors linked thereto and a logical location of the projectors on the network. At block 2462, the server processor provides an interface display screen via the tablet PC associated with the podium to enable control of images presented by each of the linked projectors using the I/O tablet. After block 2462, control passes back to block 2450 in FIG. 84.

While the invention may be susceptible to various modifications and alternative forms, specific embodiments have been shown by way of example in the drawings and have been described in detail herein. However, it should be understood that the invention is not intended to be limited to the particular forms disclosed. For example, referring again to FIG. 82, I/O tablet 2294 may be useable in either a portrait or landscape mode similar to the easel display screen described above with support to FIGS. 42 and 43 where the tablet image orientation rotates by 90° between the modes. In some cases a user may need to manually select a mode selection icon (see icon 1112 in FIG. 35) to change between portrait and landscape modes. In at least some embodiments the tablet 2294 may be mounted for rotation between landscape and portrait orientations and when the tablet 2294 is reoriented, the reorientation may be sensed (e.g., via a mechanical switch) and the image presented may be automatically switched to the appropriate mode as described above with respect to FIGS. 42 and 43. Referring again to FIG. 78 where each projector projects two landscape images (e.g., images 1i and 12i), when the table 2294 (see FIG. 82) is rotated to the landscape orientation in at least some embodiments it is contemplated that the projectors would each switch to projecting a single landscape image in the place of the two portrait images.

While an exemplary system is described above with respect to FIG. 31 and other figures that includes two subsystems 900 and 901 that are linked together, it should be appreciated that, in at least some inventive embodiments, only one of the subsystems may be required. Similarly, while an embodiment is described above that includes one or more personal interface devices 911, 913, 195, etc., that are linked to other system components, in at least some embodiments, interface devices like device 911 may not be linked.

In addition, in at least some embodiments, it is contemplated that a master unit user will be able to select where on the master unit the display screen tool area or areas will be provided. For example, in at least some cases, a master unit user will be able to select a button (not illustrated) near the lower end of master unit display screen causing the tool areas to be reoriented near the bottom of the display screen so that a person in a wheelchair can easily reach the tools.

Moreover, while a system is described above that includes a printer 2284 and that may also include a scanner (see 2295 in FIG. 83) mounted within a portable podium cabinet (see FIG. 82), in at least some embodiments a separate portable cart may be provided for the printer and/or the scanner. Here, the printer/scanner cart may be linkable to the other system resources and more specifically to the conferencing server 2286 either wirelessly (i.e., the cart may include a transceiver like transceiver 2240 in FIG. 81) or via power and data cables (e.g., see FIG. 88). In addition, or in the case of the projector carts above, the printer/scanner cart may be associable with the conferencing server 2286 in any of the ways described above that is suitable for the type (e.g., wireless or cabled) of network used to link the system resources.

Furthermore, while the mobile carts are described above in the context of systems that include podiums, in some embodiments the carts may be used with portable easel type master presentation units like the unit described above with respect to FIG. 24. In addition, each cart may also be used independently to facilitate projection functions or indeed without a master unit but with other projector carts to facilitate multiple projector presentations. Thus, a PC or the like may be used with multiple wireless or cable networked carts to facilitate a presentation.

In addition, while data and video may be transferred between resources wirelessly it may be that some systems include cable power connectors for providing power to each projector cart, printer/scanner cart, podium assembly and/or portable easel as batteries may not be practical given power consumption requirements of conventional equipment.

Thus, in the invention is to cover all modifications, equivalents and alternatives falling within the spirit and scope of the invention as described by the following claims. To apprise the public of the scope of this invention, the following claims are made.

What is claimed is:

1. A collaboration system for sharing digital content among a plurality of session attendees, the collaboration system comprising:
at least a first presentation device including at least a first presentation surface for presenting content to conference attendees in a space, the at least a first presentation surface including at least first and second independent presentation spaces for presenting content;
at least a first processor associated with the at least a first presentation device for controlling content presented in the presentation spaces;
at least a first interface linked to the processor, the at least a first interface enabling at least a first attendee to control content presented in the presentation spaces, the interface further enabling at least the first attendee to store session content as a session content set that correlates content presented in the presentation spaces with associated presentation spaces, the interface further enabling at least the first attendee to reaccess and re-present a session content set at a subsequent time on the at least a first presentation surface where, the processor presents content from a selected session content set in the same presentation spaces that the content was in when the session content set was most recently stored.

2. The system of claim 1 wherein the presentation surface further includes N presentation spaces where N is greater than 2 and wherein the processor presents content from the selected content set in each of the N presentation spaces that the content was in when the session content was most recently stored.

3. The system of claim 2 wherein at least the first user can use the interface to modify N.

4. The system of claim 2 wherein the interface is presented on the at least a first presentation device and includes a panel section where at least some session content is presented as thumbnail icons upon storage and wherein the processor re-presents the panel section including thumbnail icons upon re-presentation of the session content set.

5. The system of claim 1 wherein the at least a first presentation device includes at least first and second different presentation devices that present the at least first and second presentation spaces, respectively.

6. The system of claim 5 wherein each of the presentation devices includes an electronic display screen.

7. The system of claim 1 wherein the at least a first presentation device that presents the first and second presentation spaces includes a single presentation device that presents first and second independent presentation spaces.

8. The system of claim 7 wherein the at least a first presentation device includes an electronic display screen.

9. The system of claim 1 wherein the at least a first presentation device includes a touch sensitive display.

10. The system of claim 1 further including at least a second presentation device including at least a second presentation surface for presenting content to conference attendees in a second space, the at least a second presentation surface including at least first and second independent presentation spaces for presenting content, the second presentation device located remote from the first presentation device;
a second processor associated with the at least a second presentation device for controlling content presented in the presentation spaces provided on the second presentation surface, the second processor linked to the first processor and for controlling content on the second presentation surface so that the content on the second presentation surface replicates the content on the first presentation surface substantially in real time.

11. The system of claim 10 further including at least a second interface linked to the second processor, the at least a second interface enabling at least a second attendee to control content presented in the presentation spaces on the second presentation surface, the second interface further enabling at least the second attendee to store session content as a session content set that correlates content presented in the presentation spaces on the second presentation surface with associated presentation spaces, the second interface further enabling at least the second attendee to reaccess and re-present a session content set at a subsequent time on the at least a second presentation surface where, the second processor presents content from a selected session content set in the same presentation spaces that the content was in when the session content set was most recently stored via the second interface.

12. The system of claim 11 wherein each of the first and second presentation surfaces is touch sensitive so that users interact with content in the presentation spaces via touch.

13. The system of claim 1 further including:
at least a second presentation device including at least a second presentation surface for presenting content to conference attendees in a second space, the at least a second presentation surface including less presentation spaces than the first presentation device, the second presentation device located remote from the first presentation device; and
a second processor associated with the at least a second presentation device for controlling content presented in the presentation spaces provided on the second presentation surface, the second processor linked to the first processor and for controlling content on the second presentation surface so that the content substantially replicates at least a portion of the content on the first presentation surface, differences between content presented on the first and second presentation surfaces indicated on at least the first presentation surface.

14. The system of claim 13 wherein differences between content presented on the first and second presentation surfaces is indicated on each of the first and second presentation surfaces.

15. The system of claim 1 wherein the user interface is usable to change the dimensions of the presentation spaces.

16. The system of claim 1 wherein at least some of the presentation content includes dynamic content presented as output from an application program.

17. The system of claim 1 wherein the user interface is usable to move the presentations spaces to different locations on the first presentation surface.

18. A collaboration system for sharing digital content among a plurality of session attendees, the collaboration system comprising:
at least a first presentation device including at least a first presentation surface for presenting content to conference attendees in a first space, the at least a first presentation surface capable of providing a plurality of independent presentation spaces for presenting content;

at least a second presentation device including at least a second presentation surface for presenting content to conference attendees in a second space that is remote from the first space, the at least a second presentation surface capable of providing a plurality of independent presentation spaces for presenting content;

at least a first processor for controlling content presented in the presentation spaces provided by the first and second presentation devices;

at least a first interface linked to the processor, the at least a first interface enabling at least a first attendee to control content presented in the presentation spaces, the interface further enabling at least the first attendee to store session content as a session content set that correlates content presented in the presentation spaces with associated presentation spaces, the interface further enabling at least the first attendee to reaccess and re-present a session content set at a subsequent time on the at least a first presentation surface and the at least a second presentation surface where, the processor presents content from a selected session content set in the same presentation spaces that the content was in when the session content set was most recently stored.

19. The system of claim 18 wherein the processor substantially replicates the content on the first presentation surface on the second presentation surface.

20. The system of claim 19 wherein the first interface is used within the first space, the system further including at least a second interface linked to the processor, the at least a second interface enabling at least a second attendee to control content presented in the presentation spaces, the second interface further enabling at least the second attendee to store session content as a session content set that correlates content presented in the presentation spaces with associated presentation spaces, the second interface further enabling at least the second attendee to reaccess and re-present a session content set at a subsequent time on the at least a first presentation surface and the at least a second presentation surface where, the processor presents content from a selected session content set in the same presentation spaces that the content was in when the session content set was most recently stored.

21. The system of claim 18 wherein the at least a first presentation device includes a touch sensitive display, the first interface device integrated into the first presentation device and comprising the touch sensitive display.

22. The system of claim 18 wherein the first presentation surface further includes N presentation spaces where N is greater than 2 and wherein the processor presents content from the selected content set in each of the N presentation spaces that the content was in when the session content was most recently stored.

23. The system of claim 22 wherein at least the first attendee can use the interface to modify N.

24. The system of claim 22 wherein the interface is presented on the at least a first presentation device and includes a panel section where at least some session content is presented as thumbnail icons upon storage and wherein the processor re-presents the panel section including thumbnail icons upon re-presentation of the session content set.

25. The system of claim 18 wherein each of the presentation devices includes an electronic display screen.

26. The system of claim 18 wherein the at least a first presentation device that presents a plurality of presentation spaces includes a single presentation device that presents a plurality of independent presentation spaces and wherein the second presentation device that presents a plurality of presentation spaces includes a single presentation device that presents a plurality of independent presentation spaces.

27. The system of claim 18 further including a second processor associated with the at least a second presentation device for controlling content presented in the presentation spaces provided on the second presentation surface, the second processor linked to the first processor and for controlling content on the second presentation surface so that the content on the second presentation surface substantially replicates the content on the first presentation surface substantially in real time.

28. The system of claim 27 further including at least a second interface linked to the second processor, the at least a second interface enabling at least a second attendee to control content presented in the presentation spaces on the second presentation surface, the second interface further enabling at least the second attendee to store session content as a session content set that correlates content presented in the presentation spaces on the second presentation surface with associated presentation spaces, the second interface further enabling at least the second attendee to reaccess and re-present a session content set at a subsequent time on the at least a second presentation surface where, the second processor presents content from a selected session content set in the same presentation spaces that the content was in when the session content set was most recently stored via the second interface.

29. The system of claim 28 wherein each of the first and second presentation surfaces is touch sensitive so that users interact with content in the presentation spaces via touch.

30. The system of claim 18 wherein at least the second presentation device includes a portable computer device.

31. The system of claim 18 wherein at least the second presentation device includes a display screen on a portable computing device.

32. The system of claim 31 wherein the portable computing device includes a laptop computer.

33. A collaboration system for sharing digital content among a plurality of session attendees, the collaboration system comprising:

at least a first presentation device including at least a first presentation surface for presenting content to conference attendees in a first space, the at least a first presentation surface capable of providing a plurality of independent presentation spaces for presenting content;

at least a first processor for controlling content presentation in the presentation spaces and maintaining a database that associates users that created each object with the objects created;

at least a first interface linked to the processor, the at least a first interface enabling at least a first attendee to control objects presented in the presentation spaces, the interface further enabling at least the first attendee to store presented objects as a session content set that correlates the objects with associated presentation spaces, the interface further enabling at least the first attendee to reaccess and re-present a session content set including a plurality of objects at a subsequent time on the at least a first presentation surface where, the processor presents objects from a selected session content set in the same presentation spaces and locations that the objects were in and when the session content set was most recently stored.

34. The system of claim 33 wherein at least a subset of the objects include drawings applied to the presentation surfaces by system users.

35. The system of claim 34 wherein objects on a presentation surface are selectable via the interface and can be moved about via a touch dragging action from one presentation surface to another.

36. The system of claim 33 wherein the plurality of presentation surfaces includes N presentation spaces where N is greater than 2 and wherein the processor presents objects from the selected content set in each of the N presentation spaces that the objects were in when the session content was most recently stored.

37. The system of claim 36 wherein at least the first user can use the interface to modify N.

38. The system of claim 36 wherein the interface is presented on the at least a first presentation device and includes a panel section where at least some session objects are presented as thumbnail icons upon storage and wherein the processor re-presents the panel section including thumbnail icons upon re-presentation of the session content set.

39. The system of claim 33 wherein the at least a first presentation device that presents a plurality of presentation spaces includes a single presentation device that presents a plurality of independent presentation spaces.

40. The system of claim 39 wherein the at least a first presentation device includes an electronic display screen.

41. The system of claim 18 further including at least a second presentation device including at least a second presentation surface for presenting content to conference attendees in a second space, the at least a second presentation surface including at least first and second independent presentation spaces for presenting content, the second presentation device located remote from the first presentation device;
- a second processor associated with the at least a second presentation device for controlling content presented in the presentation spaces provided on the second presentation surface, the second processor linked to the first processor and for controlling content on the second presentation surface so that the objects on the second presentation surface substantially replicate the objects on the first presentation surface substantially in real time.

42. The system of claim 41 further including at least a second interface linked to the second processor, the at least a second interface enabling at least a second attendee to control objects presented in the presentation spaces on the second presentation surface, the second interface further enabling at least the second attendee to store presented objects as a session content set that correlates the objects with associated presentation spaces, the second interface further enabling at least the second attendee to reaccess and re-present a session content set including a plurality of objects at a subsequent time on the first and second presentation surfaces where, the second processor presents objects from a selected session content set in the same presentation spaces that the objects were in when the session content set was most recently stored via the second interface.

43. The system of claim 18 further including:
- at least a second presentation device including at least a second presentation surface for presenting content to conference attendees in a second space, the at least a second presentation surface including less presentation spaces than the first presentation device, the second presentation device located remote from the first presentation device; and
- a second processor associated with the at least a second presentation device for controlling objects presented in the presentation spaces provided on the second presentation surface, the second processor linked to the first processor and for controlling objects on the second presentation surface so that the objects on the second presentation surface substantially replicate at least a portion of the objects on the first presentation surface, differences between objects presented on the first and second presentation surfaces indicated on at least the first presentation surface.

\* \* \* \* \*

UNITED STATES PATENT AND TRADEMARK OFFICE
CERTIFICATE OF CORRECTION

| | | |
|---|---|---|
| PATENT NO. | : 9,866,794 B2 | Page 1 of 1 |
| APPLICATION NO. | : 15/417317 | |
| DATED | : January 9, 2018 | |
| INVENTOR(S) | : Michael H Dunn et al. | |

It is certified that error appears in the above-identified patent and that said Letters Patent is hereby corrected as shown below:

In the Specification

Column 28, Line 26, "5447861" should be --54478B1--.

Column 28, Line 27, "8990861" should be --89908B1--.

Column 28, Line 58, "5447861" should be --54478B1--.

Column 28, Line 60, "8990861" should be --89908B1--.

In the Claims

Column 80, Claim 33, Lines 50-51, "controlling content presentation" should be --controlling object presentation--.

Column 80, Claim 33, Line 66, "in and when" should be --in when--.

Signed and Sealed this
Twentieth Day of February, 2018

Andrei Iancu
*Director of the United States Patent and Trademark Office*